(12) United States Patent
Pittman

(10) Patent No.: US 11,790,401 B2
(45) Date of Patent: Oct. 17, 2023

(54) PLATFORM FOR LOCATION AND TIME BASED ADVERTISING

(71) Applicant: BoardActive Corporation, Atlanta, GA (US)

(72) Inventor: Douglas L. Pittman, Atlanta, GA (US)

(*) Notice: Subject to any disclaimer, the term of this patent is extended or adjusted under 35 U.S.C. 154(b) by 0 days.

(21) Appl. No.: 17/007,483

(22) Filed: Aug. 31, 2020

(65) Prior Publication Data
US 2020/0402099 A1 Dec. 24, 2020

Related U.S. Application Data

(63) Continuation-in-part of application No. 16/877,440, filed on May 18, 2020, now Pat. No. 10,762,526, (Continued)

(51) Int. Cl.
*G06Q 30/02* (2023.01)
*G06Q 30/0251* (2023.01)
(Continued)

(52) U.S. Cl.
CPC ..... *G06Q 30/0261* (2013.01); *G06Q 30/0242* (2013.01); *G06Q 30/0244* (2013.01); *G06Q 30/0246* (2013.01); *G06Q 30/0264* (2013.01); *G06Q 30/0267* (2013.01); *G06Q 30/0269* (2013.01); *G06Q 30/0277* (2013.01); *H04W 4/02* (2013.01); *H04W 4/023* (2013.01);
(Continued)

(58) Field of Classification Search
CPC .......... G06Q 30/0261; G06Q 30/0242; G06Q 30/0244; G06Q 30/0246; G06Q 30/0267; G06Q 30/0269; G06Q 30/0277; H04W 4/029; H04W 4/02; H04W 4/023; H04W 4/80; H04L 67/306
See application file for complete search history.

(56) References Cited

U.S. PATENT DOCUMENTS 8,271,413 B2  9/2012  Agarwal et al.
8,391,886 B1  3/2013  Thaper
(Continued)

FOREIGN PATENT DOCUMENTS

EP  2424278  2/2012
WO  2016043663 A1  3/2016
(Continued)

OTHER PUBLICATIONS

Copending U.S. Appl. No. 17/008,397, filed Aug. 31, 2020 entitled "Platform for Location and Time Based Advertising", Douglas L. Pittman (available in IFW).
(Continued)

*Primary Examiner* — Michael I Ezewoko

(57) ABSTRACT

The present disclosure provides systems and methods configured to perform the stages of: receiving an initial device location; receiving a subsequent device location; determining a course of travel associated with the device; aggregating data associated with courses of travel for a plurality of devices; determining a plurality of commonly traveled paths based on the aggregated data; receiving an identification of a path of the plurality of commonly traveled paths; and defining content to be transmitted to at least one device traveling down the identified path.

17 Claims, 64 Drawing Sheets

Related U.S. Application Data which is a continuation of application No. 16/823,323, filed on Mar. 18, 2020, now Pat. No. 10,692,108, which is a continuation of application No. 15/950,019, filed on Apr. 10, 2018, now Pat. No. 10,621,620, which is a continuation-in-part of application No. 15/483,790, filed on Apr. 10, 2017, now Pat. No. 10,521,822.

(51) Int. Cl.
| | |
|---|---|
| *G06Q 30/0242* | (2023.01) |
| *H04W 4/02* | (2018.01) |
| *H04W 4/029* | (2018.01) |
| *G06Q 30/0241* | (2023.01) |
| *H04W 4/80* | (2018.01) |
| *H04L 67/306* | (2022.01) |

(52) U.S. Cl.
CPC .......... *H04W 4/029* (2018.02); *H04L 67/306* (2013.01); *H04W 4/80* (2018.02)

(56) References Cited

U.S. PATENT DOCUMENTS

| | | | |
|---|---|---|---|
| 8,417,258 B2 | 4/2013 | Barnes, Jr. | |
| 8,996,035 B2 | 3/2015 | Busch | |
| 9,047,650 B2 | 6/2015 | Strode | |
| 9,094,137 B1 | 7/2015 | Sehn | |
| 9,158,414 B1 | 10/2015 | Gluzberg et al. | |
| 9,167,386 B2* | 10/2015 | Valaee | H04W 64/00 |
| 9,338,622 B2* | 5/2016 | Bjontegard | A63F 13/216 |
| 9,373,123 B2 | 6/2016 | Carlson et al. | |
| 9,516,470 B1 | 12/2016 | Scofield | |
| 9,672,538 B1 | 6/2017 | Vaynblat et al. | |
| 9,674,660 B1 | 6/2017 | Vaynblat et al. | |
| 9,918,197 B2 | 3/2018 | Labarca | |
| 10,015,124 B2 | 7/2018 | McGregor, Jr. et al. | |
| 10,062,099 B2 | 8/2018 | McGrath | |
| 10,080,129 B2* | 9/2018 | Seidman | H04W 4/029 |
| 10,311,611 B2 | 6/2019 | Stoop et al. | |
| 10,521,822 B2 | 12/2019 | Pittman | |
| 10,621,620 B2 | 4/2020 | Pittman | |
| 10,621,621 B1 | 4/2020 | Pittman | |
| 10,685,380 B1 | 6/2020 | Pittman | |
| 10,692,108 B1 | 6/2020 | Pittman | |
| 10,762,526 B1 | 9/2020 | Pittman | |
| 10,762,527 B1 | 9/2020 | Pittman | |
| 10,762,528 B1 | 9/2020 | Pittman | |
| 10,762,529 B1 | 9/2020 | Pittman | |
| 10,762,530 B1 | 9/2020 | Pittman | |
| 11,257,119 B2 | 2/2022 | Pittman | |
| 11,373,118 B2 | 6/2022 | High et al. | |
| 2002/0009978 A1 | 1/2002 | Dukach et al. | |
| 2006/0036494 A1 | 2/2006 | Aufricht et al. | |
| 2008/0214150 A1 | 9/2008 | Ramer et al. | |
| 2009/0149199 A1 | 6/2009 | Maghoul | |
| 2009/0177385 A1 | 7/2009 | Matas et al. | |
| 2009/0197616 A1 | 8/2009 | Lewis et al. | |
| 2010/0198700 A1 | 8/2010 | Ramaswamy | |
| 2011/0054776 A1 | 3/2011 | Petrov et al. | |
| 2011/0145068 A1 | 6/2011 | King et al. | |
| 2011/0171976 A1 | 7/2011 | Creemer | |
| 2012/0176411 A1 | 7/2012 | Huston | |
| 2013/0013414 A1 | 1/2013 | Haff | |
| 2013/0041753 A1* | 2/2013 | Sathyanath | G06Q 30/0261 705/14.58 |
| 2013/0060640 A1 | 3/2013 | Gadhia et al. | |
| 2013/0073388 A1 | 3/2013 | Heath | |
| 2013/0210463 A1 | 8/2013 | Busch | |
| 2014/0143060 A1 | 5/2014 | Fernandez | |
| 2014/0164125 A1 | 6/2014 | Taylor | |
| 2015/0006278 A1 | 1/2015 | Di Censo et al. | |
| 2015/0095124 A1 | 4/2015 | Felt | |
| 2015/0127460 A1* | 5/2015 | Daub | G06Q 30/0269 705/14.58 |
| 2015/0262214 A1 | 9/2015 | Geer | |
| 2015/0348117 A1 | 12/2015 | Busch | |
| 2015/0363828 A1 | 12/2015 | Mantalovos | |
| 2016/0048869 A1* | 2/2016 | Shim | G06Q 30/0246 705/14.45 |
| 2016/0116296 A1 | 4/2016 | Nguyen et al. | |
| 2016/0148269 A1 | 5/2016 | Lamont | |
| 2016/0196582 A1 | 7/2016 | Stone et al. | |
| 2016/0232572 A1 | 8/2016 | East et al. | |
| 2016/0292713 A1 | 10/2016 | Chen et al. | |
| 2016/0309292 A1 | 10/2016 | Kerr | |
| 2017/0026460 A1 | 1/2017 | Patel | |
| 2017/0061404 A1 | 3/2017 | Tunnell et al. | |
| 2017/0161784 A1 | 6/2017 | Malik | |
| 2017/0188199 A1* | 6/2017 | Ashley, Jr. | G06V 20/52 |
| 2017/0213240 A1* | 7/2017 | Waldron | G06F 16/29 |
| 2018/0047057 A1 | 2/2018 | Mayfield et al. | |
| 2018/0053215 A1 | 2/2018 | e Costa | |
| 2018/0060920 A1 | 3/2018 | Beaven et al. | |
| 2018/0114251 A1 | 4/2018 | Zavesky et al. | |
| 2018/0136651 A1 | 5/2018 | Levinson et al. | |
| 2018/0174188 A1 | 6/2018 | Wilkinson et al. | |
| 2018/0197204 A1 | 7/2018 | Wan et al. | |
| 2018/0197205 A1 | 7/2018 | Labarca | |
| 2018/0293617 A1 | 10/2018 | Pittman | |
| 2018/0300761 A1 | 10/2018 | Pittman | |
| 2018/0365266 A1 | 12/2018 | Ellenby et al. | |
| 2019/0057113 A1 | 2/2019 | McKinnon et al. | |
| 2019/0156370 A1* | 5/2019 | Harrison | G06F 16/00 |
| 2020/0126122 A1 | 4/2020 | Pittman | |
| 2020/0219132 A1 | 7/2020 | Pittman | |
| 2020/0219133 A1 | 7/2020 | Pittman | |
| 2020/0279293 A1 | 9/2020 | Pittman | |
| 2020/0279294 A1 | 9/2020 | Pittman | |
| 2020/0279295 A1 | 9/2020 | Pittman | |
| 2020/0279296 A1 | 9/2020 | Pittman | |
| 2020/0279297 A1 | 9/2020 | Pittman | |
| 2020/0311770 A1 | 10/2020 | Pittman | |
| 2020/0402100 A1 | 12/2020 | Pittman | |
| 2020/0402101 A1 | 12/2020 | Pittman | |

FOREIGN PATENT DOCUMENTS

| | | |
|---|---|---|
| WO | WO2017/079838 | 5/2017 |
| WO | 2020012241 A1 | 1/2020 |

OTHER PUBLICATIONS

Depending U.S. Appl. No. 17/009,242, filed Sep. 1, 2020 entitled "Platform for Location and Time Based Advertising", Douglas L. Pittman (available in IFW).

International Search Report and Written Opinion dated Jun. 29, 2018 cited in Application No. PCT/US2018/26965, 8 pgs.

U.S. Non-Final Office Action dated Jan. 11, 2019 cited in U.S. Appl. No. 15/483,790, 18 pgs.

International Preliminary Report on Patentability dated Apr. 29, 2019 cited in Application No. PCT/US2018/26965, 29 pgs.

U.S. Non-Final Office Action dated Oct. 3, 2019 cited in U.S. Appl. No. 15/950,019, 23 pgs.

European Supplementary Search Report dated Aug. 24, 2020 cited in Application No. 18784298.4, 8 pgs.

Copending U.S. Appl. No. 16/902,099, filed Jun. 15, 2020 entitled "Platform for Location and Time Based Advertising".

U.S. Non-Final Office Action dated Dec. 10, 2020 cited in U.S. Appl. No. 17/008,397, 30 pgs.

U.S. Non-Final Office Action dated Mar. 4, 2021 cited in U.S. Appl. No. 16/902,099, 44 pgs.

U.S. Non-Final Office Action dated Mar. 18, 2021 cited in U.S. Appl. No. 17/009,242, 35 pgs.

Ammar et al., "BusMate: Understanding Mobility Behavior for Trajectory-Based Advertising," 2015, 16th IEEE International Conference on Mobile Data Management, pp. 74-79.

Book et al., "An Empiricla Study of Mobile Ad Targeting," Rice University, 2015, pp. 1-14.

(56) References Cited

OTHER PUBLICATIONS

Mathai et al., "Location Based Mobile Advertising Framework for Commuters," 2015, International Conference on Computing and Network Communications, CoCoNet 15, Dec. 16-19, 2015, Trivandrum, India, pp. 928-925.

International Search Report and Written Opinion dated Nov. 24, 2021 cited in Application No. PCT/US21/48168, 9 pgs.

U.S. Final Office Action dated Dec. 7, 2021 cited in U.S. Appl. No. 16/902,099, 32 pgs.

Australian Examination Report No. 1 dated Dec. 13, 2021 cited in Application No. 2018253083, 5 pgs.

U.S. Non-Final Office Action dated Sep. 26, 2022 cited in U.S. Appl. No. 17/008,397, 29 pgs.

U.S. Final Office Action dated Mar. 8, 2022 cited in U.S. Appl. No. 17/008,397, 34 pgs.

Indian First Examination Report dated Feb. 8, 2022 cited in Application No. 201917044841, 6 pgs.

* cited by examiner

BOARDS

900

+ Add Board

| Name | Your Stats | Notes | Description | Coupon | Logo | Delete? |
|---|---|---|---|---|---|---|
| BoardActive | Views: 57<br>Action: 0<br>Saves: 4<br>Shares: 1 | Test... | Come See Our Promotions... | ▆ | ▆ | ✕ |
| Design Landscapes | Views: 39<br>Action: 0<br>Saves: 5<br>Shares: 8 | | The Lion, the Watch, end the Wardrobe Theater Production... | ▆ | ▆ | ✕ |
| Upward Technology | Views: 19<br>Action: 0<br>Saves: 1<br>Shares: 0 | | Demo BillBoard... | ▆ |  | ✕ |

*1000*

*1300*

MY ADVERTISERS

FIG. 13

Attractions

Education

Entertainment

Finance

Food

Health and Fitness

Kids

Legal

Lifestyles

Media

*3305*

3: Who should receive your message?
○ Send my message to everyone

[Bring them back]

Bring them back

○ Users

*FIG. 33B*

PLATFORM FOR LOCATION AND TIME BASED ADVERTISING

RELATED APPLICATIONS

The present application is a Continuation-In-Part claiming priority U.S. application Ser. No. 16/877,440 filed on May 18, 2020, which issues on Sep. 1, 2020 as U.S. Pat. No. 10,762,526, which is a Continuation of U.S. application Ser. No. 16/823,323 filed on Mar. 18, 2020, which issued on Jun. 23, 2020 as U.S. Pat. No. 10,692,108, which is a Continuation of U.S. patent application Ser. No. 15/950,019 filed on Apr. 10, 2018, which issued on Apr. 14, 2020 as U.S. Pat. No. 10,621,620, which is a Continuation-In-Part claiming priority to U.S. application Ser. No. 15/483,790 filed on Apr. 10, 2017, which issued on Dec. 31, 2019 as U.S. Pat. No. 10,521,822, assigned to the assignee of the present application, all of which are hereby incorporated by reference herein, in their entirety.

It is intended that the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to the field of digital content selection and delivery based on behavioral data. More specifically, the present disclosure relates to a platform for managing geolocation and time-based advertising and methods for managing and/or delivering location and time-based advertisements.

BACKGROUND

Outdoor advertising is a very common and powerful mode of disseminating information to users. Typically, outdoor advertising involves use of signage (e.g., a billboard, T.V., or other viewable advertisement) installed at public places such as, for example, roadways, bus/train stations, airports, shopping centers, parking spaces, etc. Further, these signage are usually managed by an advertising agency that rents the signage to different advertisers for a predetermined time period. New media now allows online placements in a similar way to billboard advertising.

However, while signage has proven to be an attractive means of advertising, they suffer from several drawbacks. For example, adverse weather such as fog, rain etc. greatly affects visibility of a signage to nearby users. Further, in order to provide visibility in low light conditions, such as during night, external lighting systems are needed which increases cost. Additionally, presence of extraneous objects such as trees, buildings, etc. partially or completely occludes signage resulting in poor visibility to users. Furthermore, for signage situated at locations, such as along highways, where users are always moving, sufficient exposure of advertisements to users may not be possible. It is therefore more difficult for the users to memorize the information of the advertisements.

Further, with existing methods of advertising using signage, neither the advertising agency, media buyer, reseller, nor the advertiser is able to determine reach and/or effectiveness of the advertisements. In other words, the advertiser is currently unaware about analytical information relating to consumption and usage of the advertisements on signage. Accordingly, advertisers are disadvantaged with regard to improving effectiveness of advertisements on signage or other advertising mediums such as, for example, but not limited to TV, real estate and other static, traditional, virtual, 3D, holographic, and other digital signage platforms. Digital signage may also be known as 'dynamic signage', and 'digital streaming". If you work in marketing, design, IT, or PR, you've likely come across a digital signage scenario that asks for your expertise. Digital signage is used across a wide portfolio. You see it in schools, convenience stores, hospitals, universities, receptions, sporting events, bus stops, malls and more. It's used to inform, educate, entertain and sell.

Over the years, the digital signage industry has adapted. What was once expensive, difficult and only available to the big brands of the world is now accessible by everyone. For the independent restaurateurs and the corner shops, as much as the big brands and signage.

Digital signage includes the provision of content (video, images, adverts, presentations) to a digital device such as a TV screen, tablet, iPad or kiosk. Digital signage may be used in both public and private areas, including, for example, schools, stores and waiting rooms, to restaurants, bus stops and airports. Digital signage can also sometimes be called 'digital OOH', 'digital out-of-home' or 'dynamic signage' but all effectively refer to the same thing.

Advertising on digital signage is currently non-interactive. In other words, subsequent to a user viewing an advertisement on a digital signage, there may be no immediate action performable by the user as a result of viewing the advertisement. Typically, the user needs to remember or note writing information from the advertisement and perform a related action later by, for example, going online, calling a phone number, making a purchase, etc. Accordingly, the user is burdened with remembering or writing down information or taking a picture. As a result, a large number of users choose to ignore the advertisement, thus reducing the reach and/or effectiveness of the advertisement.

Therefore, there is a need for improved methods and systems for advertising in outdoor and indoor locations.

BRIEF OVERVIEW

A platform for location and time-based advertisements and methods for managing and/or delivering location and time-based advertisements may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Embodiments of the present disclosure may provide a method comprising: receiving an initial device location; receiving a subsequent device location; comparing the initial device location and the subsequent device location; determining a course of travel associated with the device; aggregating data associated with courses of travel for a plurality of devices; determining a plurality of commonly traveled paths based on the aggregated data; receiving an identification of a path of the plurality of commonly traveled paths; and defining content to be transmitted to at least one device traveling down the identified path.

Embodiments of the present disclosure may provide methods, systems, and computer-readable media configured to perform at least the following functions:

a. specifying a content distribution campaign, the content distribution campaign comprising;
   i. a geolocation, and
   ii. media content associated with the geolocation;
b. specifying a plurality of rules for the content distribution campaign, wherein specifying the plurality of rules comprises:
   i. specifying a first rule corresponding to a period of time,
   ii. specifying a second rule corresponding to at least one element of profile data associated with a consumer, and
   iii. specifying a third rule corresponding to a course of travel associated with the consumer;
c. receiving a first indication that the consumer is at a first location within a radius of the geolocation;
d. assessing, in response to the first indication, the at least one element of profile data associated with the consumer;
e. receiving a second indication that the consumer is at a second location;
f. determining the course of travel based, at least in part, on an analysis of the first location and the second location; and
g. establishing that the consumer is eligible for the content distribution campaign when the plurality of rules is satisfied.

Embodiments of the present disclosure may provide methods, systems, and computer-readable media configured to perform at least the following functions:
a. specifying a content distribution campaign comprising media content associated with a geolocation;
b. specifying a plurality of rules for the content distribution campaign, wherein specifying the plurality of rules comprises:
   i. specifying the geolocation,
   ii. specifying a period of time, and
   iii. specifying at least one action to be performed by a consumer;
c. receiving a first indication that the consumer is within a radius of the geolocation;
d. tracking the consumer in response to receiving the first indication to determine whether the consumer has performed the at least one action; and
e. establishing that the consumer is eligible for the content distribution campaign when the plurality of rules is satisfied.

Embodiments of the present disclosure may provide methods, systems, and computer-readable media configured to perform at least the following functions:
a. defining at least one of the following for a registered asset:
   i. a physical asset, and
   ii. a virtual asset;
b. defining a media content associated with the registered asset, the media content comprising a first message and a second message;
c. defining a consumer audience segment to be delivered the media content;
d. defining a set of rules for providing the media content to the consumer audience segment, the set of rules comprising:
   i. a first rule corresponding a consumer's location in association with the registered asset, and
   ii. a second rule corresponding to at least one action performed by a consumer during a course of travel related to the consumer's location in association with the registered asset;
e. receiving a first determination that the first rule has been satisfied;
f. associating the first message with the consumer upon the first rule being satisfied;
g. receiving a second determination that the second rule has been satisfied; and
h. associating the second message with the consumer upon the second rule being satisfied.

Embodiments of the present disclosure provide methods, systems, and computer-readable media configured to perform at least the following functions:
a. receiving a specification of a geolocation, the specification including a radius defining a region of the geolocation;
b. receiving content to be associated with the geolocation;
c. associating the geolocation with the content;
d. defining a delivery condition for delivering the content, the delivery condition comprising a course of travel of a mobile computing device;
e. receiving a first indication from the mobile computing device, the first indication being associated with a first location of the mobile computing device;
f. determining that the first location is within the radius of the geolocation associated with the content;
g. receiving a second indication from the mobile computing device, the second indication being associated with a second location of the mobile computing device;
h. determining the course of travel of the mobile computing device based on a comparison of the first location to the second location; and
i. transmitting, when the delivery condition is met, the content associated with the geolocation.

Embodiments of the present disclosure provide methods, systems, and computer-readable media configured to perform at least the following functions:
a. establishing a geolocation for content distribution, the content distribution being based on at least the following content distribution conditions:
   i. the geolocation at which a consumer has been located, and
   ii. a course of travel of the consumer after the consumer has been located at the geolocation;
b. receiving an initial location of the consumer within the geolocation;
c. identifying the consumer as a prospect for the content distribution;
d. receiving a subsequent location of the consumer;
e. comparing the subsequent location with the initial location;
f. determining the course of travel based on the comparison; and
g. establishing the consumer as a target for the content distribution when the content distribution conditions have been met.

Embodiments of the present disclosure provide methods, systems, and computer-readable media configured to perform at least the following functions:
a. establishing a geolocation for a campaign, the content distribution being based on at least the following content distribution conditions:
   i. a characteristic of a consumer,
   ii. a period of time, iii. the geolocation at which the consumer is located, and
iv. a course of travel of the consumer;
b. receiving an initial location of the consumer within the geolocation;
c. determining whether the consumer was within the geolocation within the period of time;
d. retrieving the characteristic of the consumer;
e. determining whether the characteristic of the consumer matches at least one of the content distribution conditions;
f. identifying the consumer as a prospect for the campaign;
g. tracking the consumer as the prospect for the campaign;
h. receiving a subsequent location of the consumer;
i. comparing the subsequent location with the initial location;
j. determining the course of travel based on the comparison; and
k. establishing the consumer as a target for the campaign.

Embodiments of the present disclosure provide methods, systems, and computer-readable media configured to perform at least the following functions:
a. Defining Content Distribution Campaign
b. Specifying Rule(s)
c. Receiving an Indication Re Consumer's First Location
d. Assessing Profile Data of Consumer
e. Receiving an Indication Re Consumer's Second Location
f. Determining Course of Travel of Consumer
g. Establishing the Consumer's Campaign Eligibility Embodiments of the present disclosure provide methods, systems, and computer-readable media configured to perform at least the following functions:
a. Defining Content Distribution Campaign
b. Specifying Rules(s)
c. Receiving an Indication Re Consumer's First Location
d. Tracking the Consumer
e. Establishing the Consumer's Campaign Eligibility Embodiments of the present disclosure provide methods, systems, and computer-readable media configured to perform at least the following functions:
a. Registering Asset Data
b. Defining Plurality of Messages with Asset Data
c. Specifying Rule(s) for Delivering Messages
d. Determine that First Rule Satisfied by Consumer
e. Associate a First Message with the Consumer
f. Determine that First Rule Satisfied by the Consumer
g. Associate a Second Message with the Consumer Embodiments of the present disclosure provide methods, systems, and computer-readable media configured to perform at least the following functions:
a. Specifying Geolocation
b. Receiving Media Content Associated with Geolocation
c. Defining Delivery Conditions
d. Receiving a First Indication of a First Location
e. Comparing the First Location with the Geolocation
f. Receiving a Second Indication of a Second Location
g. Determining a Course of Travel
h. Transmitting the Media Content Embodiments of the present disclosure provide methods, systems, and computer-readable media configured to perform at least the following functions:
a. Establishing At Least One Geolocation for Campaign
b. Receiving First Location of Consumer
c. Identifying Consumer for Content Distribution
d. Receiving Subsequent Location of Consumer
e. Comparing the First Location with Subsequent Location
f. Determining a Course of Travel
g. Establishing Consumer as Prospect for Campaign Embodiments of the present disclosure provide methods, systems, and computer-readable media configured to perform at least the following functions:
a. Establishing Campaign
b. Receiving Initial Consumer Geolocation
c. Checking Period of Time Consumer in Geolocation
d. Identifying Consumer as a Prospect for Campaign
e. Receiving Subsequent Consumer Geolocation
f. Comparing Initial and Subsequent Geolocation
g. Determining Course of Travel of Consumer
h. Establishing Consumer as a Target for Campaign Embodiments of the present disclosure provide methods, systems, and computer-readable media configured to perform at least the following functions:
a. receiving an image,
  i. wherein the image is associated with a first geolocation,
  ii. wherein the image is captured by a mobile device,
    1. wherein the image is transmitted once captured,
  iii. wherein the image is uploaded;
b. processing the image for at least one brand asset;
c. transmitting a first content; and
d. tracking for one physical action,
  i. wherein the physical action is associated with a second geolocation,
  ii. wherein tracking comprises receiving mobile device activity data,
  iii. wherein tracking comprises receiving location data Embodiments of the present disclosure provide methods, systems, and computer-readable media configured to perform at least the following functions:
a. receiving an initial device location;
b. receiving a subsequent device location;
c. comparing the initial device location and subsequent device location;
d. determining a course of travel associated with the device;
e. aggregating data associated with the course of travel associated with the device with courses of travel associated with a plurality of other devices;
f. determining a plurality of common paths based on the aggregated data;
g. providing a density map comprising a density of the plurality of common paths;
h. receiving an identification of a path of the plurality of common paths; and
i. defining content to be transmitted to at least one device traveling down the identify path.

Embodiments of the present disclosure provide methods, systems, and computer-readable media configured to perform at least the following functions:
a. providing a map comprising a density the of calculated common paths of a plurality of consumer geolocation changes;
b. providing a plurality of bidding segments along at least one path of the plurality of consumer geolocation changes;
c. providing a plurality of rules to bid for the plurality of segments; and
d. providing a bidding system for the plurality of segments.

Embodiments of the present disclosure provide methods, systems, and computer-readable media configured to perform at least the following functions:
 a. establishing a content distribution campaign
 b. registering at least one mobile asset;
 c. determining when a consumer is in the proximity of the at least one mobile asset;
 d. establishing a consumer as a target for campaign; and
 e. transmitting the campaign content.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 13 illustrates a screenshot 1300 of a GUI for adding one or more advertisers on the platform, in accordance with embodiments of the present disclosure.

FIG. 33B illustrates a screenshot 3305 of another GUI for defining one or more additional delivery rules in conjunction with geolocation and time-based advertisements, in accordance with embodiments of the present disclosure.

DETAILED DESCRIPTION

Figure 1:
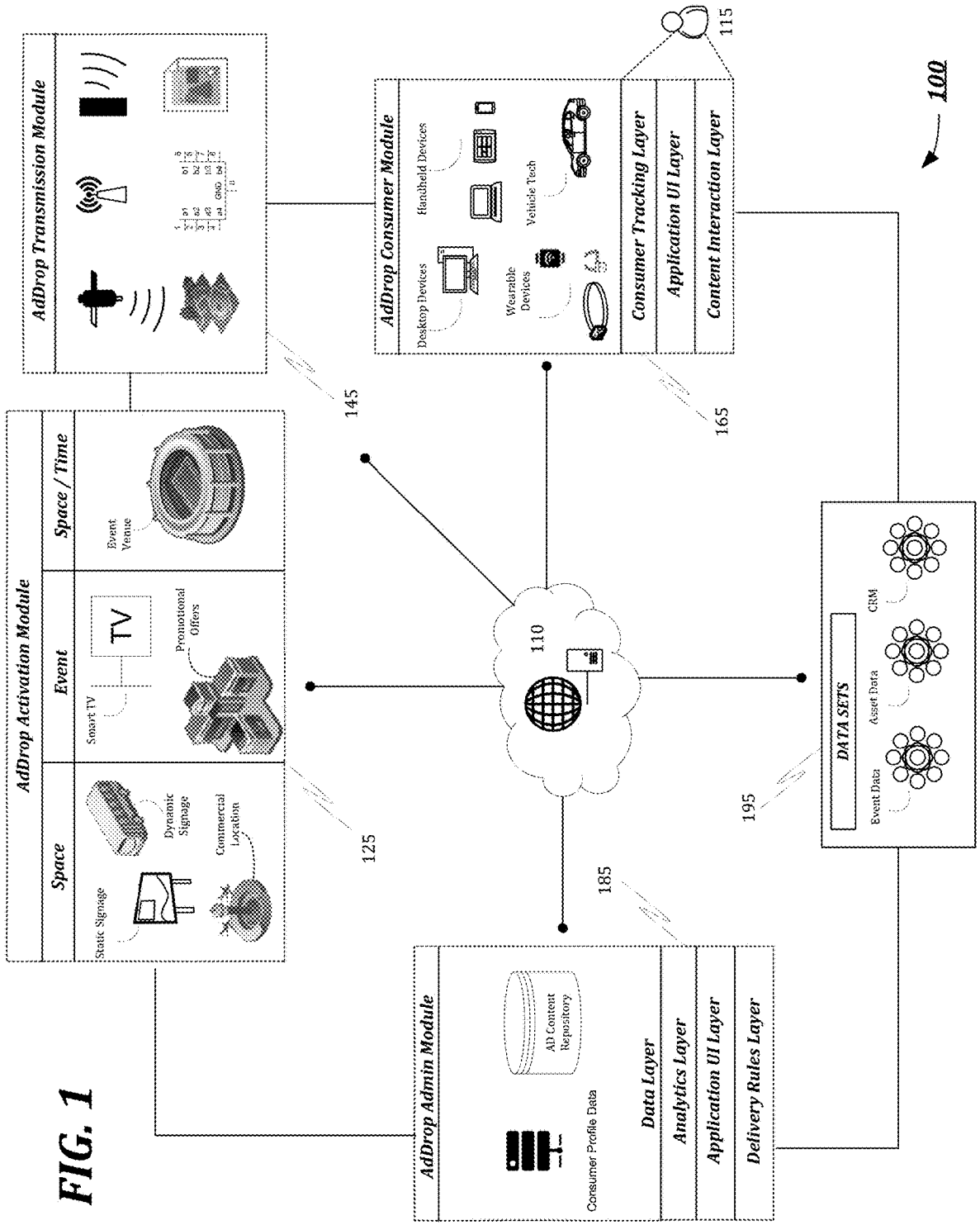
FIG. 1 illustrates a block diagram of an operating environment consistent with embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. As should be understood, any embodiment may incorporate only one or a plurality of the above-disclosed aspects of the display and may further incorporate only one or a plurality of the above-disclosed features. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, updates, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of outdoor advertising, embodiments of the present disclosure are not limited to use only in this context. For example, the geolocation and time-based advertising are configurable to be used for indoor advertising as well.

Further still, the term 'signage' is used throughout the present disclosure as a general reference to an advertising medium. Although a signage may be described in various embodiments, it should be understood that any advertising medium may be similarly applicable and considered to be within the scope of the present disclosure. Other advertising media may include, by way of non-limiting example, billboards, TV, real estate and other static, traditional, virtual, 3D, holographic, and digital signage platforms.

Additionally, the term "user" can be used to imply many different functional roles associated with the platform of the present disclosure. For example, a first set of user types may include consumers, who may interface with the platform (e.g., receive media content). Furthermore, a second set of user types may include administrative users. Administrative users may comprise platform administrators (e.g., super admins capable of specifying any and all functional parameters of the platform). Administrative users may further include agencies, who may operate a plurality of campaigns for a plurality of content providers (or "advertisers" or "advertising companies").

Additionally, the phrase "advertising company" may be used herein as a description of a possible user of systems, methods, and functionality of the present disclosure. It should be understood that any user, including those not explicitly considered "advertising companies" may implement and use the teachings herein. Accordingly, embodiments of the present disclosure should not be limited to only advertising companies, but should include any possible user.

Additionally, any instance of the phrase "specifying geo-location" or related language covers specifying a path, specifying a journey, and/or specifying a route a user and/or a consumer may take.

Still consistent with embodiments of the present disclosure, advertising content may be provided based on at least one of, or both, geolocation and time data. Although some embodiments of the present disclosure are described with respect to geolocation-based advertising, such embodiments may be contemplated to apply to time-based advertising and are, therefore, considered to be within the scope of the present disclosure.

I. Platform Overview

This overview is provided to introduce a selection of concepts in a simplified form that are further described below. This overview is not intended to identify key features or essential features of the claimed subject matter. Nor is this overview intended to be used to limit the claimed subject matter's scope.

Embodiments of the present disclosure provide a platform to enable users to segment and market to a consumer in order to, for example, influence a consumer's actions, decisions, destination, and actions at their destination, while the consumer is on their journey through the physical world. The platform may be configured to track the consumer as they move through multiple zones (e.g., locations or objects in space, either static or dynamic) on their way from a Point A to a Point B. Each zone may be registered to one or more platform users (e.g., data-aggregators or advertisers). Furthermore, in some embodiments, each zone may be associated with content marketing campaigns. As the consumer passes through the zones on their journey, the consumer may be tagged into a content campaign associated with the corresponding platform user.

The platform may then determine, for example, if the tagged consumer is a qualified prospect for the campaign (e.g., based on campaign audience segment parameters), follow the user's actions, and associate the consumer with certain messaging or data based on the consumer's activity. The campaign parameters may provide certain milestones, metrics, key performance indicators, or otherwise criteria for establishing that the consumer is a qualified target of the content campaign. As the consumer is tracked during their journey, their actions may be evaluated against the campaign parameters.

For example, when the consumer is tagged into a content campaign, the platform may be configured to track the consumer's movements and behavior (e.g., via computing device associated with the consumer such as, but not limited to, a smartphone, tablet, computer, or onboard vehicle computing devices) against the campaign parameters set by the platform user. The campaign parameters may be configured to simply log the user's actions and activity and associate the appropriate content with the user and different times, with updates to the association during the consumer's course of travel. In further embodiments, the platform may be configured to, at the right point in space, and at the right time, cause or otherwise initiate the process to begin deliver content to the tagged consumer. Still, in other embodiments, the mere data and association of content with the consumer may be provided to the platform user for content delivery through third-party delivery networks, such as Demand Side Platform (DSP) and other content exchange platforms. In this way, using the data gathered by the platform, content may be provided to consumers in various media at various points of time.

Consistent with embodiments of the present disclosure, the content may be provided to the tagged consumer. The provided content may be configured to update based on, for example, but not limited to, the consumer's interaction with the content, online activity, physical actions, and course of travel. The consumer may engage with the content designed to influence the consumer's behavior during their course of travel.

Still consistent with embodiments of the present disclosure, the platform may enable its users to influence the consumer's final destination in their journey through the physical world. As the consumer moves through multiple geozones on their way from Point A to Point B, each geozone registered to the platform "advertiser" tags that consumer into a content campaign associated with the platform advertiser when the consumer meets the profile segment parameters set by the advertiser. Once in a campaign, platform may track the consumers movements and their behavior against the campaign parameters set by the advertiser, and, at the right point in space, and at the right time, embodiments of the platform may be configured to cause content to be transmitted to the tagged consumer. The consumer may engage with the content designed to influence the consumers behavior to convert on your business metrics set by the advertiser's campaign. In this way, the platform may enable its users to influence the consumer's final destination in their journey through the physical world.

Accordingly, embodiments of the present disclosure may enable a user to generate marketing funnels, campaigns, and workflows that involve the selection and/or delivery of targeted messages to engage users as they journey from one location to another. Furthermore, embodiments may enable the targeting of users in one location, based upon their journey to or from one or more prior journeys or locations. Further still, embodiments may enable content delivery based on user's history of activity. By way of nonlimiting example, the user's history of activity may comprise a consumer leaving a selected item in their shopping cart on an ecommerce platform. Accordingly, users may be tagged to receive content, based on determinations of the platform, when they enter physical location (e.g., if they qualify for a marketing campaign) and, once tagged, the platform may track the tagged user's actions (e.g., on their phone and in the real-world) to find the right time to trigger a delivery of targeted content for the user.

Consumer Profile+Course of Travel

Generally, in a first aspect, embodiments of the present disclosure may provide a content distribution campaign that is operated based on parameters. The first parameter may be a consumer profile/audience segment. The second parameter may be tracking a consumer's path between two points. When the consumer profile and the course of travel 'match' a campaign, the consumer may be selected as a qualified prospect. No content transmission stage required.

Consumer Location+Physical Action

Generally, in a second aspect, embodiments of the present disclosure may provide a content distribution campaign that is operated based on parameters. The first parameter may be a location of the consumer relative to a geolocation. The second parameter may be a physical action the consumer may perform at or during the course of travel to or from the geolocation. When the consumer's location and the physical action performed by the consumer 'match' a campaign, the consumer may be selected as a qualified prospect.

Single Message

Generally, in a third aspect, embodiments of the present disclosure may provide a content distribution campaign that is operated based on a consumer profile/audience segment and two geolocations. The first parameter may be when a consumer is at a first location, determining if the consumer's profile meets the criteria to select for a tracking campaign. When the consumer then arrives at a second location, the consumer may be provided with the content associated with the campaign.

Multi-Message

Generally, in a fourth aspect, embodiments of the present disclosure may provide a content distribution campaign that is operated based on a consumer profile/audience segment, at least one geolocation, and at least one action. The first parameter may be when the consumer is at a first geolocation, determining if the consumer's profile meets the criteria to enter them into the campaign. If so, the consumer may be provided with the first content associated with the campaign. When the consumer then arrives at a second location OR performs an action specified by the campaign, the consumer may be provided with the second content associated with the campaign. The second content may be an iteration of the first content.

Direction of Travel/Motion (Motion Relative to a Geolocation)

Generally, in a fifth aspect, embodiments of the present disclosure may provide a content distribution campaign that is operated based on parameters. The first parameter may be a consumer profile/audience segment. The second parameter may be a 'direction of travel' or 'general motion' relative to a geolocation (e.g., billboard). When the consumer enters a geolocation, the consumer's direction of travel may be measured relative to that geolocation by comparing the consumer at a first point and a second point. If campaign parameters are met, consumer may be provided with the content associated with the campaign.

The present disclosure may provide a stand-alone application, API, or SDK, configured to, for example, enable a function associated with any of the embodiments disclosed herein, including, but not be limited to:

i) register digital assets, physical assets, virtual assets, brand assets, media assets, and/or advertisement assets associated to a platform Admin (e.g., an AppAddress®), ii) associate media content to be delivered (e.g., a BrandDrop®)

iii) specify rules for delivering the BrandDrop® (e.g., space/time/event) and target consumer profiles for receiving the BrandDrop® (e.g., Gender/Demographic/Propensity/Interest/Behavior/etc.), iv) transmit BrandDrop® for engaging the consumer at the right time/place, with the targeted profile, and v) track user engagement for delivering additional content, if applicable.

Disclosed is a method of geolocation and time-based advertising. The method may include generating, using a processor, a Graphical User Interface (GUI) or a Visual User Interface (VUI), which may be used interchangeably herein, configured to be displayed on a client device. A client device may include a plurality of different computing devices. Additionally, the method may include transmitting, using a communication interface, the GUI to the client device. The transmission may be performed via a modem configured to the device. Further, the method may include receiving, using the communication interface, a first geolocation from the client device based on a user interaction with the GUI. Furthermore, the method may include, receiving, using the communication interface, an advertisement content from the client device. Additionally, the method may include creating, using the processor, an association between the first geolocation and the advertisement content. Further, the method may include storing, using a storage device, each of the first geolocation, the advertisement content and the association. Furthermore, the method may include receiving, using the communication interface, a second geolocation from a mobile device. Additionally, the method may include comparing, using the processor, the second geolocation with the first geolocation. Further, the method may include transmitting, using the communication interface, the advertisement content to the mobile device based on the comparing.

Also disclosed is a platform for geolocation and time-based advertising. The platform may include a communication interface configured to: transmit a GUI to a client device; receive a first geolocation from the client device based on a user interaction with the GUI; receive an advertisement content from the client device; receive a second geolocation from a mobile device; and transmit the advertisement content to the mobile device based on a comparison between the first geolocation and the second geolocation. Additionally, the platform may include a processor configured to: generate the GUI configured to be displayed on the client device; create an association between the first geolocation and the advertisement content; compare the second geolocation with the first geolocation. Further, the platform may include a storage device configured to store each of the first geolocation, the advertisement content and the association.

Embodiments of the present disclosure may provide a method comprising: receiving an initial device location; receiving a subsequent device location; comparing the initial device location and the subsequent device location; determining a course of travel associated with the device; aggregating data associated with courses of travel for a plurality of devices; determining a plurality of commonly traveled paths based on the aggregated data; receiving an identification of a path of the plurality of commonly traveled paths;

and defining content to be transmitted to at least one device traveling down the identified path.

In some embodiments, the method may further comprise determining whether the course of travel corresponds to at least a portion of the identified path. By way of nonlimiting example, a user may be able to track whether a consumer is, or is likely to, take a predetermined path when traveling from an initial location to a subsequent location.

In some embodiments, the method may further comprise tagging the device for association with the defined content upon a determination that the course of travel corresponds to at least the portion of the identified path. By way of nonlimiting example, if a consumer is traveling to a baseball game, the consumer may get tagged for an advertisement for a restaurant in the baseball stadium.

In some embodiments, the method may comprise, wherein defining the content to be transmitted to the at least one device traveling down the identified path comprises employing a bidding system. By way of nonlimiting example, the time and location advertising slots may be open for bidding depending on the course of travel of a consumer, and when the consumer is traveling. Further, if it is determined that a consumer is heading to a baseball game, restaurants and bars in a baseball stadium can bid for advertising slots to be sent to the consumer on their course of travel to the baseball game.

In some embodiments, the method may comprise, wherein aggregating the data comprises calculating a consumer's propensity to visit the subsequent device location from the initial device location. By way of nonlimiting example, the method can give the user a likelihood that a consumer will travel from, for example, a movie theater to an ice cream shop.

In some embodiments, the method may comprise, wherein aggregating the data comprises determining commonly attended venues in proximity to the subsequent device location. By way of nonlimiting example, the method can calculate popular restaurants and bars consumer's frequently attend after attending a baseball game.

In some embodiments, the method may comprise, wherein defining the content comprises defining the content associated with the commonly attended venue. By way of nonlimiting example, if the venue is a baseball stadium, the content can be advertising for the various retail shops and restaurants in the baseball stadium.

In some embodiments, the method may further comprise detecting at least one consumer routine in association with the plurality of commonly traveled paths. By way of nonlimiting example, the method may detect when a consumer frequently takes the same route which may coincide with other consumers commonly traveled paths.

In some embodiments, the method may further comprise detecting at least one change in a consumer routine in association with the plurality of commonly traveled paths. By way of nonlimiting example, the method may detect when a consumer deviates from their routine or commonly traveled path.

In some embodiments, the method may comprise, wherein aggregating the data comprises aggregating purchasing behavior data associated with the plurality of commonly traveled paths. By way of nonlimiting example, the method may calculate where the consumer spends money along their commonly traveled path such as retail shopping or fast food.

In some embodiments, the method may comprise, wherein aggregating the data comprises aggregating at least one of the following: data associated with device proximity to at least one registered asset surrounding the subsequent device location; and data associated with device interactivity with content corresponding to the at least one registered asset. By way of nonlimiting example, the method can detect when a targeted consumer and/or the targeted consumer's device are near a digital billboard associated with the platform and/or user.

In some embodiments, the method may comprise, wherein aggregating data comprises determining an amount of time one or more consumers dwell within the proximity to the at least one registered asset. By way of nonlimiting example, the method can detect how long a consumer is in visual proximity to a digital billboard. By way of nonlimiting example, the method can detect how long a consumer device is in proximity to a platform user's fast food restaurant.

In some embodiments, the method may comprise, wherein determining the course of travel of the consumer comprises determining the course of travel by accessing a database and retrieving location data. By way of nonlimiting example, the consumer data may reside on a cloud computing environment or external database.

In some embodiments, the method may comprise, wherein aggregating the data comprises aggregating: data associated with a plurality of registered assets along the course of travel; and data associated with device interactivity with content corresponding to the at least one registered asset. By way of nonlimiting example, information about assets such as digital billboards and geofences along a course of travel are collected.

In some embodiments, the method may further comprise further providing a density map visually indicating a density of the plurality of commonly traveled paths. By way of nonlimiting example, the density map can show a density of aggregated consumer paths starting from a zip code and ending at a sporting event.

In some embodiments, the method may comprise, wherein providing the density map comprises providing statics associated with device interactivity to the at least one registered asset. By way of nonlimiting example, the density map can show users of the platform how much consumers interact with advertising content when taking certain paths.

In some embodiments, the method may comprise, wherein providing the density map comprises providing statics associated with device statistics to the at least one registered asset. By way of nonlimiting example, the density map can provide users of the platform to access consumer demographic information of the common courses of travel.

In some embodiments, the method may further comprise identifying, for the plurality of commonly traveled paths, the plurality of registered assets associated with each commonly traveled path. By way of nonlimiting example, locations of all available digital billboards along a course of travel are collected and made available for bidding by users of the platform interested in advertising along the course of travel.

In some embodiments, the method may comprise, wherein comparing the initial device location and the subsequent device location comprises tracking the device location within a venue. By way of nonlimiting example, the consumer device's path and stops while in a venue can be tracked.

In some embodiments, the method may comprise, wherein determining the course of travel comprises determining the course of travel for a particular event. By way of nonlimiting example, a particular event may be identified, and the courses of travel for all attendees of the event can be retroactively tracked from an initial location to the venue, or from the venue to a subsequent location.

Embodiments of the present disclosure may provide a platform for enabling the delivery of content based on certain content selection and delivery rules (hereinafter, referred to as a BrandDrop®). The BrandDrop®, as used herein, need not be associated with an actual delivery of the content, but a mere definition of the content. Although the term "BrandDrop® is a mark registered to the present Applicant, BoardActive Corporation, the scope of the present disclosure is intended to cover any delivery of content based on certain content selection and delivery rules.

The platform may enable a platform user (e.g., an Administrator or "Admin") to interact with its target content consumers based on, for example, but not limited to, the location of the consumer in time and space, the actions the consumer takes within the time and space, the characteristics of the consumer, and the characteristics of their technical devices. Accordingly, the various embodiments disclosed herein provide a new medium of communication with consumers. The medium established by the present disclosure may be presented to the user on a digital content provision medium while still taking into account, for example, but not limited to:

1) the physical space and time associated with the consumer;
   a. where is the consumer and when is the consumer there?
2) the consumer's actions within the physical space and time;
   a. what is the consumer doing at that time and place?
3) the consumer's characteristics and profile data; and
   a. what do we know about this consumer?
4) the consumer's hardware for interfacing with the medium;
   a. what screen is the consumer interfacing through?

Having addressed these points, the platform of the present disclosure may then determine, as will be detailed below, what content to deliver, how to deliver the content, when to deliver it, where to deliver, and who to deliver the content to. In this way, instead of providing generic content (e.g., advertisements) in space (e.g., a billboard or sign) or in time (e.g., a commercial), embodiments of the present invention enable an Administrator to bring a custom-tailored content directly to the nearest and best device associated with their target consumer within various locations in time and space.

Still consistent with embodiments of the present disclosure, a content of the BrandDrop® may be configured for functional interactivity with consumer. The interaction may range from a basic request from a manual user input to a tracking of user behavior with reference to the BrandDrop® (which may be placeholder term used to define any type of content). In one example, a user of the platform (e.g., an Advertiser) may provide content that would "drop" an advertisement to a consumer's device. The advertisement, in this example, may be a promotional offer that requires a user interaction to be 'revealed' or otherwise made available to the consumer. The advertisement may instruct the user to perform an action, or define what actions are to be performed, and the platform may be enabled track the user's performance of the action. Upon a determination that the required action has been performed, the BrandDrop® or a promotion associated with the BrandDrop® may be revealed, communicated, activated, or otherwise made available for consumption.

For example, a fast-food restaurant may configure the platform of the present disclosure to affect a BrandDrop® when a consumer is within a proximity to a billboard advertising the fast-food restaurant. A space-based Brand-Drop® is disclosed in more detail below. The content of the BrandDrop® may appear on any computing device in operative communication with the platform (e.g., a mobile device associated with the user). The content may instruct the consumer to take a specific action in order to obtain a promotional offer. In one example, the action may require the consumer to navigate to a location (e.g., the fast-food restaurant) within, for example, a pre-determined period of time or a specific route. The consumer may elect to engage in the promotion and begin navigating to the particular location. The platform may track the consumer's behavior against the interactivity criteria for revealing the promotional content. Upon detection of the fulfillment of the interactivity criteria (e.g., the consumer has arrived at the location within the predetermined period of time/via the specified route), the promotional content may be provided to the user.

As another example, a radio station may issue a Brand-Drop® at a point in time to a device associated with an end consumer (e.g., their car-entertainment system). A time-based BrandDrop® is disclosed in more detail below. The BrandDrop® may require the consumer to be one of the first few people to input an answer to a question to win the promotion. Consistent with embodiments of the present disclosure, modules may enable the consumer to interact with the BrandDrop® through a user interface (UI) layer integrated to the device receiving the BrandDrop®.

As yet another example, an event coordinator (e.g., a facilitator of a sporting event) may issue a BrandDrop® at a point in time and space to consumers within the space at the time. A space and time based BrandDrop® is disclosed in more detail below. The faciliatory of the sporting event may send content to the attendees of the event. The content may require an interaction to provide the consumer with a reward for performing the interaction. For example, the consumer may be required to share the content on their social media. In another example, the consumer may be required to shake their phone quickly, so as to ascertain phone telemetry data. The telemetry data may then be analyzed to determine if the user would qualify for the promotion (thereby engaging in interactivity with the audience members of the venue).

In some embodiments of the present disclosure, the platform may provide an AppAddress® for an Admin to track and organize their media assets used in triggering a Brand-Drop®. Although the term AppAddress® is a mark associated with to the present Applicant, BoardActive Corporation, the scope of the present disclosure is intended to cover any tracking, organization, and identifier means for media assets. As will be detailed below, the media assets may be comprised of, but not limited to, for example, a digitization of physical assets (e.g., geolocations for Billboards and Signage—referred to herein as "Smart Billboards" or "Active Boards") and a digitization of virtual assets (e.g., areas of space; events in space-time). Further examples of digitized assets may include, but not be limited to, for example, commercial centers, entertainment venues, transportation centers, television networks, online media networks, physical events, and virtual events.

The platform may enable the Admin to establish an exclusive permission for issuing a BrandDrop® within the AppAddress® (e.g., geo-fencing or time-based fencing). The AppAddress® may be comprised of a unique identifier which, in turn, may be transferable from one owner to another. In this way, the exclusive permission for issuing a BrandDrop® within the AppAddress® may be transferred from one Admin to the next as a transferable asset, much like a web domain. In some embodiments, the AppAddress® may be associated with one or more physical or virtual locations, paths, or points in time.

In yet further embodiments, the AppAddress® may be associated with a digitization of various brand assets (e.g., Tradename's, Logo's, Products, Designs, and other brand-identifying parameters for the Admin). Image processing techniques may be used to aid in the identification of those brand assets. In this way, and as will be detailed below, a consumer may submit a captured image in order to receive a BrandDrop®. The platform may process the image to determine if any of the objects within the image correspond to brand asset associated with an AppAddress®. If so, the platform may then employ the methods and systems disclosed herein to deliver the appropriate content to the end user. Accordingly, an AppAddress® may be associated with media assets and brand assets.

Embodiments of the present invention may be further enabled to associate mobile assets with an AppAddress®. For example, an Admin could configure their mobile assets to be used as 'moving billboards' for issuing a BrandDrop® to a target consumer. The platform may be enabled to track the location of the mobile assets in a plurality of ways. In a first instance, the platform may track the mobile asset locations (e.g., a fleet of trucks) through an asset tracking module associated with the platform. Such asset tracking module may comprise a computing device (e.g., smartphone) or dedicated global positioning system hardware. In this way, the platform may ensure that platform consumers within a radius of the mobile asset may be issued a BrandDrop®. In another instance, the platform may track the mobile asset locations (e.g., city buses) through an external database with up-to-date mobile asset location information.

As another, non-limiting example, a food-truck company might register their trucks as mobile assets to their AppAddress®. They can further associate promotional content to be issued through a BrandDrop® to prospective customers within the proximity of those mobile assets. In this way, the prospective customers may be notified with the Brand-Drop® of the food-truck's proximity. As will be further detailed below, the BrandDrop® may track the prospective customer's actions for rewards (promotions) and other interactivity upon the prospective customer's fulfillment of an action (e.g., arriving at the mobile asset's location within a period of time, or sharing the content of the BrandDrop® through social media).

Still consistent with embodiments of the present disclosure, the appropriate content to be used for a BrandDrop® may be defined by the Admin and, in some embodiments, may be further associated at the AppAddress®. The content may be provided by the Admin in various content types (e.g., iOS compatible, Android compatible, and the like). Furthermore, and as will be detailed below, the content may be segmented into various categorizes, tailored for a profile characteristic of the consumer that is to receive the content. Further still, the content may be segmented to correspond to specific digitized assets used in triggering the delivery of the content. For interactive content, the Admin may be enabled to configure interactivity criteria that a consumer must engage in for the delivery or disclosure of certain content segments. This interactivity criteria for the delivery or disclosure of content segments may be employed by the platform in the determination of which content segments to deliver, in response to which user actions.

In accordance to the various embodiments herein, each BrandDrop®, AppAddress®, digitized assets, and/or delivered content may be associated with analytics. The platform may be comprised of an analytics layer that compiles and tracks, through a tracking module, a consumer's behavior or engagement with the BrandDrop®. As will be detailed below, the analytics module may provide metrics associated with the BrandDrop's® impressions, click-throughs, revisits, and various other tracking metrics. In some embodiments, the analytics layer may be in operative communication with the tracking module and consumer profile data in order to compile and aggregate such metrics. In this way, by way of non-limiting example, the analytics layer can track a consumer's interaction with the BrandDrop® as well as actions made subsequent to the consumer's engagement with the BrandDrop® (e.g., a "conversion" metric might be set to track when the consumer routes to a Fast Food restaurant after receiving a BrandDrop®). The tracking of user behavior with regard to content present to the consumer in time and space may be referred to as Geolitics™.

It should be understood that conversion metrics may be tied to a user's online behavior. For example, after tracking a consumer during their course of travel, it may be determined that the consumer traveled through certain geolocation tied to certain campaigns. It may be further determined that the same consumer engaged in an online activity that corresponds to a conversion metric for said campaign.

In various embodiments, the analytics layer may be in bi-directional communication with an external dataset. The external dataset may be, for example, CRM data comprising additional user profile data. In this way, the platform may obtain profile data for a consumer as well as return additional analytics data back to the external dataset. Thus, the external dataset may be used for i) determining the content to be used for provision to a specific consumer, and ii) maintaining an up-to-date profile for a consumer, including analytics obtained after the delivery of the content, thereby providing a more complete user profile. Additional details with regard to the analytics layer are provided below.

Consistent with embodiments of the present disclosure, the platform may be configured to work as a stand-alone application (as detailed in '790 application), or as an application programming interface (API) and/or software development kit (SDK) for developers of existing applications. In this way, the platform, and the various modules disclosed herein, may be utilized modularly and integrated into various parties to establish, for example, a content delivery network.

For example, a brand (e.g., a fast-food restaurant chain) may have an existing mobile application for its consumers nationwide. The same brand may also have, for example, billboards and various other media assets throughout the nation that it uses in advertising to its consumers. The platform of the present disclosure may provide a solution for such brand to digitize their media assets and deliver interactive content to their consumers by integrating their mobile application with the platform of the present disclosure. In this way, the integrated application may now enable the brand to engage its consumers when they are, for example, at designated points in space (e.g., near a billboard or at a store), and time (e.g., during a video commercial for the brand) for a BrandDrop®. Moreover, the interactivity of the BrandDrop® will enable yet a deeper level of consumer engagement with the brand, with the added benefit of aggregating richer analytics on their consumers and their interaction history with the brand.

Accordingly, embodiments of the present disclosure may provide a stand-alone application, API, or SDK, configured to, for example, but not be limited to:
  i) register digital assets, physical assets, virtual assets, brand assets, media assets, and mobile assets associated a platform Admin (e.g., an AppAddress®),
  ii) associate content to be delivered in response to an activation of those assets (e.g., a BrandDrop®), including interactivity criteria, if applicable, iii) specify triggers for delivering the BrandDrop® (e.g., space/time/event) and target consumer profiles for receiving the BrandDrop® (e.g., Gender/Demographic/Propensity/Interest/Behavior/Etc.),
  iv) transmit interactive BrandDrop® for engaging the consumer at the right time/place, with the targeted profile, and
  v) track user engagement and provide analytics on consumer engagement.

Still consistent with embodiments of the present disclosure, a platform for geolocation and time-based advertising may be provided. The platform may be used by individuals or companies to provide geolocation and time-based advertisements associated with real and/or virtual signage to mobile users and also track user interaction with the geolocation and time-based advertisements.

The platform for geolocation and time-based advertisements enables an advertising company and others to manage all traditional or digital signage from a single user interface. A virtual signage works much like a traditional or digital signage in that a user can see an advertisement when the user is physically located near a geolocation associated with the virtual signage. Accordingly, the platform may broadcast the advertisement to the user when the user is a vicinity of the traditional or digital signage.

As an example, users who drive by a geolocation may be "beaconed" or provided with promotional content through, for example, a mobile device application. In an instance, a beacon (i.e., a radio transmitter) may be installed at a traditional or digital signage and/or a location corresponding to a virtual signage. In other embodiments, a modem may be installed and configured to the signage to enable telecommunications between devices and the signage. The content may include, in some instances, a live feed transmission. Further still, the content may include contact point information of a person or entity associated with the content. In some instances, signage with beacon technology may be considered as "Smart Billboards" or "Active Boards" with geolocation and time-based interactive functionality. As will be described in greater detail below, other advertising platforms, such as TVs, may be "Smart TVs" with geolocation and time-based interactivity functions.

Beacons are small devices which can transmit a signal therefore 'searching' for a Bluetooth-enabled device like a smartphone. They are low-cost and require little energy, with transmitters that are equipped with Bluetooth Low Energy (BLE). They're becoming a hot topic within digital signage as the Beacon transmitters can determine how close a device is (such as a smartphone in a shopper's pocket) and transmit a specific signal as a result. This signal may trigger an app on the device, therefore drawing attention to the physical business or location that the beacon is housed in. It should be understood that content may be transmitted from a signage to any type of computing device capable of providing the content to its corresponding user. Thus, although some embodiments disclose mobile computing devices, such as smartphones, many other computing devices may apply, including, but not limited to, in-car entertainment systems.

Accordingly, as a user drives by the traditional or digital signage and/or the location associated with the virtual signage, a mobile device of the user gets beaconed with promotional content. Alternatively, the mobile device of the user may determine a geolocation of the mobile device and transmit the geolocation to the platform. Subsequently, the platform may transmit the promotional content to the mobile device.

The promotional content may include a website, a phone, an email address, a video, live feeds, an expiration date, a QR code and a URL for tracking users and interacting with users, as well as additional information about the advertiser. In addition, the content may include connect point information. The connect point information may include, for example, an owner of the signage or a representative of the owner. The URL may include a unique identifier associated with traditional or digital signage.

Accordingly, when the user clicks the URL, the platform may cross reference the user. In other words, the platform may detect consumption of the advertisement by the user and consequently generate advertisement statistics corresponding to large number of users. Further, the platform may also transmit a cookie to the mobile device to track the user for marketing purposes and online behavioral advertising. As a result, the advertisement statistics and/or analytics may indicate number of users who drove by a signage; number of users who clicked the URL that was sent to their mobile device when they drove by the signage; number of users who shared the advertisement and so on. Further, webpage corresponding to the URL may include tracking data that enables the advertising company to collect demographic information of the users who viewed the signage.

Further, the platform may also allow users to purchase or rent a physical signage and/or a virtual signage. Accordingly, the platform may provide a user interface for making payments. Further, the platform may allow the users to manage payment schedules, including for example, automatic renewal of rent or lease.

Furthermore, the platform may integrate with existing advertisement networks (e.g., Google™ Ad Network), mapping applications (e.g., Google Maps™), in-vehicle communication systems (e.g., Apple™, Carplay™) and navigation systems (e.g., TomTom™) in order to deliver advertisements while users drive by real and/or virtual signage.

Additionally, the platform may facilitate a pin drop feature, according to which, when a user is driving by a location, the user may perform a pin drop action. Consequently, all advertisements from traditional or digital signage in the vicinity of the location may be automatically received and saved in the mobile device of the user. Accordingly, the user may view the advertisements, or reload the advertisement, later on. Such commands may be performed using voice command technology associated with the mobile device, enabled with a plurality of voice commands.

Figure 9A:
FIG. 9A illustrates a screenshot 900 of a GUI for adding one or more traditional or digital signage to a platform for geolocation and time-based advertisements, in accordance with embodiments of the present disclosure.
Figure 9B:
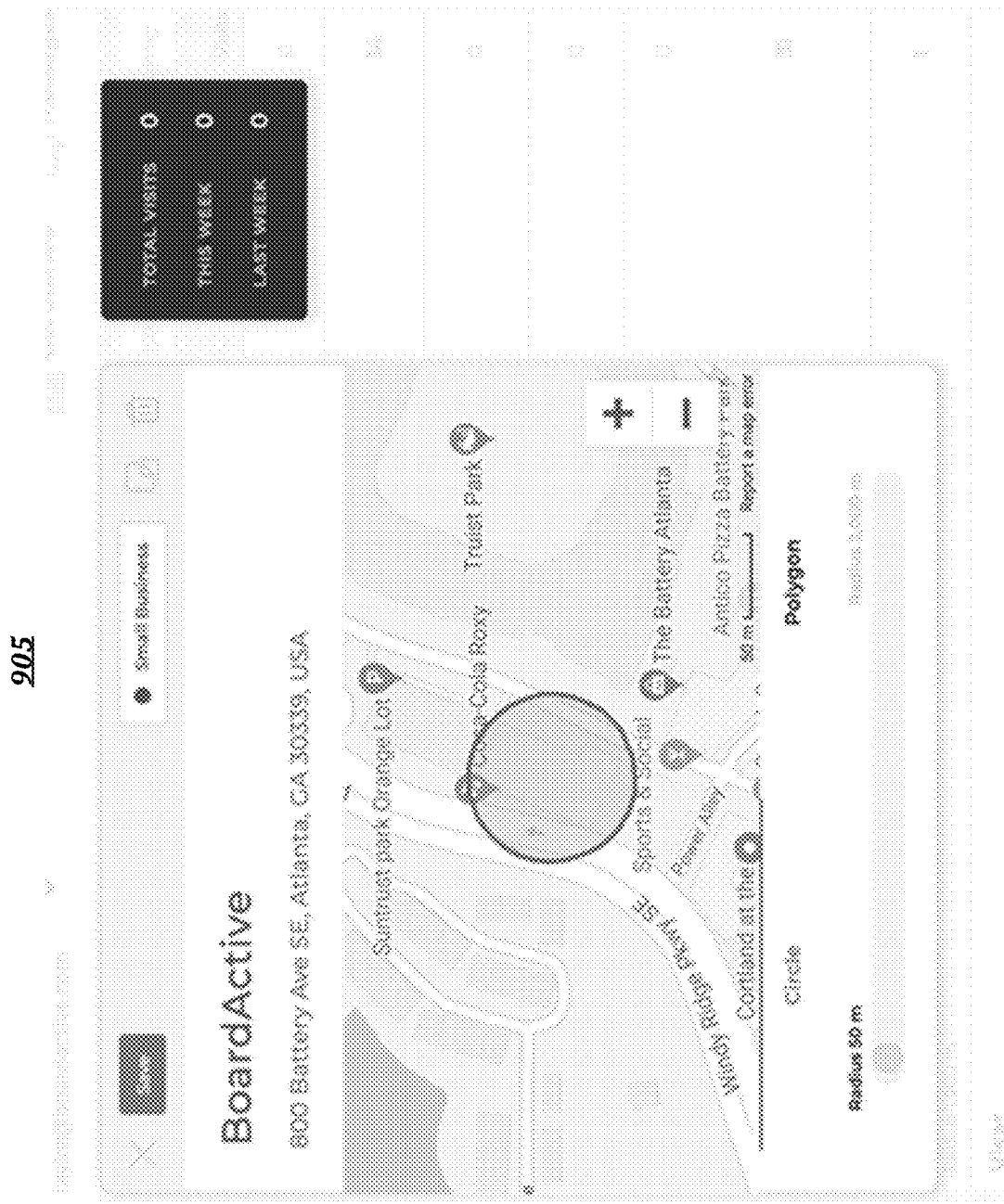
FIG. 9B illustrates a screenshot 905 of a GUI for specifying a geolocation to a platform for geolocation and time-based advertisements, in accordance with embodiments of the present disclosure.
Figure 9C:
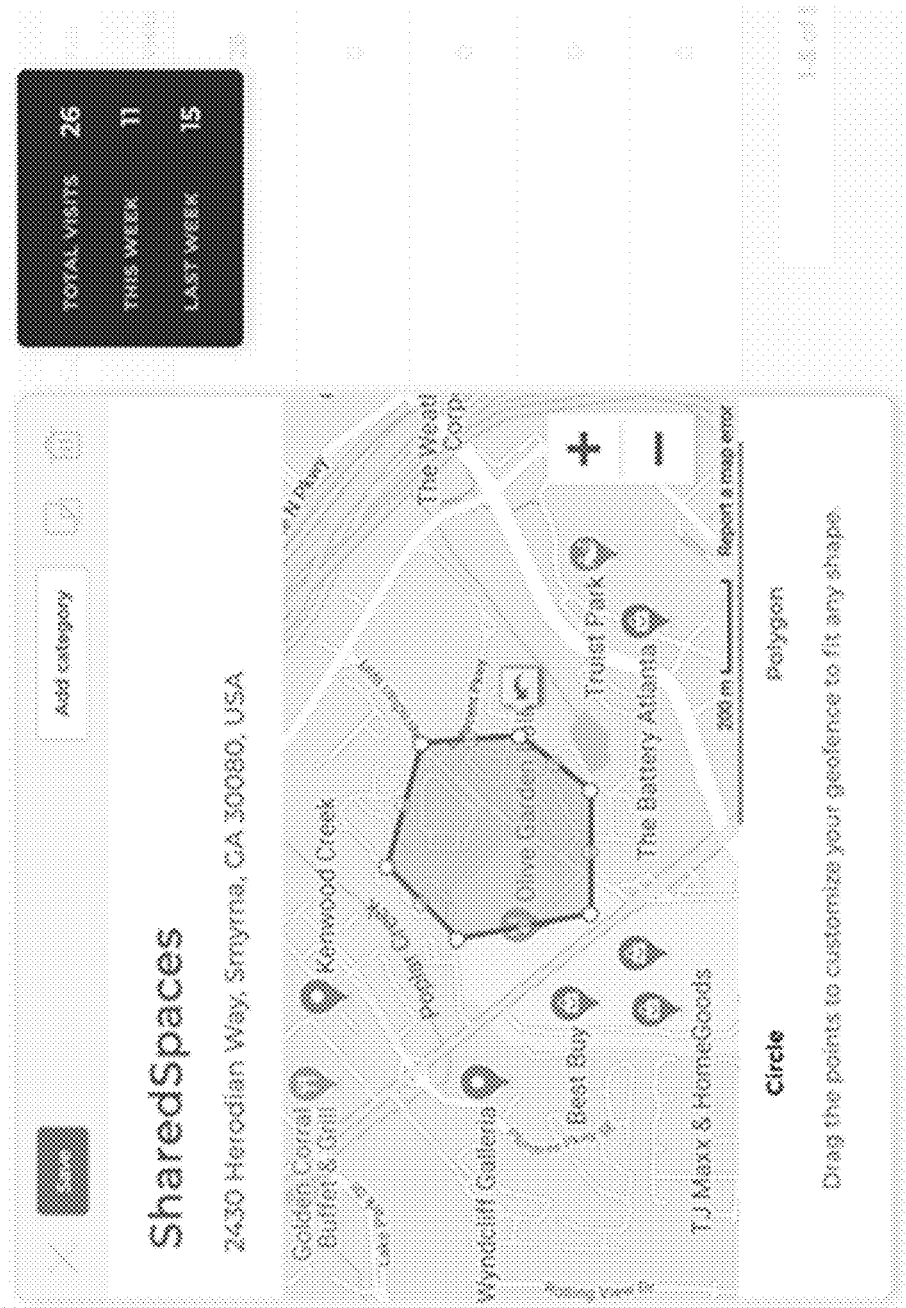
FIG. 9C illustrates a screenshot 910 of a GUI for specifying a geolocation to a platform for geolocation and time-based advertisements, in accordance with embodiments of the present disclosure.
Figure 10:
FIG. 10 illustrates a screenshot 1000 of a GUI for receiving information regarding traditional or digital signage to be added on the platform, in accordance with embodiments of the present disclosure.
Figure 11:
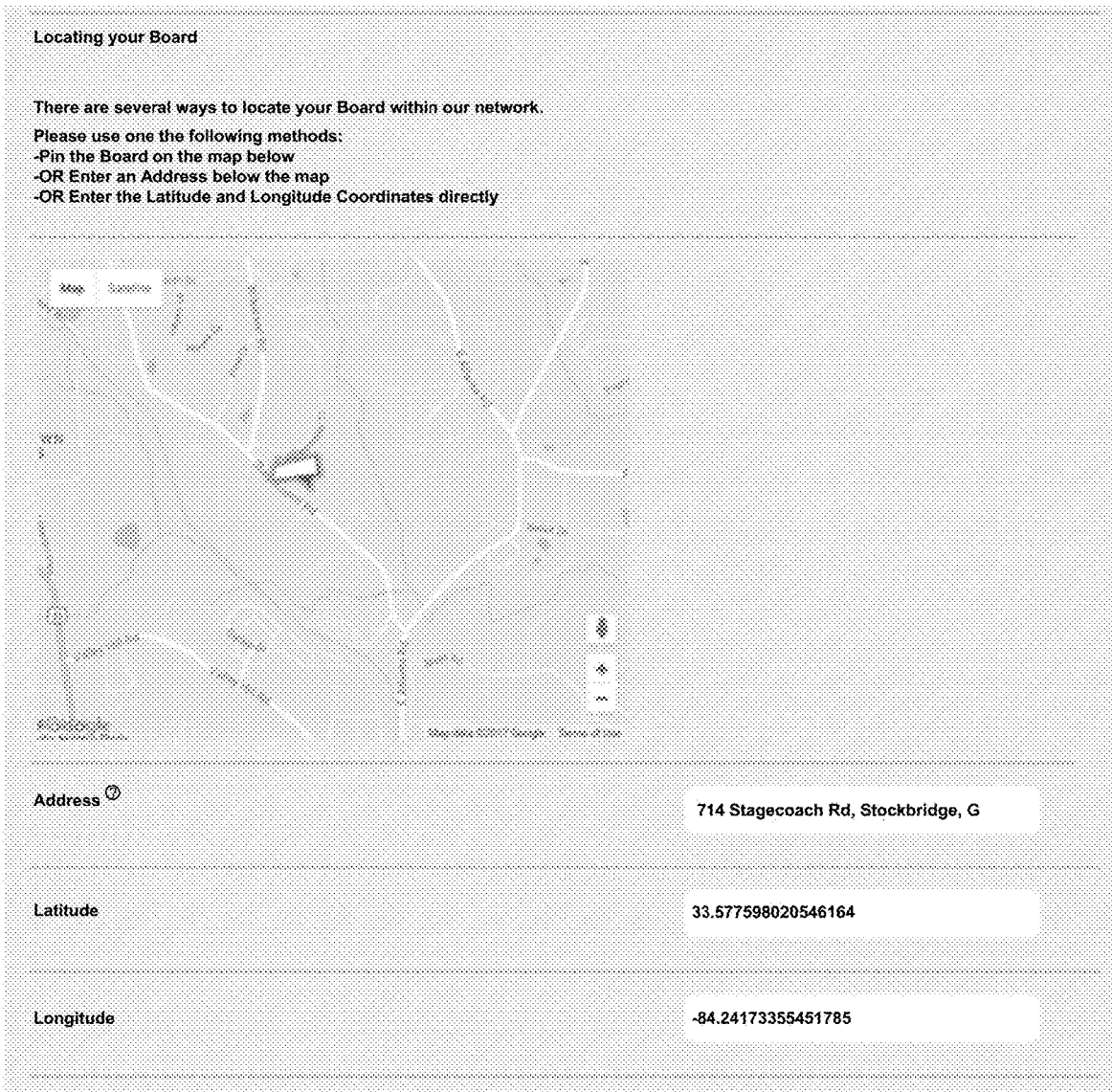
FIG. 11 illustrates a screenshot 1100 of a GUI for receiving a first geolocation corresponding to traditional or digital signage, in accordance with embodiments of the present disclosure.
Figure 12A:
FIG. 12A illustrates a screenshot 1200 of a GUI for receiving advertisement content corresponding to traditional or digital signage, in accordance with embodiments of the present disclosure.

The platform provides a GUI to enable an advertising company (or any applicable user) to add traditional or digital signage, as illustrated in FIG. 9A. Further, the GUI, as illustrated in FIG. 9B, may enable the advertising company to provide information for specifying one or more geolocations to a platform for geolocation and time-based advertisements. Further, the GUI, as illustrated in FIG. 9C, may enable the advertising company to provide information associated with specifying a geolocation to a platform for geolocation and time-based advertisements. Further, the GUI, as illustrated in FIG. 10, may enable the advertising company to provide information associated with the advertising company, such as, for example, a name of the advertising company, a category of an advertisement content, a name of the traditional or digital signage, notes and a description etc. Additionally, the GUI may enable the advertising company to define an advertising content. Further, the GUI, as illustrated in FIG. 11, may allow the advertising company to define a geographic location(s), paths of travel, and/or time associated with the content. In some embodiments, geofencing may be enabled by the area or set of coordinates selected by the user. In some instances, the geographic location does not need to correspond to a physical board and can be a purely digital signage (i.e., virtual signage). Further, the GUI, as illustrated in FIG. 12A, may also enable selection of a signage image that gets sent to mobile devices of users when they pass by the traditional or digital signage and/or a location of the virtual signage. Additionally, the GUI may also enable the advertising company to define a radius. Accordingly, only those users whose distance from the geographical location is lesser than or equal to the radius would receive the advertising content.

Figure 12B:
FIG. 12B illustrates a screenshot 1205 of a GUI for creating a content campaign, in accordance with embodiments of the present disclosure.

Further, the GUI, as illustrated in FIG. 12B, may also enable creating a content campaign. The creating a content campaign may comprise at least one of the following at least one of the following:

a. providing at least one image;
b. providing at least one logo;
c. providing at least one expiration date;
d. providing at least one bar code and/or QR code;
e. providing at least one promotional code; and
f. providing at least one audio and/or video URL.

Figure 13:
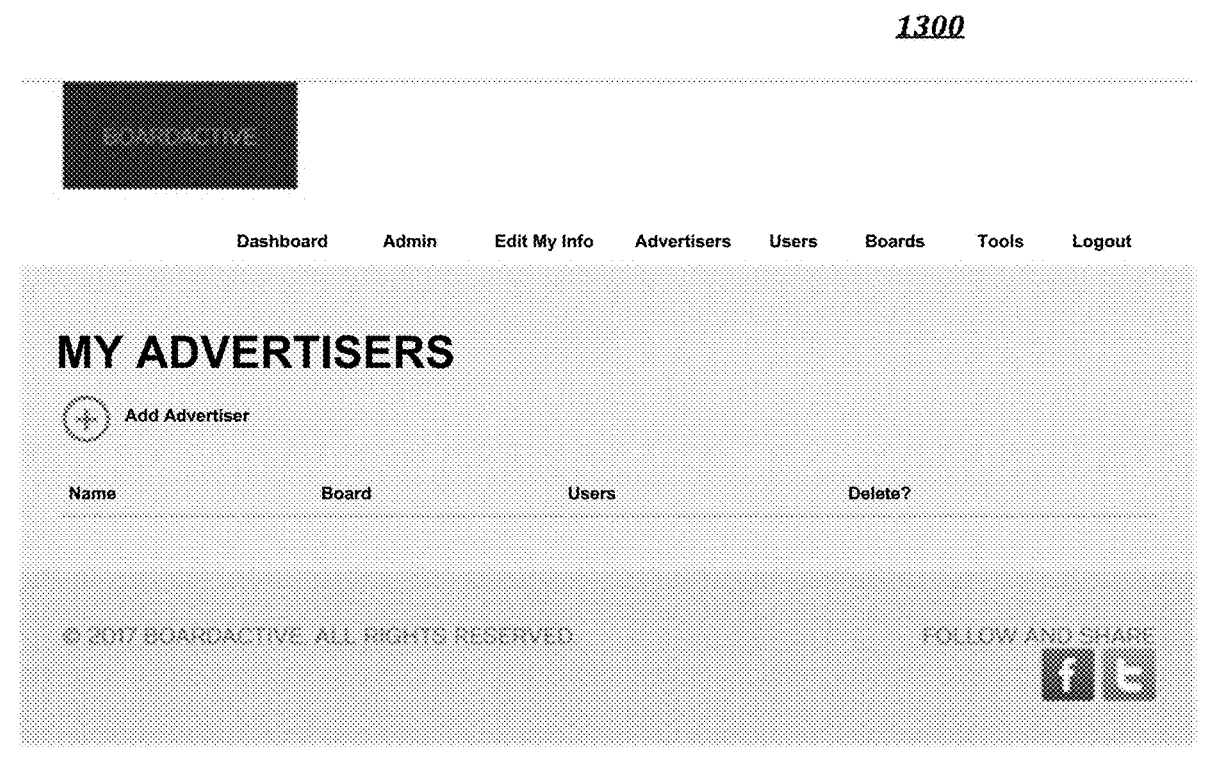
Figure 14:
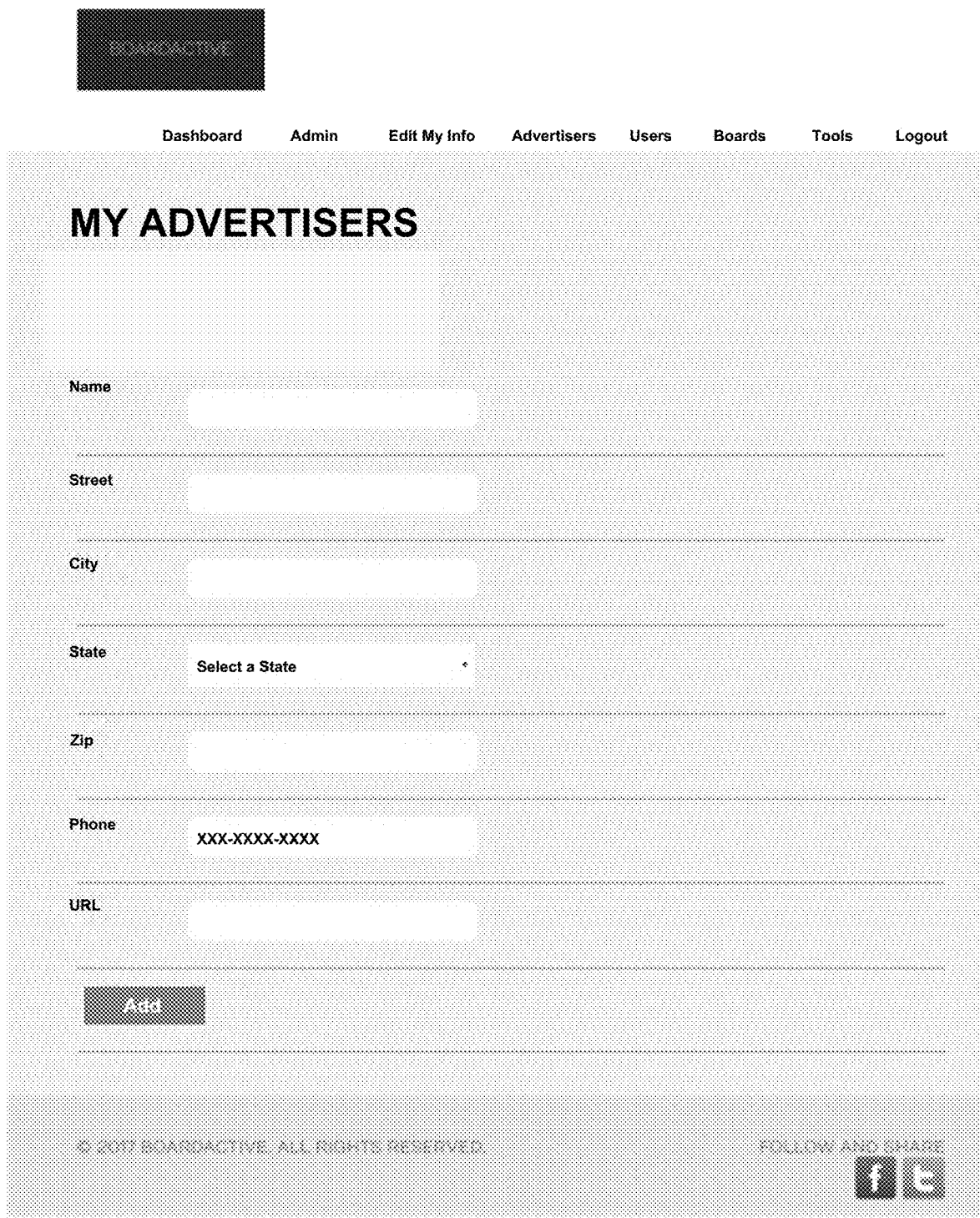
FIG. 14 illustrates a screenshot 1400 of a GUI for receiving information corresponding to an advertiser to be added on the platform, in accordance with embodiments of the present disclosure.

Further, the platform may allow a platform manager to add, delete or modify user accounts corresponding to advertising companies through the GUI, as illustrated in FIG. 13. Accordingly, the GUI, as illustrated in FIG. 14 may enable the platform manager to enter details corresponding to an advertising company to be added to the platform. Consequently, an advertising company may become a user of the platform for managing and/or delivering associated geolocation and time-based advertisements. By way of nonlimiting example, the user may further be at least one of the following:

a. an agency;
b. an advertiser;
c. an account manager;
d. an admin; and
e. a super admin.

In some embodiments, a super admin may capable of specifying any and all functional parameters of the platform. In some embodiments, data may be shared between user instances and/or across organizations. The shared data may be used to improve advertising experience.

Further, the platform provides GUI(s) for additional functionality for an advertising company to implement content distribution campaigns based on a plurality of desirable criteria, as illustrated in FIGS. 28-40. The GUI(s) illustrated in FIGS. 28-40 may be used in conjunction with the method 2700 illustrated in FIG. 27 and described herein. Additionally, the GUI(s) illustrated in FIGS. 28-40 may be used in conjunction with any other method described herein.

Figure 28:
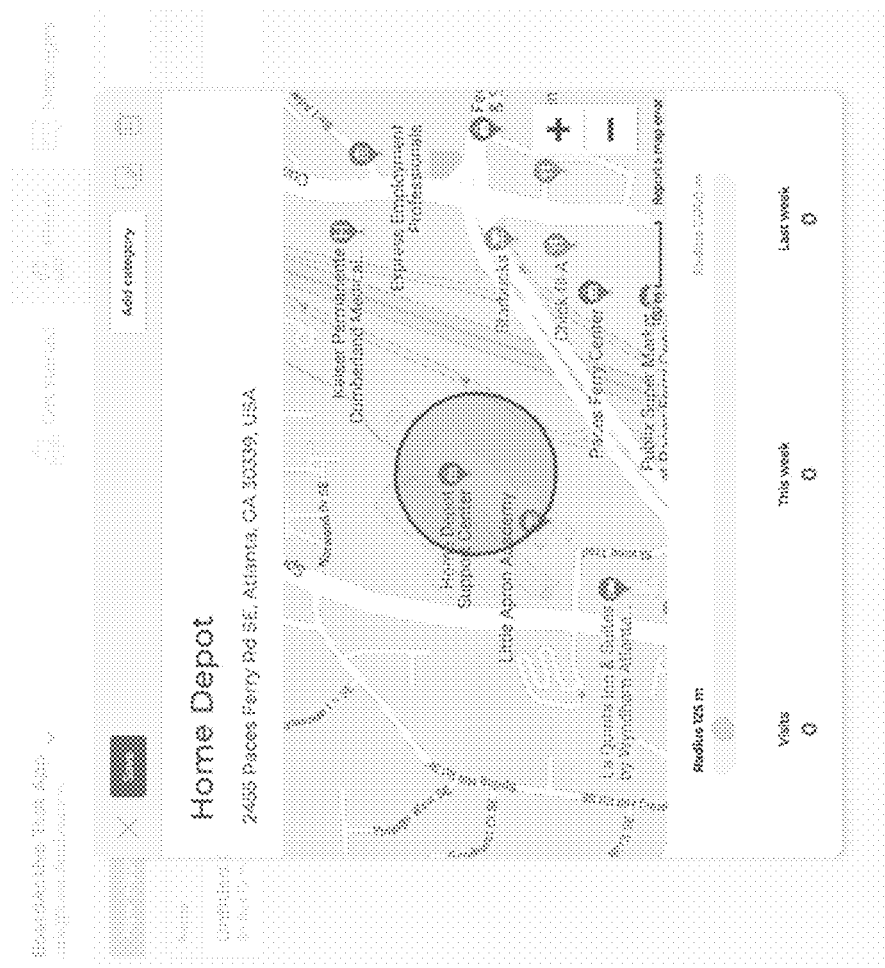
FIG. 28 illustrates a screenshot 2800 of a GUI for defining one or more geolocations for physical or virtual assets in conjunction with geolocation and time-based advertisements, in accordance with embodiments of the present disclosure.

FIG. 28 illustrates a screenshot 2800 of a GUI for defining one or more geolocations for physical or virtual assets in conjunction with geolocation and time-based advertisements, in accordance with embodiments of the present disclosure. As shown, a geofence may be added about a physical location of a retailer. The retailer may further have an ecommerce website or other ecommerce system capable of storing consumer profile data, tracking consumer habits and interactivity, and other functions. The geofence may be used to establish which consumers traverse the geofence to interact with the physical location of the retailer, purchase goods or services, avoid the physical location of the retailer, exit the geofence without making purchases, and other data.

Figure 29:
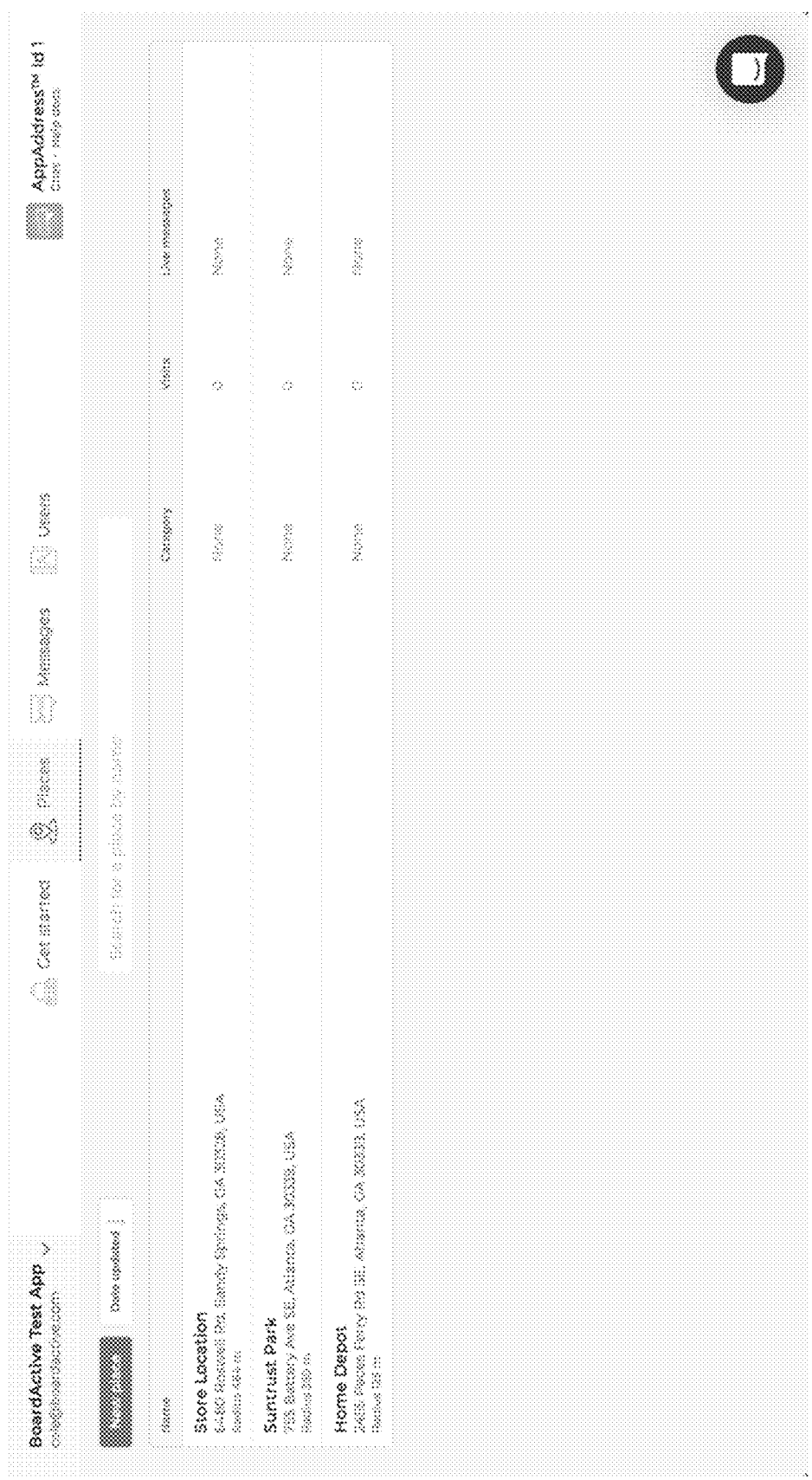
FIG. 29 illustrates a screenshot 2900 of a GUI for defining one or more campaigns associated with one or more geolocations for physical locations in conjunction with geolocation and time-based advertisements, in accordance with embodiments of the present disclosure.

FIG. 29 illustrates a screenshot 2900 of a GUI for defining one or more geolocations for physical locations in conjunction with geolocation and time-based advertisements, in accordance with embodiments of the present disclosure. As shown, a listing of physical locations of retailers and/or assets may be used by an advertising company. The listing may be in any applicable format, including a true listing, grid view, or other formats. Additionally, the physical locations may have compiled analytics associated therewith showing consumer interactions (or lack of interactions) for use in a content distribution campaign.

Figure 30:
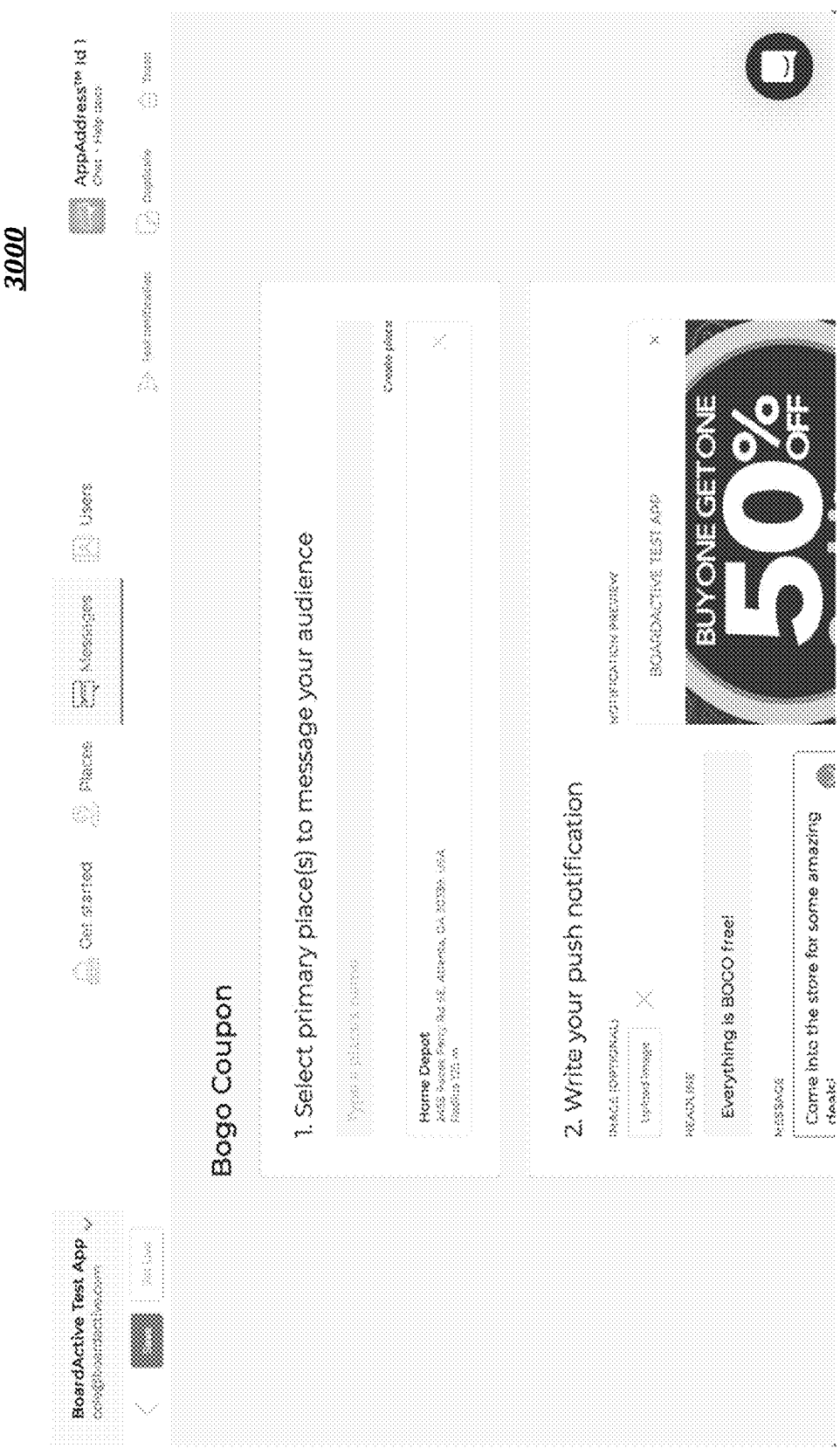
FIG. 30 illustrates a screenshot 3000 of a GUI for defining one or more campaign parameters in conjunction with geolocation and time-based advertisements, in accordance with embodiments of the present disclosure.

FIG. 30 illustrates a screenshot 3000 of a GUI for defining one or more delivery rules in conjunction with geolocation and time-based advertisements, in accordance with embodiments of the present disclosure. As shown, an advertising company may select one or more physical locations or geofences. The geofences or physical locations may be used for a BrandDrop® or other message for a suitable audience of consumers. Furthermore, the user may be enabled to define a path or a plurality of locations associated with a content. It may then be determined whether a recipient of the content was present at the locations or undertook at least a portion of the path prior to tagging the recipient for content receipt. Accordingly, upon satisfying a delivery rule, such as traversing a geofence or another physical action by a consumer, a BrandDrop® may be pushed, or a message, media content, additional media content, promotion, or other suitable media may be delivered to a mobile computing device associated with a consumer.

Figure 31A:
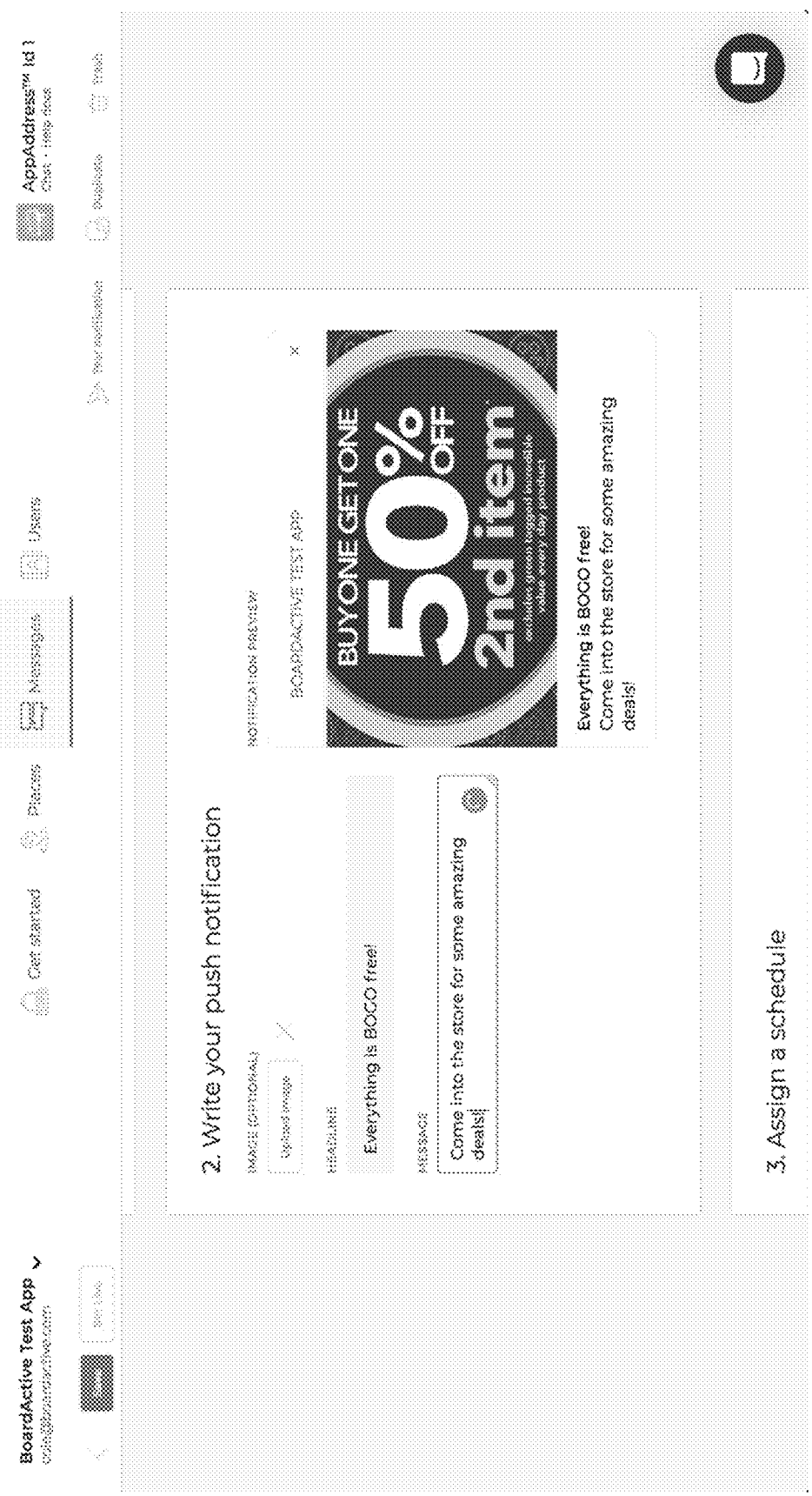
FIG. 31A illustrates a screenshot 3100 of a GUI for defining one or more messages and/or media content in conjunction the campaigns associated with geolocation and time-based advertisements, in accordance with embodiments of the present disclosure.
Figure 31B:
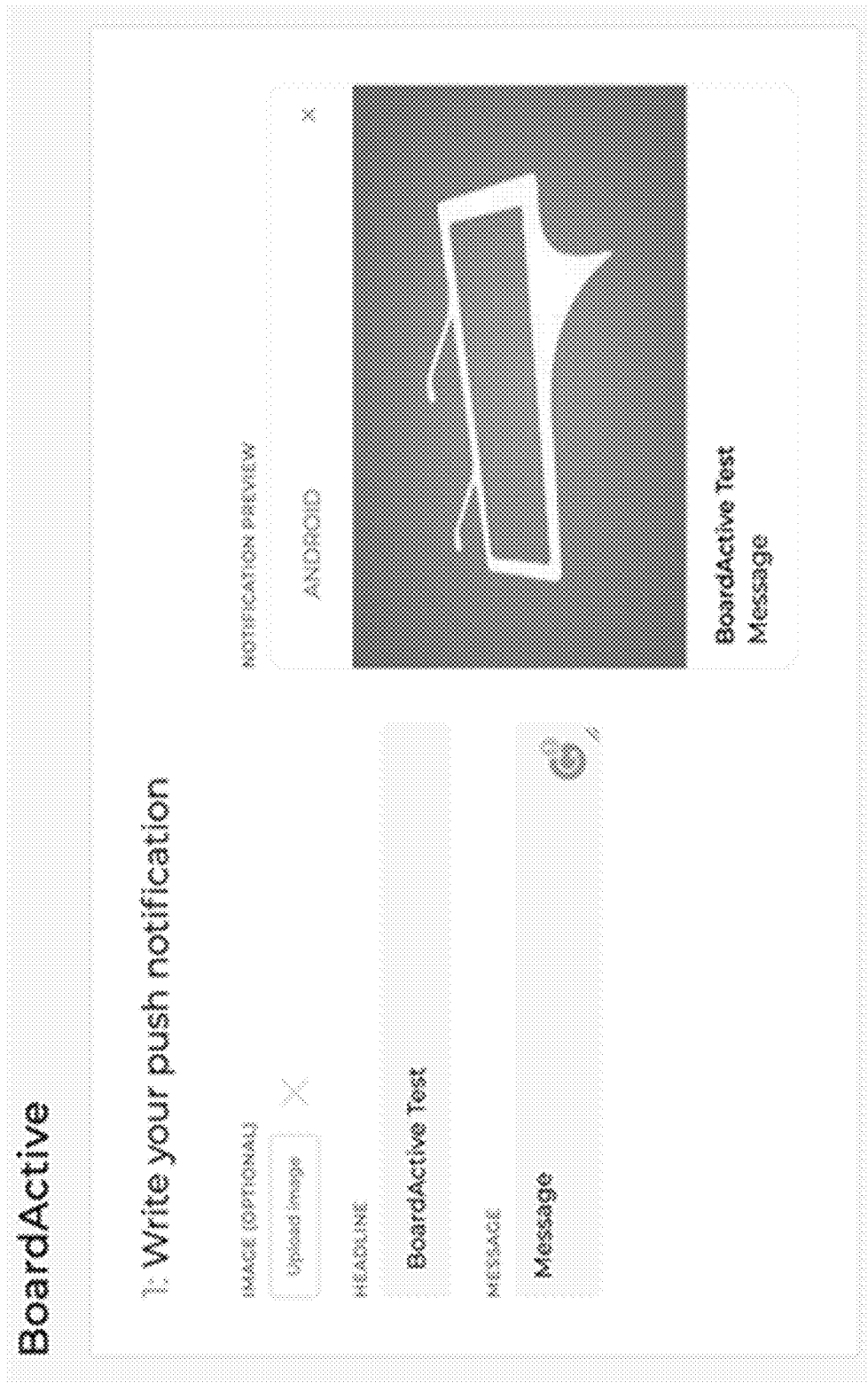
FIG. 31B illustrates a screenshot 3105 of another GUI for defining one or more messages and/or media content in conjunction the campaigns associated with geolocation and time-based advertisements, in accordance with embodiments of the present disclosure.

FIG. 31 illustrates a screenshot 3100 of a GUI for defining one or more messages and/or media content in conjunction with geolocation and time-based advertisements, in accordance with embodiments of the present disclosure. An advertising company may use the GUI to create, manipulate, delete, update, or otherwise provide a message, media content, and/or promotion for a BrandDrop® to consumers. Any suitable media content or message is applicable. For example, according to at least one embodiment of the present disclosure, the media content may be interactive media content. The interactive media content may include buttons, sliders, polls, rankings, or other suitable interactive content. The interactive media content may further include interactive chat functionality, such as intelligent chat functionality implemented with chatbots, Artificial Intelligence (AI) chatbots, short messaging system (SMS) chatbots, and other chat functionality. The interactive media content may provide at least a measure of consumer interactivity such that additional messages and/or additional media content may be delivered to the consumer.

Furthermore, although particularly illustrated as a single message, it is understood that multiple messages including additional media content, new media content, second media content, and other suitable media content or messages may also be created through the GUI. In this manner, additional delivery rules (e.g., FIG. 30 & FIGS. 32-33) may be established to update or deliver additional content to a consumer or a mobile computing device associated with a consumer.

Figure 32A:
FIG. 32A illustrates a screenshot 3200 of a GUI for defining one or more delivery rules in conjunction with geolocation and time-based advertisements, in accordance with embodiments of the present disclosure.

FIG. 32A illustrates a screenshot 3200 of a GUI for defining one or more additional delivery rules in conjunction with geolocation and time-based advertisements. In some embodiments, the additional delivery rules may comprise departure from a first location. In further embodiments, the additional delivery rules may comprise arrival at a second location. In yet further embodiments, the additional delivery rules may comprise nonarrival at a second location. In even further embodiments, the additional delivery rules may comprise online consumer behavior. By way of nonlimiting example, online consumer behavior may comprise a consumer leaving a selected item in their shopping cart on an ecommerce platform. In still further embodiments, the additional delivery rules may comprise a predetermined traveled path. In yet still further embodiments, the additional delivery rules may comprise user actions taken on a mobile device. In yet even further embodiments, the additional delivery rules may comprise a time span between locations. In yet even further embodiments, the additional delivery rules may comprise a time elapsed. In yet even further embodiments, the additional delivery rules may comprise a consumer propensity. In yet even further embodiments, the additional delivery rules may comprise a user demographic. In yet even further embodiments, the additional delivery rules may comprise consumer biometric information. In yet even further embodiments, the additional delivery rules may comprise consumer interests. In yet even further embodiments, the additional delivery rules may comprise user behavior data. Such delivery rules may be mixed and matched, inversed, and logically constructed via, for example, Boolean logic, to determine conditions for tagging and/or delivering content.

Figure 32B:
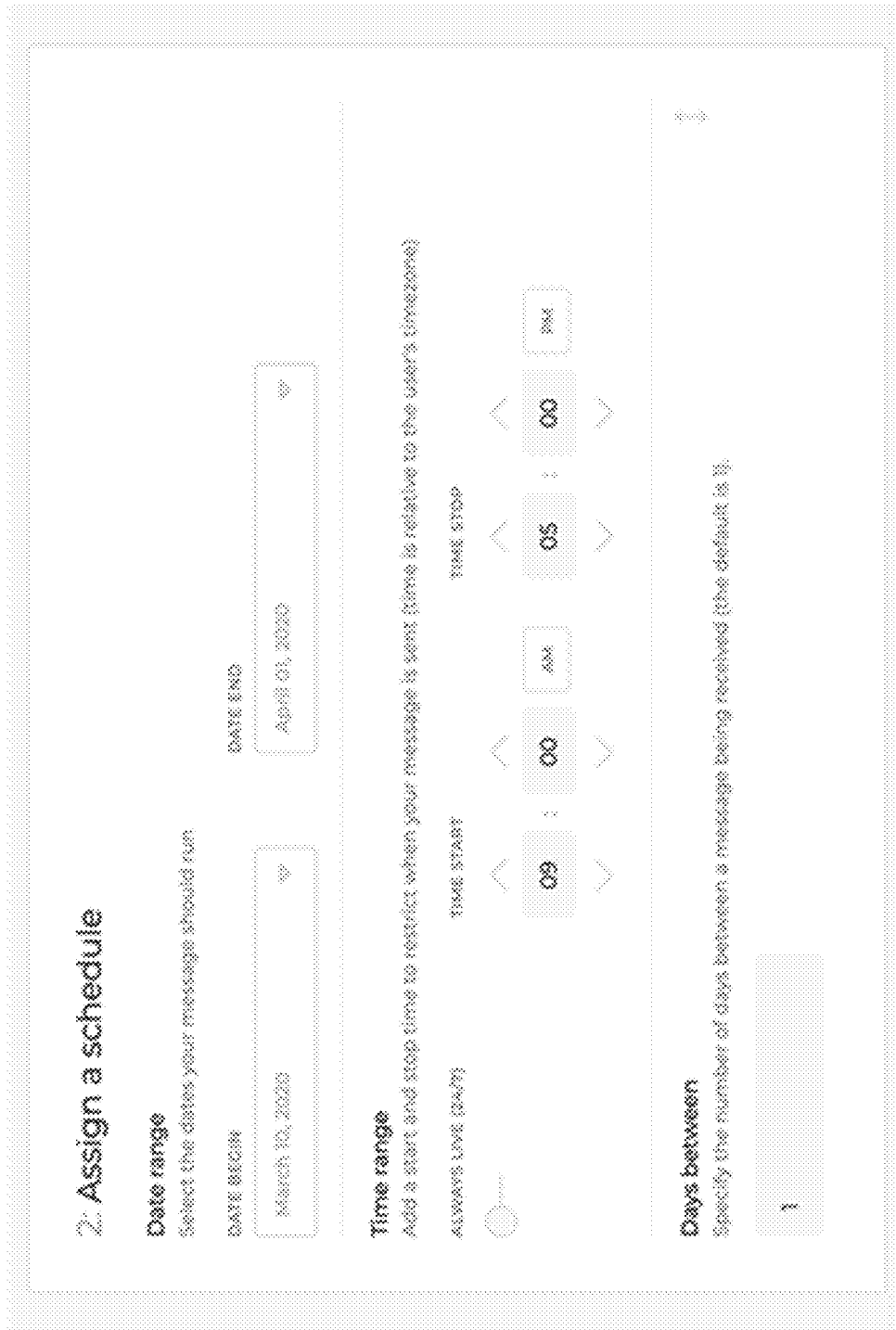
FIG. 32B illustrates a screenshot 3205 of another GUI for defining one or more delivery rules in conjunction with geolocation and time-based advertisements, in accordance with embodiments of the present disclosure.

FIG. 32B illustrates a screenshot 3205 of a GUI for defining one or more additional delivery rules in conjunction with geolocation and time-based advertisements. In some embodiments, the additional delivery rules may comprise departure from a first location. In further embodiments, the additional delivery rules may comprise arrival at a second location. In yet further embodiments, the additional delivery rules may comprise nonarrival at a second location. In even further embodiments, the additional delivery rules may comprise online consumer behavior. By way of nonlimiting example, online consumer behavior may comprise a consumer leaving a selected item in their shopping cart on an ecommerce platform. In still further embodiments, the additional delivery rules may comprise a predetermined traveled path. In yet still further embodiments, the additional delivery rules may comprise user actions taken on a mobile device. In yet even further embodiments, the additional delivery rules may comprise a time span between locations. In yet even further embodiments, the additional delivery rules may comprise a time elapsed. In yet even further embodiments, the additional delivery rules may comprise a consumer propensity. In yet even further embodiments, the additional delivery rules may comprise a user demographic. In yet even further embodiments, the additional delivery rules may comprise consumer biometric information. In yet even further embodiments, the additional delivery rules may comprise consumer interests. In yet even further embodiments, the additional delivery rules may comprise user behavior data.

Figure 33A:
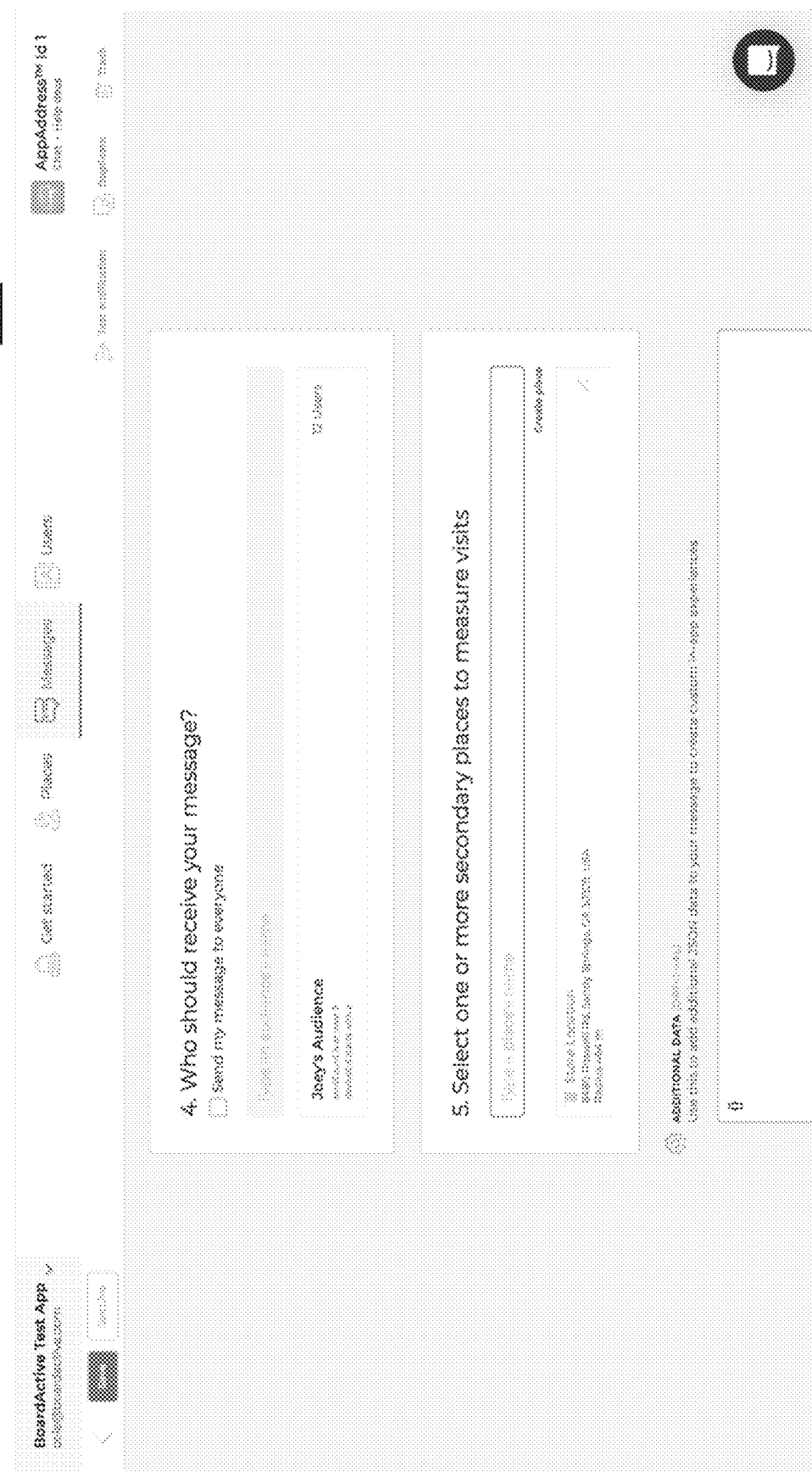
FIG. 33A illustrates a screenshot 3300 of a GUI for defining one or more additional delivery rules in conjunction with geolocation and time-based advertisements, in accordance with embodiments of the present disclosure.

FIG. 33A illustrates a screenshot 3300 of a GUI for defining one or more additional delivery rules in conjunction with geolocation and time-based advertisements. In some embodiments, the additional delivery rules may comprise departure from a first location. In further embodiments, the additional delivery rules may comprise arrival at a second location. In yet further embodiments, the additional delivery rules may comprise nonarrival at a second location. In even further embodiments, the additional delivery rules may comprise online consumer behavior. By way of nonlimiting example, online consumer behavior may comprise a consumer leaving a selected item in their shopping cart on an ecommerce platform. In still further embodiments, the additional delivery rules may comprise a predetermined traveled path. In yet still further embodiments, the additional delivery rules may comprise user actions taken on a mobile device. In yet even further embodiments, the additional delivery rules may comprise a time span between locations. In yet even further embodiments, the additional delivery rules may comprise a time elapsed. In yet even further embodiments, the additional delivery rules may comprise a consumer propensity. In yet even further embodiments, the additional delivery rules may comprise a user demographic. In yet even further embodiments, the additional delivery rules may comprise consumer biometric information. In yet even further embodiments, the additional delivery rules may comprise consumer interests. In yet even further embodiments, the additional delivery rules may comprise user behavior data.

FIG. 33B illustrates a screenshot 3305 of a GUI for defining one or more additional delivery rules in conjunction with geolocation and time-based advertisements. In some embodiments, the additional delivery rules may comprise departure from a first location. In further embodiments, the additional delivery rules may comprise arrival at a second location. In yet further embodiments, the additional delivery rules may comprise nonarrival at a second location. In even further embodiments, the additional delivery rules may comprise online consumer behavior. By way of nonlimiting example, online consumer behavior may comprise a consumer leaving a selected item in their shopping cart on an ecommerce platform. In still further embodiments, the additional delivery rules may comprise a predetermined traveled path. In yet still further embodiments, the additional delivery rules may comprise user actions taken on a mobile device. In yet even further embodiments, the additional delivery rules may comprise a time span between locations. In yet even further embodiments, the additional delivery rules may comprise a time elapsed. In yet even further embodiments, the additional delivery rules may comprise a consumer propensity. In yet even further embodiments, the additional delivery rules may comprise a user demographic. In yet even further embodiments, the additional delivery rules may comprise consumer biometric information. In yet even further embodiments, the additional delivery rules may comprise consumer interests. In yet even further embodiments, the additional delivery rules may comprise user behavior data.

Figure 33C:
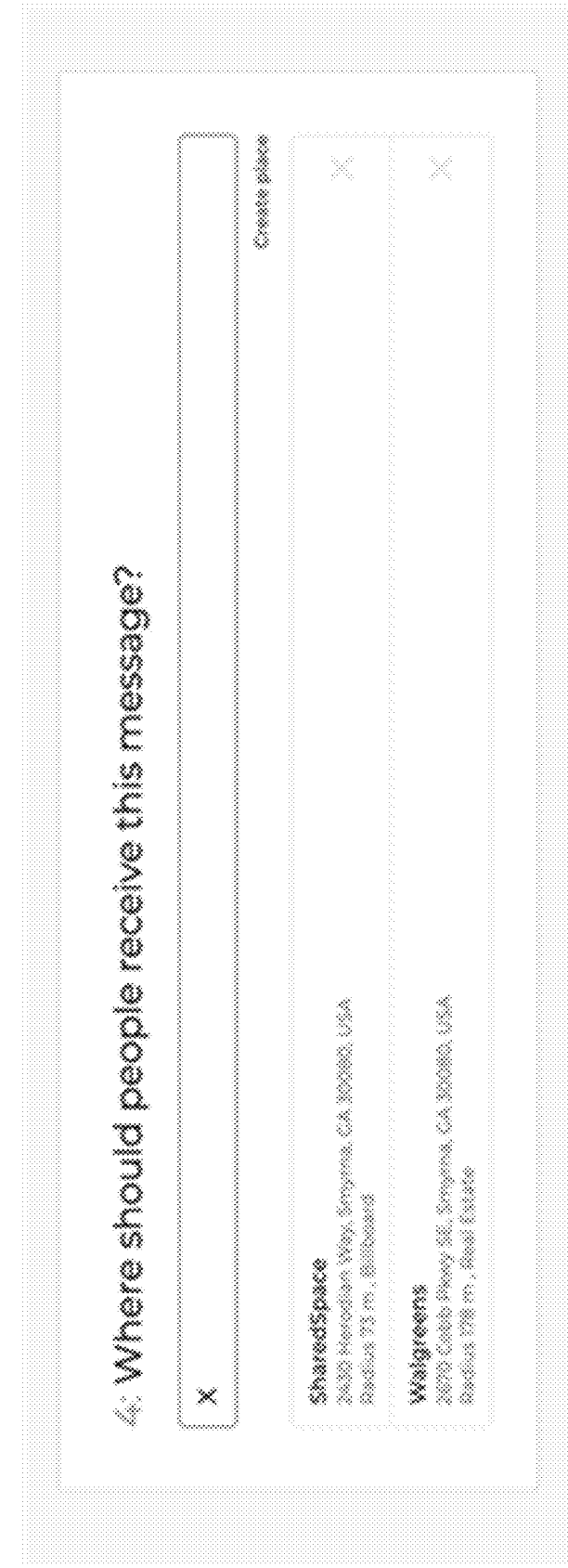
FIG. 33C illustrates a screenshot 3310 of yet another GUI for defining one or more additional delivery rules in conjunction with geolocation and time-based advertisements, in accordance with embodiments of the present disclosure.

FIG. 33C illustrates a screenshot 3310 of a GUI for defining one or more additional delivery rules in conjunction with geolocation and time-based advertisements. In some embodiments, the additional delivery rules may comprise departure from a first location. In further embodiments, the additional delivery rules may comprise arrival at a second location. In yet further embodiments, the additional delivery rules may comprise nonarrival at a second location. In even further embodiments, the additional delivery rules may comprise online consumer behavior. By way of nonlimiting example, online consumer behavior may comprise a consumer leaving a selected item in their shopping cart on an ecommerce platform. In still further embodiments, the additional delivery rules may comprise a predetermined traveled path. In yet still further embodiments, the additional delivery rules may comprise user actions taken on a mobile device. In yet even further embodiments, the additional delivery rules may comprise a time span between locations. In yet even further embodiments, the additional delivery rules may comprise a time elapsed. In yet even further embodiments, the additional delivery rules may comprise a consumer propensity. In yet even further embodiments, the additional delivery rules may comprise a user demographic. In yet even further embodiments, the additional delivery rules may comprise consumer biometric information. In yet even further embodiments, the additional delivery rules may comprise consumer interests. In yet even further embodiments, the additional delivery rules may comprise user behavior data.

Figure 33D:
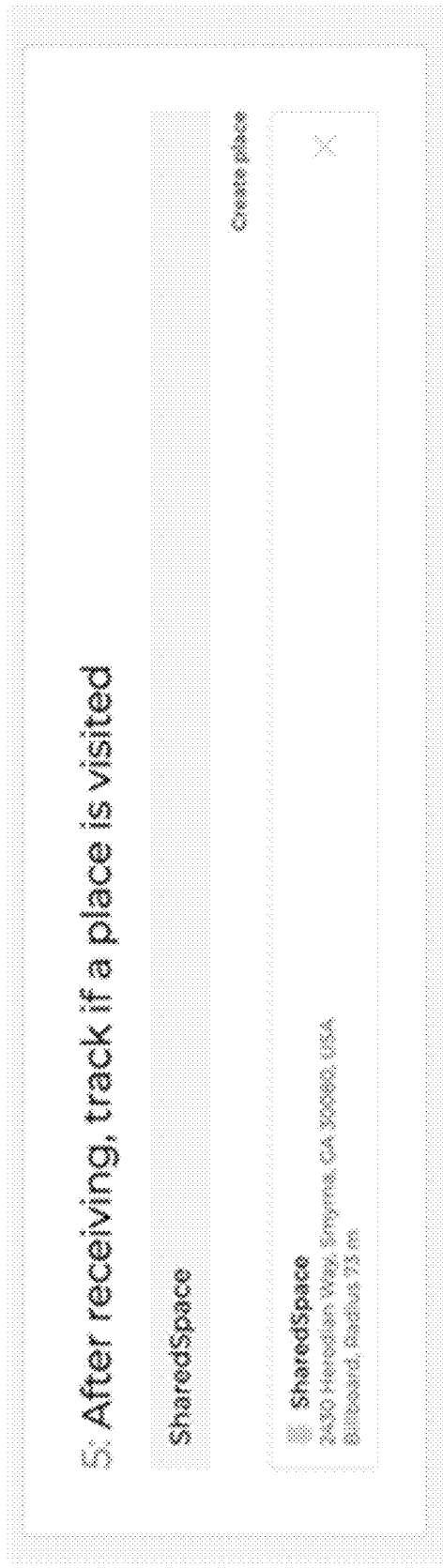
FIG. 33D illustrates a screenshot 3315 of still another GUI for defining one or more additional delivery rules in conjunction with geolocation and time-based advertisements, in accordance with embodiments of the present disclosure.

FIG. 33D illustrates a screenshot 3315 of a GUI for defining one or more additional delivery rules in conjunction with geolocation and time-based advertisements. In some embodiments, the additional delivery rules may comprise departure from a first location. In further embodiments, the additional delivery rules may comprise arrival at a second location. In yet further embodiments, the additional delivery rules may comprise nonarrival at a second location. In even further embodiments, the additional delivery rules may comprise online consumer behavior. By way of nonlimiting example, online consumer behavior may comprise a consumer leaving a selected item in their shopping cart on an ecommerce platform. In still further embodiments, the additional delivery rules may comprise a predetermined traveled path. In yet still further embodiments, the additional delivery rules may comprise user actions taken on a mobile device. In yet even further embodiments, the additional delivery rules may comprise a time span between locations. In yet even further embodiments, the additional delivery rules may comprise a time elapsed. In yet even further embodiments, the additional delivery rules may comprise a consumer propensity. In yet even further embodiments, the additional delivery rules may comprise a user demographic. In yet even further embodiments, the additional delivery rules may comprise consumer biometric information. In yet even further embodiments, the additional delivery rules may comprise consumer interests. In yet even further embodiments, the additional delivery rules may comprise user behavior data.

Figure 34:
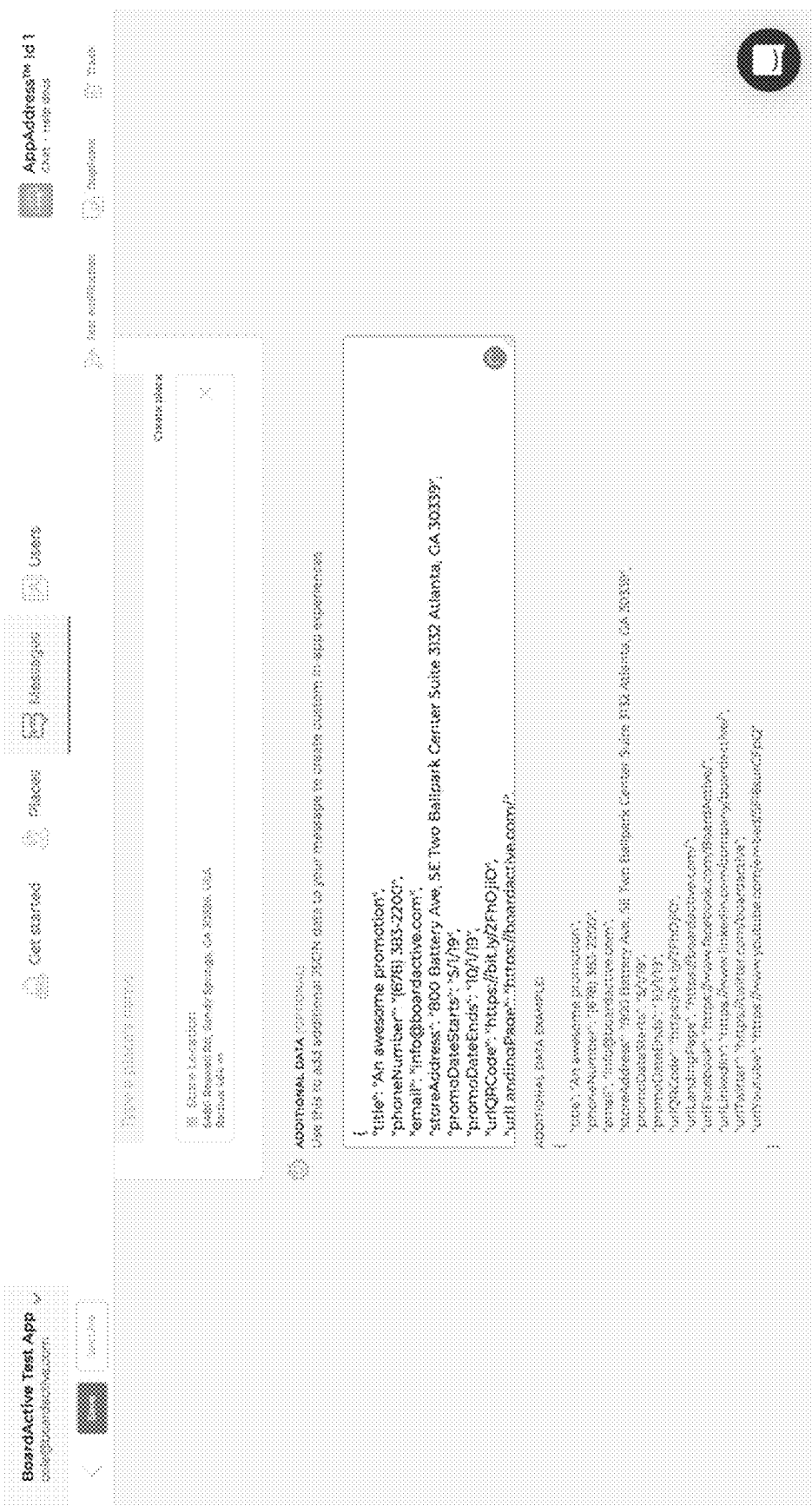
FIG. 34 illustrates a screenshot 3400 of a GUI for defining interactivity parameters, including, for example, but not limited to, one or more additional messages and/or additional media content in conjunction with geolocation and time-based advertisements, in accordance with embodiments of the present disclosure.

FIG. 34 illustrates a screenshot 3400 of a GUI for defining one or more additional messages and/or additional media content in conjunction with geolocation and time-based advertisements, in accordance with embodiments of the present disclosure. As described above, additional messages and/or delivery rules may be used in conjunction with method 2700 and other methods disclosed herein such that consumers receive different media at different times based on consumer physical actions.

Figure 35:
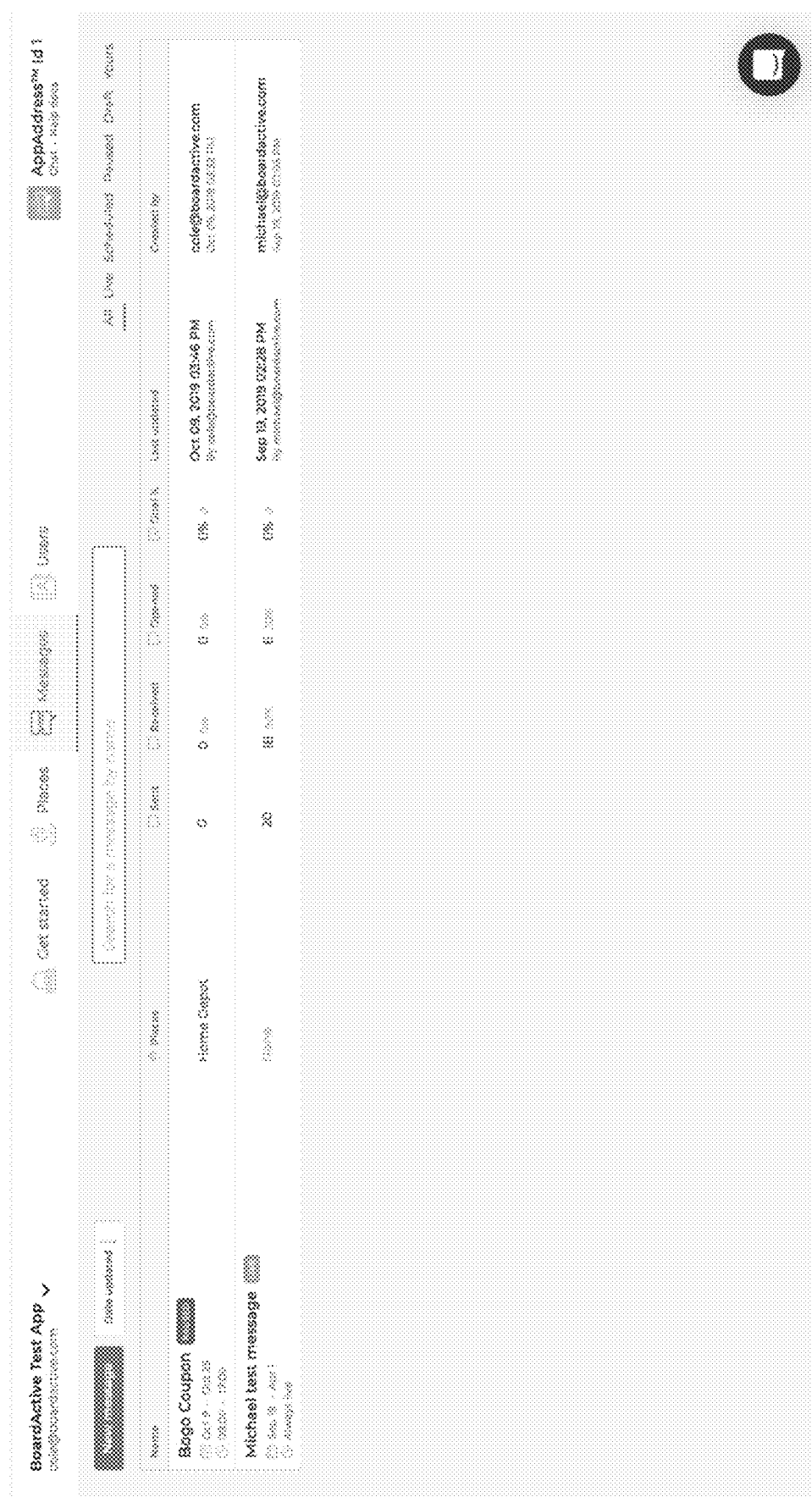
FIG. 35 illustrates a screenshot 3500 of a GUI for providing analytics associated with one or more campaigns in conjunction with geolocation and time-based advertisements, in accordance with embodiments of the present disclosure.

FIG. 35 illustrates a screenshot 3500 of a GUI for implementing and/or modifying an advertisement campaign in conjunction with geolocation and time-based advertisements, in accordance with embodiments of the present disclosure. As shown, an advertising company may start, stop, pause, record, and otherwise interact with one or more content distribution campaigns. Furthermore, complied analytics and other data related to the content distribution campaigns and physical locations of virtual and physical assets may be viewed, accessed, and/or manipulated.

Figure 36:
FIG. 36 illustrates a screenshot 3600 of a GUI for providing analytics associated with consumer profile data in conjunction with geolocation and time-based advertisements, in accordance with embodiments of the present disclosure.

The GUI(s) illustrated in FIGS. 36-40 provide examples of accessing, storing, tracking, and otherwise utilizing consumer profile data in conjunction with a content distribution campaign, media content, and/or promotions. For example, FIG. 36 illustrates a screenshot 3600 of a GUI of consumer profile data in conjunction with geolocation and time-based advertisements, in accordance with embodiments of the present disclosure. As shown, consumer profile data may be filtered, sorted, and viewed.

Figure 37:
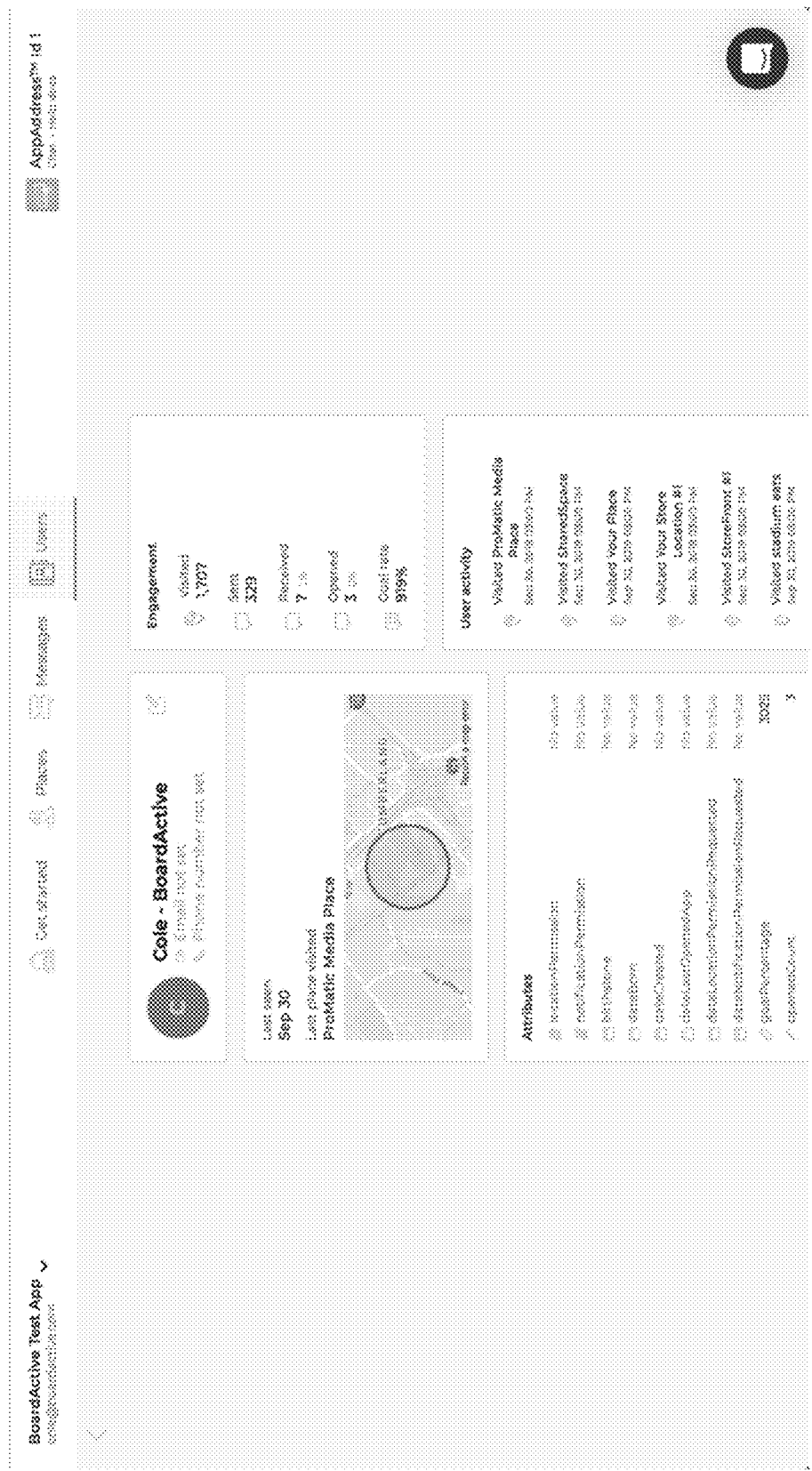
FIG. 37 illustrates a screenshot 3700 of a GUI for providing analytics associated with consumer profile data in conjunction with geolocation and time-based advertisements, in accordance with embodiments of the present disclosure.

FIG. 37 illustrates a screenshot 3700 of a GUI of consumer profile data in conjunction with geolocation and time-based advertisements, in accordance with embodiments of the present disclosure. As shown, individual consumer profile data, including physical locations of a mobile computing device associated with a particular consumer may be accessed. Furthermore, historical movements, locations, interactivity, and other measures of consumer interaction may be viewed. Additionally, measurements of consumer engagement with one or more media content, messages, and other content may be accessed.

Figure 38:
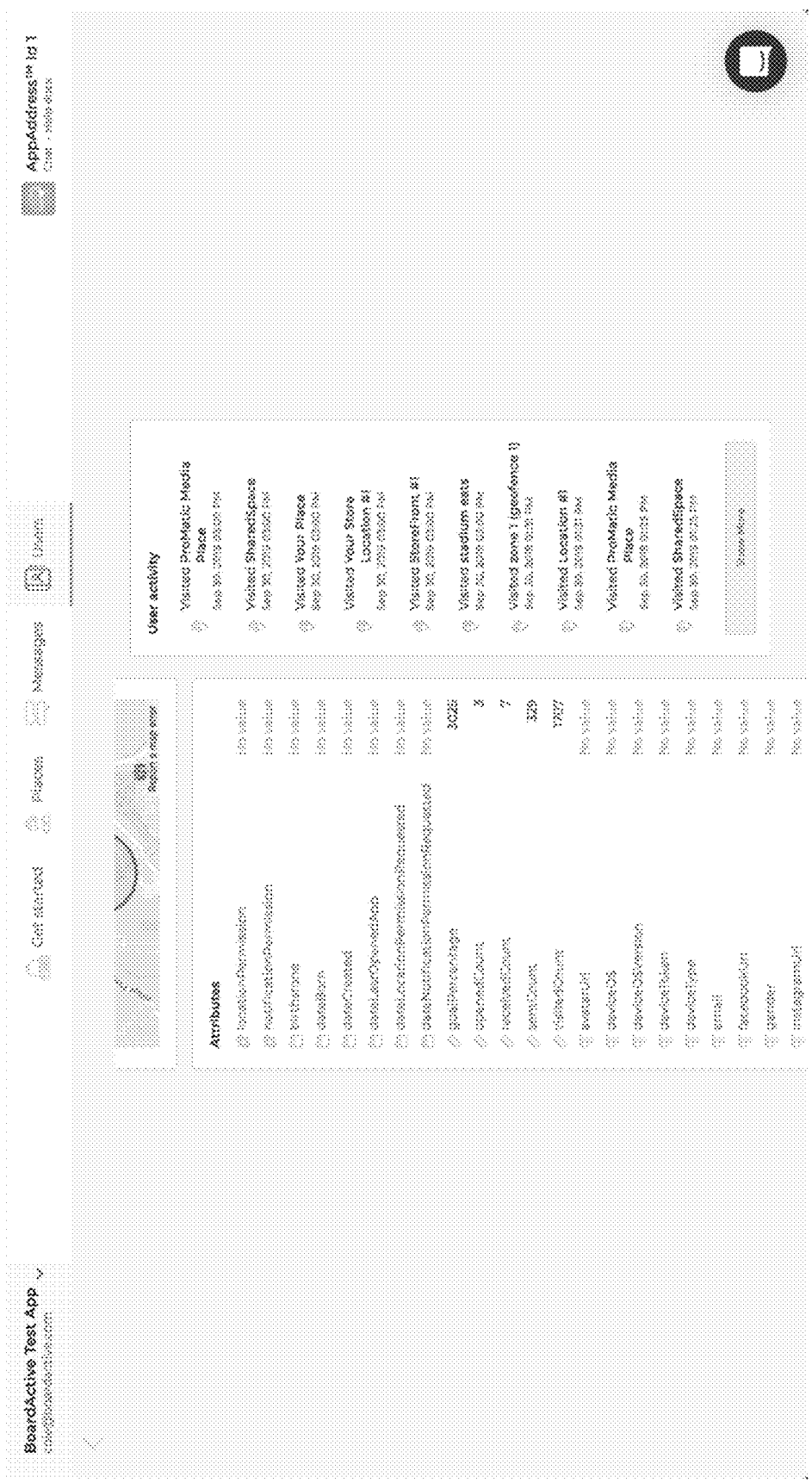
FIG. 38 illustrates a screenshot 3800 of a GUI for providing analytics associated with consumer profile data in conjunction with geolocation and time-based advertisements, in accordance with embodiments of the present disclosure.

FIG. 38 illustrates a screenshot 3800 of a GUI of consumer profile data in conjunction with geolocation and time-based advertisements, in accordance with embodiments of the present disclosure. As shown, individual attributes for a particular consumer, including attributes associated with privacy, security, preferences, and other suitable attributes may be accessed.

Figure 39:
FIG. 39 illustrates a screenshot 3900 of a GUI for defining filtering parameters associated with analytics associated with consumer profile data in conjunction with geolocation and time-based advertisements, in accordance with embodiments of the present disclosure.
Figure 40:
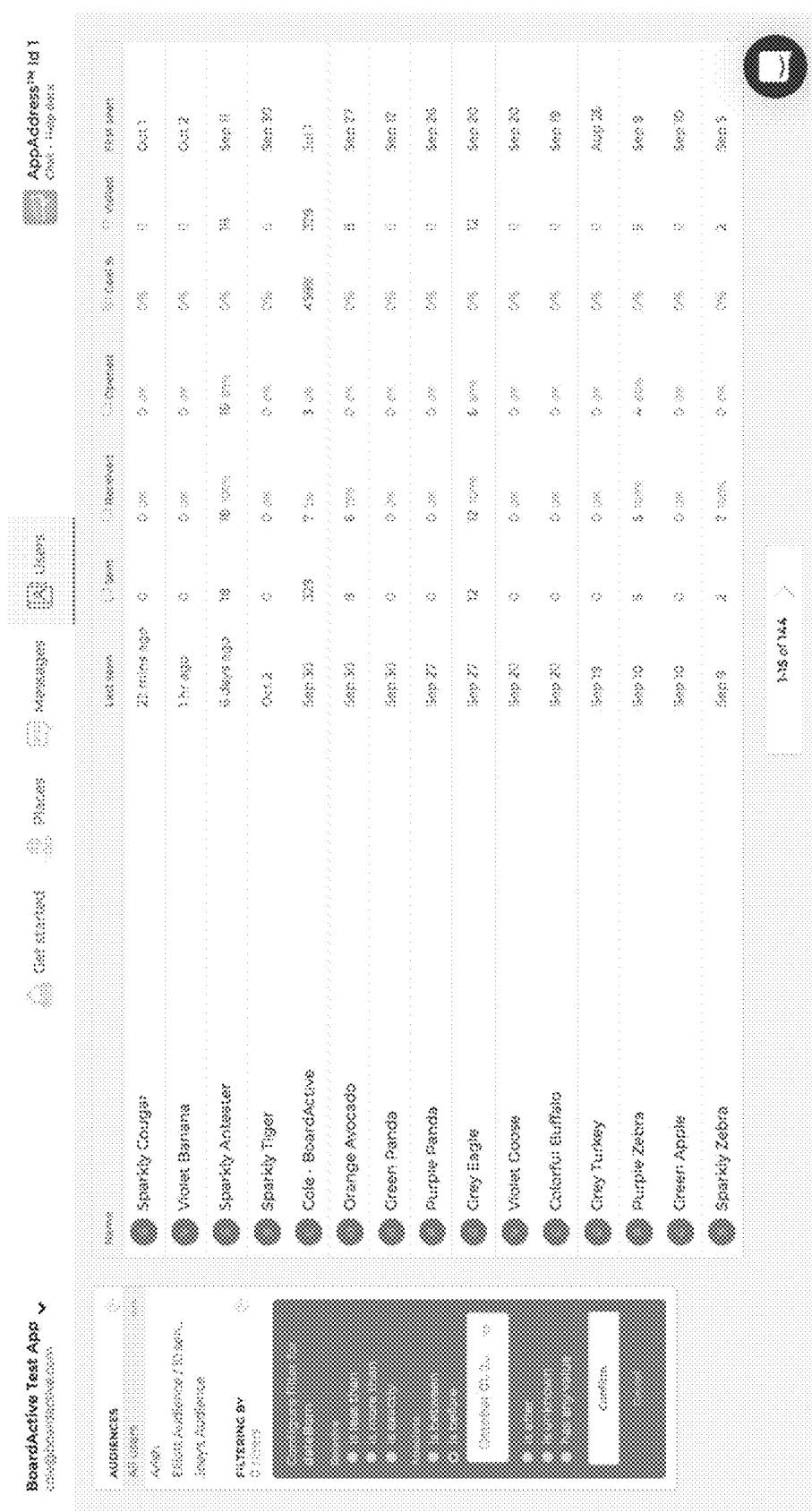
FIG. 40 illustrates a screenshot 4000 of a GUI for defining filtering parameters associated with analytics associated with consumer profile data in conjunction with geolocation and time-based advertisements, in accordance with embodiments of the present disclosure.

FIG. 39 illustrates a screenshot 3900 of a GUI of consumer profile data in conjunction with geolocation and time-based advertisements, and FIG. 40 illustrates a screenshot 4000 of a GUI of consumer profile data in conjunction with geolocation and time-based advertisements, in accordance with embodiments of the present disclosure. As shown, consumer profile data may be filtered, sorted, edited, and accessed using the GUI(s). Furthermore, historical data including analytics may be accessed to show measures of interactivity, engagement, and other suitable data.

Figure 41:
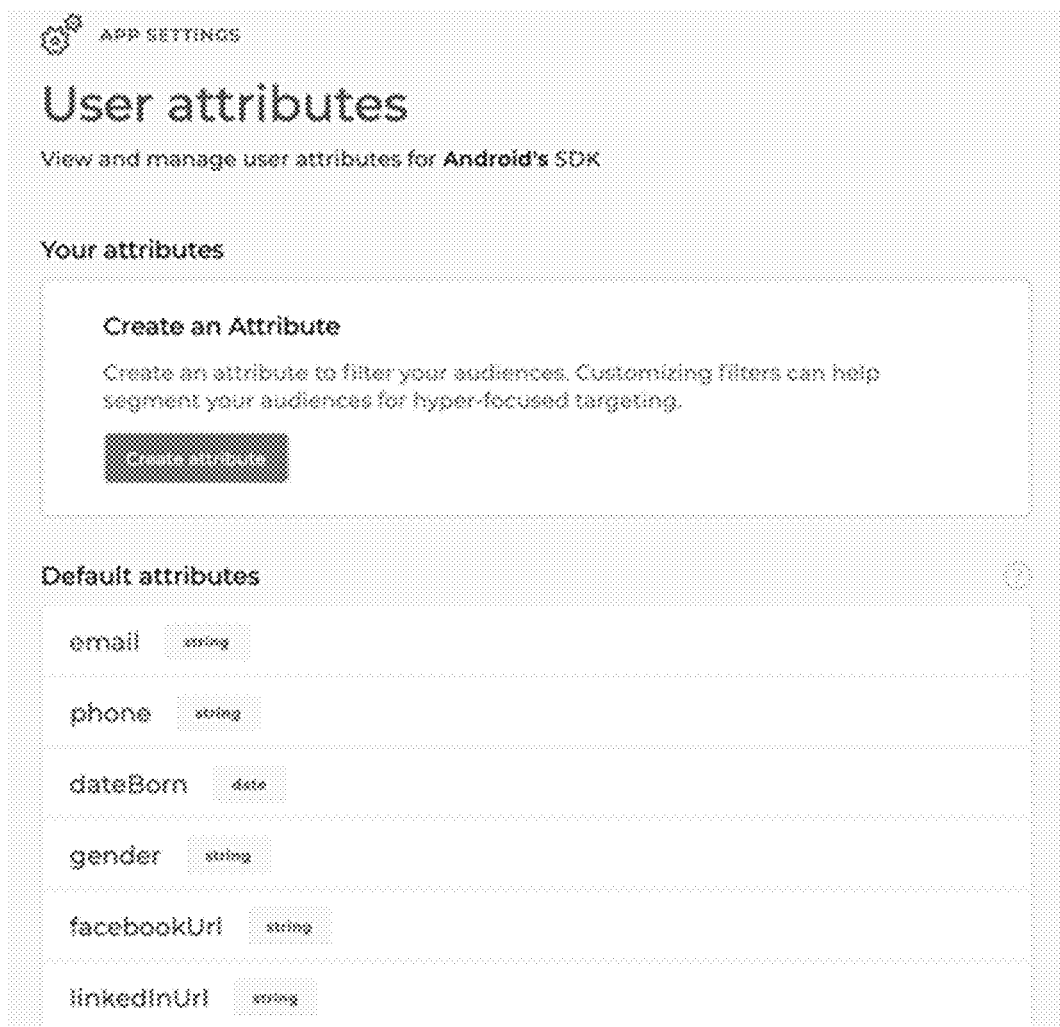
FIG. 41 illustrates a screenshot 4100 of a GUI for defining user attributes for audience filtering and segmentation in conjunction with geolocation and time-based advertisements, in accordance with embodiments of the present disclosure.

FIG. 41 illustrates a screenshot 4100 of a GUI for defining user attributes for audience filtering and segmentation in conjunction with geolocation and time-based advertisements, in accordance with embodiments of the present disclosure. As shown, user attributes for a particular user, including attributes associated with email, phone, date born, gender, Facebook URL, LinkedIn URL, and other suitable attributes may be accessed.

Figure 42:
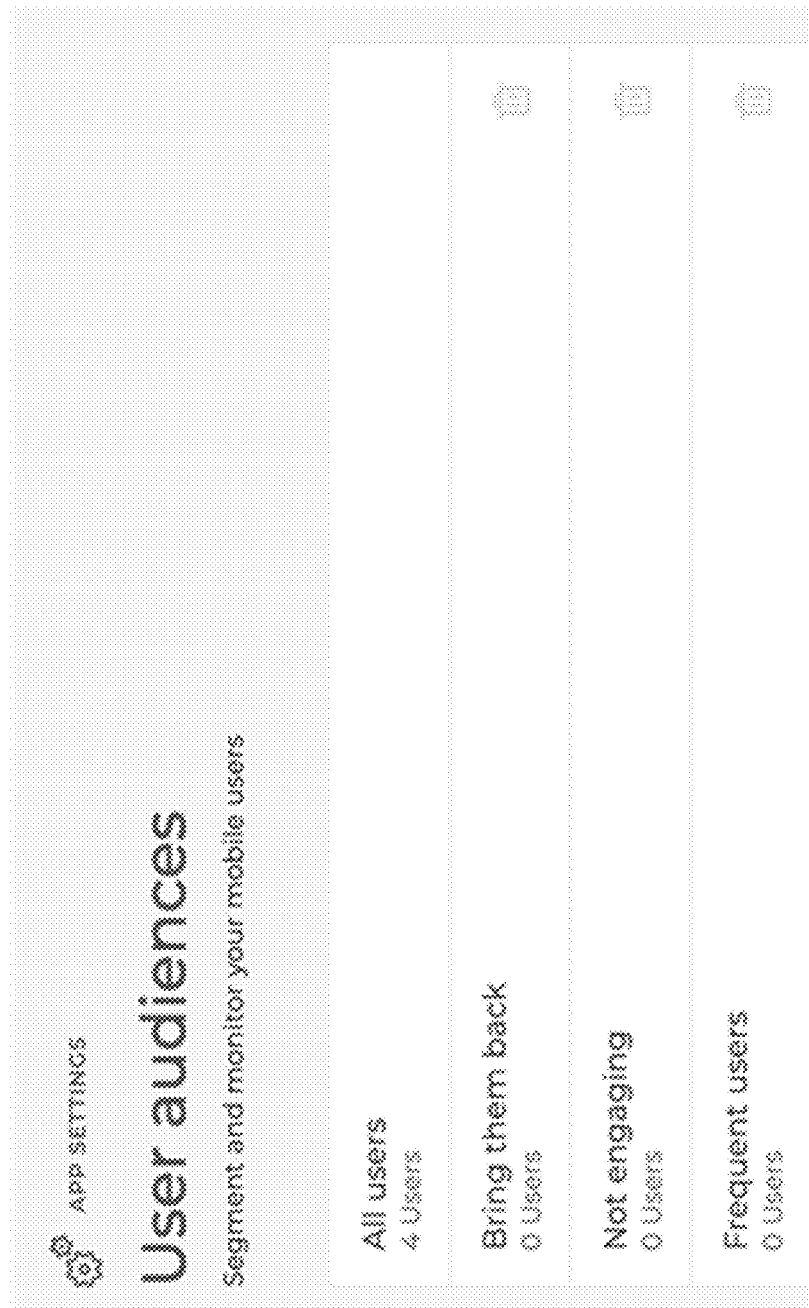
FIG. 42 illustrates a screenshot 4200 of a GUI for audience data and analytics in conjunction with geolocation and time-based advertisements, in accordance with embodiments of the present disclosure.
Figure 43:
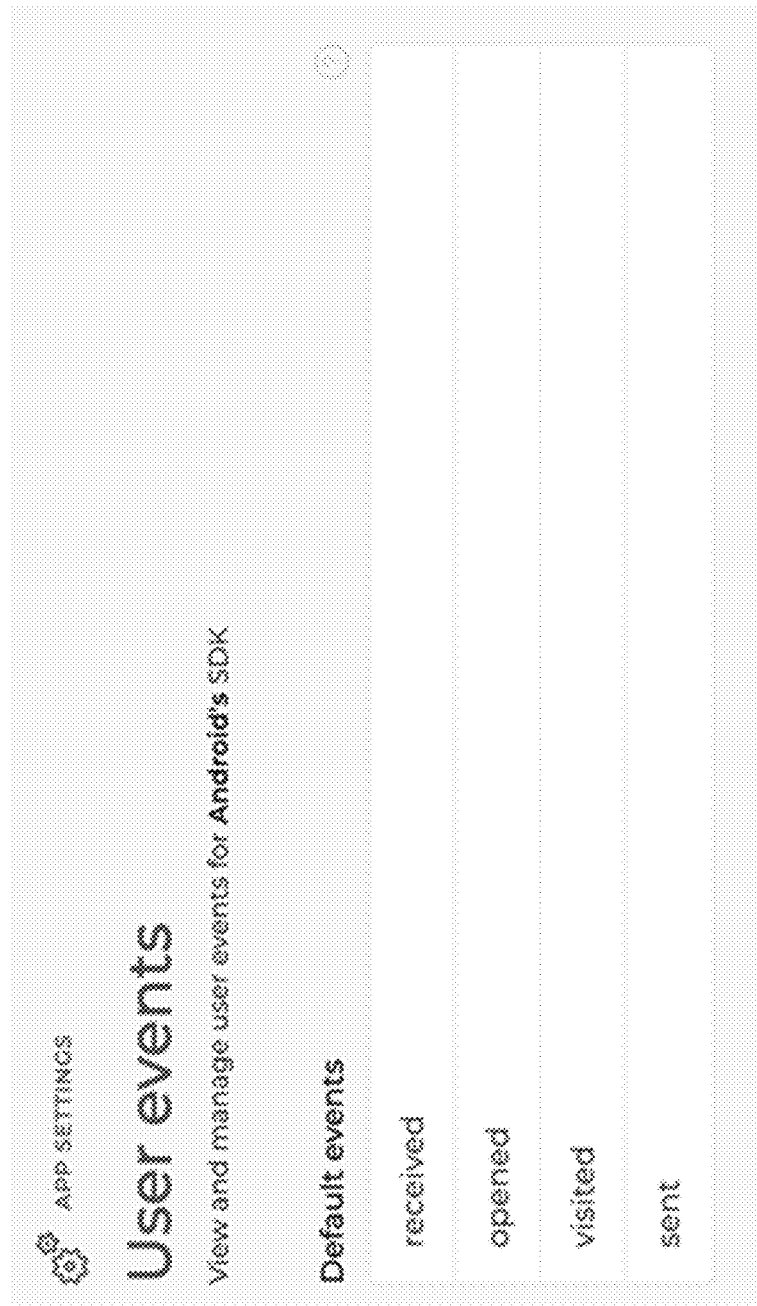
FIG. 43 illustrates a screenshot 4300 of a GUI for user interactivity and engagement in conjunction with geolocation and time-based advertisements, in accordance with embodiments of the present disclosure.

FIG. 42 illustrates a screenshot 4200 of a GUI for audience data and analytics in conjunction with geolocation and time-based advertisements, in accordance with embodiments of the present disclosure. FIG. 43 illustrates a screenshot 4300 of a GUI for user interactivity and engagement in conjunction with geolocation and time-based advertisements, in accordance with embodiments of the present disclosure. In some embodiments, the audience data and/or analytics may be configured to compile and track a consumer's behavior or engagement. In further embodiments, the audience data and/or analytics may be configured to compile and/or provide metrics associated click-throughs, revisits, and various other tracking metrics. In yet further embodiments, the audience data and/or analytics may be configured to track a consumer's interaction with an advertisement. In still further embodiments, the audience data and/or analytics may be configured to track actions made subsequent to the consumer's engagement with the advertisement. In even further embodiments, the audience data and/or analytics may be in bi-directional communication with an external dataset. The external dataset may be, by way of nonlimiting example, CRM data comprising additional user profile data. The audience data and/or analytics in bi-directional communication with an external dataset may be used to obtain profile data for a consumer as well as return additional analytics data back to the external dataset. In yet even further embodiments, the audience data and/or analytics may be configured to indicate a number of consumers who drove by a signage. In yet even further embodiments, the audience data and/or analytics may be configured to indicate a number of consumers who clicked a URL sent to their mobile device when they drove by the signage. In yet even further embodiments, the audience data and/or analytics may be configured to indicate a number of consumers who shared the advertisement. In yet even further embodiments, physical locations may have compiled analytics associated therewith showing consumer interactions (or lack of interactions) for use in a content distribution campaign. In yet even further embodiments, the audience data and/or analytics may be configured to track a consumer frequency of travel. In yet even further embodiments, the audience data and/or analytics may be configured to track the consumer frequency of travel of a typical route of a consumer. In yet even further embodiments, the audience data and/or analytics may be configured to track the consumer when diverting from the typical route of a consumer. In yet even further embodiments, the audience data and/or analytics may be configured to track actions the consumer takes through tracking devices associated with the user.

Further, in order to facilitate delivery of advertisement content to users, the platform may provide a software application ("app") installable on the mobile device associated with a user. The mobile devices may include, for example, smartphones, in-vehicle communication systems, navigation systems, and digital signage, and other formats. For instance, the app may be made available for download at an app store or online.

Figure 16:
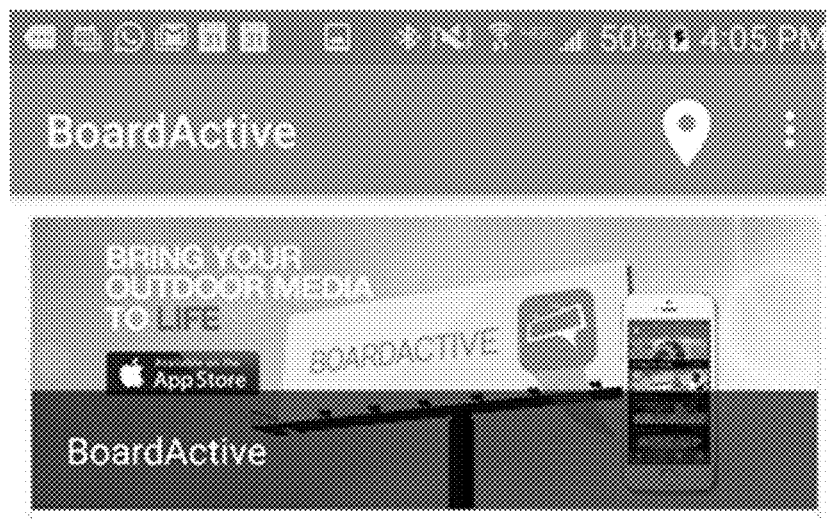
FIG. 16 illustrates a screenshot 1600 of a mobile app for delivering geolocation and time-based advertisements, depicting advertisement content corresponding to one or more traditional or digital signage saved by a user, in accordance with embodiments of the present disclosure.
Figure 16:
Figure 17A:
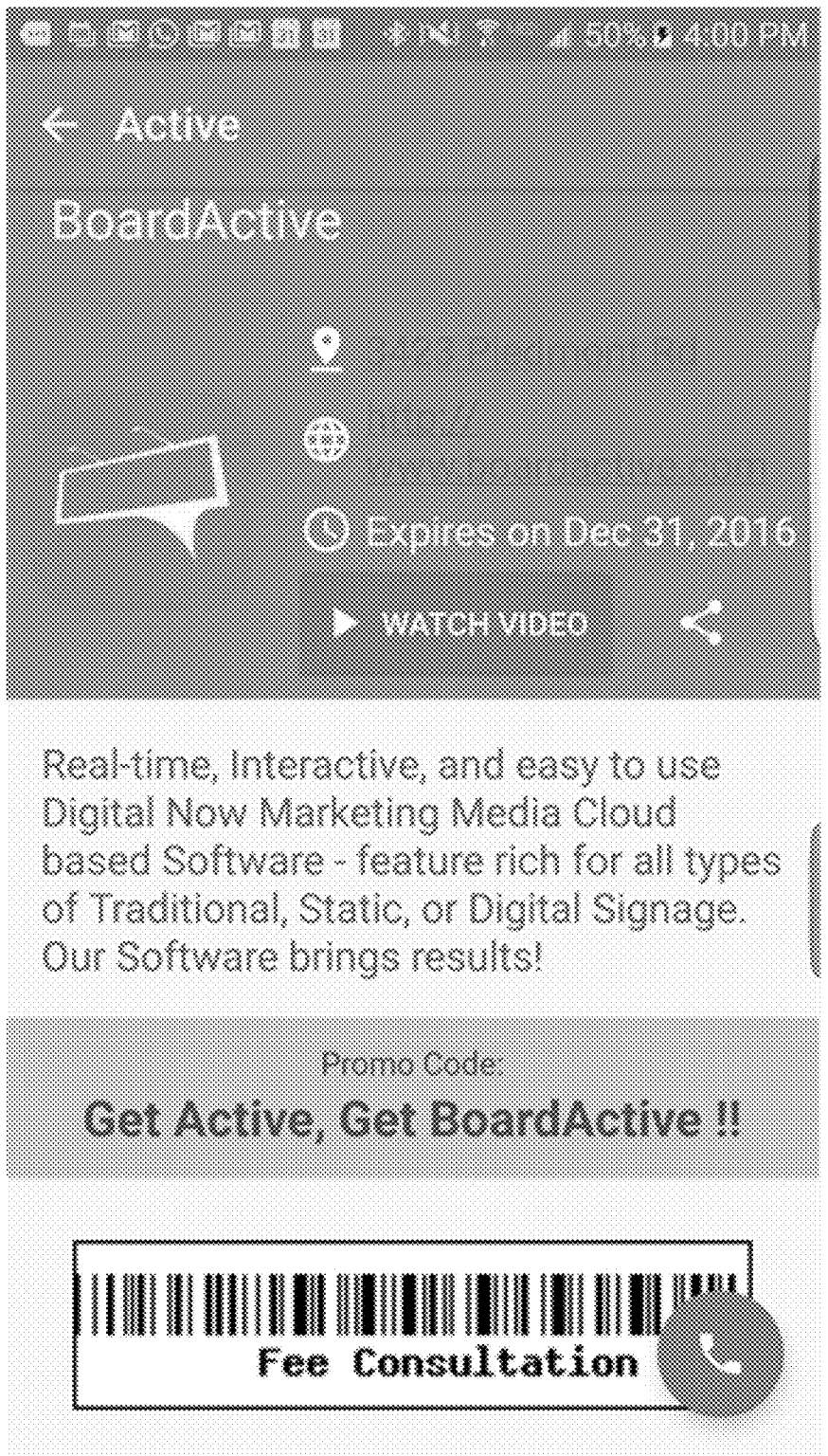
FIG. 17A illustrates a screenshot 1700 of a mobile app for delivering geolocation and time-based advertisements, depicting advertisement content corresponding to traditional or digital signage, in accordance with embodiments of the present disclosure.
Figure 17B:
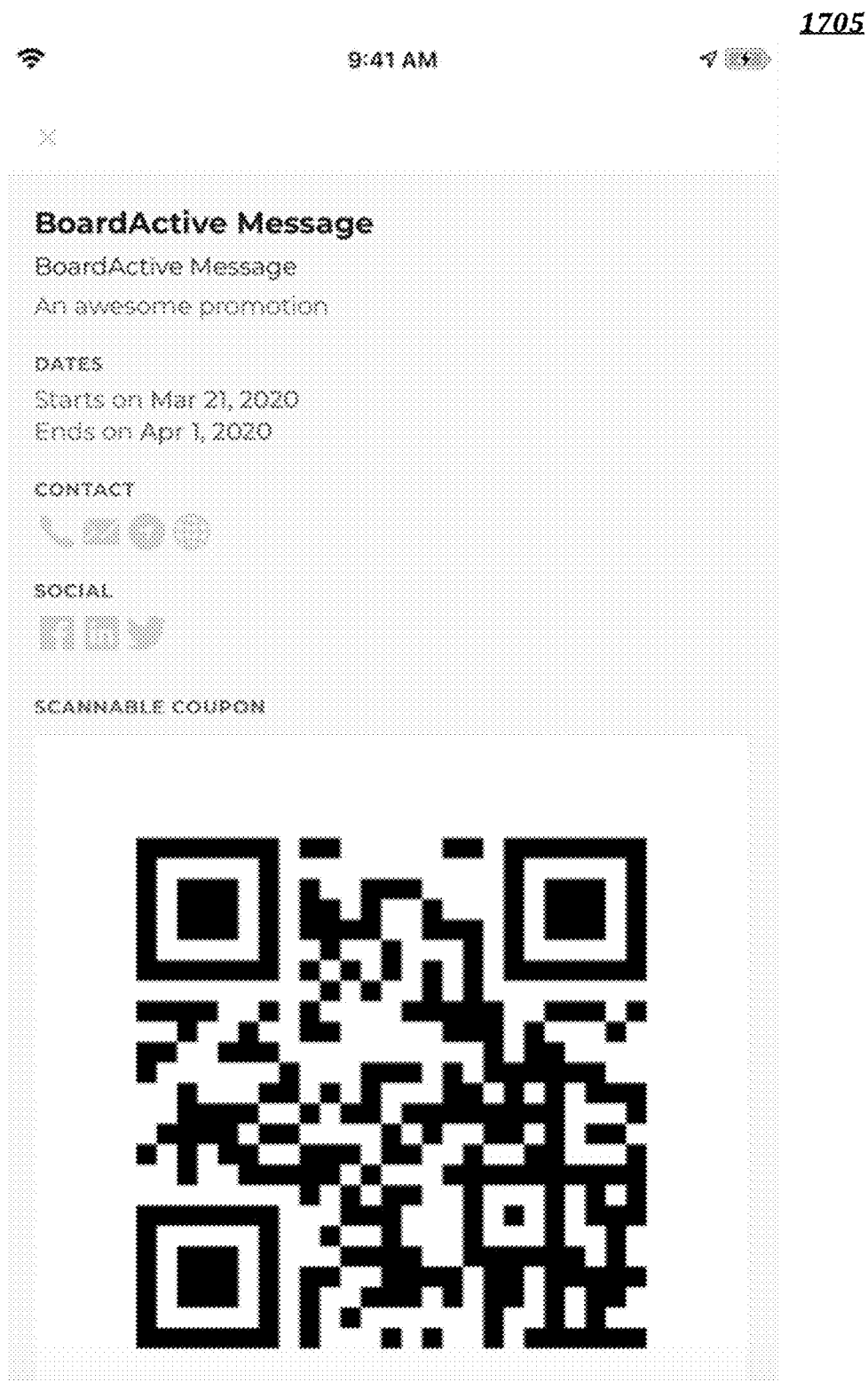
FIG. 17B illustrates a screenshot 1705 of interactive content in accordance with embodiments of the present disclosure.

The app may be configured to monitor geolocation of the mobile device, using for example, a built-in GPS receiver in the mobile device. Further, the app may be configured to transmit the geolocation to the platform through a wireless communication network, such as, cellular network. Accordingly, the platform may be configured to identify and retrieve advertisement content associated with real and/or virtual signage corresponding to the geolocation transmitted by the mobile device. Subsequently, the platform may transmit the advertisement content to the mobile device to be displayed on the mobile device, as illustrated in FIG. 17A, and as illustrated in FIG. 17B. Further, the app or beacon may be configured to store all such advertisement content received from the platform in a local storage unit on the mobile device. Accordingly, the app may enable a user to view all traditional or digital signage that the user has passed by (e.g., walk, ride, or drive), as exemplarily illustrated in FIG. 16.

Figure 15:
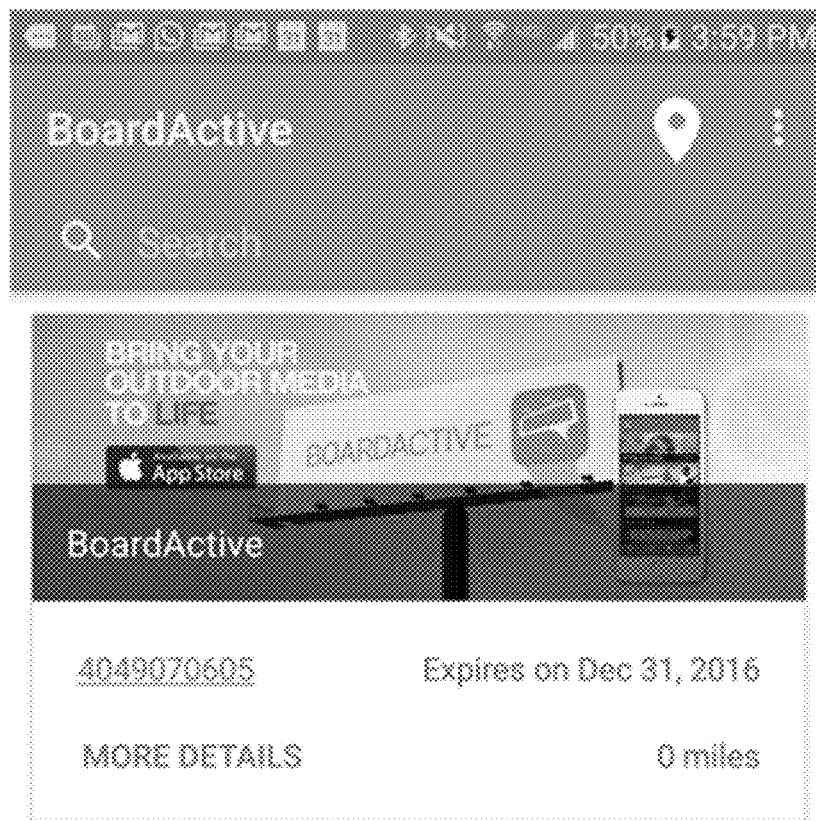
FIG. 15 illustrates a screenshot 1500 of a mobile app for delivering geolocation and time-based advertisements, depicting advertisement content corresponding to one or more traditional or digital signage passed by a user, in accordance with embodiments of the present disclosure.
Figure 15:
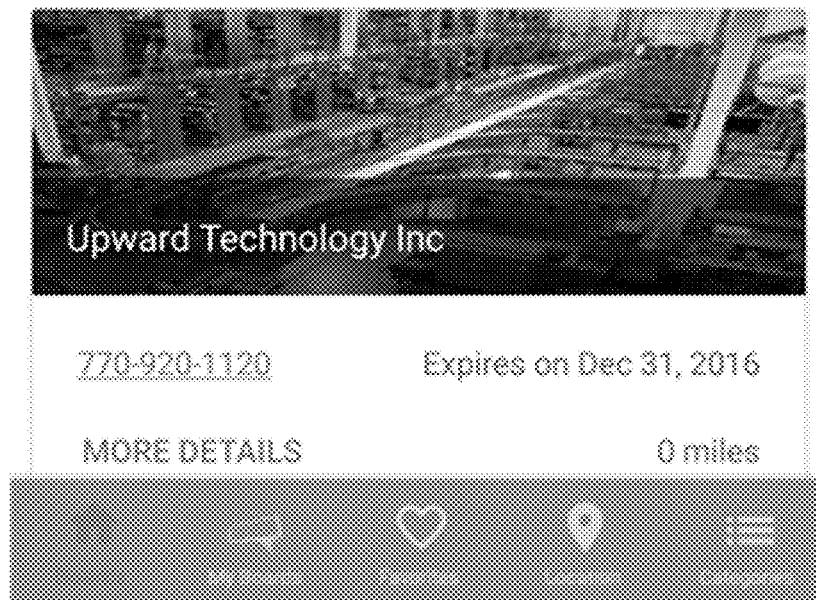

Additionally, when an advertisement content is displayed to the user while the user is in proximity to traditional or digital signage, the app may also enable a user to save the advertisement content. Accordingly, the user may retrieve a saved advertisement content and view later, as exemplarily illustrated in FIG. 15.

Figure 18:
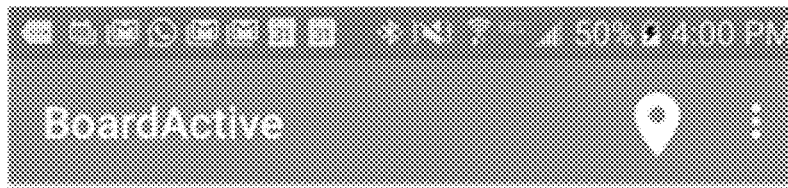
FIG. 18 illustrates a screenshot 1800 of a mobile app for delivering geolocation and time-based advertisements, depicting a plurality of categories associated with advertisement content corresponding to a plurality of traditional or digital signage, in accordance with embodiments of the present disclosure.
Figure 18:
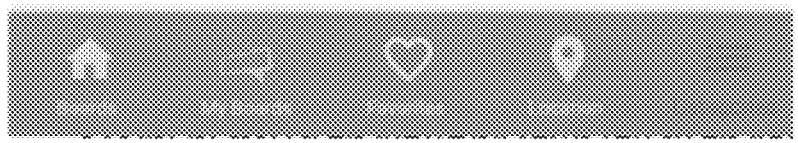

Additionally, the app may be configured to maintain a category associated with advertisement contents. As a result, the app may be able to sort the saved advertisement contents based on a category, provided by the user as exemplarily illustrated in FIG. 18.

Figure 19:
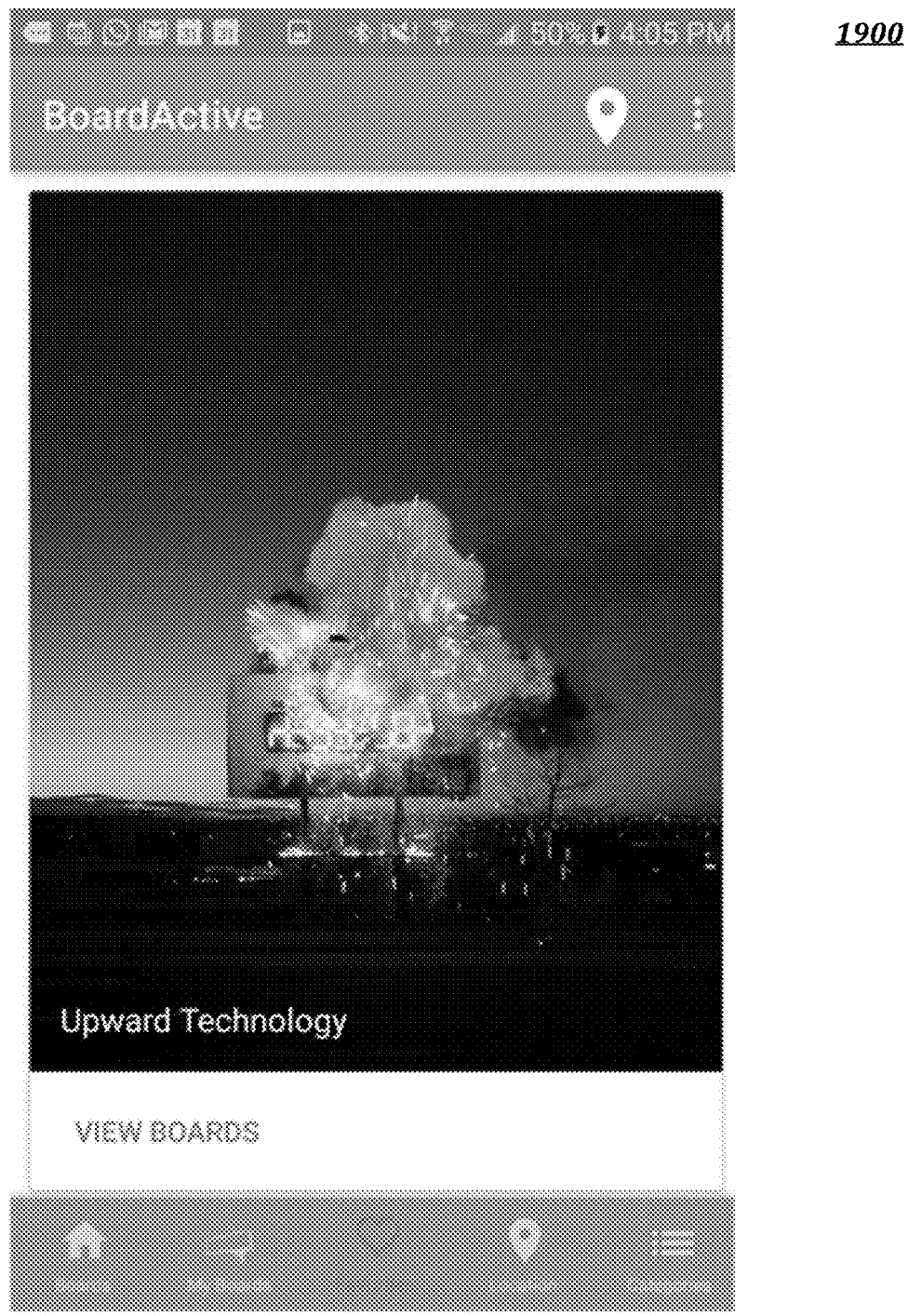
FIG. 19 illustrates a screenshot 1900 of a mobile app for delivering geolocation and time-based advertisements, depicting a user interface for selecting advertisement content corresponding to traditional or digital signage as a favorite, in accordance with embodiments of the present disclosure.

Additionally, the app may be configured to enable the user to perform actions such as "Mark," "Favorite," "Save," and "Share" with regard to an advertisement content displayed on the mobile device, as exemplarily illustrated in FIG. 19. In this way, embodiments of the present disclosure may provide for a "tap and save" media to the consumer, and a "tap and spend" media to the advertiser. Such commands may be performed using voice command technology associated with the mobile device, enabled with a plurality of voice commands.

Further, the app may also be configured to provide the pin drop feature. Accordingly, when the user is at a location, the app may enable the user to drop a pin by touching a Pin Button on the app's GUI. Accordingly, the app may store the location on the local storage device. Subsequently, the user may select the location and view traditional or digital signage in the vicinity of the location, as exemplarily illustrated in FIG. 20. Embodiments of the present disclosure may apply to all forms of digital signage platforms, not just real and/or virtual signage.

Digital signage may be comprised of many different technological components. Any form of display (screens, tablets, kiosks, projectors, signage) that shows information may be configured as a digital signage.

Still consistent with embodiments of the present disclosure, time-based advertisements may be provided in particular geographical segments. The provision of the time-based advertisements may correspond to telecommunications and television networks (collectively referred to herein as 'tele-broadcast'). A viewer within the geographical segment of a tele-broadcast may be exposed to a plurality of advertisements during the streaming of a program. Such advertisements may be broadcasted to the viewer by an entity associated with the corresponding geographical segment.

Embodiments of the present disclosure may enable a platform user to select at least one geographical segment and at least one time at which promotional content associated with the platform user may be tele-broadcasted. The platform may then provide the promotional content and the specified at least one tele-broadcast time for broadcasting the promotional content to an entity or entities corresponding to the specified at least one geographical segment. In turn, a viewer within the geographical segment, at the specified time, may be provided with the promotional content not only via the tele-broadcast, but also through a software application associated with the platform.

In some embodiments, a viewer may have a Smart TV and/or a Digital TV connected to a local area network (LAN). In such scenarios, the software application running on a computing device on the same LAN may be enabled to determine that the viewer has been displayed the promotional content, within the geographical segment and the specified time. In turn, the software application may provide the promotional content via the software application in accordance to the embodiments disclosed herein.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

II. Platform Configuration

FIG. 1 is an illustration of a platform consistent with various embodiments of the present disclosure. By way of non-limiting example, the platform 100 for geolocation and time-based advertisements may be hosted on a centralized server 110, such as, for example, a cloud computing service. The centralized server may communicate with other network entities, such as, for example, a signage equipped with wireless communication means, a mobile device (such as a smartphone, tablet, a laptop, or wireless computing devices etc.) and a client device (such as a desktop, laptop, smartphone etc.). A user, such as a manager of the platform 100 and/or an administrator of an advertising company may access platform 100 through a software application. The software application may be embodied as, for example, but not be limited to, a website, a web application, a desktop application, and a mobile application compatible with a computing device 2100. One possible embodiment of the software application may be provided by BoardActive Suite of products and services. Accordingly, the user may provide, for example, advertisement content and one or more geographical locations corresponding to traditional or digital signage. In response, the platform may associate the advertisement content with the one or more geographical locations and accordingly deliver the advertisement content to mobile devices in the vicinity of the one or more geographical locations.

As will be detailed with reference to FIG. 21 below, the computing device through which the platform may be accessed may comprise, but not be limited to, for example, a desktop computer, laptop, a tablet, or mobile telecommunications device. As will be detailed with reference to FIG. 21 below, the computing device through which the platform may be accessed may comprise, but not be limited to, for example, Smart TV, a desktop computer, laptop, a tablet, or mobile telecommunications device. Though the present disclosure is written with reference to a mobile telecommunications device, digital signage, and TVs, it should be understood that any computing device may be employed to provide the various embodiments disclosed herein.

I. Embodiments of the Present Disclosure Provide a Platform Comprised of a Distributed Set of Modules, Including, but not Limited to A. An Admin Module 185;
B. A Consumer Module 165;
C. An Activation Module 125;
D. A Transmission Module 145; and
E. A Data Sets 195.

In some embodiments, the present disclosure may provide an additional set of modules for further facilitating the software and hardware platform. The additional set of modules may comprise, but not be limited to:

A. A Delivery Rules Layer;
B. An Analytics Layer;
C. An Admin Application UI Layer;
D. A Consumer Tracking Layer;
E. A Consumer Application UI Layer;
F. A Content Interaction Layer; and
G. A Data Layer.

FIG. 1 illustrates a non-limiting example of operating environments for the aforementioned modules. Although modules are disclosed with specific functionality, it should be understood that functionality may be shared between modules, with some functions split between modules, while other functions duplicated by the modules. Furthermore, the name of the module should not be construed as limiting upon the functionality of the module. Moreover, each stage in the claim language can be considered independently without the context of the other stages. Each stage may contain language defined in other portions of this specifications. Each stage disclosed for one module may be mixed with the operational stages of another module. Each stage can be claimed on its own and/or interchangeably with other stages of other modules. The following claims will detail the operation of each module, and inter-operation between modules.

Still consistent with embodiments of the present disclosure, the aforementioned modules may be integrated, via an API or SDK, and be inter-configured with an existing computing application to perform various stages of the aforementioned method. Existing computing applications may include, for example, but not limited to, mobile applications such as those provided by Google™, Waze™, Facebook™, Chick-Fil-A™, and other applications that provide advertising content. Additionally, mobile or web applications that provide a platform for purchasing goods and/or services may utilize the API/SDK integration to control advertisements, promotions, and other media content. For example, the API/SDK may be integrated to control:

A. Digital content associated with an administrator;
B. Activation Parameters for triggering a delivery of the digital content;
C. Delivery Rules for selecting a content type to be delivered to a particular consumer;
D. Access, Manage, and Track Consumer Profile Data; and
E. Access, Manage, and Update External Data sets.

Consistent with embodiments of the present disclosure, activation parameters may determine what triggers an ad delivery event to commence. For example, the activation parameters may occur based on, but not limited to, the following parameters:

A. Space;
B. Time;
C. Space-Time; or
D. Image Processing.
  A. Space
    Designates a point in space for a BrandDrop®, regardless of time, including, but not limited to:
      Real Space—Physically Associated with a location of a Static Object;
      Virtual Space=Area defined by coordinates on a map, but not associated with a physical object; and
      Dynamic—Objects Markers associated with mobile assets.
  B. Time
    Designates a point in time for a BrandDrop®, regardless of space, including, but not limited to:
      Predefined time—Set to occur at a specific time or window of time:
        May be scheduled; and
        Schedule may be obtained from an external dataset;
      Variable—Set to occur upon a triggering event:
        May be associated with a manual, Admin action; and
        For example: the Admin may be enabled to enact a triggering event by way of the Admin UI layer.
  C. Space-Time
    Designates a specific point in space at a specific point in time to be activate the BrandDrop®.
      Event
        Corresponds to some event in a future time, but is not defined by the Admin, including, but not limited to:
        Venue Schedule;
        Sport Schedule; and
        Commercial Schedule.
  D. Image Processing
    Consumer may capture an image and submit the image to the platform;

Consumer can be prompted to prove they are near a trigger.

Perform image processing will determine whether there are registered Brand Assets within an image; and May determine an AppAddress® associated with the registered assets.

II. Embodiments of the Present Disclosure Provide a Hardware and Software Platform Operative as a Distributed System of Modules and Computing Elements for Performing at Least the Following Functions Activating A®

Embodiments of the present disclosure are enabled to determine an instance of space and time, aligned to trigger a BrandDrop®. The following section discloses, in part, what parameters may activate a BrandDrop® sequence to occur.

1. Spatial Activation

A space based activation trigger may be based at least on, but not limited to, the following:
 Spatial Regions associated with a BrandDrop®.
  A physical media; and
  A virtual media;
   May be achieved via, for example, GPS Management System; and
   May enable Admin to specify regions in space associated with BrandDrop® event.
 Objects/Markers in Space may be associated with Ads.
  Certain Objects/Markers may be mobile (e.g., mobile assets).
   E.G., Moving Object that is being Tracked:
    Bus;
    Food Truck;
    Delivery Vehicle;
    Plumber Truck;
    Moving Truck;
    Person tracking; and
    The like.
   Such objects may be configured with a location detection module.
  Embodiments of the present disclosure may access use external data sets to get up-to date coordinates on the mobile assets.
   Moving Object Can Have Beacon (See Transmission Module); and
   May also be tracked through external data.

2. Time-Based Activation

A time-based activation trigger may be based at least on, but not limited to, the following.
 Predefined time
  Configured to occur at unconstrained points in space, at a particular time.
  Rule: "At this time, Blast All Consumers."
 Variable Time
  Configured to occur at unconstrained points in space, at a variable time.
   May be typically associated with a manual action.
  Function: "When I click this button, Blast All Users".
 Event Trigger Based
  Configured to occur at unconstrained points in space, at a variable time.
  Example: A commercial when played, anywhere in world, at any point in time.
   Commercial could be in any video format.
  Could use external data to get up-to date delivery parameters.
   Event Schedule for a Venue.
   Game Schedule for a Sporting Event.

3. Space/Time Based Activation

Configured to occur at unconstrained points in space, at a variable time.
 Events:
  Venues; and
  Promotional Offerings at Store Front In some embodiments, unlike previous triggers, where a consumer can be near a designated physical/virtual media and receive a BrandDrop® at a time (predefined, variable, or event based), the Space/Time trigger may designate a specific point in space at a specific point in time to be activate the BrandDrop®.

III. Embodiments of the present disclosure provide a hardware and software platform operative by a set of methods and computer-readable media comprising instructions configured to operate the aforementioned modules and computing elements in accordance with the methods The methods and computer-readable media may comprise a set of instructions which when executed are configured to enable a method for inter-operating at least one of the following modules:
 A. An Admin Module 185;
 B. A Consumer Module 165;
 C. An Activation Module 125;
 D. A Transmission Module 145; and
 E. A Data Sets 195.

The aforementioned modules may be inter-operated to perform a method comprising the following stages:
1. Register Assets:
  a. Digital Assets;
  b. Physical Assets;
  c. Virtual Assets;
  d. Media Assets;
  e. Mobile Assets; and
  f. Assign AppAddress® to the Registered Assets.
2. Receive Content:
  a. Associate with an AppAddress®; and
  b. Associate with Interactivity Rules.
3. Receive Delivery parameters:
  a. Receive Ad Activation Parameters;
  b. Receive Ad Delivery Parameters; and
  c. Associate Content Type(s) with the BrandDrop® Parameters.
4. Receiving Activation Command:
  a. Determine Space Event has Occurred;
  b. Determine that Time Trigger has Occurred;
  c. Determine if Space/Time Event has Occurred; and
  d. Determine Device Type Used.
5. Select Appropriate Ad to Transmit:
  a. Receive Information About User;
  b. Compare to Ad Delivery Rules; and
  c. Select Appropriate Content Type(s) to Transmit.
6. Transmit BrandDrop®:
  a. Receive Indication of Content Interaction;
  b. Ad Content may provide user with Instructions for Revealing Additional Content (Promotion);
  c. Engage User Tracking; and
  d. Receive Feedback from User.
7. Provide Interactive Content:
  a. Determine if Revealing Interactive Content is true; and
  b. Bi-Directional Communication with the User.

Although the stages are disclosed in a particular order, it should be understood that the order is disclosed for illustrative purposes only. Stages may be combined, separated, reordered, and various intermediary stages may exist. Accordingly, it should be understood that the various stages, in various embodiments, may be performed in arrangements that differ from the ones claimed. Moreover, various stages may be added or removed from the without altering or deterring from the fundamental scope of the depicted methods and systems disclosed herein.

IV. Embodiments of the Present Disclosure Provide a Platform Comprised of a Distributed Set of Computing Elements The platform is operative to control a computing device in furtherance of the operation of the aforementioned modules. Although the following disclosure describes one type of computing device, the platform may be comprised of more than one computing device in operation. Computing Device 2100, detailed in FIG. 21, is yet another example.

The computing device may comprise, but not limited to at least one of the following:
A processing unit,
A memory storage, The computing device may be embodied as a mobile computing device, wherein the computing device comprises, but is not limited to:
A tablet,
A smartphone,
A drone,
A wearable device,
A vehicle,
Smart TV's, and
Smart Screens.

The computing device may comprise sensing devices, wherein the sensing device may comprise, but is not limited to:
A camera capturing content,
A microphone for enabling voice commands,
A location detection module, and
A biometrics module;
wherein the location detection module is configured to:
a. Enables the reading and communicating of location data associated with a sensing device;
b. The location data may be obtained by way of, for example, but not limited to:
    i. Human tracking (e.g., implanted tracking chips);
    ii. GPS/IP Address/Triangulation;
    iii. LAN/WAN; and
    iv. The detection of a device orientation to enable 'point and click' functionality.

In some embodiments the computing device may be embodied as any of the computing elements illustrated in FIG. 1, including, but not limited to, the Admin Module 185 and the Consumer Module 165.

In some embodiments, multiple mobile devices may be associated with a same platform user. As such, the platform may be enabled to function across devices, thereby receiving and sending data to multiple devices associated with the same platform user. In this way, the platform may be configured to track a platform user across multiple devices and communicate with the platform user at, for example, a device that is nearest to him, or a device that best fits the needs of the platform user.

Furthermore, in some embodiments, the computing device may comprise transmission module 145. Transmission module 145 may be configured to, for example, transmit content to a consumer. Such transmission may involve transmission technology, including, but not limited to:
Beacon Technology;
Embedded Chipset Transmission;
Bluetooth;
WIFI;
RFID;
NFC;
GPS Mapping and Management system; and
Other transmission missions.

In various embodiments, and as will be detailed below, transmission module 145 may be configured to cause a transmission of content through centralized server.

A. Sub-Modules operative by the Computing Device

The computing device may be operated in accordance to multiple software modules and layers. Layers may comprise sub-modules, although, in some embodiments, the layers may constitute an entire module. The platform may be operative to control at least one of the following sub-modules of a computing device in furtherance of the execution of the instructions contained in the Admin Module 185:
1. An Admin Application UI Layer;
2. A Data Layer;
3. A Delivery Rules Layer; and
4. An Analytics Layer.

The following provides non-limiting examples of functions and features of the aforementioned layers:
1. The Admin Application UI Layer
    a. May be configured for Stand-Alone Applications or integrated into existing applications:
        i. Example: Embedded frame within an existing web application;
    b. Enables user-control of the Computing Device;
    c. Enables user-control of the Modules of the Computing Device:
        i. An Admin Module 185;
        ii. A Consumer Module 165;
        iii. An Activation Module 125;
        iv. A Transmission Module 145; and
        v. Data Sets 195. d. Enables user-control of the Sub-Modules:
        i. A Delivery Rules Layer;
        ii. An Analytics Layer;
        iii. An Admin Application UI Layer;
        iv. A Consumer Tracking Layer;
        v. A Content Interaction Layer; and
        vi. A Data Layer.
2. The Data Layer
    a. Enables asset data storage, tracking, and management of:
        i. Digital Assets;
        ii. Physical Assets;
        iii. Virtual Assets;
        iv. Media Assets; and
        v. Mobile Assets.
    b. Enables content Storage, tracking, and management;
    c. Enables Assignment of an AppAddress® to associate assets with content;
    d. Enables consumer profile data storage, tracking, and management; and
    e. Enables communication and interoperation with Data Sets 195.
3. The Delivery Rules Layer
    a. Establishes the parameters and criteria for selecting content to be delivered to a consumer;
        i. Can be based on Activation Module Parameters:
            1. Space;
            2. Time; and
            3. Space/Time.

i. Can be based on Consumer Profile Parameters, including, but not limited to:
1. Gender;
2. Demographic;
3. Propensity;
4. Interest; and
5. Behavior Data.
iii. Can be based on a device type associated with the consumer;
b. Accesses consumer profile data for a user to receive the content;
i. Can receive user data from the Data Layer;
ii. Can receive user data from Tracking Layer;
iii. Can receive user data from a CRM; and
iv. Can receive user data from External PII Dataset.
c. Determines if the parameters and criteria for selecting content to be delivered to a consumer is met; and
d. Selects content to be delivered based on content that corresponds with selection parameters and criteria.
4. The Analytics Layer
a. Tracks actions user takes through tracking devices associated with the user,
i. Can engage in bi-directional communication with the Consumer Tracking Layer;
b. Further tracks and logs user actions with the Ad for metrics to be compiled in association with the delivered content;
c. Can be organized by User/Admin/AppAddress® and various other organize can be used to Update user Profile;
d. Can be coupled to external CRM data;
e. Can be coupled to external PII data;
f. Updates for Content Interactivity data;
i. Can engage in bi-directional communication with the Content Interaction Layer; and
g. Report back with Conversions/Behaviors/Actions/Interactions.

The platform may be operative to control at least one of the following sub-modules of a computing device in furtherance of the execution of the instructions contained in the Consumer Module 165:
1. A Consumer Application UI Layer;
2. A Content Interaction Layer; and
3. A Consumer Tracking Layer.

The following provides non-limiting examples of functions and features of the aforementioned layers:
1. The Consumer Application UI Layer
a. May be configured for Stand-Alone Applications or integrated into existing applications:
i. Example: Embedded frame within an existing web application;
b. Enables user-control of the Computing Device;
c. Enables user-control of the Modules of the Computing Device:
i. A Consumer Module 165;
d. Enables user-control of the Sub-Modules:
i. A Consumer Application UI Layer; and
ii. A Content Interaction Layer; and
e. Enables users to share the content through various external platforms.

FIGS. 9-20 depict various embodiments of the Consumer Application UI Layer.
2. The Content Interaction Layer
a. Operates based on interactivity rules and fulfillment criteria associated with content as established by an Admin:
i. As rules and criteria are met, based on tracking performed by the Consumer Tracking Layer, additional content segments may be revealed;
ii. Additional content segments may be pre-sent along with the content, thereby enabling the revealing of the additional content segments to be performed by the consumer interaction layer; and
iii. Additional content segments may be sent after an initial content, wherein the interaction layer does not have the content until the criteria is met, after which point the additional content segments are transmitted;
b. Enables tracking of users as they engage with the content:
i. May operate in conjunction with the Consumer Tracking Layer to provide content interaction data;
ii. May update data associated with the Analytics Layer; and
c. Enables the consumer to elect to 'engage' ad, at which point tracking may begin.
3. The Consumer Tracking Layer
a. Operates based on interactivity rules and fulfillment criteria;
b. Tracking might not always occur, but may occur after a triggering event (e.g., consumer elects to engage the content);
c. Can continue to track after triggering event to collect analytical data in order to determine, for example:
i. Where the consumer went after receiving the content;
ii. How the consumer behaved with relation to the content; and
iii. Impression and conversion parameters associated with the content;
d. May employ a tracking identifier (e.g., a Cookie ID or a hash):
i. This cookie idea could be cross referenced from a plurality of external data set; and
ii. Enabling Cross Platform Tracking;
e. Tracking may employ, for example:
i. Location Data;
ii. Orientation Data;
iii. Sensor Data;
iv. Camera Data;
v. Microphone Data;
vi. Telemetry Data;
vii. Biometric Data; and
viii. Voice Data.

Various hardware components may be used at the various stages of operations follow the method and computer-readable medium. For example, although the methods have been described to be performed by a computing device, it should be understood that, in some embodiments, different operations may be performed by different networked elements in operative communication with the computing device. For example, server 110 and/or computing device 2100 may be employed in the performance of some or all of the stages disclosed.

Figure 2:
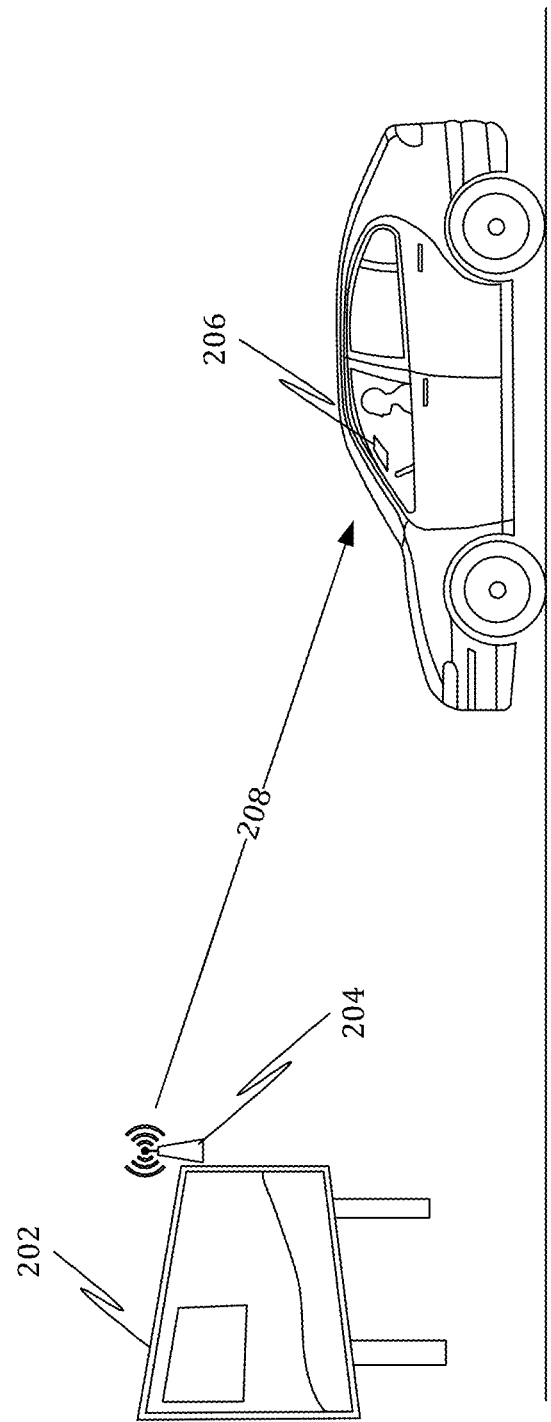
FIG. 2 illustrates delivering advertisement content associated with traditional or digital signage to a mobile device of a user by communicating with a beacon, in accordance with embodiments of the present disclosure.

Referring now to FIG. 2, delivering advertisement content associated with traditional or digital signage to a mobile device of a user by communicating with a beacon, in accordance with some embodiments is illustrated. As shown, in an instance, a traditional or digital signage 202 may be installed at a first geolocation. The location may not be limited to a billboard along a road as illustrated. Rather, the location may include, but not limited to, for example, a sporting event or an airport. Further, the traditional or digital signage may be equipped with a beacon 204 configured to transmit wireless signals 208 containing the advertisement content. As a mobile device 206 approaches the traditional or digital signage 202, the mobile device may be configured to receive the wireless signals 208. For example, a mobile app installed on the mobile device may regularly monitor for presence of wireless signals 208. Accordingly, when the mobile device 206 is within the transmission range of the beacon 204, the mobile app may decode the wireless signals 208 and display the advertisement content on the mobile device 206. The mobile device 206 may be operated by a user travelling by the traditional or digital signage, such as for example, in a vehicle. Although many embodiments are described herein with reference to a vehicle, any use in proximate location of the signage, whether or not in a vehicle, may be operative with the embodiments disclosed herein.

Although FIG. 2 depicts a traditional or digital signage at the first geographical location, in view of the present disclosure, it may be understood that in some embodiments, the traditional or digital signage may be empty or completely absent. In some embodiments, a virtual signage may be used. A virtual signage may be displayed to the user by, for example, but not limited to, augmented reality digital image processing techniques, or virtual reality environments. The user need not be aware of the presence of the virtual signage in their geolocation for embodiments to enable the provision of the advertisement associated with the virtual signage. Thus, by placing the beacon 204 at the first geolocation, the same end result of displaying advertisement content on the mobile device 206 in the vicinity of the first geolocation may be achieved.

Figure 3:
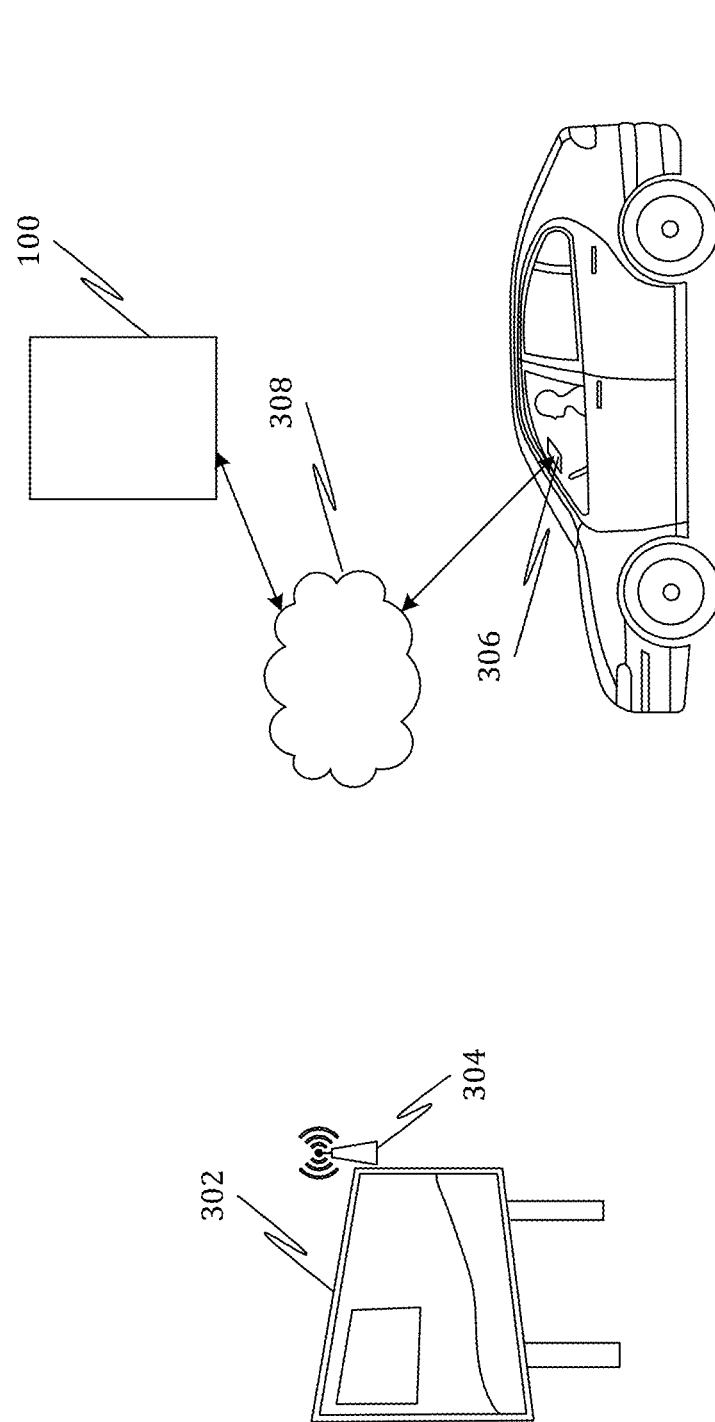
FIG. 3 illustrates delivering advertisement content associated with traditional or digital signage to a mobile device of a user by communicating with a platform, in accordance with embodiments of the present disclosure.

FIG. 3 illustrates delivering advertisement content associated with traditional or digital signage to a mobile device of a user by communicating with a platform 100, in accordance with some embodiments. It should be noted that, with some embodiments, the provision of the advertisement and the interactivity with digital signage may be with a computing device built into the user's vehicle. As shown, a traditional or digital signage 302 may be physically installed at a first geolocation. Additionally, the traditional or digital signage 302 may be equipped with a beacon 304 configured to transmit wireless signals 208 containing the advertisement content. Further, a mobile device 306 may be configured to regularly monitor a location of the mobile device. For example, a mobile app installed on the mobile device 306 may periodically query a GPS receiver on the mobile device to determine a current location of the mobile device. Further, the mobile app may be configured to regularly transmit the location of the mobile device to the platform 100 over a communication channel 308, such as for example, wireless cellular network and/or the Internet.

Accordingly, in an instance, as the mobile device 306 approaches the traditional or digital signage 302, the mobile device may be configured to receive the wireless signals transmitted by the beacon 308. Alternatively, and/or additionally, the mobile device 306 may also receive advertisement content from the platform upon approaching the vicinity of the traditional or digital signage. Accordingly, in an instance, advertisement content received from the beacon 308 may be augmented with advertisement content received from the platform.

Although FIG. 3 depicts a traditional or digital signage at the first geographical location, in view of the present disclosure, it may be understood that in some embodiments, the traditional or digital signage may be empty or completely absent. Further, in an instance, even if the beacon 304 is absent at the first geolocation, the same end result of displaying the advertisement content on the mobile device 306 in the vicinity of the first geolocation may be achieved.

Figure 4:
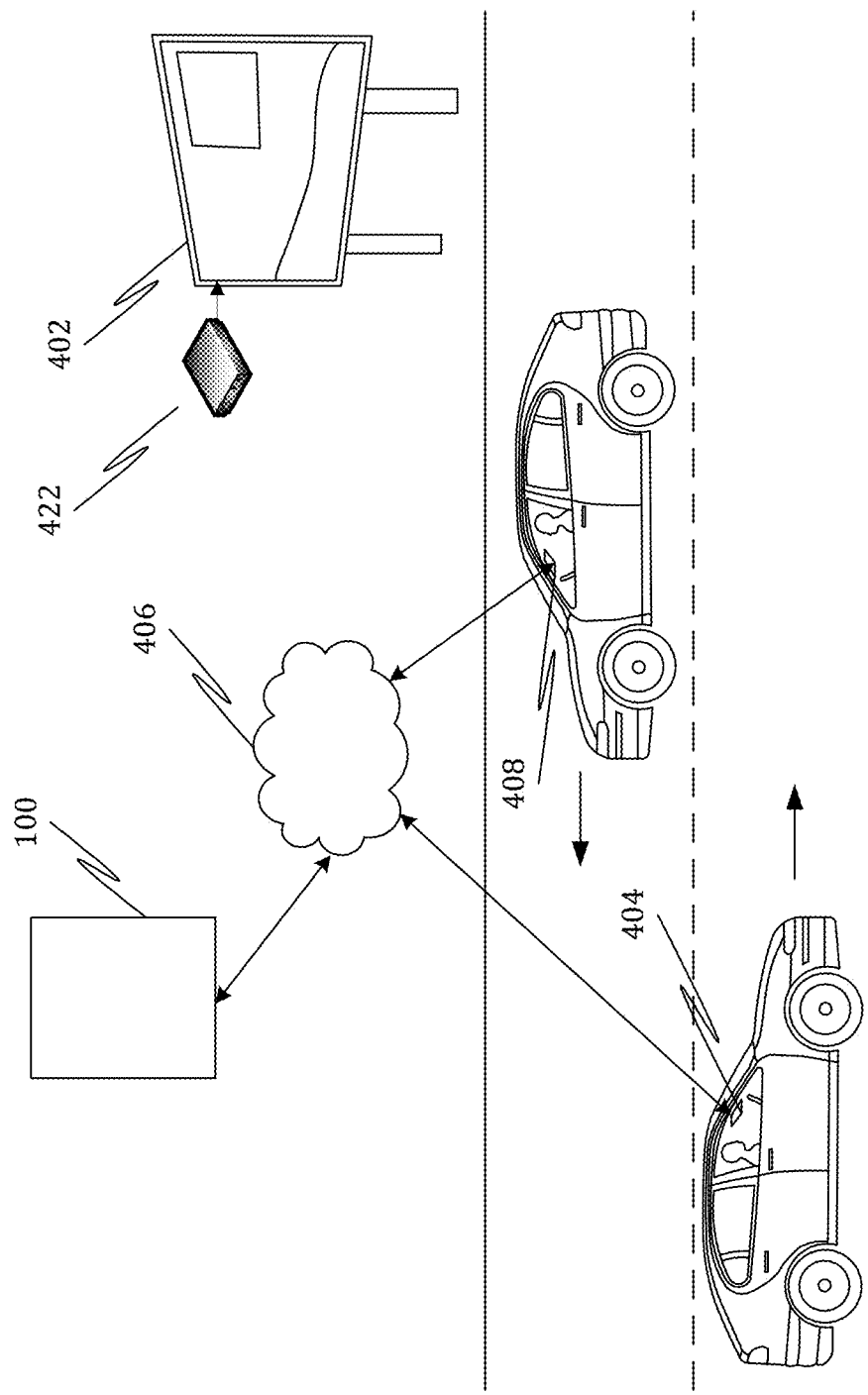
FIG. 4 illustrates delivering advertisement content associated with traditional or digital signage to a mobile device of a user based on a relative direction of the user's movement, in accordance with embodiments of the present disclosure.

FIG. 4 illustrates delivering advertisement content associated with traditional or digital signage to a mobile device of a user based on a relative direction of the user's movement, in accordance with some embodiments. As illustrated, a traditional or digital signage 402 may be installed at a first geolocation. Signage 402 may comprise an attachable modem 422 so as to enable signage to interface with a telecommunications network. The telecommunications network, in turn, may be in operative communication with mobile device 404.

Further, the traditional or digital signage 402 may be installed on one side of a highway such that, the traditional or digital signage 402 is visible only to users travelling on the corresponding side of highway towards a face of the traditional or digital signage 402. As a result, a mobile device 404 carried by a user travelling towards the face of the traditional or digital signage 402 may be able to receive the advertisement content corresponding to the traditional or digital signage 402. In order to achieve this, a direction of travel of the mobile device 404 in relation to the first geolocation location may be determined. The direction of travel may be determined, for example, using data received from GPS receiver on the mobile device 404 in conjunction with map information. Accordingly, a mobile app on the mobile device 404 may transmit direction of motion information to the platform 100 through a communication channel 406 such as, for example, wireless cellular network and/or the Internet. Further, based on the direction of motion information received, the platform 100 may determine that the traditional or digital signage 402 is intended to be visible for a user of the mobile 404. Consequently, the platform may deliver the advertisement content to the mobile device 404.

However, users travelling on the other side of the highway away from the face of the traditional or digital signage 402 may not be able to view the traditional or digital signage 402. Accordingly, for example, a mobile device 408 operated by a user travelling away from the face of the traditional or digital signage 402 may not receive the advertisement content. Accordingly, a mobile app on the mobile device 408 may transmit direction of motion information to the platform 100 through the communication channel 406. Further, based on the direction of motion information received, the platform 100 may determine that the traditional or digital signage 402 is not intended to be visible for a user of the mobile 408. Consequently, the platform may not deliver the advertisement content to the mobile device 408.

As a result, advertisement content may be delivered to users only if they are relevant. In some embodiments it can be foreseen that, for example, the advertisement content may not be relevant for users traveling away from the face of a signage since the signage may be advertising a facility that is situated ahead of the location of the signage. As a result, users who are travelling in an opposite direction may not able to visit the facility and avail of an offer advertised on the signage. Still consistent with embodiments, advertisement content may be provided based on, for example, demographic information associated with the consumer receiving the content. In this way, the content may be tailored by, for example, category, to the user.

III. Platform Operation

Although methods 500 to 800 have been described to be performed by platform 100, it should be understood that computing device 2100 may be used to perform the various stages of methods 500 to 800. Furthermore, in some embodiments, different operations may be performed by different networked elements in operative communication with computing device 2100. For example, server 110 may be employed in the performance of some or all of the stages in methods 500 to 800. Moreover, server 110 may be configured much like computing device 2100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 500 to 800 will be described in greater detail below.

Disclosed is a method of geolocation and time-based advertising. The method may include registering asset data including at least one of the following: a geolocation for physical assets, and a geolocation for virtual assets. The method may further include receiving media content to be associated with at least one registered asset associated with the registered asset data and specifying a plurality of rules for delivering the media content to a consumer. Specifying the plurality of rules can include specifying at least a first delivery rule corresponding the consumer's physical location in association with the at least one registered asset, specifying at least a second delivery rule corresponding to at least one element of profile data associated with the consumer, and specifying at least a third delivery rule corresponding to at least one physical action performed by the consumer. The method may further include delivering the media content to a device associated with the consumer upon the first delivery rule and the second delivery rule being satisfied, comparing a physical action with the third delivery rule in order to determine whether to deliver additional media content to the consumer, and delivering the additional media content to the device based on the comparing the physical action with the third delivery rule.

Also disclosed is an additional method of geolocation and time-based advertising. The method may include defining at least one of the following for a registered asset: a geolocation for physical assets and a geolocation for virtual assets. The method may further include defining media content associated with the registered asset, with the media content including a first message and a second message. The method may further include defining a consumer audience segment to be delivered the media content, with the consumer audience segment being further defined by a set of rules. The set of rules can include a first delivery rule corresponding a consumer's physical location in association with the at least one registered asset and a second delivery rule corresponding to at least one physical action performed by the consumer. The method may further include delivering the first message to a device associated with the consumer upon the first delivery rule being satisfied and delivering the second message to the device upon the second delivery rule being satisfied.

Also disclosed is yet another method of geolocation and time-based advertising. The method may include registering a location of an advertisement asset, the advertisement asset having media content associated with an advertisement campaign. The method may further include tagging a mobile computing device associated with a consumer based on the location of the advertisement asset in relation to the mobile computing device, tracking a consumer action performed subsequent to the tagging of the mobile computing device, and delivering a media content to the mobile computing device, the media content being displayed based on a consumer profile data associated with the consumer and the tracked consumer action.

Also disclosed is still another method of geolocation and time-based advertising (referred to as "Point and Click"). The method may be used as an alternative to interacting with, or physically touching an object or data center to receive information. The method may be further used as an opt-in feature.

The method may include receiving at least one of the following: an image, an object, a content, and a brand asset.

The brand asset may be, for example, a picture of a logo (Nike swoosh), a slogan, a name, an object (e.g., a coke bottle), a billboard, an advertisement, a store front, or any other matter that may be considered as a brand asset. A user may point their phone's camera to a billboard, and the "Point-and-Click" technology would identify the brand asset (e.g., billboard) in image. The user may point their phone's camera towards a person who may be wearing a branded t-shirt, and the P&C technology would detect the brand asset (e.g., logo on t-shirt). Having detected the brand asset, the P&C technology may then provide content to the user. Providing content may be performed 'live' (as the user points the phone towards the brand asset), or may be performed post-processing (e.g., in a photo library of a phone). The provision of content may be conditioned upon various parameters, including: 1) a profile of the user; 2) an action performed by the user; and/or 3) the location of the user. Once the P&C technology determines that at least one condition has been met, the user may be provided with the content. The content that is provided to the user is not limited to an advertisement but may be any content. By way of nonlimiting example, the user may be able to 'follow' brands, 'unsubscribe' or 'de-list' themselves from the brand's campaigns, view brand inventory at a particular store, or engage with brand representatives. Alternatively, this P&C may enable brands to advertise/engage their audience as the users flip through their photo-library of pictures they took from days prior. By way of nonlimiting example, a college student may be looking through his phone at pictures from his Frat Party the night before. The picture might have some 'bud light' beers in the background. Bud Light could use the platform to then engage this college kid with a message "Have fun last night? Next 12 pack is on us"—all by detecting their beer in the photo.

In some embodiments, the image may be associated with a first geolocation. In further embodiments, the image may be taken from a mobile device. In further embodiments, the image taken from a mobile device may be transmitted to a device configured to receive the image once captured. In yet further embodiments, the image taken from a mobile device may be uploaded to platform 100 and/or a third-party platform. In even further embodiments, the image may correspond to at least one of the following:

a. an advertisement,
   b. a picture in a photo-library,
   c. an offering,
   d. a brand asset,
   e. a barcode, and
   f. a QR code.

The method may further include processing the image for at least one brand asset. By way of non-limiting example, a brand asset may be at least one of the following:
   a. a picture of a logo (e.g., Nike swoosh),
   b. a slogan,
   c. a name,
   d. an object (e.g., a coke bottle),
   e. a billboard,
   f. an advertisement,
   g. a store front, and
   h. any other matter that may be considered as a brand asset.

The method may further include receiving a specification of brand assets to be detected within an image. The receiving the specification of brand assets to be detected within an image may be used to keyword search based on the brand. The receiving the specification of brand assets to be detected within an image may be further used to load offers associated with the brand. The receiving the specification of brand assets to be detected within an image may be further used to associate personal data already collected by owners of the brand asset.

The method may further include content delivery rules. In some embodiments, the content delivery rules may comprise at least one of the following:
   a. a geolocation,
   b. a time, and
   c. a demographic.

The method may further include transmitting a first content. In some embodiments, transmitting the first content may comprise transmitting when rules are met. In further embodiments, transmitting the first content may comprise transmitting a URL to the content. In yet further embodiments, transmitting the first content may comprise loading the URL. In some embodiments, the first content may be interactive. In further embodiments, the first content may comprise an Augmented Reality ("AR") superimposition over the image. In some embodiments, transmitting the first content may occur after tracking a user from a first location to a second location. In some embodiments, transmitting the first content may occur after tracking a user to the second location. In some embodiments, the first content may be transmitted in response to the detection of the at least one brand asset.

The method may further include tracking for at least one physical action. In some embodiments, the at least one physical action may be associated with a second geolocation. In further embodiments, the at least one physical action may comprise a point of sale. In some embodiments, the tracking may comprise receiving a mobile device activity data. In some embodiments, the tracking may comprise receiving a location data. In some embodiments, the tracking for the at least one physical action may further comprise time-based rules. In some embodiments, the tracking for the at least one physical action may further comprise location-based rules. In some embodiments, the tracking for the at least one physical action may further comprise demographic-based rules.

The method may further include receiving a specification of the at least one action. In some embodiments, the receiving the specification of the at least one action may comprise receiving interactivity criteria. In some embodiments, the receiving the specification of the at least one action may comprise a path, a time, a destination, and/or an activity.

The method may further include updating the first content based on the at least one physical action. The method may further include transmitting a second content. In some embodiments, the second content may comprise an AR superimposition of the first content. In further embodiments, the second content may comprise an AR superimposition over the image. In yet further embodiments, the second content may comprise an AR superimposition over the camera.

In some embodiments, the consumer may interact with the first content and/or second content. In some embodiments, the consumer interacting with the first content and/or second content interactions may comprise an opt out and/or delete request of personal data.

In some embodiments, the brand asset processing may be performed on a remote server. In some embodiments, the brand asset processing may be performed on a user's phone.

Figure 5:
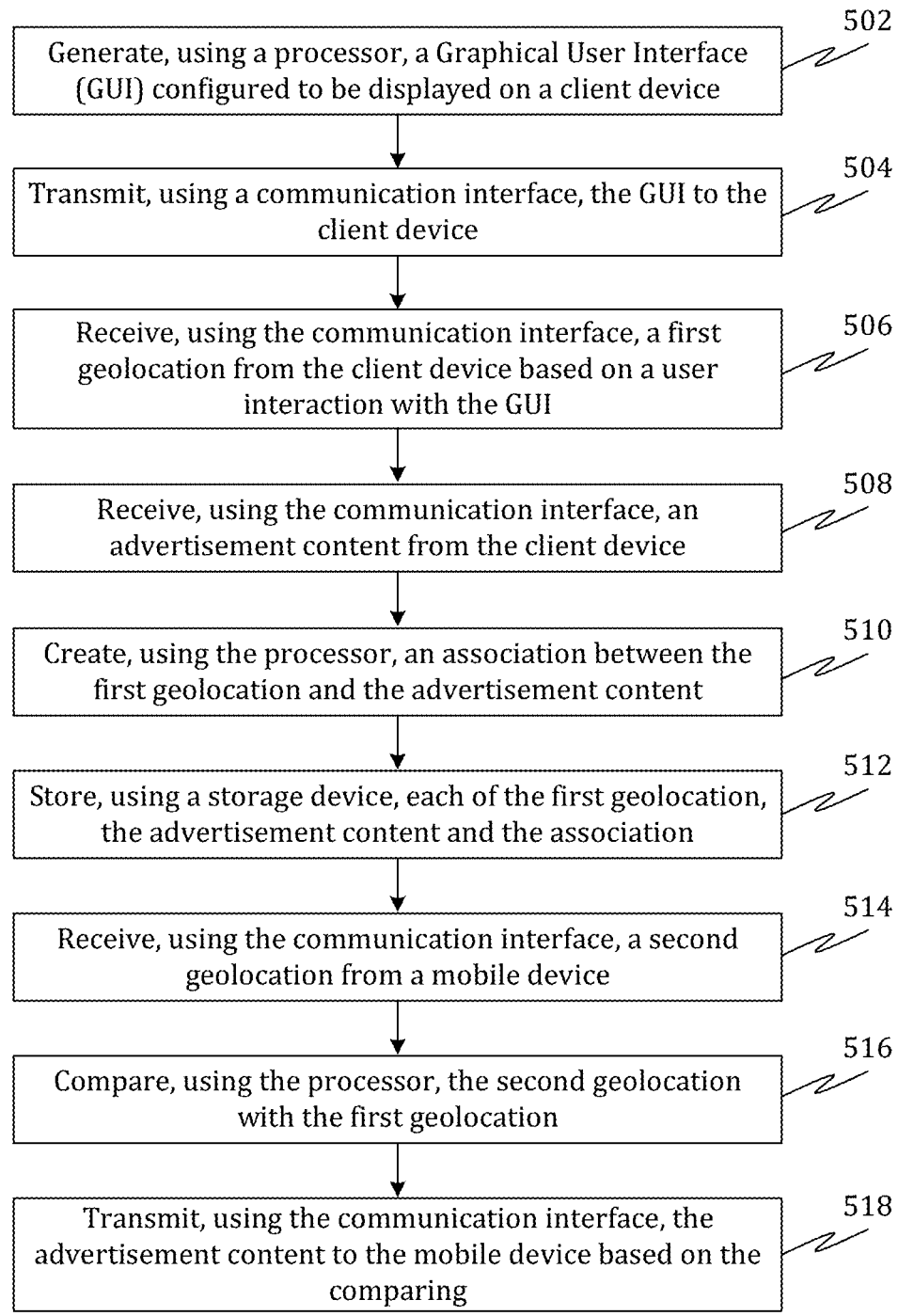
FIG. 5 illustrates a flowchart of a method 500 of geolocation and time-based advertisements, in accordance with the embodiments of present disclosure.

FIG. 5 illustrates a flowchart of a method 500 of geolocation and time-based advertisements, in accordance with some embodiments. The method 500 may include a step 502 of generating, using a processor, a Graphical User Interface (GUI) configured to be displayed on a client device. Additionally, the method 500 may include a step 504 of transmitting, using a communication interface, the GUI to the client device. Further, the method 500 may include a step 506 of receiving, using the communication interface, a first geolocation from the client device based on a user interaction with the GUI. In some embodiments, the first geolocation may be associated with at least one of a traditional or digital signage and a virtual signage. Furthermore, the method 500 may include a step 508 of receiving, using the communication interface, an advertisement content from the client device. Additionally, the method 500 may include a step 510 of creating, using the processor, an association between the first geolocation and the advertisement content. Further, the method 500 may include a step 512 of storing, using a storage device, each of the first geolocation, the advertisement content and the association. Furthermore, the method 500 may include a step 514 of receiving, using the communication interface, a second geolocation from a mobile device. The mobile device may include one or more of a smartphone, a vehicle navigation system and an in-vehicle communication system. Additionally, the method 500 may include a step 516 of comparing, using the processor, the second geolocation with the first geolocation. Further, the method 500 may include a step 518 of transmitting, using the communication interface, the advertisement content to the mobile device based on the comparing.

Further, in some embodiments, the platform may be configured for receiving, using the communication interface, a radius from the client device. The radius may define a region centered on the first geolocation. Further, comparing the first geolocation with the second geolocation comprises determining whether the second geolocation falls within the region. As a result, the administrator of an advertising company may control an area surrounding the first geolocation within which users would receive the advertisement content.

In some embodiments, the communication interface may include a long range communication interface configured to provide communication between the platform for geolocation and time based advertising and each of the client device and the mobile device. Alternatively, and/or additionally, in some embodiments, the communication interface may include a short range communication interface and a long range communication interface. Further, the long range communication interface may be configured to provide communication between the platform for geolocation and time based advertising and the client device. Furthermore, the short range communication interface may be configured to provide communication between a beacon and the mobile device. Additionally, the beacon may be located in a vicinity of the first geolocation.

Figure 6:
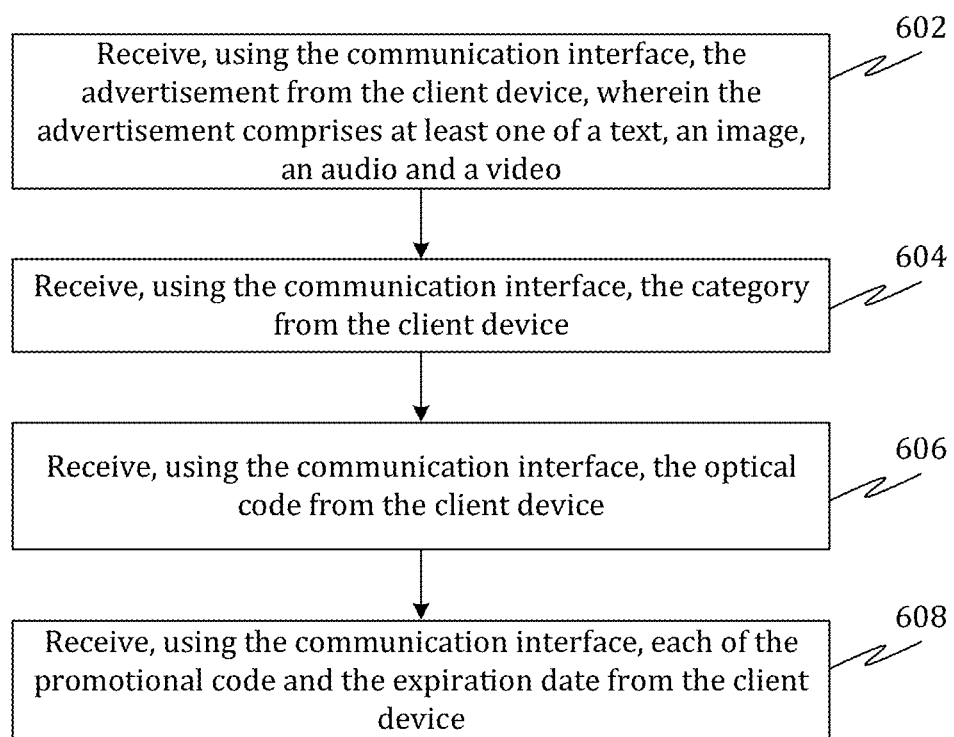
FIG. 6 illustrates a flow chart of a method 600 geolocation and time-based advertisements by receiving advertisement content from a client device, in accordance with the embodiments of present disclosure.

FIG. 6 illustrates a flow chart of a method 600 for geolocation and time-based advertisements by receiving advertisement content from a client device, in accordance with some embodiments. The advertisement content may include each of an advertisement, a category associated with the advertisement, an optical code, a promotional code, an expiration date associated with the promotional code and a URL of a webpage. Accordingly, the method 600 may include a step 602 of receiving, using the communication interface, the advertisement from the client device, wherein the advertisement comprises at least one of a text, an image, an audio and a video. Additionally, the method 600 may include a step 604 of receiving, using the communication interface, the category from the client device. Further, the method 600 may include a step 606 of receiving, using the communication interface, the optical code from the client device. Furthermore, the method 600 may include a step 608 of receiving, using the communication interface, each of the promotional code and the expiration date from the client device. Further, the method 600 may include a step 610 of receiving, using the communication interface, the URL from the client device.

An example of a GUI for receiving the advertisement content is illustrated in FIG. 12. As shown, the GUI may enable a user, such as an administrator of an advertising company to select a file containing the image (i.e., Signage image) to be associated with the traditional or digital signage. Additionally, the GUI may provide a functionality to perform editing operations on the image, such as, but not limited to, resizing, cropping, filtering etc. Further, the GUI may also enable the administrator to select a logo to be associated with the advertisement content. Furthermore, the GUI may also enable the administrator to enter the expiration date. Moreover, the GUI may also enable the administrator to select a file containing an optical code, such as for example, a barcode or a QR code. Additionally, the GUI may also provide a functionality to create a barcode or a QR code. Additionally, and/or alternatively, the GUI may also enable the administrator to enter a promo code and an Audio/Video link, including, for example, connect point information.

In some embodiments, the category associated with the advertisement content may enable the user to manage the advertisement content in a more effective manner. For example, the user may be able to search, filter or sort advertisement contents from various real and/or virtual signage based on the category. Accordingly, using an input unit of the mobile device, the user may provide the category. Subsequently, using a display unit of the mobile device, the advertisement associated with the category may be displayed.

Figure 7:
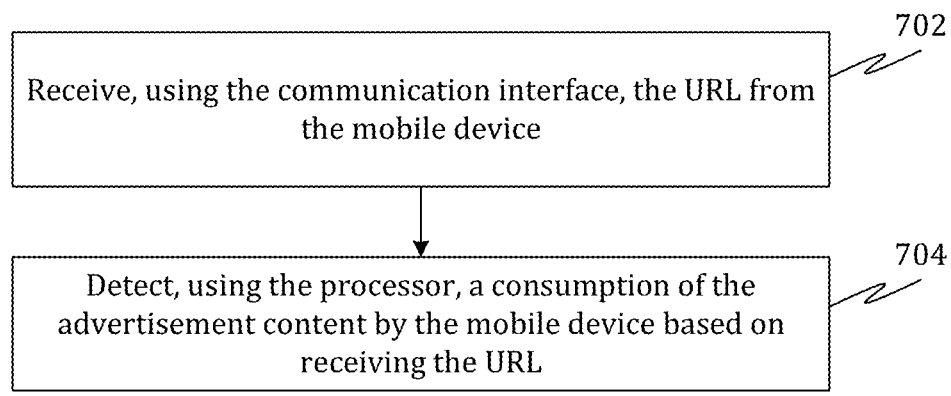
FIG. 7 illustrates a flow chart of a method 700 of detecting consumption of an advertisement content associated with traditional or digital signage, in accordance with the embodiments of present disclosure.

FIG. 7 illustrates a flow chart of a method 700 of detecting consumption of an advertisement content associated with traditional or digital signage, in accordance with some embodiments. In order to facilitate detecting consumption, a URL of a webpage configured for tracking requests is embedded in the advertisement content. Further, the URL is uniquely associated with the first geolocation corresponding to the traditional or digital signage. Accordingly, the method 700 may include a step 702 of receiving, using the communication interface, the URL from the mobile device. For instance, when the advertisement content is displayed on a mobile device of a user, a click operation on the URL by the user may generate a webpage request received by the platform. Additionally, the method 700 may include a step 704 of detecting, using the processor, a consumption of the advertisement content by the mobile device based on receiving the URL. As an example, receipt of the webpage request from the mobile device is indicative of the fact that the advertisement content was displayed on the mobile device.

Further, in some embodiments, additional tracking of user activity may be performed. For example, subsequent to a click operation on the URL, the platform may transmit, using the communication interface, a cookie to the mobile device. Further, the cookie may be configured to track user activity on the mobile device. As a result, rich user behavior data may be collected that may provide greater insights into user intent, interest etc. which may facilitate targeted advertising and user analytics.

Further, in some embodiments, based on detecting the consumption of the advertisement, advertisement statistics may be generated using the processor. The advertisement statistics may include one or more of number of views of the advertisement content, number of actions performed on the advertisement content, number of saves performed on the advertisement content, and number of shares performed on the advertisement content. Further, the advertisement statistics may be displayed along with a corresponding real and/or virtual signage, as exemplarily illustrated in FIG. 9. As a result, an advertising company may obtain immediate insights into user interaction with a corresponding real and/or virtual signage.

Figure 8:
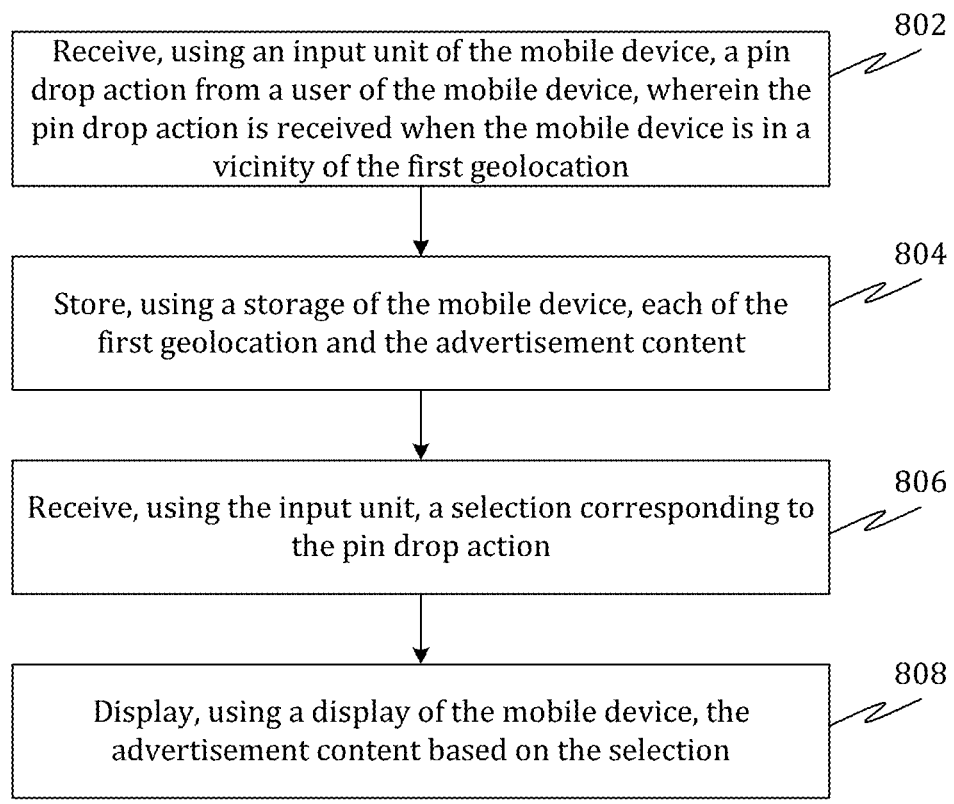
FIG. 8 illustrates a flow chart of a method 800 of providing a pin drop feature for identifying and viewing traditional or digital signage associated with a geographical location on which a pin drop action is performed, in accordance with embodiments of the present disclosure. Such commands may be performed using voice command technology associated with the mobile device, enabled with a plurality of voice commands.

FIG. 8 illustrates a flow chart of a method 800 of providing a pin drop feature for identifying and viewing traditional or digital signage associated with a geographical location on which a pin drop action is performed, in accordance with some embodiments. Accordingly, the method 800 may include a step 802 of receiving, using an input unit of a mobile device, a pin drop action from a user of the mobile device. Throughout the various embodiments disclosure herein, touch, voice, and gesture input may be an input medium compatible with the computing devices used. The pin drop action may be received when the mobile device is in a vicinity of the first geolocation. Further, the method 800 may include a step 804 of storing, using a storage of the mobile device, each of the first geolocation and the advertisement content. Furthermore, the method 800 may include a step 806 of receiving, using the input unit, a selection corresponding to the pin drop action. Additionally, the method 800 may include as step 808 of displaying, using a display of the mobile device, the advertisement content based on the selection.

Figure 20:
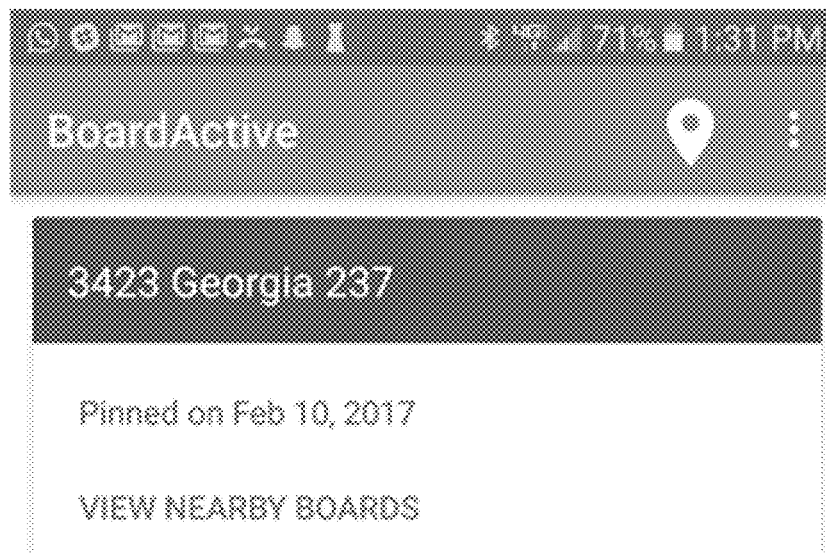
FIG. 20 illustrates a screenshot 2000 of a mobile app for delivering geolocation and time-based advertisements, depicting advertisement content corresponding to one or more traditional or digital signage associated with a pin drop action, in accordance with embodiments of the present disclosure.
Figure 20:

An illustration of the pin drop feature may be seen in FIG. 20. As illustrated, the screenshot 2000 of the GUI depicts two geographical locations where the user performed a pin drop action. Further, the GUI may also display a time at which the pin drop action was performed. Additionally, corresponding to each pin drop event, an option (i.e., "View Nearby Boards") may be provided for the user to view nearby real and/or virtual signage.

Although methods 2200, 2300, 2400, 2500, and 2600 have been described to be performed by platform 100, it should be understood that computing device 2100 may be used to perform the various stages of methods 2200, 2300, 2400, 2500, and 2600. Furthermore, in some embodiments, different operations may be performed by different networked elements in operative communication with computing device 2100. For example, server 110 may be employed in the performance of some or all of the stages in methods 2200, 2300, 2400, 2500, and 2600. Moreover, server 110 may be configured much like computing device 2100.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of methods 2200, 2300, 2400, 2500, and 2600 will be described in greater detail below.

Figure 22:
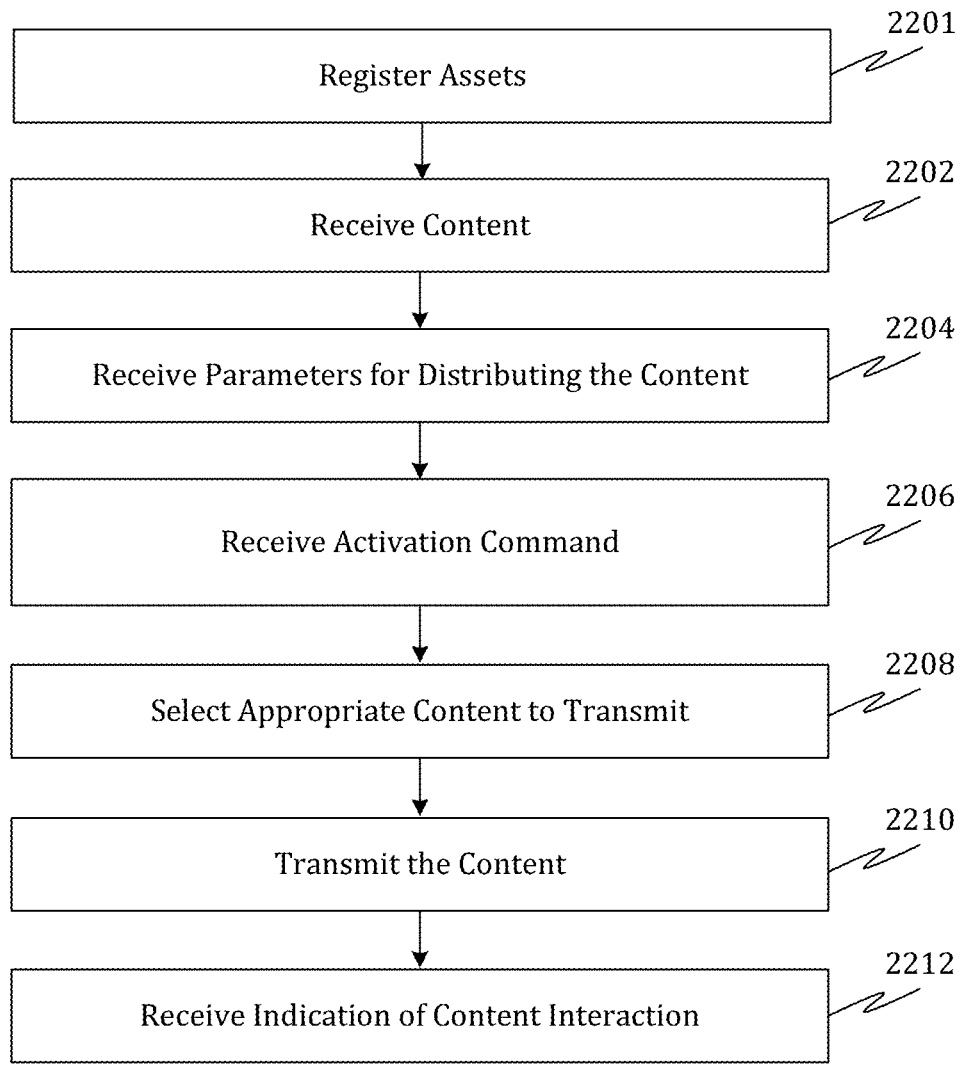
FIG. 22 illustrates a flow chart of a method 2200 for providing stand-alone application, API, or SDK, in accordance with embodiments of the present disclosure.

FIG. 22 illustrates a flow chart of a method for providing stand-alone application, API, or SDK, in accordance to embodiments disclosed herein. Method 2200 may comprise the following stages and sub-stages:

Stage 2201—Registering Assets
  Assets registered may include, but not be limited to:
    A. Digital Assets,
    B. Physical Assets,
    C. Virtual Assets,
    D. Media Assets, and
    E. Mobile Assets.
  In some embodiments, the registered assets may be assigned an AppAddress®.
Stage 2202—Receiving BrandDrop® Content
  The received content may be associated with an AppAddress®, and
  The received content may be associated with Interactivity Rules.
Stage 2204—Receiving BrandDrop® parameters
  Ad Activation Parameters may be received,
  Ad Delivery Parameters may be received, and
  Content Type(s) may be associated with the BrandDrop® Parameters.
Stage 2206—Receiving BrandDrop® Activation Command
  Determine if a Spatial trigger has Occurred,
  Determine if a Time-based trigger has Occurred,
  Determine if a Space/Time based trigger has Occurred, and
  Determine a Device Type Used in order to select suitable content format.
Stage 2208—Selecting an Appropriate Ad to Transmit
  Retrieve data about consumer based on consumer profile data,
  Compare to Ad Delivery Rules against consumer profile data, and
  Select appropriate content type(s) to transmit.
Stage 2210—Transmitting BrandDrop®
  Receive Indication of Content Interaction,
  Ad Content may provide user with Instructions for revealing additional content (promotion),
  Engage User Tracking, and
  Receive Feedback from User.
Stage 2212—Provide Interactive Content
  Determine if revealing interactive content rules and criteria are met,
  Enable Bi-Directional communication with the consumer, and
  Enable Consumer Tracking to commence.

Figure 23:
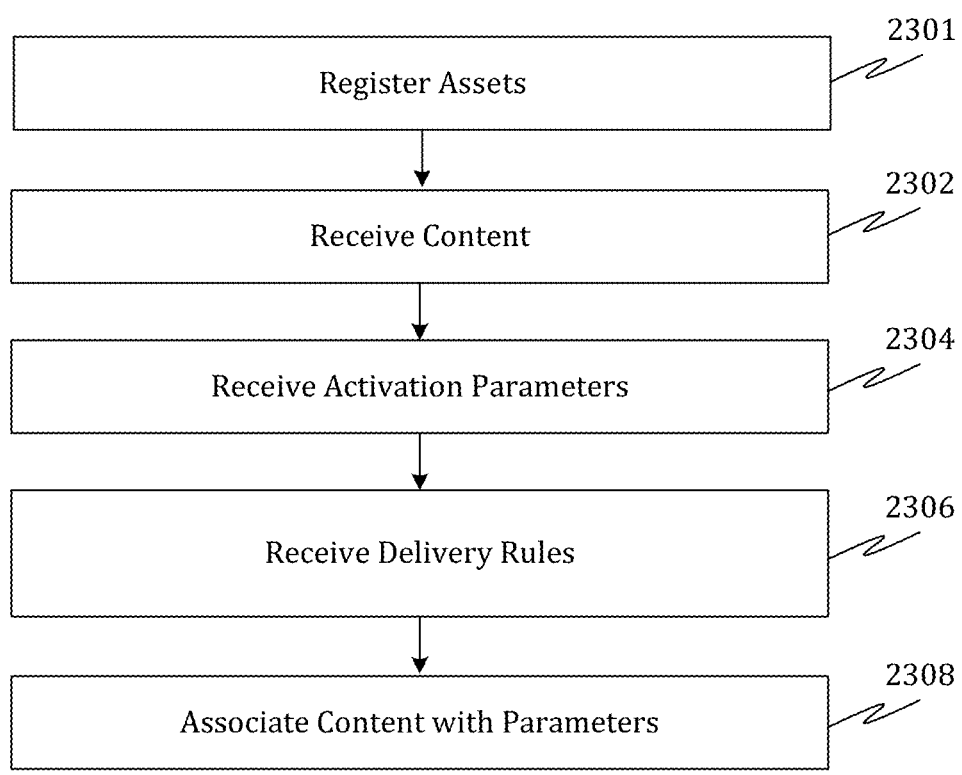
FIG. 23 illustrates a flow chart of a method 2300 for providing stand-alone application, API, or SDK, in accordance with embodiments of the present disclosure.

FIG. 23 illustrates a flow chart of a method for providing stand-alone application, API, or SDK, in accordance to embodiments disclosed herein. Method 2300 may comprise the following stages and sub-stages:

Stage 2301—Registering Assets
  Assets registered may include, but not be limited to:
    A. Digital Assets,
    B. Physical Assets,
    C. Virtual Assets,
    D. Media Assets, and
    E. Mobile Assets.
  In some embodiments, the registered assets may be assigned AppAddress®.
Stage 2302—Receiving BrandDrop® Content
  Content can be Interactive,
  Interactive content may be released in segments based on user feedback,
  Content may be different for Different User Profile types, and
  Content may be different for Different User Device types.
Stage 2304—Receive BrandDrop® Activation Parameters
  A. Space
    Designates a point in space for a BrandDrop®, regardless of time, including, but not limited to:
      Real Space—Physically Associated with a location of a Static Object;
      Virtual Space=Area defined by coordinates on a map, but not associated with a physical object; and
      Dynamic—Objects Markers associated with mobile assets.
  B. Time
    Designates a point in time for a BrandDrop®, regardless of space, including, but not limited to:
      Predefined time—Set to occur at a specific time or window of time:
        May be scheduled,
        Schedule may be obtained from an external dataset;
      Variable—Set to occur upon a triggering event:
        May be associated with a manual, Admin action, and
        For example: the Admin may be enabled to enact a triggering event by way of the Admin UI layer.
  C. Space-Time
    Designates a specific point in space at a specific point in time to be activate the BrandDrop®.
      Event:
        Corresponds to some event in a future time, but is not defined by the Admin, including, but not limited to:
          Venue Schedule,
          Sport Schedule, and
          Commercial Schedule.
  D. Image Processing
    Consumer may capture an image and submit the image to the platform;
    Consumer can be prompted to prove they are near a trigger.
    Perform image processing will determine whether there are registered Brand Assets within an image; and
    May determine an AppAddress® associated with the registered assets.
Stage 2306—Receiving BrandDrop® Delivery Rules
  A. Based on Rules Selecting Content to Be Delivered Upon Activation:
    Can receive user data from Tracking Module;
    Can receive user data from CRM module;
    Can receive user data from External PII Module; and
    Gender/Demographic/Propensity/Interest/Behavior/ Etc.

Figure 24:
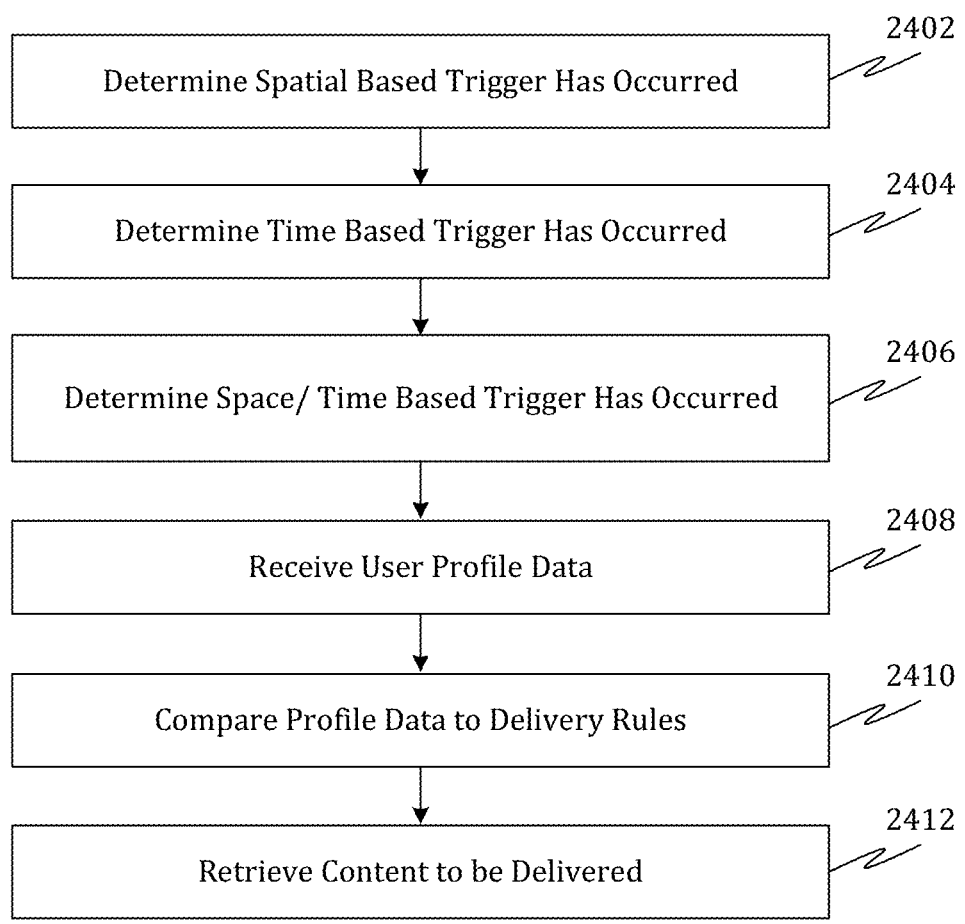
FIG. 24 illustrates a flow chart of a method 2400 for providing stand-alone application, API, or SDK, in accordance with embodiments of the present disclosure.
Figure 25:
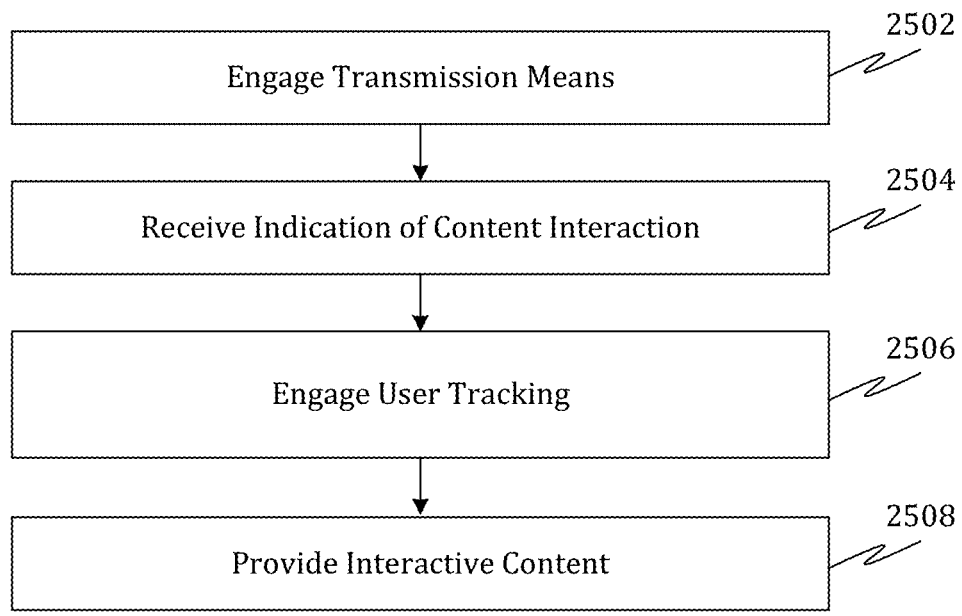
FIG. 25 illustrates a flow chart of a method 2500 for providing stand-alone application, API, or SDK, in accordance with embodiments of the present disclosure.
Figure 26:
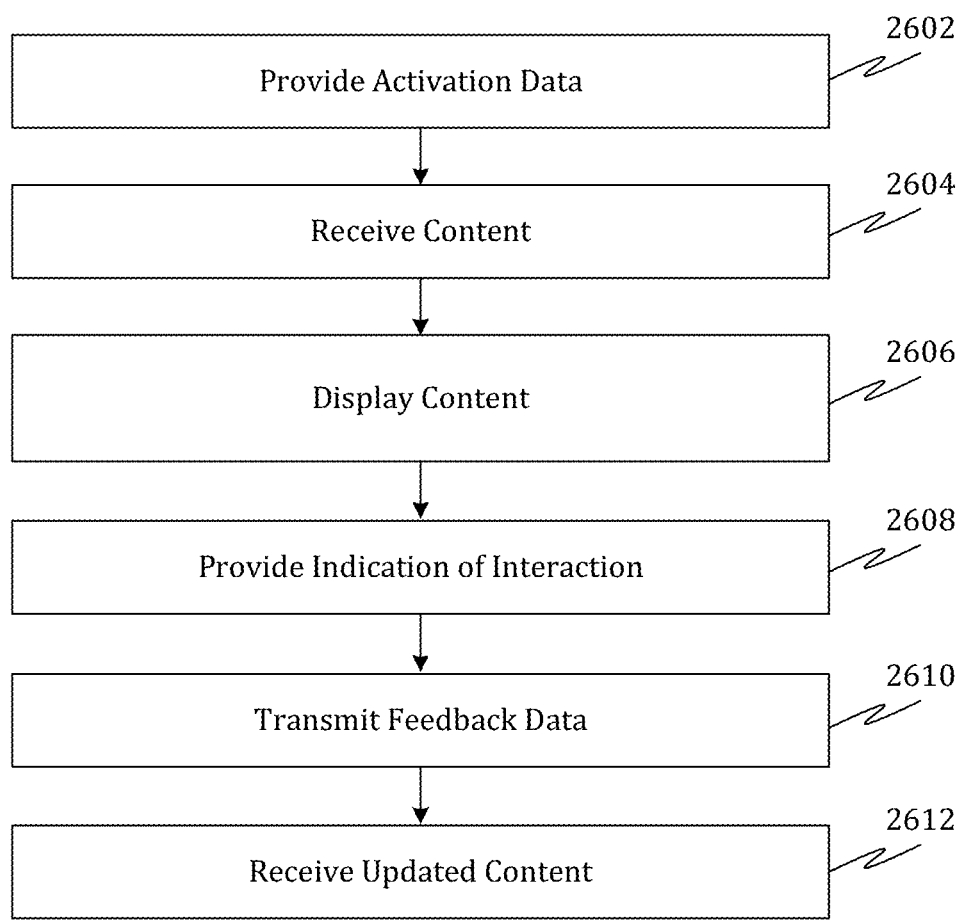
FIG. 26 illustrates a flow chart of a method 2600 for providing stand-alone application, API, or SDK, in accordance with embodiments of the present disclosure.
Figure 27A:
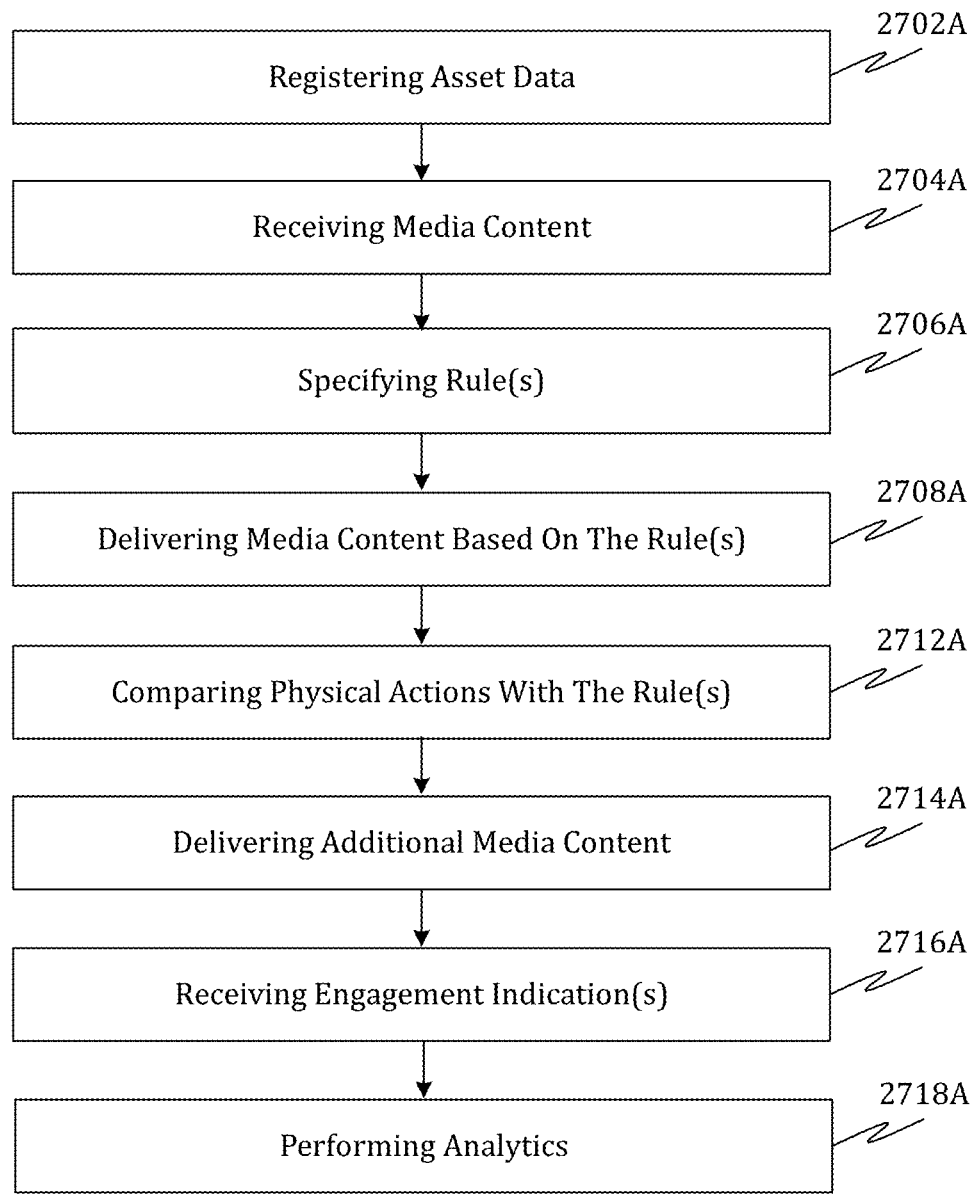
FIG. 27A illustrates a flow chart of a method 2700A of geolocation and time-based advertising, in accordance with embodiments of the present disclosure.

Stage 2306—Associating Content Type(s)
  An association is made with the activation parameters, delivery rules, to be Delivered When Activation/Rules Met.
FIG. 24 illustrates a flow chart of a method for providing stand-alone application, API, or SDK, in accordance to embodiments disclosed herein. Method 2400 may comprise the following stages and sub-stages:
  Stage 2302—Determining Spatial Trigger has occurred
    Can be based on data received from consumer tracking layer, and
    Can use Image Processing—Sent from the consumer.
  Stage 2304—Determining that Time-Based trigger has occurred
    Determine if Space Trigger is True:
      Can Await Image Processing to Determine if by a registered asset.
  Stage 2306—Determining if Space/Time Event Has Occurred
    Determine if event has occurred.
  Stage 2308—Receiving Profile Data
    Can determine device type used,
    Can receive consumer data from Tracking Module,
    Can receive consumer data from CRM Module,
    Can receive consumer data from External PII Module, and
    Can receive data associated with consumer Gender/Demographic/Propensity/Interest/Behavior/Etc.
  Stage 2310—Comparing Profile Data
    Comparing to Ad Delivery Rules.
  Stage 2312—Retrieving Content
    Look Up Content Type(s) associated with Trigger and Rules.
FIG. 25 illustrates a flow chart of a method for providing stand-alone application, API, or SDK, in accordance to embodiments disclosed herein. Method 2500 may comprise the following stages and sub-stages:
  Stage 2502—Engaging Ad Transmission Module
    May directly Transmit BrandDrop®:
      A. E.G., Beacon Technology;
    May indirectly transmit BrandDrop®:
      A. E.G., Server 110; and
    May Update User Profile to Account for Ad Transmission.
  Stage 2504—Receiving Indication of Content Interaction
    Ad Content may provide user with Instructions for revealing additional content (promotion).
  Stage 2506—Engaging of Consumer Tracking
    May be configured to commence upon BrandDrop® receipt or interaction;
    Track for Fulfillment of Interaction Request Type; and
    Receive Feedback from User.
  Stage 2508—Providing Interactive Content
    Enables Bi-Directional Communication;
    Reveals based on interactivity rules associated with content;
    May Update Content; and
    May Update Analytics.
FIG. 26 illustrates a flow chart of a method for providing stand-alone application, API, or SDK, in accordance to embodiments disclosed herein. Method 2600 may comprise the following stages and sub-stages:
  Stage 2602—Providing Ad Activation Data
    May be based on Consumer Tracking Module Tracking Data; and
    May be based on captured images:
      Captured images may be processed on consumer device; and
      Captured images may be communicated to back-end processing device (e.g., server 110).
  Stage 2604—Receiving Ad Content
    The BrandDrop® may comprise interactive content.
  Stage 2606—Displaying Ad Content
    The BrandDrop® may comprise Interactive Instructions.
  Stage 2608—Providing Indication of Ad Interaction
    Consumer may elect to engage in interaction; and
    Interaction (e.g., tracking) may occur by default.
  Stage 2610—Providing Feedback Data
    Transmits Updated Tracking Data; and
    Transmits Interaction Commands.
  Stage 2612—Receive Updated Content
    Additional content segments may be revealed in response to interactivity rules and criteria being met.
FIG. 27A illustrates a flow chart of a method 2700A of geolocation and time-based advertising, in accordance with the present disclosure. Method 2700A may comprise the following stages and sub-stages:
  Stage 2702A—Registering Asset Data
  Registering asset data can include, for example, registering asset data including at least one of the following: a geolocation for physical assets, and a geolocation for virtual assets. Registering asset data can also include:
    1) Define a place or physical location:
      a. May be configured to prevent a third party or competitor from advertising within or about geofence.
      b. May be configured to geofence about competitor locations (e.g., other physical retail locations) and send promotional messages to consumers upon entering those areas to redirect them to another retail location.
      c. Data associated with a geofence may include, but is not limited to:
        i. Visits (Foot traffic);
        ii. How often consumers visit geofenced locations after receiving message or media content;
        iii. Dwell Time (i.e., amount of time spent at a particular location or multiple locations);
        iv. Frequent visitors; and
        v. Statistics (e.g., statistics may be viewed to aid in selecting an appropriate geofence).
      d. The geofence may be attached to messages and/or media content
        multiple physical locations may be associated with a particular message or media content, and multiple media contents may be associated with a single physical location.
      e. Multiple physical locations may be geofenced to analyze statistics such as foot traffic.
  Stage 2704A—Receiving Media Content
  Receiving media content can include receiving media content to be associated with at least one registered asset associated with the registered asset data. Receiving media content can also include:
    1) Define a Message:
      a. Select a geofence to be associated with a message to be delivered.
      b. Craft a message or media content.
        1. May include images, and additional data with interactive buttons such as, for example, the following:
        2. Map button that leads to directions in maps;
        3. Call/email buttons that open that form of contact with prefilled business;
        4. Social media buttons that lead to business webpages;

5. Website button that leads to chosen website landing page;
6. The in-app view of a push notification can be customized for any interface, and may include rich media content;
7. The advertising company can specify more than one media content such as, for example:
   a. Define initial message (e.g., when a consumer satisfies a first delivery rule);
   b. Define second message (e.g., when a consumer satisfies a subsequent delivery rule);
   c. Define promotion (e.g., when user enters store); and
   d. Define additional content (e.g., based on additional delivery rules).
8. May include a chatbot, SMS chatbot, and/or AI based interactions.
c. Assign Time Relevance.
   i. Choose how long a message campaign may run;
   ii. Daypart one or more campaigns based on date and time; and
   iii. Limit how often the BrandDrop® may occur (e.g., set an amount of time a consumer can receive the message in a day as well as how many times they can receive it overall).

Stage 2706A—Specifying Rule(s)

Specifying rules may include specifying one or more rules for triggering BrandDrops®, specifying one or more delivery rules for delivering content, or any suitable rules. Specifying rules can include, at least, but not be limited to, specifying a plurality of rules for delivering the media content to a consumer, where specifying the plurality of rules includes: specifying at least a first delivery rule corresponding the consumer's physical location in association with the at least one registered asset, specifying at least a second delivery rule corresponding to at least one element of profile data associated with the consumer, and specifying at least a third delivery rule corresponding to at least one physical action performed by the consumer. Specifying rules may also include:
1) Define a Segment:
   a) Choose filters to segment the consumers that receive a message.
      i) Filter by consumer data, consumer profile data, demographics, location history, and event history.
         (1) Attach any number of filters to each message.
         (2) Create specific audiences based on a consumer's location habits and in-app behavior.
      ii) Segments can be defined on past behavior captured by an application.
   b) Traditional.
      i) Segments can be purchased (e.g., from Online Behavior Data providers).
      ii) Segments can be bid upon (e.g., Ad bidding systems).
      iii) Segments can be a customized list of a combination of demographic factors defined by an advertising company.

Stage 2708A—Delivering Media Content Based on the Rule(s)

Delivering media content may include delivering the media content to a device associated with the consumer upon the first delivery rule and the second delivery rule being satisfied. Other implementations may deliver based on only the first or the second delivery rule being satisfied individually.

Stage 2712A—Comparing Physical Actions with the Rule(s)

Comparing physical actions with the rules may include comparing a physical action with the third delivery rule in order to determine whether to deliver media content or additional media to the consumer. The third delivery rule may include a secondary place, physical action, or indication of path of travel. For example, the third delivery rule can include but is not limited to:
1) Define a Secondary Place or Event:
   a) Example 1: The secondary place serves as a conversion metric.
   b) Example 2: Delay a second message until a consumer reaches the secondary place or event.
   c) Example 3: If a consumer didn't go to the secondary place or event, provide the consumer with an alternative message and/or alternative media content.
   d) Example 4: Time-based secondary delivery rules (e.g., those consumers who have been walking by a particular location for an amount of time—provide with a promotion for that particular location—"You've passed by me so often, come check it out").
   e) Example 5: If a consumer attended a specific event or traveled to a location, subsequently traveling past a secondary location, provide a message or media content associated with the new secondary location (e.g., a consumer traveling past a coffee shop after attending a music festival).

Stage 2714A—Delivering Additional Media Content

Delivering additional media content may include, for example, delivering the additional media content to the device based on the comparing the physical action with the third delivery rule.

Stage 2716A—Receiving Engagement Indication(s)

Engagement indication may include interactivity data. The interactivity data may be defined by an advertising company. For example, as shown below:
1) Define Interactivity Data.
   a) The platform can be built into existing applications that brands have with their customer (e.g., a restaurant mobile ordering application such as the Chick-fil-A™ app).
   b) Platform data can be used to Customize the in-App Experience.
      i. Example 1—How often a consumer visits a location or frame of time when they visit the location, and around those times, provide engagement content.
      ii. Example 2—Once a consumer is 'in the store' provide other app behavior.
      iii. Example 3—Did a consumer get to the store after passing a billboard or an ad? If so, provide a promotion.
   c) Custom Events and Interactivity Data can be Defined (e.g., An advertising company may filter consumers based on "In-App Behavior").
      iv. Example 1—How long was a consumer on certain screens, what did they click on, how much time did they spend in the app?—send a promotion or custom event based on the data.
      v. Example 2—"User has something in shopping cart, but never purchased: Next time they are at a location, please give them an ad "You left something your cart, here is a coupon to pick it up now at the store".
      vi. Example 3—Can be coupled with user profile attributes such as preferences, prior purchase history, and other attributes.

vii. Example 4—Can be coupled with cross-platform data:
  1. Target™ online shopping cart has unpurchased items, when consumer is at Walmart™ receives promotions for those same items left in the Target™ online shopping cart for purchase at Walmart™

Stage 2718A—Aggregating Analytics

Analytics may be compiled at any time, on-the-fly, or in batches. Analytics may be used in conjunction with the GUI(s) illustrated in FIGS. 28-40 such that an advertising company can associate content distribution campaigns based on consumer profile data, consumer engagement, consumer physical actions, and other attributes. In some embodiments, the delivery of the content may not be necessary for the aggregation of analytics. Rather, the mere association of the consumer with content, or the tracking of the consumers behaviors in physical space for the tagging of the consumer to particular campaigns, may be used for the aggregation and provision of analytics.

Figure 27B:
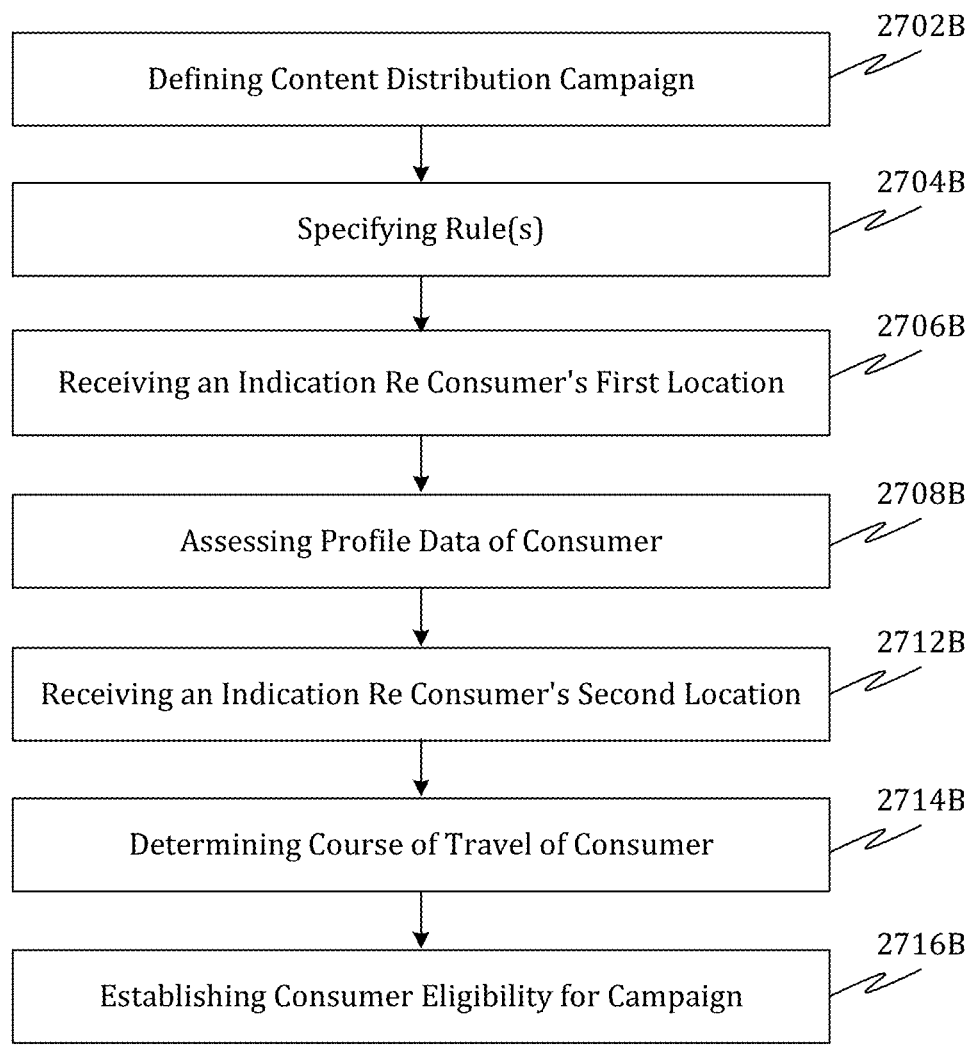
FIG. 27B illustrates a flow chart of a method 2700B of geolocation and time-based advertising, in accordance with embodiments of the present disclosure.

FIG. 27B illustrates a flow chart of a method 2700B of geolocation and time-based advertising, in accordance with the present disclosure. Method 2700B may comprise the following stages and sub-stages:

Stage 2702B—Defining Content Distribution Campaign

Defining a content distribution campaign may include defining at least one message and/or media content. The at least one message and/or media content may include images, and additional data with interactive buttons such as, for example, the following:
  a. Map button that leads to directions in maps;
  b. Call/email buttons that open that form of contact with prefilled business;
  c. Social media buttons that lead to business webpages; and
  d. Website button that leads to chosen website landing page.

The in-app view of a push notification can be customized for any interface, and may include rich media content. The advertising company can specify more than one media content such as, for example:
  a. Define initial message (e.g., when a consumer satisfies a first delivery rule);
  b. Define second message (e.g., when a consumer satisfies a subsequent delivery rule);
  c. Define promotion (e.g., when user enters store); and
  d. Define additional content (e.g., based on additional delivery rules).

The at least one message and/or media content may include a chatbot, SMS chatbot, and/or AI based interactions.

Stage 2704B—Specifying Rule(s)

Specifying rules may include specifying one or more rules for triggering BrandDrops®, specifying one or more delivery rules for delivering content, or any suitable rules. Specifying rules can include, at least, but not be limited to, specifying a plurality of rules for delivering the media content to a consumer, where specifying the plurality of rules includes: specifying at least a first delivery rule corresponding the consumer's physical location in association with the at least one registered asset, specifying at least a second delivery rule corresponding to at least one element of profile data associated with the consumer, and specifying at least a third delivery rule corresponding to at least one physical action performed by the consumer. Specifying rules may also include:
  1) Define a Segment.
    a) Choose filters to segment the consumers that receive a message.
      i) Filter by consumer data, consumer profile data, demographics, location history, and event history.
        (1) Attach any number of filters to each message.
        (2) Create specific audiences based on a consumer's location habits and in-app behavior.
      ii) Segments can be defined on past behavior captured by an application.
    b) Traditional.
      i) Segments can be purchased (e.g., from Online Behavior Data providers).
      ii) Segments can be bid upon (e.g., Ad bidding systems).
      iii) Segments can be a customized list of a combination of demographic factors defined by an advertising company.

Stage 2706B—Receiving an Indication Re Consumer's First Location

Receiving an indication re consumer's first location may include enabling cross platform tracking. Receiving the indication re consumer's first location may further include tracking location data.

Stage 2708B—Assessing Profile Data of Consumer
  a. Assessing profile data of consumer may include, for example, comparing the rules for the content distribution campaign with the profile data of the consumer;
  b. Can determine device type used;
  c. Can receive consumer data from Tracking Module;
  d. Can receive consumer data from CRM module;
  e. Can receive consumer data from External PII Module; and
  f. Can receive data associated with consumer Gender/Demographic/Propensity/Interest/Behavior/Etc.

Stage 2712B—Receiving an Indication Re Consumer's Second Location

Receiving an indication re consumer's second location may include enabling cross platform tracking. Receiving the indication re consumer's second location may further include tracking location data.

Stage 2714B—Determining Course of Travel of Consumer

Determining course of travel of consumer may include, for example, comparing the consumer's first location with the consumer's second location.

Stage 2716B—Establishing the Consumer's Campaign Eligibility

Establishing the consumer's campaign eligibility may include comparing the consumer profile data with the first location and the second location. Establishing the consumer's campaign eligibility may include comparing the rules with first location and the second location.

Figure 27C:
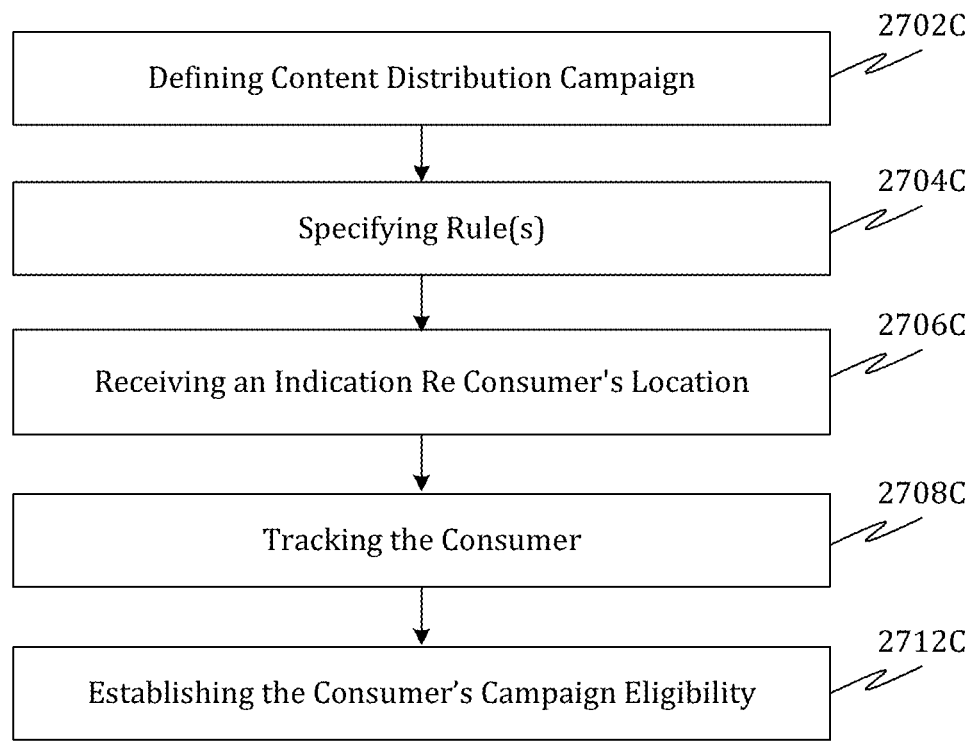
FIG. 27C illustrates a flow chart of a method 2700C of geolocation and time-based advertising, in accordance with embodiments of the present disclosure.

FIG. 27C illustrates a flow chart of a method 2700C of geolocation and time-based advertising, in accordance with the present disclosure. Method 2700C may comprise the following stages and sub-stages:

Stage 2702C—Defining Content Distribution Campaign

Defining a content distribution campaign may include defining at least one message and/or media content. The at least one message and/or media content may include images, and additional data with interactive buttons such as, for example, the following:
  a. Map button that leads to directions in maps;
  b. Call/email buttons that open that form of contact with prefilled business;
  c. Social media buttons that lead to business webpages; and
  d. Website button that leads to chosen website landing page.

The in-app view of a push notification can be customized for any interface and may include rich media content. The advertising company can specify more than one media content such as, for example:
   a. Define initial message (e.g., when a consumer satisfies a first delivery rule);
   b. Define second message (e.g., when a consumer satisfies a subsequent delivery rule);
   c. Define promotion (e.g., when user enters store); and
   d. Define additional content (e.g., based on additional delivery rules).

The at least one message and/or media content may include a chatbot, SMS chatbot, and/or AI based interactions.

Stage 2704C—Specifying Rules(s)

Specifying rules may include specifying one or more rules for triggering BrandDrops®, specifying one or more delivery rules for delivering content, or any suitable rules. Specifying rules can include, at least, but not be limited to, specifying a plurality of rules for delivering the media content to a consumer, where specifying the plurality of rules includes: specifying at least a first delivery rule corresponding the consumer's physical location in association with the at least one registered asset, specifying at least a second delivery rule corresponding to at least one element of profile data associated with the consumer, and specifying at least a third delivery rule corresponding to at least one physical action performed by the consumer. Specifying rules may also include:
   1) Define a Segment.
      a) Choose filters to segment the consumers that receive a message.
         i) Filter by consumer data, consumer profile data, demographics, location history, and event history.
            (1) Attach any number of filters to each message.
            (2) Create specific audiences based on a consumer's location habits and in-app behavior.
         ii) Segments can be defined on past behavior captured by an application.
      b) Traditional.
         i) Segments can be purchased (e.g., from Online Behavior Data providers).
         ii) Segments can be bid upon (e.g., Ad bidding systems).
         iii) Segments can be a customized list of a combination of demographic factors defined by an advertising company.

Stage 2706C—Receiving an Indication Re Consumer's First Location

Receiving an indication re consumer's first location may include enabling cross platform tracking. Receiving the indication re consumer's first location may further include tracking location data.

Stage 2708C—Tracking the Consumer

Tracking the consumer may include operating based on interactivity rules and fulfillment criteria. Tracking the consumer may further include employing a tracking identifier (e.g., a Cookie ID or a hash). Tracking the consumer may further include employing, for example:
   a. Orientation Data;
   b. Sensor Data;
   c. Camera Data;
   d. Microphone data;
   e. Telemetry Data;
   f. Biometric Data; and
   g. Voice Data.

Stage 2712C—Establishing the Consumer's Campaign Eligibility

Establishing the consumer's campaign eligibility may include comparing the tracking data with the specified rules. Establishing the consumer's campaign eligibility may further include retrieving data about consumer based on consumer profile data. Establishing the consumer's campaign eligibility may further include comparing to Ad Delivery Rules against consumer profile data.

Figure 27D:
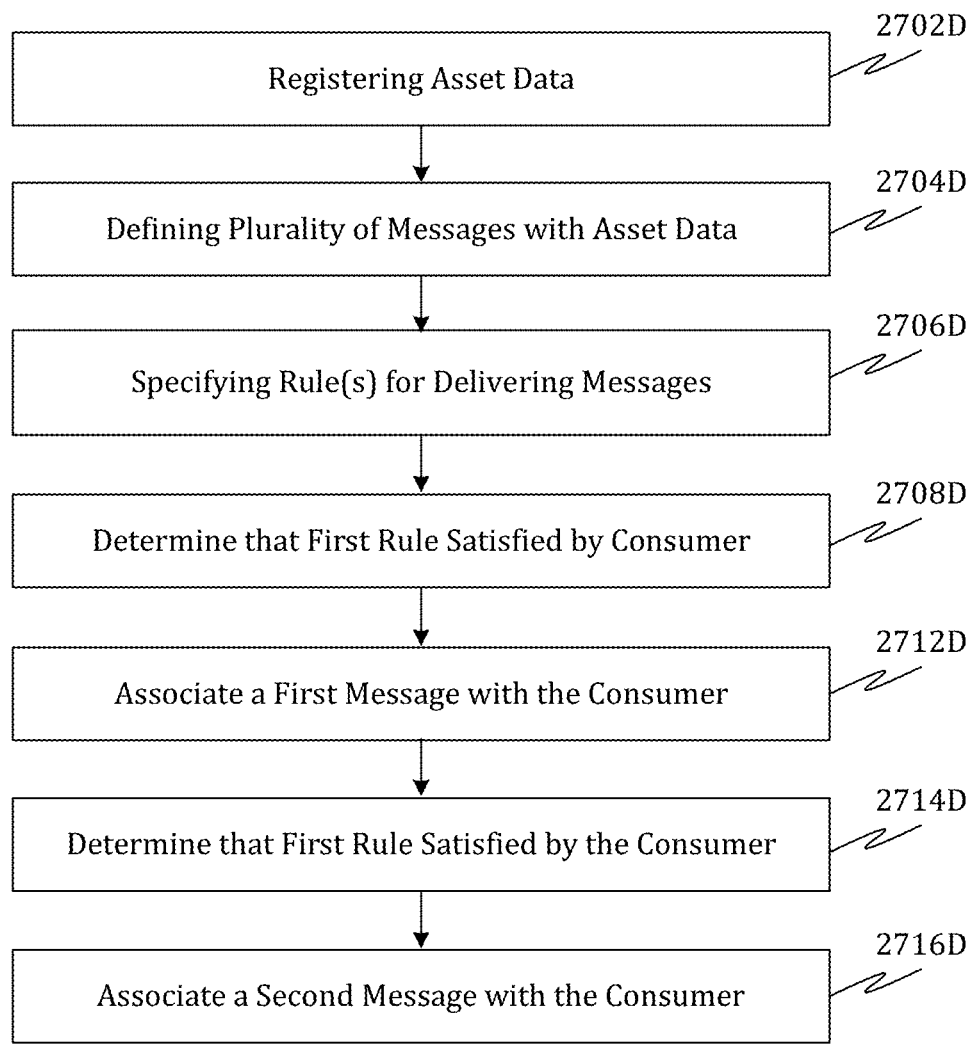
FIG. 27D illustrates a flow chart of a method 2700D of geolocation and time-based advertising, in accordance with embodiments of the present disclosure.

FIG. 27D illustrates a flow chart of a method 2700D of geolocation and time-based advertising, in accordance with the present disclosure. Method 2700D may comprise the following stages and sub-stages:

Stage 2702D—Registering Asset Data

Registering asset data can include, for example, registering asset data including at least one of the following: a geolocation for physical assets, and a geolocation for virtual assets. Registering asset data can also include:
   1) Define a place or physical location
      a. May be configured to prevent a third party or competitor from advertising within or about geofence.
      b. May be configured to geofence about competitor locations (e.g., other physical retail locations) and send promotional messages to consumers upon entering those areas to redirect them to another retail location.
      c. Data associated with a geofence may include, but is not limited to:
         i. Visits (Foot traffic);
         ii. How often consumers visit geofenced locations after receiving message or media content;
         iii. Dwell Time (i.e., amount of time spent at a particular location or multiple locations);
         iv. Frequent visitors; and
         v. Statistics (e.g., statistics may be viewed to aid in selecting an appropriate geofence).
      d. The geofence may be attached to messages and/or media content
         multiple physical locations may be associated with a particular message or media content, and multiple media contents may be associated with a single physical location.
      e. Multiple physical locations may be geofenced to analyze statistics such as foot traffic.

Stage 2704D—Defining Plurality of Messages with Asset Data

Defining a plurality of messages with asset data may include images, and additional data with interactive buttons such as, for example, the following:
   a. Map button that leads to directions in maps;
   b. Call/email buttons that open that form of contact with prefilled business;
   c. Social media buttons that lead to business webpages; and
   d. Website button that leads to chosen website landing page.

The in-app view of a push notification can be customized for any interface, and may include rich media content. The advertising company can specify more than one media content such as, for example:
   a. Define initial message (e.g., when a consumer satisfies a first delivery rule);
   b. Define second message (e.g., when a consumer satisfies a subsequent delivery rule);
   c. Define promotion (e.g., when user enters store); and d. Define additional content (e.g., based on additional delivery rules).

The at least plurality of messages with asset data may include a chatbot, SMS chatbot, and/or AI based interactions.

Stage 2706D—Specifying Rule(s) for Delivering Messages

Specifying rules may include specifying one or more rules for triggering BrandDrops®, specifying one or more delivery rules for delivering content, or any suitable rules. Specifying rules can include, at least, but not be limited to, specifying a plurality of rules for delivering the media content to a consumer, where specifying the plurality of rules includes: specifying at least a first delivery rule corresponding the consumer's physical location in association with the at least one registered asset, specifying at least a second delivery rule corresponding to at least one element of profile data associated with the consumer, and specifying at least a third delivery rule corresponding to at least one physical action performed by the consumer. Specifying rules may also include:
1) Define a Segment.
   a) Choose filters to segment the consumers that receive a message.
      i) Filter by consumer data, consumer profile data, demographics, location history, and event history.
         (1) Attach any number of filters to each message.
         (2) Create specific audiences based on a consumer's location habits and in-app behavior.
      ii) Segments can be defined on past behavior captured by an application.
   b) Traditional.
      i) Segments can be purchased (e.g., from Online Behavior Data providers).
      ii) Segments can be bid upon (e.g., Ad bidding systems).
      iii) Segments can be a customized list of a combination of demographic factors defined by an advertising company.

Stage 2708D—Determine that First Rule Satisfied by Consumer

Determine that first rule satisfied by consumer may include comparing the tracking data with the first rule. Determine that first rule satisfied by consumer may further include retrieving data about consumer based on consumer profile data. Determine that first rule satisfied by consumer may further include comparing to Ad Delivery Rules against consumer profile data.

Stage 2712D—Associate a First Message with the Consumer

Associate a first message with the consumer may include defining at least one message and/or media content. The at least one message and/or media content may include images, and additional data with interactive buttons such as, for example, the following:
a. Map button that leads to directions in maps;
b. Call/email buttons that open that form of contact with prefilled business;
c. Social media buttons that lead to business webpages; and
d. Website button that leads to chosen website landing page.

The in-app view of a push notification can be customized for any interface, and may include rich media content. The advertising company can specify more than one media content such as, for example:

a. Define initial message (e.g., when a consumer satisfies a first delivery rule);
b. Define second message (e.g., when a consumer satisfies a subsequent delivery rule);
c. Define promotion (e.g., when user enters store); and
d. Define additional content (e.g., based on additional delivery rules).

The at least one message and/or media content may include a chatbot, SMS chatbot, and/or AI based interactions.

Stage 2714D—Determine that First Rule Satisfied by the Consumer

Determine that first rule satisfied by consumer may include comparing the tracking data with the first rule. Determine that first rule satisfied by consumer may further include retrieving data about consumer based on consumer profile data. Determine that first rule satisfied by consumer may further include comparing to Ad Delivery Rules against consumer profile data.

Stage 2716D—Associate a Second Message with the Consumer

Associating a second message with the consumer may include defining at least one message and/or media content. The at least one message and/or media content may include images, and additional data with interactive buttons such as, for example, the following:
a. Map button that leads to directions in maps;
b. Call/email buttons that open that form of contact with prefilled business;
c. Social media buttons that lead to business webpages; and
d. Website button that leads to chosen website landing page.

The in-app view of a push notification can be customized for any interface, and may include rich media content. The advertising company can specify more than one media content such as, for example:

a. Define initial message (e.g., when a consumer satisfies a first delivery rule);
b. Define second message (e.g., when a consumer satisfies a subsequent delivery rule);
c. Define promotion (e.g., when user enters store); and
d. Define additional content (e.g., based on additional delivery rules).

The at least one message and/or media content may include a chatbot, SMS chatbot, and/or AI based interactions.

Figure 27E:
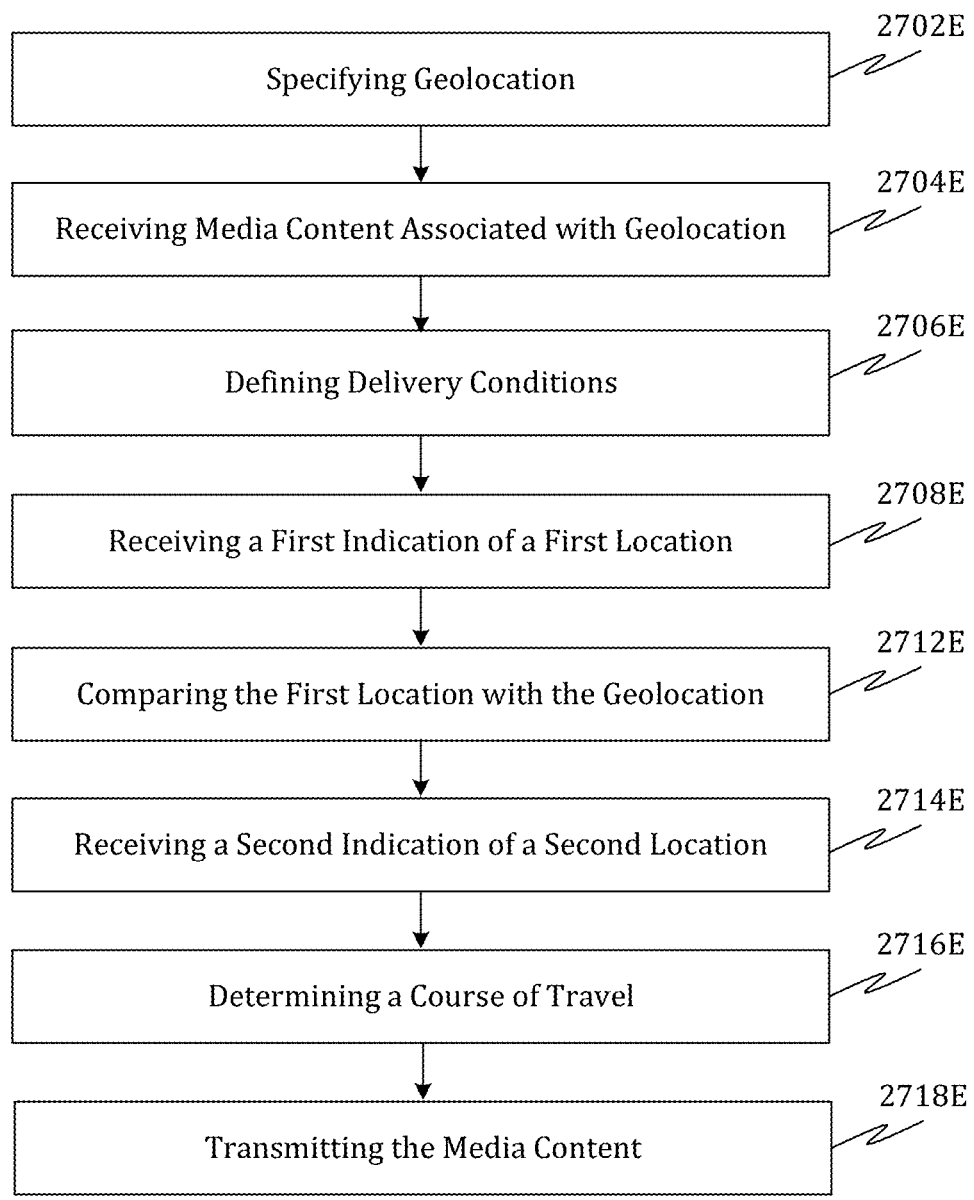
FIG. 27E illustrates a flow chart of a method 2700E of geolocation and time-based advertising, in accordance with embodiments of the present disclosure.

FIG. 27E illustrates a flow chart of a method 2700E of geolocation and time-based advertising, in accordance with the present disclosure. Method 2700E may comprise the following stages and sub-stages:

Stage 2702E—Specifying Geolocation

Establishing at least one geolocation for campaign may include at least one geographical area or a path of travel. By way of nonlimiting example, the at least one geolocation may be a Billboard, a Moving Bus, a TV set, an event venue, and/or any arbitrary points in space.

Stage 2704E—Receiving Media Content Associated with Geolocation

Receiving media content can include receiving media content to be associated with at least one registered asset associated with the registered asset data. Receiving media content can also include:
1) Define a Message.
   a. Select a geofence to be associated with a message to be delivered.
   b. Craft a message or media content.

i. May include images, and additional data with interactive buttons such as, for example, the following:
ii. Map button that leads to directions in maps;
iii. Call/email buttons that open that form of contact with prefilled business;
iv. Social media buttons that lead to business webpages;
v. Website button that leads to chosen website landing page;
vi. The in-app view of a push notification can be customized for any interface, and may include rich media content;
vii. The advertising company can specify more than one media content such as, for example:
1. Define initial message (e.g., when a consumer satisfies a first delivery rule);
2. Define second message (e.g., when a consumer satisfies a subsequent delivery rule);
3. Define promotion (e.g., when user enters store);
4. Define additional content (e.g., based on additional delivery rules); and
5. May include a chatbot, SMS chatbot, and/or AI based interactions.
c. Assign Time Relevance.
viii. Choose how long a message campaign may run;
ix. Daypart one or more campaigns based on date and time; and
x. Limit how often the BrandDrop® may occur (e.g., set an amount of time a consumer can receive the message in a day as well as how many times they can receive it overall).

Stage 2706E—Defining Delivery Conditions

Defining delivery conditions may include specifying one or more conditions for triggering BrandDrops®, specifying one or more delivery conditions for delivering content, or any suitable rules. Defining delivery conditions can include, at least, but not be limited to, specifying a plurality of rules for delivering the media content to a consumer, where specifying the plurality of rules includes: specifying at least a first delivery rule corresponding the consumer's physical location in association with the at least one registered asset, specifying at least a second delivery rule corresponding to at least one element of profile data associated with the consumer, and specifying at least a third delivery rule corresponding to at least one physical action performed by the consumer. Defining delivery conditions may also include:

1) Define a Segment.
   a) Choose filters to segment the consumers that receive a message.
      i) Filter by consumer data, consumer profile data, demographics, location history, and event history.
         (1) Attach any number of filters to each message.
         (2) Create specific audiences based on a consumer's location habits and in-app behavior.
      ii) Segments can be defined on past behavior captured by an application.
   b) Traditional.
      i) Segments can be purchased (e.g., from Online Behavior Data providers)
      ii) Segments can be bid upon (e.g., Ad bidding systems)
      iii) Segments can be a customized list of a combination of demographic factors defined by an advertising company.

Stage 2708E—Receiving a First Indication of a First Location

Receiving a first indication of a first location may include enabling cross platform tracking. Receiving the first indication of a first location may further include tracking location data.

Stage 2712E—Comparing the First Location with the Geolocation

Comparing the first location with the geolocation may include employing a tracking identifier (e.g., a Cookie ID or a hash). Tracking the consumer may further include employing, for example:
a. Orientation Data;
b. Sensor Data;
c. Camera Data;
d. Microphone data;
e. Telemetry Data;
f. Biometric Data; and
g. Voice Data.

Stage 2714E—Receiving a Second Indication of a Second Location

Receiving a second indication of a first location may include enabling cross platform tracking. Receiving the second indication of a first location may further include tracking location data.

Stage 2716E—Determining a Course of Travel

Determining course of travel of may include, for example, comparing the first location with the second location.

Stage 2718E—Transmitting the Media Content

Transmitting the media content may include retrieving data about consumer based on consumer profile data. Transmitting the media content may further include compare to ad delivery rules against consumer profile data. Transmitting the media content may further include selecting appropriate content type(s) to transmit.

Figure 27F:
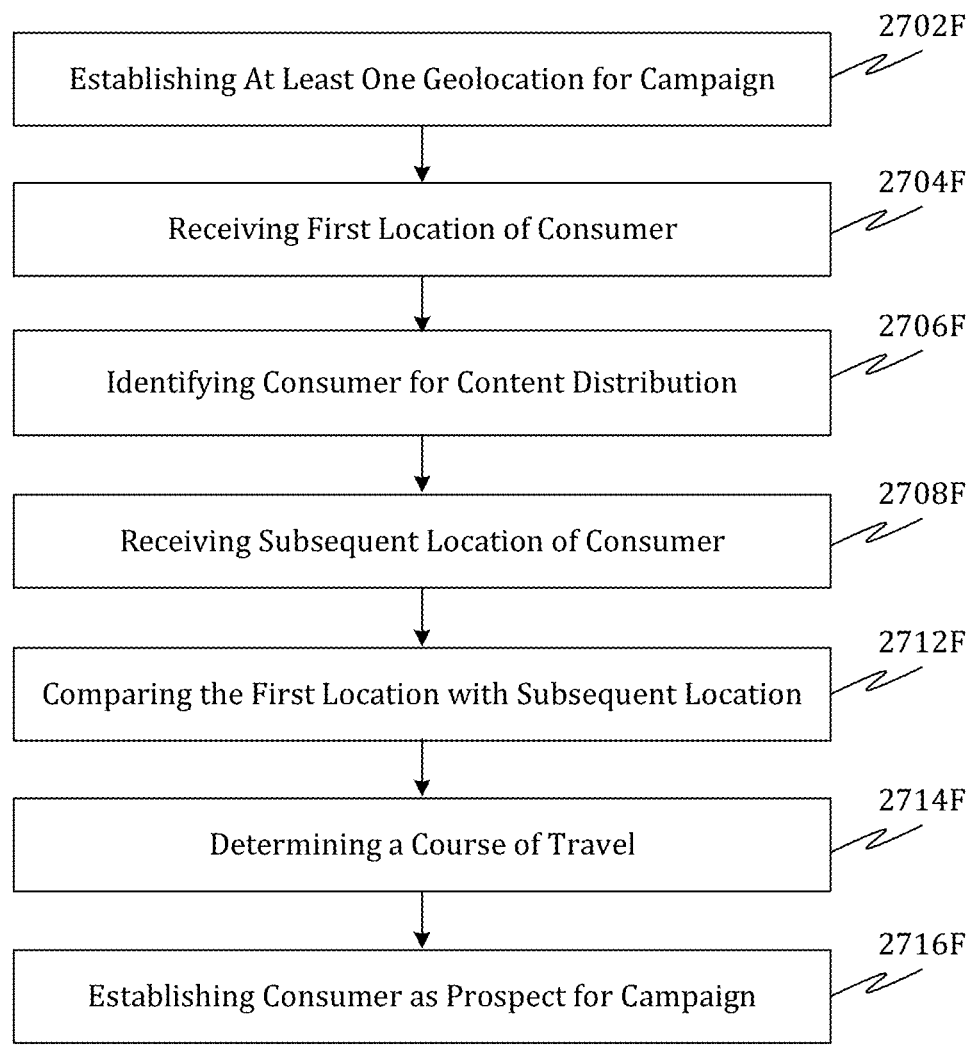
FIG. 27F illustrates a flow chart of a method 2700F of geolocation and time-based advertising, in accordance with embodiments of the present disclosure.

FIG. 27F illustrates a flow chart of a method 2700F of geolocation and time-based advertising, in accordance with the present disclosure. Method 2700F may comprise the following stages and sub-stages:

Stage 2702F—Establishing At Least One Geolocation for Campaign

Establishing at least one geolocation for campaign may include at least one geographical area or a path of travel. By way of nonlimiting example, the at least one geolocation may be a Billboard, a Moving Bus, a TV set, an event venue, and/or any arbitrary point in space.

Stage 2704F—Receiving First Location of Consumer

Receiving a first location of a consumer may include enabling cross platform tracking. Receiving the first location of a consumer may further include tracking location data.

Stage 2706F—Identifying Consumer for Content Distribution

Identifying consumer for content distribution may include comparing the tracking data of the first location with the second location. Identifying the consumer for content distribution may further include retrieving data about consumer course of travel. Identifying the consumer content distribution may further include comparing to ad delivery rules against consumer profile data.

Stage 2708F—Receiving Subsequent Location of Consumer

Receiving subsequent location of consumer may include employing a tracking identifier (e.g., a Cookie ID or a hash). Receiving subsequent location of consumer may further include employing, for example:
a. Orientation Data;
b. Sensor Data;
c. Camera Data;
d. Microphone Data;
e. Telemetry Data;
f. Biometric Data; and
g. Voice Data.

Stage 2712F—Comparing the First Location with Subsequent Location

Comparing the first location with subsequent location may include a consumer's direction of travel relative to a geolocation. Comparing the first location with subsequent location may include a consumer's general motion relative to a geolocation.

Stage 2714F—Determining a Course of Travel

Determining a course of travel may include consumer motion relative to a geolocation. Determining a course of travel may include comparing the consumer at a first point and a second point.

Stage 2716F—Establishing Consumer as Prospect for Campaign

Establishing consumer as prospect for campaign may include comparing the tracking data of the first location with the second location. Establishing consumer as prospect for campaign may further include retrieving data about consumer course of travel. Establishing consumer as prospect for campaign may further include comparing to ad delivery rules against consumer profile data.

Figure 27G:
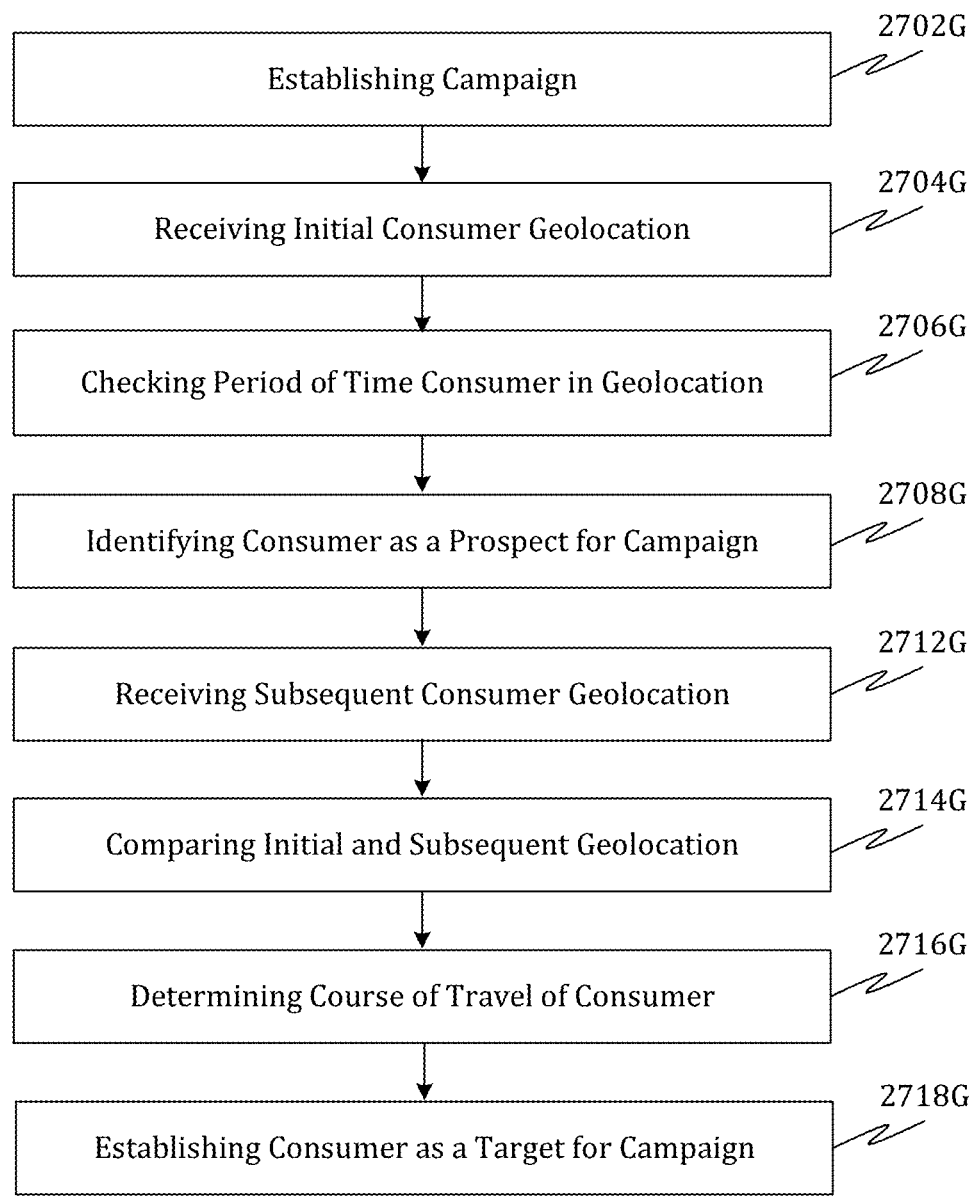
FIG. 27G illustrates a flow chart of a method 2700G of geolocation and time-based advertising, in accordance with embodiments of the present disclosure.

FIG. 27G illustrates a flow chart of a method 2700G of geolocation and time-based advertising, in accordance with the present disclosure. Method 2700G may comprise the following stages and sub-stages:

Stage 2702G—Establishing Campaign

Establishing campaign may include defining at least one message and/or media content. The at least one message and/or media content may include images, and additional data with interactive buttons such as, for example, the following:
a. Map button that leads to directions in maps;
b. Call/email buttons that open that form of contact with prefilled business;
c. Social media buttons that lead to business webpages; and
d. Website button that leads to chosen website landing page.

The in-app view of a push notification can be customized for any interface and may include rich media content. The advertising company can specify more than one media content such as, for example:
a. Define initial message (e.g., when a consumer satisfies a first delivery rule);
b. Define second message (e.g., when a consumer satisfies a subsequent delivery rule);
c. Define promotion (e.g., when user enters store); and
d. Define additional content (e.g., based on additional delivery rules).

The at least one message and/or media content may include a chatbot, SMS chatbot, and/or AI based interactions.

Stage 2704G—Receiving Initial Consumer Geolocation

Receiving initial consumer geolocation may include enabling cross platform tracking. Receiving initial consumer geolocation may further include tracking location data.

Stage 2706G—Checking Period of Time Consumer in Geolocation

Checking period of time consumer in geolocation may include comparing the initial time a consumer is in a consumer location, with a subsequent time a consumer exits the geolocation.

Stage 2708G—Identifying Consumer as a Prospect for Campaign

Identifying consumer as a prospect for campaign may include Determining if a Spatial trigger has occurred. Identifying consumer as a prospect for campaign may further include determining if a time-based trigger has occurred. Identifying consumer as a prospect for campaign may further include determining if a Space/Time based trigger has occurred. Identifying consumer as a prospect for campaign may further include determining a Device Type Used in order to select suitable content format.

Stage 2712G—Receiving Subsequent Consumer Geolocation

Receiving subsequent consumer geolocation may include at least one geographical area. By way of nonlimiting example, the subsequent consumer geolocation may be a Billboard, a Moving Bus, a TV set, an event venue, and/or any arbitrary point in space.

Stage 2714G—Comparing Initial and Subsequent Geolocation

Comparing initial and subsequent geolocation may include employing a tracking identifier (e.g., a Cookie ID or a hash). Comparing initial and subsequent geolocation may further include employing, for example:
a. Orientation Data;
b. Sensor Data;
c. Camera Data;
d. Microphone Data;
e. Telemetry Data;
f. Biometric Data; and
g. Voice Data.

Stage 2716G—Determining Course of Travel of Consumer

Determining a course of travel of a consumer may include consumer motion relative to a geolocation. Determining a course of travel of the consumer may include comparing the consumer at a first point and a second point.

Stage 2718G—Establishing Consumer as a Target For Campaign

Establishing consumer as prospect for campaign may include comparing the tracking data with the first rule. Establishing consumer as prospect for campaign may further include retrieving data about consumer course of travel. Establishing consumer as prospect for campaign may further include comparing to ad delivery rules against consumer profile data.

Point and Click Embodiments

Figure 44:
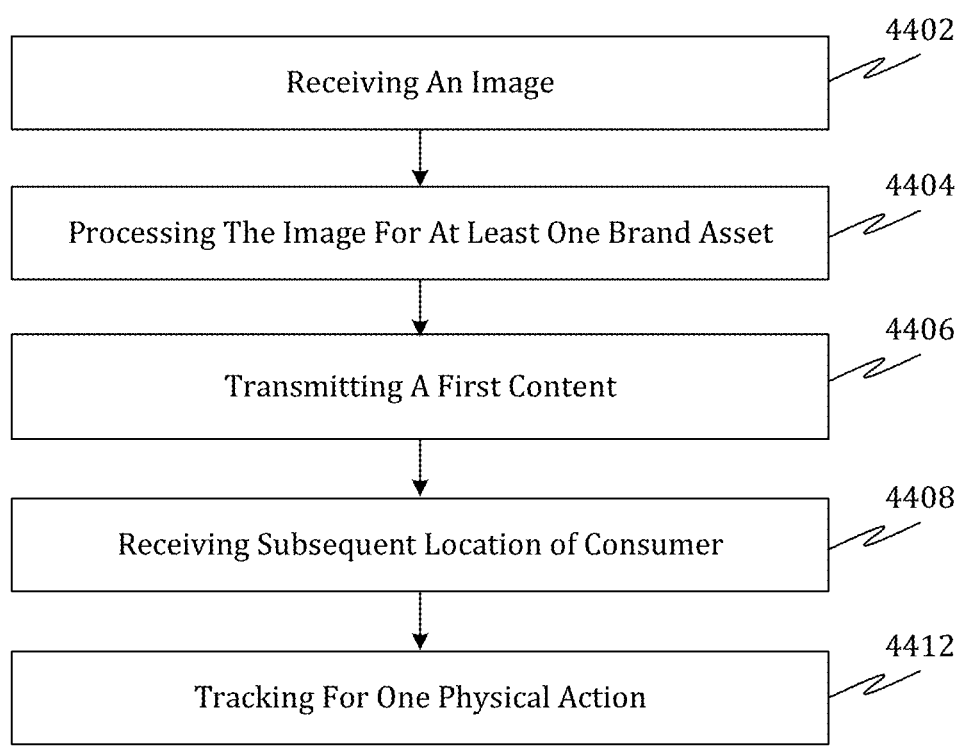
FIG. 44 illustrates a flow chart of a method for geolocation 4400 (Point and Click), in accordance to embodiments disclosed herein.

FIG. 44 illustrates a flow chart of a method for geolocation 4400 (Point and Click), in accordance to embodiments disclosed herein. The method may be used as an alternative to interacting with, or physically touching an object or data center to receive information. The method may be further used as an opt-in feature.

Point and click ("P&C") generally relates to the utilization of a camera (e.g., a smartphone) to detect a "brand asset" within an image. The brand asset may be, for example, a picture of a logo (Nike swoosh), a slogan, a name, an object (e.g., a coke bottle), a billboard, an advertisement, a store front, or any other matter that may be considered as a brand asset. A user may point their phone's camera to a billboard, and the "Point-and-Click" technology would identify the brand asset (billboard) in image. The user may point their phone's camera towards a person who may be wearing a branded t-shirt, and the P&C technology would detect the brand asset (logo on t-shirt). Having detected the brand asset, the P&C technology may then provide content to the user. Providing content may be performed 'live' (as the user points the phone towards the brand asset), or may be performed post-processing (after the user has taken a snapshot with their phone). The provision of content may be conditioned upon various parameters, including: 1) a profile of the user; 2) an action performed by the user; and/or 3) the location of the user. Once the P&C technology determines that at least one condition has been met, the user may be provided with the content. The content that is provided to the user is not limited to an advertisement but may be any content. By way of nonlimiting example, the user may be able to 'follow' brands, 'unsubscribe' or 'de-list' themselves from the brand's campaigns, view brand inventory at a particular store, or engage with brand representatives. Alternatively, this P&C may enable brands to advertise/engage their audience as the users flip through their photo-library of pictures they took from days prior. By way of nonlimiting example, a college student may be looking through his phone at pictures from his Frat Party the night before. The picture might have some 'bud light' beers in the background. Bud Light could use the platform to then engage this college kid with a message "Have fun last night? Next 12 pack is on us"—all by detecting their beer in the photo.

The method may include receiving at least one of the following: an image, an object, a content, and a brand asset.

In some embodiments, the image may be associated with a first geolocation. In further embodiments, the image may be taken from a mobile device. In further embodiments, the image taken from a mobile device may be transmitted to a device configured to receive the image once captured. In yet further embodiments, the image taken from a mobile device may be uploaded to platform 100 and/or a third party platform. In even further embodiments, the image may correspond to at least one of the following:
  a. an advertisement,
  b. a picture in a photo-library,
  c. an offering,
  d. a brand asset,
  e. a barcode, and
  f. a QR code.

The method may further include processing the image for at least one brand asset. By way of non-limiting example, a brand asset may be at least one of the following:
  g. a picture of a logo (Nike swoosh),
  h. a slogan,
  i. a name,
  j. an object (e.g., a coke bottle),
  k. a billboard,
  l. an advertisement,
  m. a store front, and
  n. any other matter that may be considered as a brand asset.

The method may further include receiving a specification of brand assets to be detected within an image. The receiving the specification of brand assets to be detected within an image may be used to keyword search based on the brand. The receiving the specification of brand assets to be detected within an image may be further used to load offers associated with the brand.

The method may further include content delivery rules. In some embodiments, the content delivery rules may comprise at least one of the following:
  o. a geolocation,
  p. a time, and
  q. a demographic.

The method may further include transmitting a first content. In some embodiments, transmitting the first content may comprise transmitting when rules are met. In further embodiments, transmitting the first content may comprise transmitting a URL to the content. In yet further embodiments, transmitting the first content may comprise loading the URL. In some embodiments, the first content may be interactive. In further embodiments, the first content may comprise an Augmented Reality ("AR") superimposition over the image. In some embodiments, transmitting the first content may occur after tracking a user from a first location to a second location. In some embodiments, transmitting the first content may occur after tracking a user to the second location. In some embodiments, the first content may be transmitted in response to the detection of the at least one brand asset.

The method may further include tracking for at least one physical action. In some embodiments, the at least one physical action may be associated with a second geolocation. In further embodiments, the at least one physical action may comprise a point of sale. In some embodiments, the tracking may comprise receiving a mobile device activity data. In some embodiments, the tracking may comprise receiving a location data. In some embodiments, the tracking for the at least one physical action may further comprise time-based rules. In some embodiments, the tracking for the at least one physical action may further comprise location-based rules. In some embodiments, the tracking for the at least one physical action may further comprise demographic-based rules.

The method may further include receiving a specification of the at least one action. In some embodiments, the receiving the specification of the at least one action may comprise receiving interactivity criteria. In some embodiments, the receiving the specification of the at least one action may comprise a path, a time, a destination, and/or an activity.

The method may further include updating the first content based on the at least one physical action.

The method may further include transmitting a second content. In some embodiments, the second content may comprise an AR superimposition of the first content. In further embodiments, the second content may comprise an AR superimposition over the image. In yet further embodiments, the second content may comprise an AR superimposition over the camera.

Embodiments of the present disclosure provide methods, systems, and computer-readable media configured to perform at least the following functions:
  a. 4402—receiving an image
    i. wherein the image is associated with a first geolocation,
    ii. wherein the image is captured by a mobile device,
      1. wherein the image is transmitted once captured,
    iii. wherein the image is uploaded;
  b. 4404—processing the image for at least one brand asset
  c. Processing the image for at least one brand asset may include use of a computing device and/or algorithm to detect the at least one brand asset
  d. 4406—transmitting a first content
    i. tracking for one physical action:
      1. wherein the physical action is associated with a second geolocation,
      2. wherein tracking comprises receiving mobile device activity data,
      3. wherein tracking comprises receiving location data,
      4. further comprising: time-based rules,
      5. further comprising: location-based rules,
      6. further comprising: demographic-based rules,
  e. further comprising:
    i. receiving a specification of brand assets to be detected within an image,
    ii. associating a first geolocation with the brand assets, iii. determining the first geolocation based on the image processing,
f. further comprising:
   i. detecting the brand asset in the image,
   ii. transmitting the first content is in response to the detection,
g. further comprising:
   i. specifying content delivery rules,
   ii. wherein the content delivery rules comprise:
      1. a geolocation,
      2. a time, and
      3. a demographic;
   iii. wherein transmitting comprises:
      1. transmitting when rules are met,
      2. transmitting a URL to the content, and
      3. further comprising loading the URL;
   iv. further comprising:
      1. receiving a specification of the at least one action:
         a. wherein receiving spec comprises receiving interactivity criteria,
         b. wherein receiving spec comprises receiving spec of:
            i. a path,
            ii. a time,
            iii. a destination, and
            iv. an activity;
   v. wherein image corresponds to:
      1. an advertisement,
      2. an offering,
      3. a brand asset,
      4. a barcode, and
      5. a QR code;
   vi. wherein physical activity is associated with:
      1. a point of sale;
   vii. wherein first content corresponds to:
      1. an Augmented Reality superimposition over the image;
   viii. wherein the second content comprises:
      1. an AR superimposition of the first content,
      2. an AR superimposition over the image, and
      3. an AR superimposition over the camera;
h. 4408—receiving a subsequent location of a customer;
i. Receiving a subsequent location of a customer may include general motion relative to a geolocation;
j. 4412—tracking for one physical action;
k. Tracking one physical action may include employing a tracking identifier (e.g., a Cookie ID or a hash). Tracking one physical action may further include employing, for example:
   i. Orientation Data,
   ii. Sensor Data,
   iii. Camera Data,
   iv. Microphone Data,
   v. Telemetry Data,
   vi. Biometric Data; and
   vii. Voice Data.

Heat Mapping Embodiments

Figure 45:
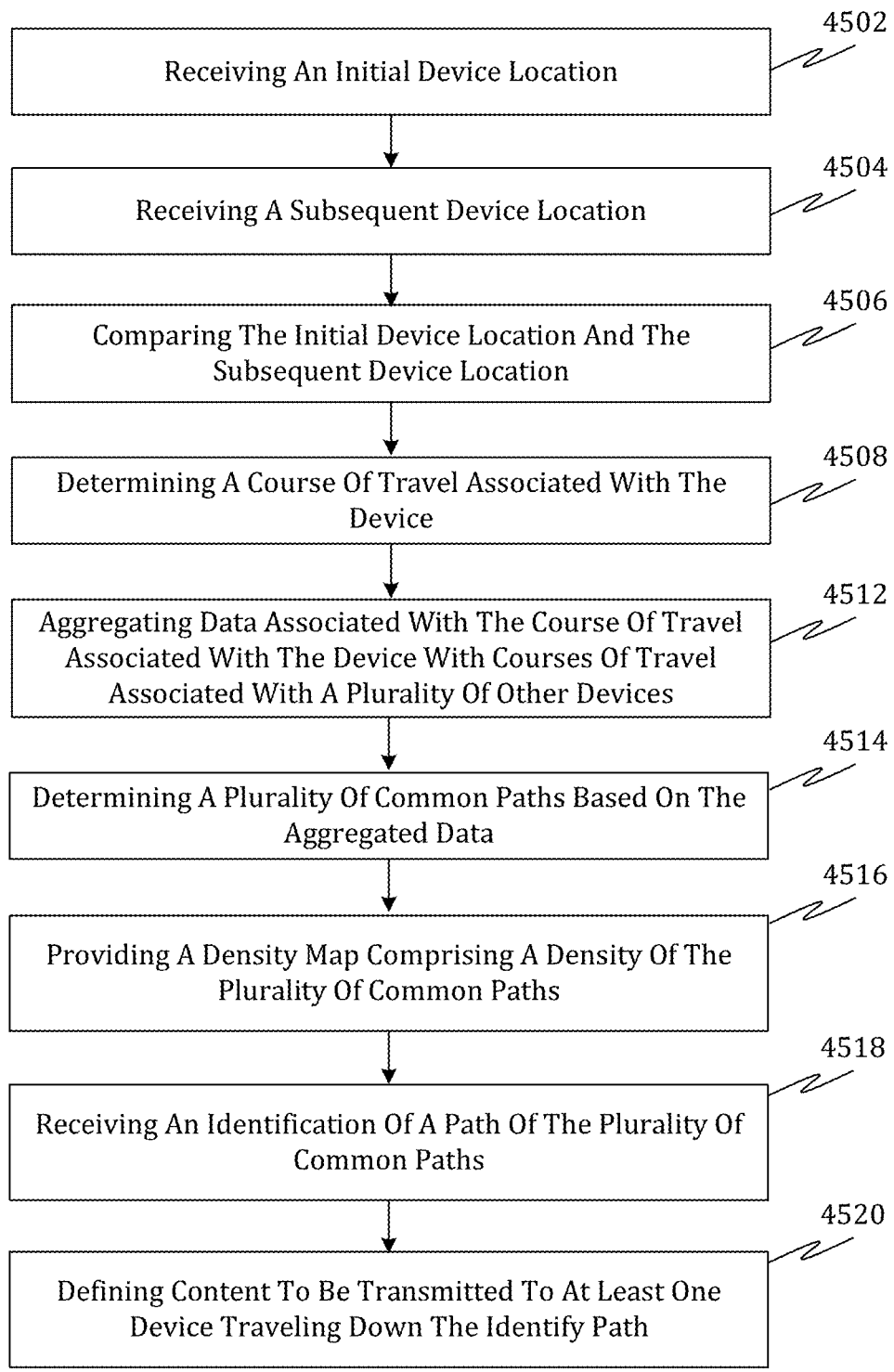
FIG. 45 illustrates a flow chart of a method for geolocation 4500 (Heat Mapping), in accordance to embodiments disclosed herein.

FIG. 45 illustrates a flow chart of a method for geolocation 4500 (Heat Mapping), in accordance to embodiments disclosed herein.

The method may further include registering a plurality of assets including at least one of the following: a geolocation for physical assets, and a geolocation for virtual assets.

The method may further include calculating a plurality of desired consumer journeys. In some embodiments, the plurality of desired consumer journeys may comprise retrospectively tracking the plurality of consumer journeys.

The method may further include calculating a plurality of consumer analytics. In some embodiments, the plurality of consumer analytics may provide data for the platform to detect correlations between a plurality of consumer journeys, and the spending habits of the plurality consumers on the journeys. By way of non-limiting example, users of the platform can see what restaurants and retail stores consumers commonly visit and spend money at along their journeys. In further embodiments, the plurality of consumer analytics may provide data for the platform to detect proximity information between advertising slots and user competitor zones. By way of non-limiting example, a user that owns McDonald's franchises may receive information about which digital billboards on common consumer paths that pass by, or go to a competitor fast food restaurant (e.g., Wendy's); for which the user may then push advertisements on the digital billboards to advertise a discount if they go to the user's McDonald's instead of the competitor fast food restaurant. In further embodiments, the plurality of consumer analytics may provide data for the platform to detect a plurality of correlations. By way of nonlimiting example, the platform may detect common paths of a plurality of consumers heading to their place of work in the mornings.

In further embodiments, the plurality of consumer analytics may provide data for the platform to detect the consumer's propensity to visit a second location after visiting a first location. By way of nonlimiting example, the platform can give the user a likelihood that a consumer will travel from, for example, a movie theater to an ice cream shop. In further embodiments, the plurality of consumer analytics may provide data for the platform to detect a plurality of proximity information between a plurality of advertising slots and at least one user competitor geolocation. In further embodiments, the plurality of consumer analytics may provide data for the platform to detect at least one change in a consumer routine the plurality of consumer journeys. In further embodiments, the plurality of consumer analytics may provide data for the platform to detect purchasing behavior data. In further embodiments, the plurality of consumer analytics may provide data for the platform to detect at least one of the following: location data, sensor data, telemetry data, device usage data, and a unique identifier. In further embodiments, the plurality of consumer analytics may provide data for the platform to detect at least one of the following: consumer demographics; previous visits to a physical location associated with at least one registered asset; previous interactivity associated with the registered asset while visiting the geolocation; and previous interactivity with the media content while within a threshold distance to the geolocation associated with the registered asset. In further embodiments, the plurality of consumer analytics may provide data for the platform to detect a number of consumer visits within a physical proximity of the course of travel of the consumer. In further embodiments, the plurality of consumer analytics may provide data for the platform to detect a frequency of media content viewed within the course of travel of the consumer. In further embodiments, the plurality of consumer analytics may provide data for the platform to detect an amount of time one or more consumers dwell within a physical proximity to a registered asset. By way of nonlimiting example, the platform can detect how long a consumer is in visual proximity to a digital billboard. By way of nonlimiting example, the platform can detect how long a consumer device is in proximity to a platform user's fast food restaurant.

In some embodiments, the method may further include determining a course of travel of the consumer. In some embodiments, the determining a course of travel of the consumer may be is provided by accessing a database and retrieving location data. By way of nonlimiting example, the consumer data may reside on a cloud computing environment or external database.

In some embodiments, the method may further include providing at least one graphing algorithm. In some embodiment, the graphing algorithm may be configured to provide at least one map.

In some embodiments, the method may further include providing a density map of a plurality of consumer journeys. In some embodiments, the density map of plurality of consumer journeys may comprise a plurality of density map analytics. The density map of the plurality of consumer journeys may be used to view most commonly traveled paths between multiple points in space. In some embodiments, the plurality of consumer journeys may be input manually. In some embodiments, the plurality of density map analytics may comprise at least one correlation between a plurality of locations. By way of nonlimiting example, the plurality of density map analytics may provide commonly traveled paths from a certain zip code, to a sporting event. In further embodiments, the density map comprises a consumer-specific frequency of visits within a physical proximity to a registered asset.

The at least one correlation between a plurality of locations may be used to track a consumer's propensity to visit a second location after visiting a first location. In some embodiments, the plurality of density map analytics may provide data for the platform to detect at least one routine and/or history for the plurality of consumer journeys. In further embodiments, the plurality of density map analytics may provide data for the platform to detect changes in the at least one routine and/or history for the plurality of consumer journeys. In even further embodiments, the plurality of density map analytics may comprise purchasing behavior data.

The method may further comprise specifying, for the common paths of the plurality of consumer geolocation changes, a plurality of registered assets. In some embodiments, the plurality of registered assets are configured to be associated with: a change in a physical location associated with the consumer; a particular destination to which the consumer navigates; and a particular time period in which the consumer navigates.
  a. Example 1—Provide content to billboards based on what paths people take,
  b. Example 2—Provide detailed breakdowns of purchasing behaviors,
  c. Example 3—If the majority of people who travel down a path buy a certain good, advertise that good,
  d. Example 4—Provide correlation/likelihood between places such as a person going to a pizza shop and then going to an ice cream shop after, and
  e. Example 5—Be able to identify changes in routine.

Embodiments of the present disclosure provide methods, systems, and computer-readable media configured to perform at least the following functions:
  a. 4502—receiving an initial device location;
  b. Receiving an initial device location may include at least one geographical area. By way of nonlimiting example, the subsequent consumer geolocation may be a Billboard, a Moving Bus, a TV set, an event venue, and/or any arbitrary point in space;
  c. 4504—receiving a subsequent device location;
  d. Receiving a subsequent device location may include at least one geographical area. By way of nonlimiting example, the subsequent consumer geolocation may be a Billboard, a Moving Bus, a TV set, an event venue, and/or any arbitrary point in space;
  e. 4506—comparing the initial device location and the subsequent device location;
  f. Comparing the initial device location and the subsequent device location may include employing a tracking identifier (e.g., a Cookie ID or a hash). Tracking one physical action may further include employing, for example:
    i. Orientation Data;
    ii. Sensor Data;
    iii. Camera Data;
    iv. Microphone Data; and
    v. Telemetry Data.
  g. 4508—determining a course of travel associated with the device;
  h. Determining a course of travel associated with the device may include consumer motion relative to a geolocation. Determining a course of travel of the consumer may include comparing the consumer at a first point and a second point;
  i. 4512—aggregating data associated with the course of travel associated with the device with courses of travel associated with a plurality of other devices;
  j. Aggregating data associated with the course of travel associated with the device with courses of travel associated with a plurality of other devices may include gathering a plurality of courses of travel of a plurality of consumers. In some embodiments, the determining a course of travel of the consumer may be is provided by accessing a database and retrieving location data;
  k. 4514—determining a plurality of common paths based on the aggregated data;
  l. Determining a plurality of common paths based on the aggregated data may include providing at least one graphing algorithm. The graphing algorithm may be configured to provide at least one map;
  m. 4516—providing a density map comprising a density of the plurality of common paths;
  n. Providing a density map comprising a density of the plurality of common paths may include providing a density map of a plurality of consumer journeys. In some embodiments, the density map of plurality of consumer journeys may comprise analytics. The density map of the plurality of consumer journeys may be used to view most commonly traveled paths between multiple points in space. In some embodiments, the plurality of consumer journeys may be input manually. In some embodiments, the analytics may comprise at least one correlation between a plurality of locations. By way of nonlimiting example, the analytics may provide commonly traveled paths from a certain zip code, to a sporting event. In further embodiments, the density map comprises a consumer-specific frequency of visits within a physical proximity to a registered asset;
  o. 4518—receiving an identification of a path of the plurality of common paths;
  p. Receiving an identification of a path of the plurality of common paths may include providing a graphical map of a frequency of location changes;

q. 4520—defining content to be transmitted to at least one device traveling down the identify path;
r. Defining content to be transmitted to at least one device traveling down the identify path may include defining at least one message and/or media content. The at least one message and/or media content may include images, and additional data with interactive buttons such as, for example, the following:
   i. Map button that leads to directions in maps;
   ii. Call/email buttons that open that form of contact with prefilled business;
   iii. Social media buttons that lead to business webpages; and
   iv. Website button that leads to chosen website landing page.
s. The in-app view of a push notification can be customized for any interface, and may include rich media content. The advertising company can specify more than one media content such as, for example:
   i. Define initial message (e.g., when a consumer satisfies a first delivery rule);
   ii. Define second message (e.g., when a consumer satisfies a subsequent delivery rule);
   iii. Define promotion (e.g., when user enters store); and
   iv. Define additional content (e.g., based on additional delivery rules).
t. The at least one message and/or media content may include a chatbot, SMS chatbot, and/or AI based interactions.

The method may include registering a location of an advertisement asset, the advertisement asset having media content associated with an advertisement campaign. In some embodiments, the advertisement asset may be a mobile asset configured to travel within a geographical area and configured to be tracked within the geographical area.

The method may further include tagging a mobile computing device associated with a consumer based on the location of the advertisement asset in relation to the mobile computing device.

The method may further include tracking a consumer action performed subsequent to the tagging of the mobile computing device. In some embodiments, the tracked consumer action may comprise a consumer traversing a geofence border encompassing a physical location. In further embodiments, the tracked consumer action may be associated with a particular social event. In yet further embodiments, the tracked consumer action may be associated with the consumer leaving a particular social event. In still further embodiments, the tracked consumer action may be activity data associated with the mobile computing device.

The method may further include comparing a location change of the user with previous location changes of the user.

The method may further include collecting activity data. In some embodiments, the activity data may comprise compiled analytics based on consumer interaction with the location change associated with an advertising asset.

The method may further include providing a graphical map of a frequency of location changes of the user.

Figure 46:
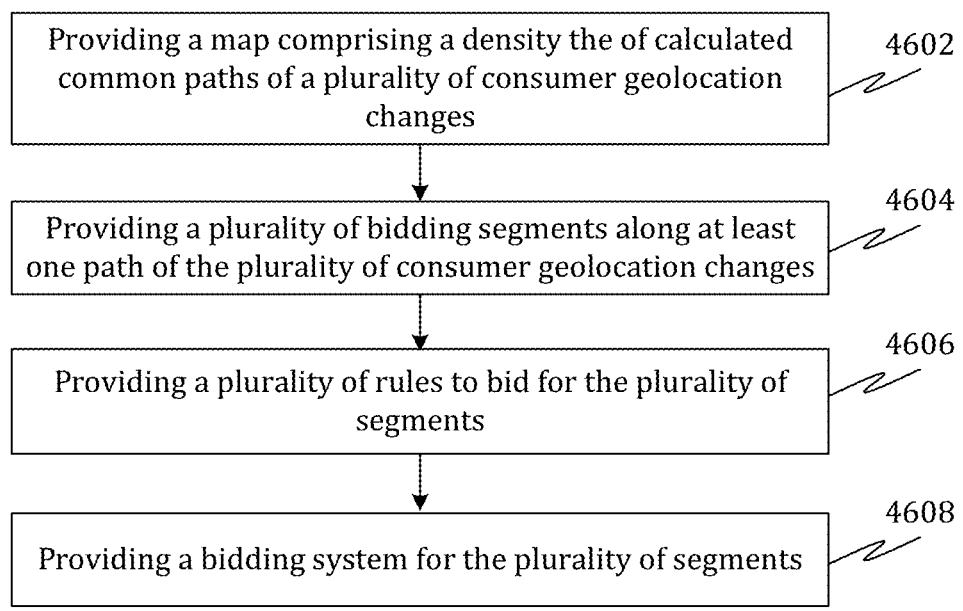
FIG. 46 illustrates a flow chart of a method for geolocation 47 (Heat Mapping), in accordance to embodiments disclosed herein.

FIG. 46—Heatmap Bidding

FIG. 46 illustrates a flow chart of a method for geolocation 4600 (Heat Mapping), in accordance to embodiments disclosed herein.

The method may include providing a map of a plurality of consumer geolocation changes.

The method may further include providing a plurality of segments along at least one path of the plurality of consumer geolocation changes.

The method may further include providing a plurality of rules to bid for the plurality of segments. In some embodiments, the plurality of segments may be used for providing content to a plurality of consumers.

The method may further include providing a bidding system for the plurality of segments. In some embodiments, the more popular paths of the plurality of consumer geolocation changes may cost more to secure. In some embodiments, the bidding system may comprise conversion metrics and/or analytics. In some embodiments, the bidding system may be performed on platform 100, a stand-alone application, an API, and/or an SDK.

Embodiments of the present disclosure provide methods, systems, and computer-readable media configured to perform at least the following functions:
a. 4602—providing a map comprising a density the of calculated common paths of a plurality of consumer geolocation changes;
b. 4604—providing a plurality of bidding segments along at least one path of the plurality of consumer geolocation changes;
c. 4606—providing a plurality of rules to bid for the plurality of segments; and
d. 4608—providing a bidding system for the plurality of segments.

Figure 47:
FIG. 47 illustrates a screenshot 4700 of a GUI for a map comprising a density the of calculated common paths of a plurality of consumer geolocation changes in conjunction with geolocation and time-based advertisements, in accordance with embodiments of the present disclosure.

FIG. 47 illustrates a screenshot 4700 of a GUI for a map comprising a density the of calculated common paths of a plurality of consumer geolocation changes in conjunction with a system for geolocation and time-based advertisements, in accordance with embodiments of the present disclosure.

In some embodiments, the system may comprise a memory storage.

In further embodiments, the system may comprise at least one processing unit, wherein the at least one processing unit. In some embodiments, the at least one processing unit may be configured to register a plurality of assets including at least one of the following: a geolocation for physical assets, and a geolocation for virtual assets. In some embodiments, the at least one processing unit may be configured to receive an initial consumer geolocation.

In some embodiments, the at least one processing unit may be configured to receive a subsequent consumer geolocation. In some embodiments, the at least one processing unit may be configured to compare the initial and subsequent geolocations. In some embodiments, the at least one processing unit may be configured to determine a course of travel of the consumer. In some embodiments, the at least one processing unit may be configured to compile consumer analytics based on a plurality of consumer geolocation changes. In some embodiments, the at least one processing unit may be configured to calculate a plurality of common paths of the plurality of consumer geolocation changes. In some embodiments, the at least one processing unit may be configured to provide a density map comprising the density of the calculated common paths of the plurality of consumer geolocation changes.

Figure 48:
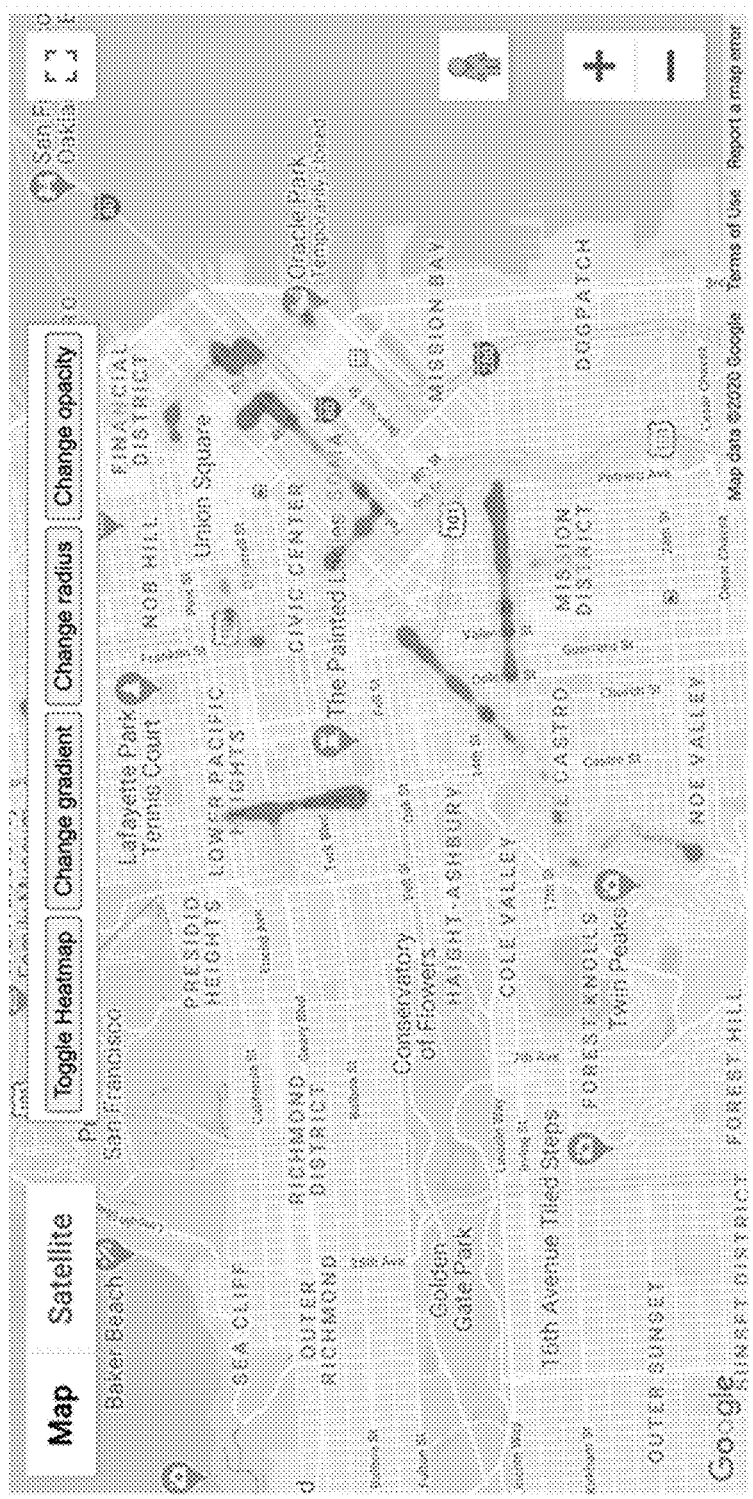
FIG. 48 illustrates a screenshot 4800 of a GUI for a map comprising a density the of calculated common paths of a plurality of consumer geolocation changes in conjunction with geolocation and time-based advertisements, in accordance with embodiments of the present disclosure.

FIG. 48 illustrates a screenshot 4800 of a GUI for a map comprising a density the of calculated common paths of a plurality of consumer geolocation changes in conjunction with a system for geolocation and time-based advertisements, in accordance with embodiments of the present disclosure.

Figure 49:
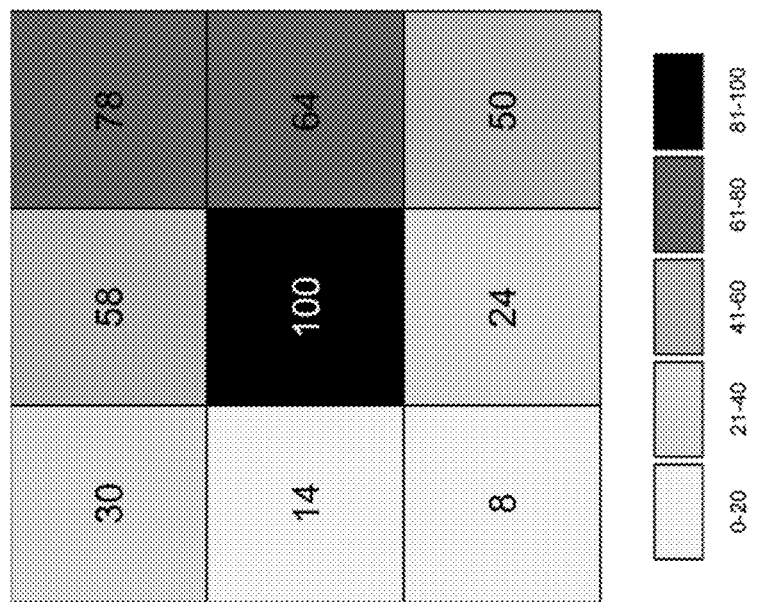
FIG. 49 illustrates a screenshot 4900 of a GUI for a map comprising a density the of calculated common paths of a plurality of consumer geolocation changes in conjunction with geolocation and time-based advertisements, in accordance with embodiments of the present disclosure.

FIG. 49 illustrates a screenshot 4900 of a GUI for a density chart for a map comprising a density the of calculated common paths of a plurality of consumer geolocation changes in conjunction with a system for geolocation and time-based advertisements, in accordance with embodiments of the present disclosure.

B. Computing Device Architecture

The platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, the platform 100 may be hosted on a centralized server, such as, for example, a cloud computing service. Although methods 500 to 800, 2200, 2300, 2400, 2500, 2600, and 2700 have been described to be performed by a computing device 2100, it should be understood that, in some embodiments, different operations may be performed by different networked elements in operative communication with computing device 2100.

Embodiments of the present disclosure may comprise a system having a memory storage and a processing unit. The processing unit coupled to the memory storage, wherein the processing unit is configured to perform the stages of methods 500 to 800, 2200, 2300, 2400, 2500, and 2600.

Figure 21:
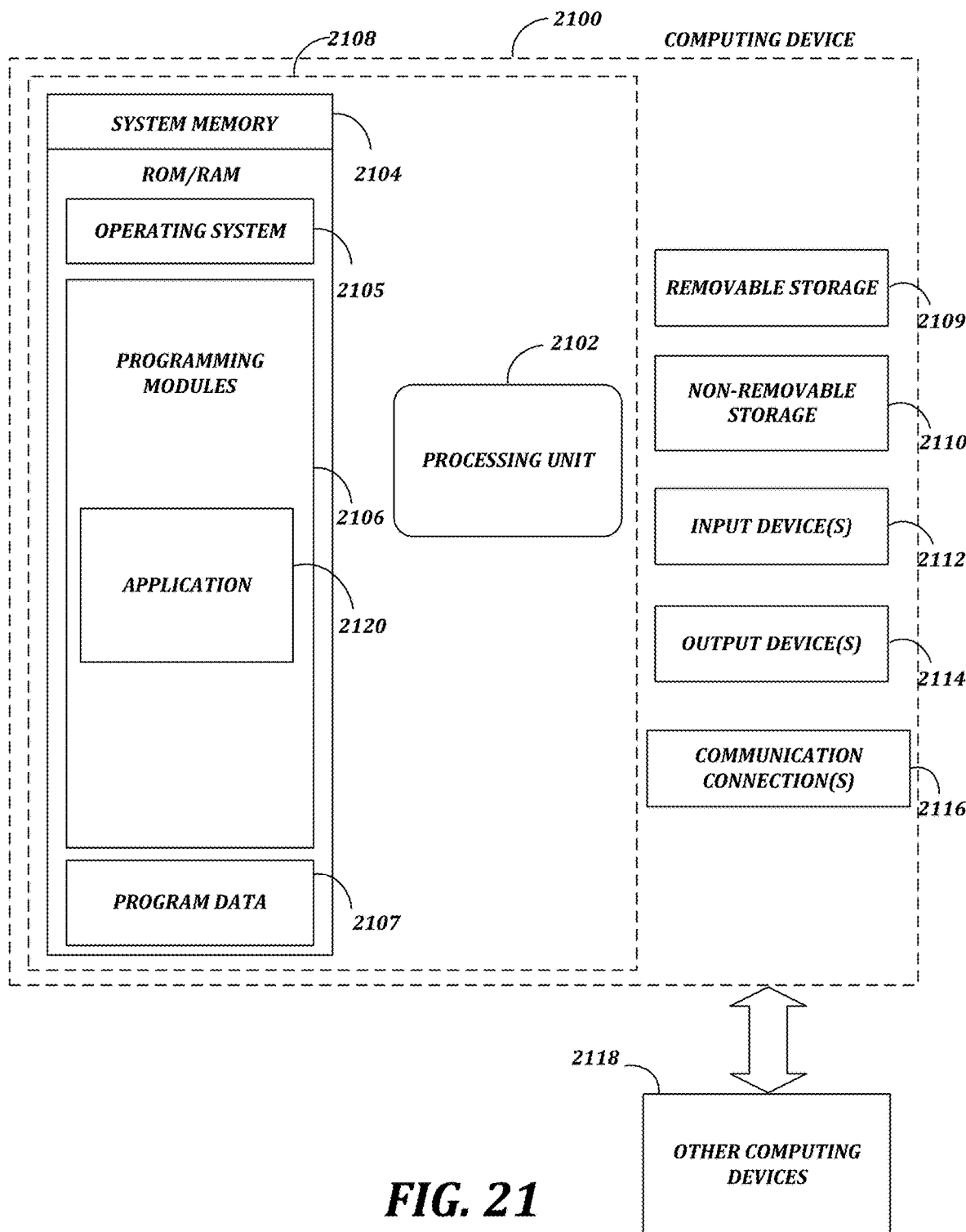
FIG. 21 illustrates a block diagram of a system 2100 for implementing the platform for geolocation and time-based advertising, in accordance with embodiments of the present disclosure.

FIG. 21 is a block diagram of a system including computing device 2100. The computing device 2100 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS400/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

Platform 100 may be hosted on a centralized server or a cloud computing service.

Embodiments of the present disclosure may comprise a system having a central processing unit (CPU) 2120, a bus 2130, a memory unit 2140, a power supply unit (PSU) 2150, and one or more Input/Output (I/O) units. The CPU 2120 coupled to the memory unit 2140 and the plurality of I/O units 2160 via the bus 2130, all of which are powered by the PSU 2150. It should be understood that, in some embodiments, each disclosed unit may actually be a plurality of such units for the purposes of redundancy, high availability, and/or performance. The combination of the presently disclosed units is configured to perform the stages any method disclosed herein.

FIG. 21 is a block diagram of a system including computing device 2100. Consistent with an embodiment of the disclosure, the aforementioned CPU 2120, the bus 2130, the memory unit 2140, a PSU 2150, and the plurality of I/O units 2160 may be implemented in a computing device, such as computing device 2100 of FIG. 21. Any suitable combination of hardware, software, or firmware may be used to implement the aforementioned units. For example, the CPU 2120, the bus 2130, and the memory unit 2140 may be implemented with computing device 2100 or any of other computing devices 2100, in combination with computing device 2100. The aforementioned system, device, and components are examples and other systems, devices, and components may comprise the aforementioned CPU 2120, the bus 2130, the memory unit 2140, consistent with embodiments of the disclosure.

At least one computing device 2100 may be embodied as any of the computing elements illustrated in all of the attached figures, including [list the modules and methods]. A computing device 2100 does not need to be electronic, nor even have a CPU 2120, nor bus 2130, nor memory unit 2140. The definition of the computing device 2100 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 2100, especially if the processing is purposeful.

With reference to FIG. 21, a system consistent with an embodiment of the disclosure may include a computing device, such as computing device 2100. In a basic configuration, computing device 2100 may include at least one clock module 2110, at least one CPU 2120, at least one bus 2130, and at least one memory unit 2140, at least one PSU 2150, and at least one I/O 2160 module, wherein I/O module may be comprised of, but not limited to a non-volatile storage sub-module 2161, a communication sub-module 2162, a sensors sub-module 2163, and a peripherals sub-module 2164.

A system consistent with an embodiment of the disclosure the computing device 2100 may include the clock module 2110 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 2120, the central component of modern computers, which relies on a clock. The only exceptions are asynchronous circuits such as asynchronous CPUs. The clock 2110 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 4 wires.

Many computing devices 2100 use a "clock multiplier" which multiplies a lower frequency external clock to the appropriate clock rate of the CPU 2120. This allows the CPU 2120 to operate at a much higher frequency than the rest of the computer, which affords performance gains in situations where the CPU 2120 does not need to wait on an external factor (like memory 2140 or input/output 2160). Some embodiments of the clock 2110 may include dynamic frequency change, where, the time between clock edges can vary widely from one edge to the next and back again.

A system consistent with an embodiment of the disclosure the computing device 2100 may include the CPU unit 2120 comprising at least one CPU Core 2121. A plurality of CPU cores 2121 may comprise identical the CPU cores 2121, such as, but not limited to, homogeneous multi-core systems. It is also possible for the plurality of CPU cores 2121 to comprise different the CPU cores 2121, such as, but not limited to, heterogeneous multi-core systems, big.LITTLE systems and some AMD accelerated processing units (APU). The CPU unit 2120 reads and executes program instructions which may be used across many application domains, for example, but not limited to, general purpose computing, embedded computing, network computing, digital signal processing (DSP), and graphics processing (GPU). The CPU unit 2120 may run multiple instructions on separate CPU cores 2121 at the same time. The CPU unit 2120 may be integrated into at least one of a single integrated circuit die and multiple dies in a single chip package. The single integrated circuit die and multiple dies in a single chip package may contain a plurality of other aspects of the computing device 2100, for example, but not limited to, the clock 2110, the CPU 2120, the bus 2130, the memory 2140, and I/O 2160.

The CPU unit 2120 may contain cache 2122 such as, but not limited to, a level 1 cache, level 2 cache, level 3 cache or combination thereof. The aforementioned cache 2122 may or may not be shared amongst a plurality of CPU cores 2121. The cache 2122 sharing comprises at least one of message passing and inter-core communication methods may be used for the at least one CPU Core 2121 to communicate with the cache 2122. The inter-core communication methods may comprise, but not limited to, bus, ring, two-dimensional mesh, and crossbar. The aforementioned CPU unit 2120 may employ symmetric multiprocessing (SMP) design.

The plurality of the aforementioned CPU cores 2121 may comprise soft microprocessor cores on a single field programmable gate array (FPGA), such as semiconductor intellectual property cores (IP Core). The plurality of CPU cores 2121 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 2121, for example, but not limited to Instruction-level parallelism (ILP) such as, but not limited to, super-scalar pipelining, and Thread-level parallelism (TLP).

Consistent with the embodiments of the present disclosure, the aforementioned computing device 2100 may employ a communication system that transfers data between components inside the aforementioned computing device 2100, and/or the plurality of computing devices 2100. The aforementioned communication system will be known to a person having ordinary skill in the art as a bus 2130. The bus 2130 may embody internal and/or external plurality of hardware and software components, for example, but not limited to a wire, optical fiber, communication protocols, and any physical arrangement that provides the same logical function as a parallel electrical bus. The bus 2130 may comprise at least one of, but not limited to a parallel bus, wherein the parallel bus carry data words in parallel on multiple wires, and a serial bus, wherein the serial bus carry data in bit-serial form. The bus 2130 may embody a plurality of topologies, for example, but not limited to, a multidrop/ electrical parallel topology, a daisy chain topology, and a connected by switched hubs, such as USB bus. The bus 2130 may comprise a plurality of embodiments, for example, but not limited to:

Internal data bus (data bus) 2131/Memory bus
    Control bus 2132
    Address bus 2133
    System Management Bus (SMBus)
    Front-Side-Bus (FSB)
    External Bus Interface (EBI)
    Local bus
    Expansion bus
    Lightning bus
    Controller Area Network (CAN bus)
    Camera Link
    ExpressCard
    Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
    Small Computer System Interface (SCSI)/Serial Attached SCSI (SAS)
    HyperTransport
    InfiniBand
    RapidIO
    Mobile Industry Processor Interface (MIPI)
    Coherent Processor Interface (CAPI)
    Plug-n-play
    1-Wire
    Peripheral Component Interconnect (PCI), including embodiments such as, but not limited to, Accelerated Graphics Port (AGP), Peripheral Component Interconnect eXtended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper{Cu} Link]), Express Card, AdvancedTCA, AMC, Universal 10, Thunderbolt/Mini DisplayPort, Mobile PCIe (M-PCIe), U.2, and Non-Volatile Memory Express (NVMe)/Non-Volatile Memory Host Controller Interface Specification (NVMHCIS).
    Industry Standard Architecture (ISA), including embodiments such as, but not limited to Extended ISA (EISA), PC/XT-bus/PC/AT-bus/PC/104 bus (e.g., PC/104-Plus, PCI/104-Express, PCI/104, and PCI-104), and Low Pin Count (LPC).
    Music Instrument Digital Interface (MIDI)
    Universal Serial Bus (USB), including embodiments such as, but not limited to, Media Transfer Protocol (MTP)/ Mobile High-Definition Link (MHL), Device Firmware Upgrade (DFU), wireless USB, InterChip USB, IEEE 1394 Interface/Firewire, Thunderbolt, and eXtensible Host Controller Interface (xHCI).

Consistent with the embodiments of the present disclosure, the aforementioned computing device 2100 may employ hardware integrated circuits that store information for immediate use in the computing device 2100, know to the person having ordinary skill in the art as primary storage or memory 2140. The memory 2140 operates at high speed, distinguishing it from the non-volatile storage sub-module 2161, which may be referred to as secondary or tertiary storage, which provides slow-to-access information but offers higher capacities at lower cost. The contents contained in memory 2140, may be transferred to secondary storage via techniques such as, but not limited to, virtual memory and swap. The memory 2140 may be associated with addressable semiconductor memory, such as integrated circuits consisting of silicon-based transistors, used for example as primary storage but also other purposes in the computing device 2100. The memory 2140 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 2141, Static Random-Access Memory (SRAM) 2142, CPU Cache memory 2125, Advanced Random-Access Memory (A-RAM), and other types of primary storage such as Random-Access Memory (RAM).

Non-volatile memory which can retain stored information even after power is removed, for example, but not limited to, Read-Only Memory (ROM) 2143, Programmable ROM (PROM) 2144, Erasable PROM (EPROM) 2145, Electrically Erasable PROM (EEPROM) 2146 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 2100 may employ the communication system between an information processing system, such as the computing device 2100, and the outside world, for example, but not limited to, human, environment, and another computing device 2100. The aforementioned communication system will be known to a person having ordinary skill in the art as I/O 2160. The I/O module 2160 regulates a plurality of inputs and outputs with regard to the computing device 2100, wherein the inputs are a plurality of signals and data received by the computing device 2100, and the outputs are the plurality of signals and data sent from the computing device 2100. The I/O module 2160 interfaces a plurality of hardware, such as, but not limited to, non-volatile storage 2161, communication devices 2162, sensors 2163, and peripherals 2164. The plurality of hardware is used by the at least one of, but not limited to, human, environment, and another computing device 2100 to communicate with the present computing device 2100. The I/O module 2160 may comprise a plurality of forms, for example, but not limited to channel I/O, port mapped I/O, asynchronous I/O, and Direct Memory Access (DMA).

Consistent with the embodiments of the present disclosure, the aforementioned computing device 2100 may employ the non-volatile storage sub-module 2161, which may be referred to by a person having ordinary skill in the art as one of secondary storage, external memory, tertiary storage, off-line storage, and auxiliary storage. The non-volatile storage sub-module 2161 may not be accessed directly by the CPU 2120 without using intermediate area in the memory 2140. The non-volatile storage sub-module 2161 does not lose data when power is removed and may be two orders of magnitude less costly than storage used in memory module, at the expense of speed and latency. The non-volatile storage sub-module 2161 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (2161) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, CompactFlash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 2100 may employ the communication sub-module 2162 as a subset of the I/O 2160, which may be referred to by a person having ordinary skill in the art as at least one of, but not limited to, computer network, data network, and network. The network allows computing devices 2100 to exchange data using connections, which may be known to a person having ordinary skill in the art as data links, between network nodes. The nodes comprise network computer devices 2100 that originate, route, and terminate data. The nodes are identified by network addresses and can include a plurality of hosts consistent with the embodiments of a computing device 2100. The aforementioned embodiments include, but not limited to personal computers, phones, servers, drones, and networking devices such as, but not limited to, hubs, switches, routers, modems, and firewalls.

Two nodes can be said are networked together, when one computing device 2100 is able to exchange information with the other computing device 2100, whether or not they have a direct connection with each other. The communication sub-module 2162 supports a plurality of applications and services, such as, but not limited to World Wide Web (WWW), digital video and audio, shared use of application and storage computing devices 2100, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 4 [IPv4], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 2162 may comprise a plurality of size, topology, traffic control mechanism and organizational intent. The communication sub-module 2162 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G, 4G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 2100 may employ the sensors sub-module 2163 as a subset of the I/O 2160. The sensors sub-module 2163 comprises at least one of the devices, modules, and subsystems whose purpose is to detect events or changes in its environment and send the information to the computing device 2100. Sensors are sensitive to the measured property, are not sensitive to any property not measured, but may be encountered in its application, and do not significantly influence the measured property. The sensors sub-module 2163 may comprise a plurality of digital devices and analog devices, wherein if an analog device is used, an Analog to Digital (A-to-D) converter must be employed to interface the said device with the computing device 2100. The sensors may be subject to a plurality of deviations that limit sensor accuracy. The sensors sub-module 2163 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nanosensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 2100 may employ the peripherals sub-module 2162 as a subset of the I/O 2160. The peripheral sub-module 2164 comprises ancillary devices uses to put information into and get information out of the computing device 2100. There are 3 categories of devices comprising the peripheral sub-module 2164, which exist based on their relationship with the computing device 2100, input devices, output devices, and input/output devices. Input devices send at least one of data and instructions to the computing device 2100. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 2100. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 2164:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 2100. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 2100 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data Acquisition (DAQ) devices covert at least one of analog signals and physical parameters to digital values for processing by the computing device 2100. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 2162 sub-module), data storage device (non-volatile storage 2161), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

VI. Aspects

The following disclose a first set of Aspects of the present disclosure. The various Aspects are not to be construed as patent aspects unless the language of the Aspect appears as a patent aspect. The Aspects describe various non-limiting embodiments of the present disclosure.

Aspect 1: A method comprising: registering asset data including at least one of the following: a geolocation for physical assets, and a geolocation for virtual assets; receiving media content to be associated with at least one registered asset associated with the registered asset data; specifying a plurality of rules for delivering the media content to a consumer, wherein specifying the plurality of rules comprises: specifying at least a first delivery rule corresponding the consumer's physical location in association with the at least one registered asset; specifying at least a second delivery rule corresponding to at least one element of profile data associated with the consumer; and specifying at least a third delivery rule corresponding to at least one physical action performed by the consumer; delivering the media content to a device associated with the consumer upon the first delivery rule and the second delivery rule being satisfied; comparing a physical action with the third delivery rule in order to determine whether to deliver additional media content to the consumer; and delivering the additional media content to the device based on the comparing the physical action with the third delivery rule.

Aspect 2: The method of any preceding aspect, wherein the media content is configured to operate with a content interaction layer to facilitate interacting with a consumer in conjunction with the media content.

Aspect 3: The method of any preceding aspect, further comprising: receiving an indication of engagement with the media content through the content interaction layer; and compiling analytics based on the indication of engagement with the media content.

Aspect 4: The method of any preceding aspect, wherein the media content is configured to operate with a consumer tracking layer to facilitate tracking the consumer in conjunction with the media content.

Aspect 5: The method of any preceding aspect, further comprising: tracking the consumer by accessing a database and retrieving location data; determining that the consumer is in a spatial proximity to a registered asset based on the tracking; and delivering the additional media content to the device based on the determining.

Aspect 6: The method of any preceding aspect, wherein the consumer tracking layer is configured to track at least one of the following: location data, sensor data, telemetry data, device usage data, and a unique identifier.

Aspect 7: The method of any preceding aspect, wherein the additional media content is associated with interacting within a physical location associated with the at least one registered asset.

Aspect 8: The method of any preceding aspect, wherein the additional media content is associated the geofence surrounding the at least one registered asset.

Aspect 9: The method of any preceding aspect, wherein specifying the third delivery rule comprises specifying that the consumer is present within the geofence.

Aspect 10: The method of any preceding aspect, wherein specifying the third delivery rule comprises specifying that the consumer has interacted with the media content within a predetermined timeframe.

Aspect 11: The method of any preceding aspect, wherein specifying the second delivery rule comprises one of: specifying an amount of time any consumer can be delivered the media content; specifying times of day any consumer can be delivered the media content; and specifying a number of times a particular consumer can receive the media content.

Aspect 12: The method of any preceding aspect, wherein delivering the media content comprises engaging a transmission module configured to transmit the media content when the consumer is within a physical proximity to a registered asset.

Aspect 13: The method of any preceding aspect, further comprising suppressing third party media content when the consumer is within a physical proximity to a registered asset.

Aspect 14: The method of any preceding aspect, wherein delivering the media content comprises engaging a transmission module configured to transmit the media content when the consumer is within a physical proximity to a third party asset.

Aspect 15: The method of any preceding aspect, further comprising compiling analytics based on an indication of engagement with the media content, the analytics comprising at least one of the following: a number of consumer visits within a physical proximity to a registered asset; a frequency of visits of consumers having the media content and within a physical proximity to a registered asset; an amount of time one or more consumers dwell within a physical proximity to a registered asset; and a consumer-specific frequency of visits within a physical proximity to a registered asset.

Aspect 16: The method of any preceding aspect, wherein delivering the media content comprises engaging a transmission module configured to transmit at least one of the following: multiple different media contents when the consumer is within a physical proximity to a registered asset; and a single media content when the consumer is within a physical proximity to one or more different registered assets.

Aspect 17: The method of any preceding aspect, wherein the first delivery rule and the second delivery rule being satisfied comprises at least one of the following: receiving a designation of a space and a time; and determining that the consumer is in a proximity to the designated space at the designated time.

Aspect 18: The method of any preceding aspect, further comprising specifying, for the delivered media content, interactivity criteria.

Aspect 19: The method of any preceding aspect, further comprising: receiving an indication that the consumer is engaged in a potential fulfillment of the interactivity criteria, wherein receiving the indication comprises receiving the indication that the consumer is moving at a particular path, towards a physical location, and within a designated period of time.

Aspect 20: The method of any preceding aspect, wherein the interactivity criteria is configured to be associated with: a change in a physical location associated with the consumer; a particular destination to which the consumer navigates; and a particular time period in which the consumer must fulfill the interactivity criteria.

Aspect 21: The method of any preceding aspect, further comprising providing, upon a fulfillment of the interactivity criteria: a modification of the delivered media content and a tracking of the consumer's activity as it relates to the interactivity criteria with additional media content when interactivity criteria is met.

Aspect 22: The method of any preceding aspect 18, further comprising providing, upon a fulfillment of the interactivity criteria: replacing the delivered media content and a tracking of the consumer's activity as it relates to the interactivity criteria with new media content when interactivity criteria is met.

Aspect 23: The method of any preceding aspect, wherein the interactivity criteria comprises at least one of the following: an amount of consumer interactions with a user interface related to the delivered media content; a threshold amount of time a consumer views the delivered media content; a request to purchase a good or service associated with the delivered media content; and a purchase of a good or service associated with the delivered media content.

Aspect 24: The method of any preceding aspect, wherein specifying the second delivery rule comprises specifying that the at least one element of profile data is related to the interactivity criteria.

Aspect 25: The method of any preceding aspect, wherein specifying the second delivery rule comprises specifying that the at least one element of profile data is an unpurchased good or service from previous interactivity, and the additional media content is an offer to purchase the unpurchased good or service.

Aspect 26: The method of any preceding aspect, wherein the unpurchased good or service is related to a first entity and the offer to purchase is related to a second entity.

Aspect 27: The method of any preceding aspect, wherein specifying the second delivery rule comprises specifying that the at least one element of profile data is one or more of the following: previous interactivity; consumer demographics; consumer location history; and consumer preferences.

The following disclose a second set of aspects of the present disclosure. The second set of aspects are not to be construed as patent claims unless the language of the aspect appears as a patent claim. The second set of aspects describe various non-limiting embodiments of the present disclosure.

Aspect 1: A method, comprising: defining at least one of the following for a registered asset: a geolocation for physical assets, and a geolocation for virtual assets; defining media content associated with the registered asset, the media content comprising a first message and a second message; defining a consumer audience segment to be delivered the media content, the consumer audience segment being further defined by a set of rules, the set of rules comprising: a first delivery rule corresponding a consumer's physical location in association with the at least one registered asset; and a second delivery rule corresponding to at least one physical action performed by the consumer; delivering the first message to a device associated with the consumer upon the first delivery rule being satisfied; and delivering the second message to the device upon the second delivery rule being satisfied.

Aspect 2: The method of any preceding aspect, wherein the media content further comprises a promotion, and wherein the set of rules further comprises a third delivery rule corresponding to a consumer's physical location after delivery of the second message, the method further comprising: delivering the promotion to the device upon the third delivery rule being satisfied.

Aspect 3: The method of any preceding aspect, wherein the media content further comprises a plurality of additional messages, the method further comprising: delivering at least one message of the plurality of additional messages based on additional physical actions performed by the consumer.

Aspect 4: The method of any preceding aspect, wherein the consumer audience segment is further defined by at least one of the following: an amount of time any consumer can be delivered the media content; times of day any consumer can be delivered the media content; and a number of times a particular consumer can receive the media content.

Aspect 5: The method of any preceding aspect, wherein the at least one physical action performed by the consumer is at least one of the following: traveling to a physical location associated with the first message and the second message; traveling to a physical location that is not associated with the first message and the second message; traveling within a threshold distance to a physical location associated with the first message and the second message; and traveling within a threshold distance to a physical location associated with the first message and the second message over a threshold amount of time.

Aspect 6: The method of any preceding aspect, further comprising compiling analytics based on consumer interactivity with the media content.

Aspect 7: The method of any preceding aspect, wherein the analytics comprise at least one of the following: consumer demographics; previous visits to a physical location associated with the registered asset; previous interactivity with the media content while visiting the physical location associated with the registered asset; and previous interactivity with the media content while within a threshold distance to the physical location associated with the registered asset.

The following disclose a third set of aspects of the present disclosure. The third set of aspects are not to be construed as patent claims unless the language of the aspect appears as a patent claim. The third set of aspects describe various non-limiting embodiments of the present disclosure.

Aspect 1: A method comprising: registering a location of an advertisement asset, the advertisement asset having media content associated with an advertisement campaign; tagging a mobile computing device associated with a consumer based on the location of the advertisement asset in relation to the mobile computing device; tracking a consumer action performed subsequent to the tagging of the mobile computing device; and delivering a media content to the mobile computing device, the media content being displayed based on a consumer profile data associated with the consumer and the tracked consumer action.

Aspect 2: The method of any preceding aspect, wherein the advertisement asset is a mobile asset configured to travel within a geographical area and configured to be tracked within the geographical area.

Aspect 3: The method of any preceding aspect, wherein the mobile asset comprises an advertisement associated with the advertisement campaign being displayed thereon.

Aspect 4: The method of any preceding aspect, wherein the tracked consumer action is comprised of two or more of: the consumer traversing a geofence border; the profile data matching a predetermined demographic; the consumer avoiding a geofence border; an amount of time expiring; the consumer attending a specific social event; and the consumer interacting with the media content.

Aspect 5: The method of any preceding aspect, wherein the geofence border encompasses a retail store or encompasses a social event.

Aspect 6: The method of any preceding aspect, wherein the predetermined demographic comprises one of the following: consumers associated with attending a social event; consumers who historically have shopped at a retail store; and consumers who historically have shopped at an ecommerce website.

Aspect 7: The method of any preceding aspect, wherein the consumers who historically have shopped at an ecommerce website include consumers who have not completed a purchase at the ecommerce website.

Aspect 8: The method of any preceding aspect, wherein the media content comprises an advertisement of discounted goods that were not purchased at the ecommerce website.

Aspect 9: The method of any preceding aspect, wherein the consumer interacting with the media content includes a consumer who has expressly selected an interest in the media content.

Aspect 10: The method of any preceding aspect, wherein the media content is first media content, the method further comprising, when the consumer has avoided the geofence border, delivering second media content to the mobile computing device comprising a promotion associated with traversing the geofence border at a predetermined time.

Aspect 11: The method of any preceding aspect, wherein the media content is first media content, the method further comprising, when the predetermined time has expired, delivering second media content to the mobile computing device comprising an advertisement of a promotion associated with performing an interaction with the first media content in the future.

Aspect 12: The method of any preceding aspect, wherein the tracked consumer action is activity data associated with the mobile computing device.

Aspect 13: The method of any preceding aspect, wherein the activity data comprises compiled analytics based on consumer interaction with an application associated with a brand asset.

Aspect 14: The method of any preceding aspect, wherein the compiled analytics includes data measurements of: an amount of time a consumer spent traversing a particular web page; an amount of time a consumer spent on a single user interface element of a particular web page or a particular application; an amount of clicks a consumer initiated with a brand asset or a particular product; a number of occurrences a consumer revisited a particular webpage; a number of occurrences a consumer revisited a particular application; and an amount of time a consumer spent utilizing a particular application.

Aspect 15: The method of any preceding aspect, wherein the activity data comprises data indicating a consumer placed one or more products in a virtual shopping cart that were not purchased through an ecommerce website.

Aspect 16: The method of any preceding aspect, wherein the one or more products are associated with both the ecommerce website and a physical retail location.

Aspect 17: The method of any preceding aspect, wherein the tracked consumer action comprises a consumer traversing a geofence border encompassing the physical retail location associated with the one or more products.

Aspect 18: The method of any preceding aspect, wherein the media content comprises an advertisement or promotion associated with the one or more products or the physical retail location.

Aspect 19: The method of any preceding aspect, wherein the media content comprises a graphical reminder that the one or more products are available for purchase at the physical retail location.

Aspect 20: The method of any preceding aspect, wherein the media content comprises a unique promotion for at least one of the one or more products based on the consumer profile data.

Aspect 21: The method of any preceding aspect, wherein the consumer profile data is associated with an online profile of the consumer, and the media content is uniquely tailored to display on the mobile computing device based on the online profile.

Aspect 22: The method of any preceding aspect, wherein the advertisement campaign is associated with a particular social event.

Aspect 23: The method of any preceding aspect, wherein media content is further associated with the particular social event.

Aspect 24: The method of any preceding aspect, wherein the tracked consumer action is the consumer leaving the particular social event.

Aspect 25: The method of any preceding aspect, wherein the media content is an advertisement associated with a promotion of a second location within a predetermined distance from the particular social event.

Aspect 26: The method of any preceding aspect, wherein the promotion of the second location includes an expiration date associated with a duration of the particular social event.

The following disclose a fourth set of aspects of the present disclosure. The fourth set of aspects are not to be construed as patent claims unless the language of the aspect appears as a patent claim. The fourth set of aspects describe various non-limiting embodiments of the present disclosure.

Aspect 1: Any software and/or hardware combination that provides geolocation based content distribution based on at least three rules: 1) user is in geolocation one; 2) user has a profile (segmentation of the user) that matches campaign criteria; and 3) user goes from the first geolocation to a secondary location.

Aspect 2: Any software and/or hardware combination that provides geolocation based content distribution based on at least three rules: 1) user is in geolocation one; 2) the timing of this event matches campaign criteria; and 3) user goes from the first geolocation to a secondary location.

Aspect 3: Any software and/or hardware combination that provides content based on at least two rules:
user is at a first geolocation;
user has a profile (segmentation of the user) that matches campaign criteria; and
the software then updates the content based on one rule:
user goes from the first geolocation to a secondary geolocation.

Aspect 4: Any software and/or hardware combination that enables:
specifying a first geolocation for a content campaign;
associating media content to be transmitted as part of the campaign;
defining rules for transmitting the media content: a first rule is associated the user profile (e.g., demographics, segment, age, gender, etc.); a second rule is associated with a second triggering event (e.g., a second location that the user navigates to after passing the first geolocation that triggers the event);

receiving an indication that the user is in the first geolocation associated with the content campaign;

checking against the first rule for transmitting the media content;

tracking the user to see if they navigate to second geolocation associated with the second rule; and transmitting the media content when the first rule and the second rule is met.

Aspect 5: Any software and/or hardware combination that enables:

specifying a first geolocation for a content campaign;

associating media content to be transmitted as part of the campaign;

defining rules for transmitting the media content: a first rule may be associated a period of time (e.g., hours in a day, days of week, time of event, etc.); a second rule may be associated with a second triggering event (e.g., a second location that the user navigates to after passing the first geolocation that triggers the event);

receiving an indication that the user is in the first geolocation associated with the content campaign;

checking against the first rule for transmitting the media content;

tracking the user to see if they navigate to second geolocation associated with the second rule; and transmitting the media content when the first rule and the second rule is met.

Aspect 6: Any software and/or hardware combination that enables:

specifying a geolocation for a content campaign, the geolocation may correspond to any one of the following: a physical object (e.g., a billboard); any geographical coordinates (e.g., any point in space); a mobile object (e.g., a moving bus);

associating media content to be transmitted as part of the campaign; the user may click or otherwise interact with the media content; or the user's device may track the user's activity/location when the media content is received;

defining rules for transmitting the media content: a first rule may be associated the user profile (e.g., demographics, segment, age, gender, etc.); a second rule may be associated with a second triggering event (e.g., a second location that the user navigates to after passing the first geolocation that triggers the event);

receiving an indication that the user is in a geolocation associated with a content campaign;

checking against the first rule for transmitting the media content;

transmitting the media content when the first rule is met;

tracking the user to see if they navigate to second geolocation associated with the second rule; and updating the media content when the second rule is met.

Aspect 7: Any software and/or hardware combination that is configured to:

check for at least three conditions tied to an end-user's mobile device: a) was at a first location (e.g., geolocation), b) traveled to a second location, c) within a period of time;

send the consumer content associated with a campaign tied to that geolocation; and provide an administrative user interface where an administrative user can:

define the campaign (i.e., geolocation, the content, and the delivery conditions), or manage the various geolocations (e.g., turn the campaigns on or off).

Aspect 8: Any software and/or hardware combination that is configured to:

check for at least three conditions tied to an end-user's mobile device:

was at a first location (e.g., geolocation), traveled to a second location, within a period of time;

send the consumer content associated with a campaign tied to that geolocation; and provide an administrative user interface where an administrative user can:

define the campaign (i.e., geolocation, the content, and the delivery conditions), manage the various geolocations (e.g., turn the campaigns on or off), or see statistics associated with each campaign (tracking data, interactivity data, analytics).

Aspect 9: Any software and/or hardware combination that is configured to:

check for at least three conditions tied to an end-user's mobile device:

was at a first location (e.g., geolocation), traveled to a second location, within a period of time;

send the consumer content associated with a campaign tied to that geolocation; and uses any of the following technology:

a beacon tied to a geolocation (e.g., billboard), or a centralized computing server (cloud) receiving the end-user's location data.

The following disclose a fifth set of aspects of the present disclosure. The fifth set of aspects are not to be construed as patent claims unless the language of the Aspect appears as a patent claim. The fifth set of aspects describe various non-limiting embodiments of the present disclosure.

Aspect 1. A method comprising:

specifying a content distribution campaign, the content distribution campaign comprising;

a geolocation, and media content associated with the geolocation;

specifying a plurality of rules for the content distribution campaign, wherein specifying the plurality of rules comprises:

specifying a first rule corresponding to a period of time, specifying a second rule corresponding to at least one element of profile data associated with a consumer, and specifying a third rule corresponding to a course of travel associated with the consumer;

receiving a first indication that the consumer is at a first location within a radius of the geolocation;

assessing, in response to the first indication, the at least one element of profile data associated with the consumer;

receiving a second indication that the consumer is at a second location;

determining the course of travel based, at least in part, on an analysis of the first location and the second location; and establishing that the consumer is eligible for the content distribution campaign when the plurality of rules is satisfied.

Aspect 2. The method of any of the aspects, wherein specifying the third rule corresponding to the course of travel associated with the consumer comprises specifying a destination as the second location.

Aspect 3. The method of any of the aspects, further comprising providing a first aspect of the media content associated with the content distribution campaign when the following delivery rules are satisfied:

the first rule corresponding to the period of time, and the second rule corresponding to the at least one element of profile data associated with the consumer.

Aspect 4. The method of any of the aspects, further comprising tracking the consumer during the course of travel.

Aspect 5. The method of any of the aspects, further comprising providing a second aspect of the media content associated with the content distribution campaign when the third rule associated with the second location is satisfied.

Aspect 6. The method of any of the aspects, further comprising, receiving a third indication that the consumer has interacted with the first aspect of the media content during the course of travel.

Aspect 7. The method of any of the aspects, wherein specifying the first rule comprises specifying a limited timeframe, during the course of travel, in which the consumer has to interact with the first aspect of the media content.

Aspect 8. The method of any of the aspects, further comprising tracking the consumer during the course of travel in response to the third indication.

Aspect 9. The method of any of the aspects, wherein tracking the consumer during the course of travel comprises receiving, from a mobile computing device associated with the consumer, at least one of the following:
location data,
sensor data,
telemetry data,
device usage data, and
a unique identifier.

Aspect 10. The method of any of the aspects, further comprising providing a second aspect of the media content associated with the content distribution campaign when the third rule associated with the second location is satisfied.

Aspect 11. The method of any of the aspects, wherein specifying the first rule comprises specifying a limited timeframe, during the course of travel, in which the consumer is eligible to receive the media content associated with the content distribution campaign.

Aspect 12. The method of any of the aspects, wherein specifying the first rule comprises specifying a limited timeframe, during the course of travel, in which the consumer is eligible to receive a second aspect of the media content associated with the content distribution campaign.

The following disclose a sixth set of aspects of the present disclosure. The sixth set of aspects are not to be construed as patent claims unless the language of the aspect appears as a patent claim. The sixth set of aspects describe various non-limiting embodiments of the present disclosure.

Aspect 1. A method comprising:
specifying a content distribution campaign comprising media content associated with a geolocation;
specifying a plurality of rules for the content distribution campaign, wherein specifying the plurality of rules comprises:
specifying the geolocation,
specifying a period of time, and
specifying at least one action to be performed by a consumer;
receiving a first indication that the consumer is within a radius of the geolocation;
tracking the consumer in response to receiving the first indication to determine whether the consumer has performed the at least one action; and
establishing that the consumer is eligible for the content distribution campaign when the plurality of rules is satisfied.

Aspect 2. The method of any of the aspects, wherein specifying the at least one action comprises specifying at least one of the following:
a target destination; and
a particular path towards the target destination.

Aspect 3. The method of any of the aspects, further comprising:
receiving a second indication that the consumer is engaged in a potential fulfillment of the at least one action.

Aspect 4. The method of any of the aspects, wherein receiving the second indication comprises establishing that the consumer is performing at least one of the following actions: moving at a particular path, towards a target destination, and within the period of time.

Aspect 5. The method of any of the aspects, further comprising:
providing a first aspect of the media content in response to the first indication.

Aspect 6. The method of any of the aspects, further comprising providing, upon a fulfillment of the at least one action, a second aspect of the media content.

Aspect 7. The method of any of the aspects, wherein the second aspect of the media content comprises a modification of the first aspect of the media content.

The following disclose a seventh set of aspects of the present disclosure. The seventh set of aspects are not to be construed as patent claims unless the language of the aspect appears as a patent claim. The seventh set of aspects describe various non-limiting embodiments of the present disclosure.

Aspect 1. A method, comprising:
defining at least one of the following for a registered asset:
a physical asset, and
a virtual asset;
defining a media content associated with the registered asset, the media content comprising a first message and a second message;
defining a consumer audience segment to be delivered the media content;
defining a set of rules for providing the media content to the consumer audience segment, the set of rules comprising:
a first rule corresponding a consumer's location in association with the registered asset, and
a second rule corresponding to at least one action performed by a consumer during a course of travel related to the consumer's location in association with the registered asset;
receiving a first determination that the first rule has been satisfied;
associating the first message with the consumer upon the first rule being satisfied;
receiving a second determination that the second rule has been satisfied; and
associating the second message with the consumer upon the second rule being satisfied.

Aspect 2. The method of any of the aspects, wherein defining the set of rules further comprises defining at least one additional rule specifying the following:
the consumer's relative presence at a first location associated a delivery of the first message;
the consumer's relative presence at a second location associated with a delivery of the second message;
the consumer's path from the first location to the second location; and
a period of time in which the consumer traveled from the first location to the second location.

Aspect 3. The method of any of the aspects, further comprising providing the media content to the consumer.

Aspect 4. The method of any of the aspects, wherein providing the media content comprises:
providing the first message when the at least one additional rule has not been satisfied, and
providing the second message when the at least one additional rule has been satisfied.

The following disclose an eighth set of aspects of the present disclosure. The eighth set of aspects are not to be construed as patent claims unless the language of the aspect appears as a patent claim. The eighth set of aspects describe various non-limiting embodiments of the present disclosure.

Aspect 1. A method comprising:
receiving a specification of a geolocation, the specification comprising a radius defining a region of the geolocation;
receiving content to be associated with the geolocation;
associating the geolocation with the content;
defining a delivery condition for delivering the content, the delivery condition comprising a course of travel of a mobile computing device;
receiving a first indication from the mobile computing device, the first indication being associated with a first location of the mobile computing device;
determining that the first location is within the radius of the geolocation associated with the content;
receiving a second indication from the mobile computing device, the second indication being associated with a second location of the mobile computing device;
determining the course of travel of the mobile computing device based on a comparison of the first location to the second location; and
transmitting, when the delivery condition is met, the content associated with the geolocation.

Aspect 2. The method of any of the aspects, wherein associating the geolocation with the content comprises associating the geolocation with at least one of the following: a tradition signage, a digital signage and a virtual signage.

Aspect 3. The method of any of the aspects, wherein receiving the content comprises receiving each of the following: an advertisement content, a category associated with the advertisement content, an optical code, a promotional code, an expiration date associated with the promotional code and a URL of a webpage.

Aspect 4. The method of any of the aspects, wherein receiving the content comprises receiving at least one of the following: a text, an image, an audio and a video.

Aspect 5. The method of any of the aspects, further comprising:
defining a market segment for the content;
determining if a user of the mobile computing device corresponds to the market segment, and
wherein transmitting the content comprises transmitting the content when the market segment and the user segment align.

Aspect 6. The method of any of the aspects, wherein receiving the content comprises receiving a URL of a webpage, the URL being uniquely associated with the geolocation.

Aspect 7. The method of any of the aspects further comprising transmitting a cookie to the mobile computing device associated with the user when it is determined that the user has accessed the URL.

Aspect 8. The method of any of the aspects, further comprising generating advertisement statistics based on the mobile computing device's access of the URL.

Aspect 9. The method of any of the aspects, wherein generating the advertisement statistics comprises generating at least one of the following statistics: a number of views of the content, a number of actions performed on the content, a number of saves performed on the content, and a number of shares performed on the content.

Aspect 10. The method of any of the aspects, wherein receiving the first indication and receiving the second indication of the mobile computing device comprises receiving the first location and receiving the second location from a communication interface having a long-range communication interface configured to provide communication between a platform for geolocation and time-based advertising.

Aspect 11. The method of any of the aspects, wherein receiving the first indication and receiving the second indication of the mobile computing device comprises receiving the first location and receiving the second location from a communication interface comprised of at least one of the following: a short range communication interface and a long range communication interface, wherein the long range communication interface is configured to provide communication between a platform for geolocation and time-based advertising and the mobile computing device, wherein the short range communication interface is configured to provide communication between a beacon and the mobile computing device, wherein the beacon is located in a vicinity of the geolocation.

Aspect 12. The method of any of the aspects, wherein receiving the first indication and receiving the second indication from the mobile computing device comprises receiving the first location and receiving the second location from the mobile computing device comprising a vehicle navigation system, the vehicle navigation system being configured to provide a map of proximate content.

The following disclose a ninth set of aspects of the present disclosure. The ninth set of aspects are not to be construed as patent claims unless the language of the aspect appears as a patent claim. The ninth set of aspects describe various non-limiting embodiments of the present disclosure.

Aspect 1. A computer-readable medium comprising a set of instructions which, when executed, are configured to perform a method, the method comprising:
establishing a geolocation for content distribution, the content distribution being based on at least the following content distribution conditions:
the geolocation at which a consumer has been located, and
a course of travel of the consumer after the consumer has been located at the geolocation;
receiving an initial location of the consumer within the geolocation;
identifying the consumer as a prospect for the content distribution;
receiving a subsequent location of the consumer;
comparing the subsequent location with the initial location;
determining the course of travel based on the comparison; and
establishing the consumer as a target for the content distribution when the content distribution conditions have been met.

Aspect 2. The computer-readable medium of any of the aspects, wherein establishing the geolocation comprises associating the geolocation with at least one of the following: a traditional signage, a digital signage, and a virtual signage.

Aspect 3. The computer-readable medium of any of the aspects, wherein the content distribution is based on at least one of the following additional conditions:
a period of time, and
a profile of the consumer.

Aspect 4. The computer-readable medium of any of the aspects, further comprising delivering, to the consumer, content associated with the content distribution to the consumer.

Aspect 5. The computer-readable medium of any of the aspects, further comprising tracking the consumer during the course of travel.

Aspect 6. The computer-readable medium of any of the aspects, further comprising providing a user interface for viewing statistics associated with the content distribution.

Aspect 7. The computer-readable medium of any of the aspects, further comprising providing a user interface configured for:

associating the geolocation with the content distribution, and defining the content distribution conditions.

The following disclose a tenth set of aspects of the present disclosure. The tenth set of aspects are not to be construed as patent claims unless the language of the aspect appears as a patent claim. The tenth set of aspects describe various non-limiting embodiments of the present disclosure.

Aspect 1. A method comprising:

establishing a geolocation for content distribution, the content distribution being based on at least the following content distribution conditions:

a characteristic of a consumer, a period of time, the geolocation at which the consumer is located, and a course of travel of the consumer;

receiving an initial location of the consumer within the geolocation;

determining whether the consumer was within the geolocation within the period of time;

retrieving the characteristic of the consumer;

determining whether the characteristic of the consumer matches at least one of the content distribution conditions;

identifying the consumer as a prospect for the content distribution;

receiving a subsequent location of the consumer;

comparing the subsequent location with the initial location;

determining the course of travel based on the comparison; and establishing the consumer as a target for the content distribution.

Aspect 2. Software comprising geolocation based content distribution based on three rules:

user is in geolocation one;

user has a profile (segmentation of the user) that matches campaign criteria; and user goes from the first geolocation to a secondary location.

Aspect 3. Software comprising geolocation based content distribution based on three rules:

user is in geolocation one;

the timing of this event matches campaign criteria; and user goes from the first geolocation to a secondary location.

Aspect 4. A software that sends a content based on two rules:

user is in geolocation one;

user has a profile (segmentation of the user) that matches campaign criteria;

and the software then updates the content based on one rule:

user goes from the first geolocation to a secondary location.

Aspect 5. Software comprising:

specify a first geolocation for a content campaign;

associate media content to be transmitted as part of the campaign;

define rules for transmitting the media content:

a first rule is associated the user profile (e.g., demographics, segment, age, gender, etc.);

a second rule is associated with a second triggering event (e.g., a second location that the user navigates to after passing the first geolocation that triggers the event);

receiving an indication that the user is in the first geolocation associated with the content campaign;

check against the first rule for transmitting the media content;

track the user to see if they navigate to second geolocation associated with the second rule; and transmit the media content when the first rule and the second rule is met.

Aspect 6. A software configured to:

specify a first geolocation for a content campaign;

associate media content to be transmitted as part of the campaign;

define rules for transmitting the media content;

a first rule is associated a period of time (e.g., hours in a day, days of week, time of event, etc.);

a second rule is associated with a second triggering event (e.g., a second location that the user navigates to after passing the first geolocation that triggers the event);

receiving an indication that the user is in the first geolocation associated with the content campaign;

check against the first rule for transmitting the media content;

track the user to see if they navigate to second geolocation associated with the second rule; and transmit the media content when the first rule and the second rule is met.

Aspect 7. A software configured to:

specify a geolocation for a content campaign;

can correspond to any one of the following:

physical object (billboard);

any geographical coordinates (any point in space);

a mobile object (e.g., moving bus);

associate media content to be transmitted as part of the campaign;

the user can click or otherwise interact with the media content;

the user's device can track the user's activity/location when the media content is received;

define rules for transmitting the media content:

a first rule is associated the user profile (e.g., demographics, segment, age, gender, etc.);

a second rule is associated with a second triggering event (e.g., a second location that the user navigates to after passing the first geolocation that triggers the event);

receiving an indication that the user is in a geolocation associated with a content campaign;

check against the first rule for transmitting the media content;

transmit the media content when the first rule is met;

track the user to see if they navigate to second geolocation associated with the second rule; and update the media content when the second rule is met.

Aspect 8. A software that is configured to:

check for three conditions tied to an end-user's mobile device:

was at a first location (e.g., geolocation), traveled to a second location, within a period of time, send the consumer content associated with a campaign tied to that geolocation; and provide an administrative user interface where an administrative user can:
define the campaign (i.e., geolocation, the content, and the delivery conditions), and
manage the various geolocations (turn the campaigns on or off).

Aspect 9. A software that is configured to:
check for three conditions tied to an end-user's mobile device:
was at a first location (e.g., geolocation),
traveled to a second location,
within a period of time,
send the consumer content associated with a campaign tied to that geolocation; and
provide an administrative user interface where an administrative user can:
define the campaign (i.e., geolocation, the content, and the delivery conditions),
manage the various geolocations (turn the campaigns on or off), and
see statistics associated with each campaign (tracking data, interactivity data, analytics).

Aspect 10. A hardware system that is configured to:
check for three conditions tied to an end-user's mobile device:
was at a first location (e.g., geolocation),
traveled to a second location,
within a period of time,
send the consumer content associated with a campaign tied to that geolocation; and
use any of the following technology:
a beacon tied to a geolocation (e.g., billboard), OR
a centralized computing server (cloud) receiving the end-user's location data.

Aspect 11. A system comprising:
A client device configured for:
receiving advertisement content,
associating first geolocation with advertisement content,
dep first geolocation has a radius centered on the first geolocation
variation 2: specifying direction of travel for visibility of content,
dep: client device comprises long range communication interface (telecom),
dep: short range communication interface (beacon),
dep: GUI for:
uploading content,
editing content,
dep: adding:
optical code,
QR code,
promo code,
link.
A server device configured for:
receiving a second geolocation from a mobile device,
comparing the second geolocation with the first location,
dep: determining if it falls within the radius,
variation 1: receiving direction of travel from phone,
variation 1b: receiving motion information from phone,
variation 2: determining direction of travel of the mobile device relative to the first geolocation,
variation 3: transmitting ad based on the comparison,
variation 4: determining that the digital signage is not intended to be visible for a user,
dep: checking demographic information before transmission,
dep: storing association of the first geolocation and the content,
dep: generating a URL associated with the content,
dep: tracking consumption of the content,
dep: wherein tracking consumption=detecting access to URL,
dep: tracking user activity subsequent to the consumption,
dep: generating analytics.
A mobile device configured for:
dep: smartphone or in-vehicle system,
transmitting location second geolocation,
variation 1a: transmitting motion information,
variation 1b: transmitting direction of travel information,
variation 2: transmitting location second point
receiving content,
dep: client device comprises long range communication interface (telecom),
dep: short range communication interface (beacon),
dep: view content,
dep: display categories of content.

The following disclose an eleventh set of aspects of the present disclosure. The eleventh set of aspects are not to be construed as patent claims unless the language of the aspect appears as a patent claim. The eleventh set of aspects describe various non-limiting embodiments of the present disclosure.

Aspect 1. Any software/hardware combination that performs the following stages:
Defining a Course of Travel relative to a Geolocation;
Specifying Content to be delivered during the course of travel;
Determining a consumer's course of travel by detecting the consumer; and
Transmitting the Specified Content.

Aspect 2. Any software/hardware combination that performs the following stages:
Establishing a time and location based content distribution campaign based on:
a geolocation, and
a course of travel after a consumer was at the geolocation;
Identifying a consumer at the geolocation;
Tracking the consumer's course of travel; and
Qualifying the consumer as a target for the campaign.

Aspect 3. Any software/hardware combination that performs the following stages:
Establishing a time and location based content distribution campaign based on:
a consumer profile,
a geolocation; and
a course of travel after a consumer was at the geolocation;
Receiving an initial location of a consumer within the geolocation;
Checking if the consumer profile matches;
Tracking the consumers course of travel; and
Qualifying the consumer as a target for the campaign.

Aspect 4. Any software/hardware combination that performs the following stages:
Establishing a time and location based content distribution campaign based on the following parameters:
a course of travel associated with the consumer, and
a consumer profile;
Detecting a Consumer at a First Location, then
determining if consumer profile matches the campaign parameters;
Detecting a Consumer at a Second Location, then
determining if course of travel of the consumer matches the campaign parameters; and Qualifying the Consumer for the Content Distribution campaign.

Aspect 5. A software/hardware combination that performs the following stages:

Establishing a time and location based content distribution campaign based on:
  a location, and
  a physical action;
Detecting a Consumer at a First Location, then
Tracking the Consumer to See if They performed a Physical Action; and
Qualifying the Consumer for the Content Distribution campaign.

Aspect 6. Any software/hardware combination that performs the following stages:

Establishing a time and location based content distribution campaign based on:
  A geolocation:
    May Correspond to a Physical Place (Billboard), or
    May be any arbitrary point in space,
  A consumer audience segment,
  An action the consumer must perform during a course of travel,
  A first message to be delivered at the geolocation,
  A second message to be delivered during the course of travel;
Receiving an indication that a consumer is at the geolocation,
  qualifying the consumer for delivery of the first message; and
Receiving an indication that the consumer is performing the action specified by the campaign parameters,
  qualifying the consumer for delivery of the second message.

The following disclose a twelfth set of aspects of the present disclosure. The twelfth set of aspects are not to be construed as patent claims unless the language of the aspect appears as a patent claim. The twelfth set of aspects describe various non-limiting embodiments of the present disclosure.

Aspect 1. A method of geolocation and time-based content provision, the method comprising:
  associating content with a geolocation, wherein associating the content with the geolocation comprises:
    receiving a specification of the geolocation, the specification including a radius defining a region of the geolocation,
    receiving the content to be associated with the geolocation,
    associating the geolocation with the content,
    storing each of the geolocation, the content, and the association,
    providing an interface configured to display the following:
      the geolocation,
      the content associated with to the geolocation, and
      analytics associated with the content and the geolocation, and
    providing administrative controls associated with the geolocation, wherein providing the administrative controls comprises the following:
      enabling a delivery of the content associated with the geolocation,
      disabling the delivery of the content associated with the geolocation, and
      defining a delivery condition for delivering the content, the delivery condition comprising a period of time and a motion during a course of travel of the mobile computing device from a first location to a second location;
  receiving a first indication from the mobile computing device, wherein receiving the first indication comprises receiving the first location of the mobile computing device;
  determining that the first location is within a radius of the geolocation associated with the content;
  tracking the mobile computing in response to the first indication, wherein tracking the mobile computing device comprises tracking the mobile computing device during the course of travel;
  receiving a second indication from the mobile computing device, wherein receiving the second indication comprises receiving the second location from the mobile computing device during the course of travel;
  comparing the second location with the first location;
  determining the motion of the mobile device during the course of travel from the first location to the second location based on the comparison; and
  transmitting, when the delivery condition is met, the content to the mobile computing device.

Aspect 2. The method of any preceding aspect, wherein associating the geolocation with the content comprises associating the geolocation with at least one of the following: a tradition signage, a digital signage and a virtual signage.

Aspect 3. The method of any preceding aspect, wherein receiving the content comprises receiving each of the following: an advertisement content, a category associated with the advertisement, an optical code, a promotional code, an expiration date associated with the promotional code and a URL of a webpage, wherein the method further comprises:
  receiving the advertisement content, the advertisement comprising at least one of the following: a text, an image, an audio and a video;
  receiving the category;
  receiving the optical code;
  receiving each of the promotional code and the expiration date; and
  receiving the URL.

Aspect 4. The method of any preceding aspect, further comprising:
  identifying the category based on a user of the mobile computing device; and
  displaying the advertisement content associated with the category.

Aspect 5. The method of any preceding aspect, wherein receiving the content comprises receiving a URL of a webpage, the URL being uniquely associated with the geolocation, wherein the method further comprises:
  receiving the URL from the mobile computing device; and
  detecting a consumption of the content by the mobile computing device based on receiving the URL.

Aspect 6. The method of any preceding aspect, further comprising transmitting cookie to the mobile computing device, wherein the cookie is configured to track user activity on the mobile computing device.

Aspect 7. The method of any preceding aspect, further comprising generating advertisement statistics based on detecting the consumption of the content, Aspect 8. The method of any preceding aspect, wherein generating the advertisement statistics comprises generating at least one of the following statistics: a number of views of the content, a number of actions performed on the content, a number of saves performed on the content, and a number of shares performed on the content.

Aspect 9. The method of any preceding aspect, wherein receiving the first location and the second location of the mobile computing device comprises receiving the first location and the second location from a communication interface having a long range communication interface configured to provide communication between a platform for geolocation and time based advertising.

Aspect 10. The method of any preceding aspect, wherein receiving the first location and the second location of the mobile computing device comprises receiving the second from a communication interface having a short range communication interface and a long range communication interface, wherein the long range communication interface is configured to provide communication between a platform for geolocation and time based advertising and the mobile computing device, wherein the short range communication interface is configured to provide communication between a beacon and the mobile computing device, wherein the beacon is located in a vicinity of the geolocation.

Aspect 11. The method of any preceding aspect, further comprising:
  receiving a pin drop action from the mobile computing device, the pin drop action being received when the mobile computing device is within the radius of the geolocation;
  storing all content within the radius and associating the content with the pin drop action in response to receiving the pin drop location within the radius of the geolocation;
  receiving a selection to view all of the content corresponding to the pin drop action; and
  displaying all of the content based on the selection.

Aspect 12. The method of any preceding aspect, wherein receiving the first location and the second location from the mobile computing device comprises receiving the first location and the second location from the mobile computing device comprising a vehicle navigation system, the vehicle navigation system being configured to provide a map of proximate content.

Aspect 13. A system for geolocation and time based advertising, the platform comprising:
  a memory storage;
  at least one processing unit, wherein the at least one processing unit is configured to:
    receive a first indication from a mobile device,
    enable, in response to the first indication, the mobile device for the following:
      a display of content associated with a geolocation when a motion during a course of travel of the mobile device and a period of time during which the motion occurred is consistent with a delivery condition associated with the content, and
      a tracking of locations and movements of the mobile device;
    receive a second indication from the mobile device, wherein the second indication comprises a detection of the mobile device at a first location, wherein the first location is within a radius of a geolocation associated with the content,
    track the mobile device in response to the second indication, wherein the at least one processing unit being configured to track the mobile device comprises the at least one processing unit being configured to track the motion associated with the mobile device during the course of travel of the mobile device;
    receive a third indication from the mobile device, wherein the third indication comprises receiving a second location of the mobile device during the course of travel of the mobile device,
    compare the second location with the first location,
    determine the motion of the mobile device during the course of travel from the first location to the second location based on the comparison, and
    deliver, when the delivery condition is met, the content to the mobile device; and
    at least one of the following communication interfaces:
      a short range communication interface configured to provide communication between a beacon and the mobile device, and
      a long range communication interface configured to provide communication between a platform for geolocation and time based advertising and the mobile device.

Aspect 14. The system of any preceding aspect, wherein the geolocation is associated with at least one of the following: a traditional signage, a digital signage, and a virtual signage.

Aspect 15. The system of any preceding aspect, wherein the content comprises each of the following: an advertisement content, a category associated with the advertisement, an optical code, a promotional code, an expiration date associated with the promotional code and a URL of a webpage, wherein the at least one processing unit is further configured to:
  receive the advertisement content, wherein the advertisement content comprises at least one of the following: a text, an image, an audio and a video,
  receive the category,
  receive the optical code,
  receive each of the promotional code and the expiration date, and
  receive the URL from the client device.

Aspect 16. The system of any preceding aspect, wherein the advertisement content comprises the following: the URL of the webpage, wherein the URL is uniquely associated with the geolocation, wherein the communication interface is further configured to receive the URL from the mobile device, wherein the at least one processing unit is further configured to detect a consumption of the advertisement content by the mobile device based on receiving the URL.

Aspect 17. The system of any preceding aspect, wherein the at least one processing unit is further configured to transmit a cookie to the mobile device, wherein the cookie is configured to track user activity on the mobile device.

Aspect 18. The system of any preceding aspect, wherein the at least one processing unit is further configured to generate advertisement statistics based on detecting the consumption of the advertisement content.

Aspect 19. The system of any preceding aspect, wherein the advertisement statistics comprises at least one of the following: a number of views of the advertisement content, a number of actions performed on the advertisement content, a number of saves performed on the advertisement content, and a number of shares performed on the advertisement content.

Aspect 20. The system of any preceding aspect, wherein the at least one processing unit is further configured to receive a radius to be associated with the content, wherein the radius defines a region for delivering the content.

Aspect 21. The system of any preceding aspect, further comprising a long range communication interface configured to provide communication between a platform for geolocation and time based advertising the mobile device.

Aspect 22. The system of any preceding aspect, wherein the mobile device comprises a vehicle navigation system.

Aspect 23. A method comprising:
  receiving a first indication from a user of a mobile device;
  enabling, in response to the first indication, the mobile device for the following:
    a display of content associated with a geolocation when a motion of the mobile device during a course of travel, a period of time during which the motion occurred, and a characteristic of the user are consistent with a delivery condition associated with the content, a tracking of locations and movements of the mobile device, and a tracking of a user interaction with the content;

receiving a second indication from the mobile device, wherein receiving the second indication comprises receiving a first location of the mobile device;

determining that the first location is within a radius of the geolocation having the content associated with the geolocation;

tracking the mobile device in response to the second indication, wherein tracking the mobile device comprises tracking the mobile device during the course of travel;

receiving a third indication from the mobile device, wherein the third indication comprises receiving a second location of the mobile device;

comparing the second location with the first location;

determining the motion of the mobile device during the course of travel from the first location to the second location based on the comparison;

retrieving a characteristic associated with the user of the mobile device;

delivering, when the delivery condition is met, the content to the mobile device;

receiving a fourth indication from the mobile device, wherein receiving the fourth indication comprises receiving the user interaction with the content;

initiating, in response to the fourth indication, the tracking of the user interaction; and aggregating analytics associated with the user, the mobile device, the user interaction, and the content;

displaying, within an administrative interface, the following:

a representation of the geolocation, a representation of the content associated with the geolocation, and the analytics relative to the content at the geolocation; and providing, within the administrative interface, controls associated with the geolocation, wherein providing the controls comprises the following:

enabling a delivery of the content associated with the geolocation, disabling the delivery of the content associated with the geolocation, and defining the delivery condition for delivering the content comprising the motion and the characteristic.

The following disclose a thirteenth set of aspects of the present disclosure. The thirteenth set of aspects are not to be construed as patent claims unless the language of the aspect appears as a patent claim. The thirteenth set of aspects describe various non-limiting embodiments of the present disclosure.

Aspect 1. A method comprising:

registering asset data, wherein registering the asset data comprises at least one of the following:

registering a first geolocation associated with one of the following:

a physical asset, and a virtual asset;

receiving media content to be associated with at least one registered asset, wherein the media content is configured to be operative with a content interaction layer and a consumer tracking layer to enable:

interacting with a consumer of the media content in conjunction with, at least in part, the media content, and tracking the consumer of the media content in conjunction with, at least in part, the media content;

specifying a plurality of rules for selecting the media content to deliver to the consumer, wherein specifying the plurality of rules comprises specifying:

a first rule for delivering the media content, the first rule being associated with at least one element of profile data corresponding with the consumer, and a second rule for updating the media content, the second rule being associated with a second geolocation;

receiving an activation command for triggering a delivery of the media content, wherein receiving the activation command comprises at least one of the following:

determining that a spatial trigger has occurred, determining that a time-based trigger has occurred, and determining that an event has occurred, comparing the first rule and the at least one element of profile data associated with the consumer in order to determine whether to deliver the media content to the consumer;

delivering the media content to a device associated with the consumer when the first rule is met;

tracking a location associated with the consumer further to the delivery of the media content;

comparing the second rule and the location in order to determine whether to update the media content; and updating the media content at the device associated with the consumer when the second rule is met.

Aspect 2. The method of any preceding aspect, wherein registering the asset data comprises registering a mobile asset, the mobile asset being associated a with location tracking technology.

Aspect 3. The method of any preceding aspect, further comprising:

tracking the mobile asset, and updating a database with an up-to-date location data associated with the location tracking technology.

Aspect 4. The method of any preceding aspect, wherein tracking the mobile asset comprises accessing the database with the up-to-date location data and retrieving the up-to-date location data.

Aspect 5. The method of any preceding aspect, wherein tracking the mobile asset comprises communicating with the location tracking technology associated with the mobile asset.

Aspect 6. The method of any preceding aspect, wherein receiving the activation command for triggering the delivery of the media content comprises determining that the consumer is in a spatial proximity to an up-to-date location of the mobile asset.

Aspect 7. The method of any preceding aspect, wherein registering the asset data comprises registering a brand asset, wherein the brand asset is comprised of a digitization of at least one of the following:

a trade name, a trade design, a trade logo, and a source-identifier associated with a brand.

Aspect 8. The method of any preceding aspect, further comprises:

receiving a multimedia content, and processing the multimedia content to ascertain an object within the multimedia content that corresponds to the brand asset.

Aspect 9. The method of any preceding aspect, wherein receiving the activation command for triggering the delivery of the media content comprises ascertaining that the brand asset is present within the multimedia content.

Aspect 10. The method of any preceding aspect, wherein receiving the multimedia content comprises receiving the multimedia content comprising an image captured by the consumer.

Aspect 11. The method of any preceding aspect, wherein delivering the media content comprises delivering a plurality of content types, wherein each of the plurality of content types is configured to be delivered based on tailored delivery rules.

Aspect 12. The method of any preceding aspect, further comprising tailoring at least one of: a content type and a delivery rule to the at least one element of profile data associated with the consumer.

Aspect 13. The method of any preceding aspect, further comprising tailoring at least one of: a content type and a delivery rule to a characteristic of a device type associated with the consumer.

Aspect 14. The method of any preceding aspect, further comprising tracking at least one action associated with the consumer, wherein tracking the at least one action comprises communicating with the consumer tracking layer operated on at least one device associated with the consumer.

Aspect 15. The method of any preceding aspect, wherein tracking the at least one action comprises employing the consumer tracking layer to track at least one of the following:
  location data,
  sensor data,
  telemetry data,
  device usage data, and
  a unique identifier.

Aspect 16. The method of any preceding aspect, further comprising compiling analytics based on the at least one action.

Aspect 17. The method of any preceding aspect, wherein delivering the media content comprises engaging a transmission module configured to transmit the media content when the consumer is within a physical proximity to the first geolocation.

Aspect 18. The method of any preceding aspect, wherein determining that the spatial trigger has occurred comprises:
  receiving location data from the consumer tracking layer in operative communication with at least one device associated with the consumer.

Aspect 19. The method of any preceding aspect, further comprising, determining, based on the location data, that the recipient is in proximity to the first geolocation.

Aspect 20. The method of claim 1, wherein determining that the time-based trigger has occurred comprises at least one of the following:
  determining that a predefined time has been met,
  receiving a manual triggering event, and
  accessing schedule data from a data storage.

Aspect 21. The method of any preceding aspect, wherein determining that the time-based trigger has occurred comprises at least one of the following:
  receiving a designation of a time, and
  determining that the consumer is in a proximity to at least one of: the first geolocation and the second geolocation at the designated time.

Aspect 22. The method of any preceding aspect, further comprising specifying, for the media content, interactivity criteria.

Aspect 23. The method of any preceding aspect, further comprising receiving an indication that the consumer is moving at a particular path, towards the second geolocation and within a designated period of time.

Aspect 24. The method of any preceding aspect, wherein specifying the interactivity criteria comprises specifying:
  a change in a physical location associated with the consumer,
  a particular destination to which the consumer must navigate, and
  a particular time period in which the consumer must fulfill the interactivity criteria.

Aspect 25. The method of any preceding aspect, wherein tracking the location associated with the consumer comprises tracking the location relative to the interactivity criteria.

Aspect 26. The method of any preceding aspect, further comprising tracking, via the consumer tracking layer, telemetry data.

Aspect 27. The method of any preceding aspect, wherein updating the media content comprises updating the media content upon a fulfillment of the interactivity criteria.

Aspect 28. A method comprising:
  registering asset data, wherein registering the asset data comprises at least one of the following:
  registering a first geolocation associated with one of the following:
    a physical asset, and
    a virtual asset;
  receiving media content to be associated with at least one registered asset;
  specifying a plurality of rules for delivering the media content, wherein specifying the plurality of rules comprises specifying:
    a first delivery rule associated with at least one element of profile data corresponding with a recipient of the media content, and
    a second delivery rule associated with a second geolocation at which the recipient is tracked;
  receiving an indication that the recipient is proximate to the first geolocation,
  comparing the first delivery rule and the at least one element of profile data associated with the recipient;
  tracking a location associated with the recipient in response to a matching comparison;
  comparing the second delivery rule and the location in order to determine whether the recipient is proximate to the second geolocation; and
  delivering, upon fulfillment of the first delivery rule and the second delivery rule, the media content to the recipient.

Aspect 29. A computer-readable medium comprising a set of instructions which when executed perform a method, the method comprising:
  registering asset data, wherein registering the asset data comprises at least one of the following:
  registering a first geolocation associated with one of the following:
    a physical asset, and
    a virtual asset;
  receiving media content to be associated with at least one registered asset;
  specifying a plurality of rules for delivering the media content, wherein specifying the plurality of rules comprises specifying:
    a first delivery rule associated with a period of time, and
    a second delivery rule associated with a second geolocation at which a recipient is tracked during the period of time;
  receiving an indication that the recipient is proximate to the first geolocation;
  tracking a location associated with the recipient in response to a matching comparison;

comparing the second delivery rule and the location in order to determine whether the recipient is proximate to the second geolocation; an delivering, upon fulfillment of the first delivery rule and the second delivery rule, the media content to the recipient.

The following disclose a fourteenth set of aspects of the present disclosure. The fourteenth set of aspects are not to be construed as patent claims unless the language of the aspect appears as a patent claim. The fourteenth set of aspects describe various non-limiting embodiments of the present disclosure.

Aspect 1. A method of geolocation and time-based content provision, the method comprising:

associating content with a geolocation, wherein associating the content with the geolocation comprises:

receiving a specification of the geolocation, the specification including a radius defining a region of the geolocation, receiving the content to be associated with the geolocation, associating the geolocation with the content, storing each of the geolocation, the content, and the association, providing an interface configured to display the following: the geolocation, the content associated with to the geolocation, analytics associated with the content and the geolocation, and defining a delivery condition for delivering the content, the delivery condition comprising a period of time and a direction of travel during a course of travel of the mobile computing device from a first location to a second location:

receiving a first indication from the mobile computing device, wherein receiving the first indication comprises receiving the first location of the mobile computing device;

determining that the first location is within a radius of the geolocation associated with the content;

tracking the mobile computing device in response to the first indication, wherein tracking the mobile computing device comprises tracking the mobile computing device during the course of travel;

receiving a second indication from the mobile computing device, wherein receiving the second indication comprises receiving the second location from the mobile computing device during the course of travel;

comparing the second location with the first location;

determining the direction of travel of the mobile device during the course of travel from the first location to the second location based on the comparison; and transmitting, when the delivery condition is met, the content to the mobile computing device.

Aspect 2. The method of any preceding aspect, wherein associating the geolocation with the content comprises associating the geolocation with at least one of the following: a tradition signage, a digital signage and a virtual signage.

Aspect 3. The method of any preceding aspect, wherein receiving the content comprises receiving each of the following: an advertisement content, a category associated with the advertisement, an optical code, a promotional code, an expiration date associated with the promotional code and a URL of a webpage, wherein the method further comprises:

receiving the advertisement content, the advertisement comprising at least one of the following: a text, an image, an audio and a video;

receiving the category;

receiving the optical code;

receiving each of the promotional code and the expiration date; and receiving the URL.

Aspect 4. The method of claim 3, further comprising:

identifying the category based on a user of the mobile computing device; and displaying the advertisement content associated with the category.

Aspect 5. The method of claim 1, wherein receiving the content comprises receiving a URL of a webpage, the URL being uniquely associated with the geolocation, wherein the method further comprises:

receiving the URL from the mobile computing device; and detecting a consumption of the content by the mobile computing device based on receiving the URL.

Aspect 6. The method of any preceding aspect, further comprising transmitting a cookie to the mobile computing device, wherein the cookie is configured to track user activity on the mobile computing device.

Aspect 7. The method of any preceding aspect, further comprising generating advertisement statistics based on detecting the consumption of the content.

Aspect 8. The method of any preceding aspect, wherein generating the advertisement statistics comprises generating at least one of the following statistics: a number of views of the content, a number of actions performed on the content, a number of saves performed on the content, and a number of shares performed on the content.

Aspect 9. The method of any preceding aspect, wherein receiving the first location and the second location of the mobile computing device comprises receiving the first location and the second location from a communication interface having a long-range communication interface configured to provide communication between a platform for geolocation and time-based advertising.

Aspect 10. The method of claim 1, wherein receiving the first location and the second location of the mobile computing device comprises receiving the second location from a communication interface having a short range communication interface and a long range communication interface, wherein the long range communication interface is configured to provide communication between a platform for geolocation and time-based advertising and the mobile computing device, wherein the short range communication interface is configured to provide communication between a beacon and the mobile computing device, wherein the beacon is located in a vicinity of the geolocation.

Aspect 11. The method of any preceding aspect, further comprising:

receiving a pin drop action from the mobile computing device, the pin drop action being received when the mobile computing device is within the radius of the geolocation;

storing all content within the radius and associating the content with the pin drop action in response to receiving the pin drop location within the radius of the geolocation;

receiving a selection to view all of the content corresponding to the pin drop action; and displaying all of the content based on the selection.

Aspect 12. The method of any preceding aspect, wherein receiving the first location and the second location from the mobile computing device comprises receiving the first location and the second location from the mobile computing device comprising a vehicle navigation system, the vehicle navigation system being configured to provide a map of proximate content.

Aspect 13. A system for geolocation and time-based advertising, the platform comprising:

a memory storage;

at least one processing unit, wherein the at least one processing unit is configured to:

receive a first indication from a mobile device, enable, in response to the first indication, the mobile device for the following:

a display of content associated with a geolocation when a direction of travel during a course of travel of the mobile device and a period of time during which the direction of travel occurred is consistent with a delivery condition associated with the content, and a tracking of locations and movements of the mobile device;

receive a second indication from the mobile device, wherein the second indication comprises a detection of the mobile device at a first location, wherein the first location is within a radius of a geolocation associated with the content, track the mobile device in response to the second indication, wherein the at least one processing unit being configured to track the mobile device comprises the at least one processing unit being configured to track the direction of travel associated with the mobile device during the course of travel of the mobile device, receive a third indication from the mobile device, wherein the third indication comprises receiving a second location of the mobile device during the course of travel of the mobile device, compare the second location with the first location, determine the direction of travel of the mobile device during the course of travel from the first location to the second location based on the comparison, and deliver, when the delivery condition is met, the content to the mobile device;

and at least one of the following communication interfaces:

a short-range communication interface configured to provide communication between a beacon and the mobile device, and a long-range communication interface configured to provide communication between a platform for geolocation and time-based advertising and the mobile device.

Aspect 14. The system of any preceding aspect, wherein the geolocation is associated with at least one of the following: a traditional signage, a digital signage, and a virtual signage.

Aspect 15. The system of any preceding aspect, wherein the content comprises each of the following: an advertisement content, a category associated with the advertisement, an optical code, a promotional code, an expiration date associated with the promotional code and a URL of a webpage, wherein the at least one processing unit is further configured to:

receive the advertisement content, wherein the advertisement content comprises at least one of the following: a text, an image, an audio and a video, receive the category, receive the optical code, receive each of the promotional code and the expiration date, and receive the URL from the client device.

Aspect 16. The system of any preceding aspect, wherein the advertisement content comprises the following: the URL of the webpage, wherein the URL is uniquely associated with the geolocation, wherein the communication interface is further configured to receive the URL from the mobile device, wherein the at least one processing unit is further configured to detect a consumption of the advertisement content by the mobile device based on receiving the URL.

Aspect 17. The system of any preceding aspect, wherein the at least one processing unit is further configured to transmit a cookie to the mobile device, wherein the cookie is configured to track user activity on the mobile device.

Aspect 18. The system of any preceding aspect, wherein the at least one processing unit is further configured to generate advertisement statistics based on detecting the consumption of the advertisement content.

Aspect 19. The system of any preceding aspect, wherein the advertisement statistics comprises at least one of the following: a number of views of the advertisement content, a number of actions performed on the advertisement content, a number of saves performed on the advertisement content, and a number of shares performed on the advertisement content.

Aspect 20. A method comprising:

receiving a first indication from a user of a mobile device;

enabling, in response to the first indication, the mobile device for the following:

a display of content associated with a geolocation when a direction of travel of the mobile device during a course of travel, a period of time during which the direction of travel occurred, and a characteristic of the user are consistent with a delivery condition associated with the content, a tracking of locations, movements, and the direction of travel of the mobile device, and a tracking of a user interaction with the content;

receiving a second indication from the mobile device, wherein receiving the second indication comprises receiving a first location of the mobile computing device;

determining that the first location is within a radius of the geolocation having the content associated with the geolocation;

tracking the mobile computing device in response to the second indication, wherein tracking the mobile device comprises tracking the mobile device during the course of travel;

receiving a third indication from the mobile computing device, wherein the third indication comprises receiving a second location of the mobile computing device;

comparing the second location with the first location;

determining a direction of travel of the mobile device during the course of travel from the first location to the second location relative to the geolocation based on the comparison;

retrieving a characteristic associated with a user of the mobile device;

determining whether to deliver the second content associated with the geolocation to the mobile computing device based on the direction of travel and the characteristic;

delivering, when the delivery condition is met, the content to the mobile device upon the determination;

receiving a fourth indication from the mobile device, wherein receiving the fourth indication comprises receiving the user interaction with the content;

initiating, in response to the fourth indication, the tracking of the user interaction; and aggregating analytics associated with the user, the mobile device, the user interaction, and the content.

The following disclose a fifteenth set of aspects of the present disclosure. The fifteenth set of aspects are not to be construed as patent claims unless the language of the aspect appears as a patent claim. The fifteenth set of aspects describe various non-limiting embodiments of the present disclosure.

Aspect 1. A method comprising:

specifying a content distribution campaign, the content distribution campaign comprising;

a geolocation, and media content associated with the geolocation;

specifying a plurality of rules for the content distribution campaign, wherein specifying the plurality of rules comprises:

specifying a first rule corresponding to a period of time,
specifying a second rule corresponding to at least one element of profile data associated with a consumer, and
specifying a third rule corresponding to a course of travel associated with the consumer;
receiving a first indication that the consumer is at a first location within a radius of the geolocation;
assessing, in response to the first indication, the at least one element of profile data associated with the consumer;
receiving a second indication that the consumer is at a second location;
determining the course of travel based, at least in part, on an analysis of the first location and the second location; and
establishing that the consumer is eligible for the content distribution campaign when the plurality of rules is satisfied.

Aspect 2. The method of any preceding aspect, wherein specifying the third rule corresponding to the course of travel associated with the consumer comprises specifying a destination as the second location.

Aspect 3. The method of any preceding aspect, further comprising providing a first aspect of the media content associated with the content distribution campaign when the following delivery rules are satisfied:
the first rule corresponding to the period of time, and
the second rule corresponding to the at least one element of profile data associated with the consumer.

Aspect 4. The method of any preceding aspect, further comprising tracking the consumer during the course of travel.

Aspect 5. The method of any preceding aspect, further comprising providing a second aspect of the media content associated with the content distribution campaign when the third rule associated with the second location is satisfied.

Aspect 6. The method of any preceding aspect, further comprising, receiving a third indication that the consumer has interacted with the first aspect of the media content during the course of travel.

Aspect 7. The method of any preceding aspect, wherein specifying the first rule comprises specifying a limited timeframe, during the course of travel, in which the consumer has to interact with the first aspect of the media content.

Aspect 8. The method of any preceding aspect, further comprising tracking the consumer during the course of travel in response to the third indication.

Aspect 9. The method of any preceding aspect, wherein tracking the consumer during the course of travel comprises receiving, from a mobile computing device associated with the consumer, at least one of the following:
location data,
sensor data,
telemetry data,
device usage data, and
a unique identifier.

Aspect 10. The method of any preceding aspect, further comprising providing a second aspect of the media content associated with the content distribution campaign when the third rule associated with the second location is satisfied.

Aspect 11. The method of any preceding aspect, wherein specifying the first rule comprises specifying a limited timeframe, during the course of travel, in which the consumer is eligible to receive the media content associated with the content distribution campaign.

Aspect 12. The method of any preceding aspect, wherein specifying the first rule comprises specifying a limited timeframe, during the course of travel, in which the consumer is eligible to receive a second aspect of the media content associated with the content distribution campaign.

Aspect 13. A method comprising:
specifying a content distribution campaign comprising media content associated with a geolocation;
specifying a plurality of rules for the content distribution campaign, wherein specifying the plurality of rules comprises:
specifying the geolocation,
specifying a period of time, and
specifying at least one action to be performed by a consumer;
receiving a first indication that the consumer is within a radius of the geolocation;
tracking the consumer in response to receiving the first indication to determine whether the consumer has performed the at least one action; and
establishing that the consumer is eligible for the content distribution campaign when the plurality of rules is satisfied.

Aspect 14. The method of any preceding aspect, wherein specifying the at least one action comprises specifying at least one of the following:
a target destination; and
a particular path towards the target destination.

Aspect 15. The method of any preceding aspect, further comprising:
receiving a second indication that the consumer is engaged in a potential fulfillment of the at least one action.

Aspect 16. The method of any preceding aspect, wherein receiving the second indication comprises establishing that the consumer is performing at least one of the following actions: moving at a particular path, towards a target destination, and within the period of time.

Aspect 17. The method of any preceding aspect, further comprising:
providing a first aspect of the media content in response to the first indication.

Aspect 18. The method of any preceding aspect, further comprising providing, upon a fulfillment of the at least one action, a second aspect of the media content.

Aspect 19. The method of any preceding aspect, wherein the second aspect of the media content comprises a modification of the first aspect of the media content.

Aspect 20. A method, comprising:
defining at least one of the following for a registered asset:
a physical asset, and
a virtual asset;
defining a media content associated with the registered asset, the media content comprising a first message and a second message;
defining a consumer audience segment to be delivered the media content;
defining a set of rules for providing the media content to the consumer audience segment, the set of rules comprising:
a first rule corresponding a consumer's location in association with the registered asset, and
a second rule corresponding to at least one action performed by a consumer during a course of travel related to the consumer's location in association with the registered asset;
receiving a first determination that the first rule has been satisfied;
associating the first message with the consumer upon the first rule being satisfied;
receiving a second determination that the second rule has been satisfied; and
associating the second message with the consumer upon the second rule being satisfied.

Aspect 21. The method of any preceding aspect, wherein defining the set of rules further comprises defining at least one additional rule specifying the following:

the consumer's relative presence at a first location associated a delivery of the first message;

the consumer's relative presence at a second location associated with a delivery of the second message;

the consumer's path from the first location to the second location; and a period of time in which the consumer traveled from the first location to the second location.

Aspect 22. The method of any preceding aspect, further comprising providing the media content to the consumer.

Aspect 23. A method in the claims, wherein providing the media content comprises:

providing the first message when the at least one additional rule has not been satisfied, and providing the second message when the at least one additional rule has been satisfied.

The following disclose a sixteenth set of aspects of the present disclosure. The sixteenth set of aspects are not to be construed as patent claims unless the language of the aspect appears as a patent claim. The sixteenth set of aspects describe various non-limiting embodiments of the present disclosure.

Aspect 1. A method comprising:

receiving a specification of a geolocation, the specification comprising a radius defining a region of the geolocation;

receiving content to be associated with the geolocation;

associating the geolocation with the content;

defining a delivery condition for delivering the content, the delivery condition comprising a course of travel of a mobile computing device;

receiving a first indication from the mobile computing device, the first indication being associated with a first location of the mobile computing device;

determining that the first location is within the radius of the geolocation associated with the content;

receiving a second indication from the mobile computing device, the second indication being associated with a second location of the mobile computing device;

determining the course of travel of the mobile computing device based on a comparison of the first location to the second location; and transmitting, when the delivery condition is met, the content associated with the geolocation.

Aspect 2. The method of any preceding aspect, wherein associating the geolocation with the content comprises associating the geolocation with at least one of the following: a tradition signage, a digital signage and a virtual signage.

Aspect 3. The method of any preceding aspect, wherein receiving the content comprises receiving each of the following: an advertisement content, a category associated with the advertisement content, an optical code, a promotional code, an expiration date associated with the promotional code and a URL of a webpage.

Aspect 4. The method of any preceding aspect, wherein receiving the content comprises receiving at least one of the following: a text, an image, an audio and a video.

Aspect 5. The method of any preceding aspect, further comprising:

defining a market segment for the content;

determining if a user of the mobile computing device corresponds to the market segment, and wherein transmitting the content comprises transmitting the content when the market segment and the user segment align.

Aspect 6. The method of any preceding aspect, wherein receiving the content comprises receiving a URL of a webpage, the URL being uniquely associated with the geolocation.

Aspect 7. The method of any preceding aspect, further comprising transmitting a cookie to the mobile computing device associated with the user when it is determined that the user has accessed the URL.

Aspect 8. The method of any preceding aspect, further comprising generating advertisement statistics based on the mobile computing device's access of the URL.

Aspect 9. The method of any preceding aspect, wherein generating the advertisement statistics comprises generating at least one of the following statistics: a number of views of the content, a number of actions performed on the content, a number of saves performed on the content, and a number of shares performed on the content.

Aspect 10. The method of any preceding aspect, wherein receiving the first indication and receiving the second indication of the mobile computing device comprises receiving the first location and receiving the second location from a communication interface having a long-range communication interface configured to provide communication between a platform for geolocation and time-based advertising.

Aspect 11. The method of any preceding aspect, wherein receiving the first indication and receiving the second indication of the mobile computing device comprises receiving the first location and receiving the second location from a communication interface comprised of at least one of the following: a short range communication interface and a long range communication interface, wherein the long range communication interface is configured to provide communication between a platform for geolocation and time-based advertising and the mobile computing device, wherein the short range communication interface is configured to provide communication between a beacon and the mobile computing device, wherein the beacon is located in a vicinity of the geolocation.

Aspect 12. The method of any preceding aspect, wherein receiving the first indication and receiving the second indication from the mobile computing device comprises receiving the first location and receiving the second location from the mobile computing device comprising a vehicle navigation system, the vehicle navigation system being configured to provide a map of proximate content.

Aspect 13. A computer-readable medium comprising a set of instructions which, when executed, are configured to perform a method, the method comprising:

establishing a geolocation for content distribution, the content distribution being based on at least the following content distribution conditions:

the geolocation at which a consumer has been located, and a course of travel of the consumer after the consumer has been located at the geolocation;

receiving an initial location of the consumer within the geolocation;

identifying the consumer as a prospect for the content distribution;

receiving a subsequent location of the consumer;

comparing the subsequent location with the initial location;

determining the course of travel based on the comparison; and establishing the consumer as a target for the content distribution when the content distribution conditions have been met.

Aspect 14. The computer-readable medium of any preceding aspect, wherein establishing the geolocation comprises associating the geolocation with at least one of the following: a traditional signage, a digital signage, and a virtual signage.

Aspect 15. The computer-readable medium of any preceding aspect, wherein the content distribution is based on at least one of the following additional conditions:
    a period of time, and
    a profile of the consumer.

Aspect 16. The computer-readable medium of any preceding aspect, further comprising delivering, to the consumer, content associated with the content distribution to the consumer.

Aspect 17. The computer-readable medium of any preceding aspect, further comprising tracking the consumer during the course of travel.

Aspect 18. The computer-readable medium of any preceding aspect, further comprising providing a user interface for viewing statistics associated with the content distribution.

Aspect 19. The computer-readable medium of any preceding aspect, further comprising providing a user interface configured for:
    associating the geolocation with the content distribution, and
    defining the content distribution conditions.

Aspect 20. A method comprising:
    establishing a geolocation for content distribution, the content distribution being based on at least the following content distribution conditions:
        a characteristic of a consumer,
        a period of time,
        the geolocation at which the consumer is located, and
        a course of travel of the consumer;
    receiving an initial location of the consumer within the geolocation;
    determining whether the consumer was within the geolocation within the period of time;
    retrieving the characteristic of the consumer;
    determining whether the characteristic of the consumer matches at least one of the content distribution conditions;
    identifying the consumer as a prospect for the content distribution;
    receiving a subsequent location of the consumer;
    comparing the subsequent location with the initial location;
    determining the course of travel based on the comparison; and
    establishing the consumer as a target for the content distribution.

The following disclose a seventeenth set of aspects of the present disclosure. The seventeenth set of aspects are not to be construed as patent claims unless the language of the aspect appears as a patent claim. The seventeenth set of aspects describe various non-limiting embodiments of the present disclosure.

Aspect 1. A method comprising:
    registering a location of an advertisement asset, the advertisement asset having media content associated with an advertisement campaign;
    tagging a mobile computing device associated with a consumer based on the location of the advertisement asset in relation to the mobile computing device;
    tracking a consumer action performed subsequent to the tagging of the mobile computing device;
    comparing a location change of the user with previous location changes of the user; and
    providing a graphical map of a frequency of location changes of the user.

Aspect 2. The method of any preceding aspect, wherein the tracked consumer action comprises a consumer traversing a geofence border encompassing a physical location.

Aspect 3. The method of any preceding aspect, wherein the tracked consumer action is associated with a particular social event.

Aspect 4. The method of any preceding aspect, wherein the tracked consumer action is associated with the consumer leaving a particular social event.

Aspect 5. The method of any preceding aspect, wherein the tracked consumer action is activity data associated with the mobile computing device.

Aspect 6. The method of any preceding aspect, further comprising collecting activity data, wherein the activity data comprises compiled analytics based on consumer interaction with the location change associated with an advertising asset.

Aspect 7. The method of any preceding aspect, wherein the advertisement asset is a mobile asset configured to travel within a geographical area and configured to be tracked within the geographical area.

Aspect 8. A system for geolocation and time-based advertising, the platform comprising:
    a memory storage; and
    at least one processing unit, wherein the at least one processing unit is configured to:
    register a plurality of assets including at least one of the following:
        a geolocation for physical assets, and
        a geolocation for virtual assets;
    receive an initial consumer geolocation,
    receive a subsequent consumer geolocation,
    compare the initial and subsequent geolocations,
    determine a course of travel of the consumer,
    compile consumer analytics based on a plurality of consumer geolocation changes,
    calculate a plurality of common paths of the plurality of consumer geolocation changes, and
    provide a density map comprising the density of the calculated common paths of the plurality of consumer geolocation changes.

The following disclose an eighteenth set of aspects of the present disclosure. The eighteenth set of aspects are not to be construed as patent claims unless the language of the aspect appears as a patent claim. The eighteenth set of aspects describe various non-limiting embodiments of the present disclosure.

Aspect 1. A method comprising:
    registering asset data including at least one of the following:
        a geolocation for physical assets, and
        a geolocation for virtual assets;
    receiving media content to be associated with at least one registered asset associated with the registered asset data;
    specifying a plurality of rules for delivering the media content to a consumer, wherein specifying the plurality of rules comprises:
        specifying at least a first delivery rule corresponding the consumer's physical location in association with the at least one registered asset;

specifying at least a second delivery rule corresponding to at least one element of profile data associated with the consumer; and specifying at least a third delivery rule corresponding to at least one physical action performed by the consumer;

delivering the media content to a device associated with the consumer upon the first delivery rule and the second delivery rule being satisfied;

comparing a physical action with the third delivery rule in order to determine whether to deliver additional media content to the consumer; and delivering the additional media content to the device based on the comparing the physical action with the third delivery rule.

Aspect 2. The method of any preceding aspect, wherein the media content is configured to operate with a content interaction layer to facilitate interacting with a consumer in conjunction with the media content.

Aspect 3. The method of any preceding aspect, further comprising:

receiving an indication of engagement with the media content through the content interaction layer; and compiling analytics based on the indication of engagement with the media content.

Aspect 4. The method of any preceding aspect, wherein the media content is configured to operate with a consumer tracking layer to facilitate tracking the consumer in conjunction with the media content.

Aspect 5. The method of any preceding aspect, further comprising:

tracking the consumer by accessing a database and retrieving location data;

determining that the consumer is in a spatial proximity to a registered asset based on the tracking; and delivering the additional media content to the device based on the determining.

Aspect 6. The method of any preceding aspect, wherein the consumer tracking layer is configured to track at least one of the following:
 location data,
 sensor data,
 telemetry data,
 device usage data, and
 a unique identifier.

Aspect 7. The method of any preceding aspect, wherein the additional media content is associated with interacting within a physical location associated with the at least one registered asset.

Aspect 8. The method of any preceding aspect, wherein the additional media content is associated the geofence surrounding the at least one registered asset.

Aspect 9. The method of any preceding aspect, wherein specifying the third delivery rule comprises specifying that the consumer is present within the geofence.

Aspect 10. The method of any preceding aspect, wherein specifying the third delivery rule comprises specifying that the consumer has interacted with the media content within a predetermined timeframe.

Aspect 11. The method of any preceding aspect, wherein specifying the second delivery rule comprises one of:

specifying an amount of time any consumer can be delivered the media content;

specifying times of day any consumer can be delivered the media content; and specifying a number of times a particular consumer can receive the media content.

Aspect 12. The method of any preceding aspect, wherein delivering the media content comprises engaging a transmission module configured to transmit the media content when the consumer is within a physical proximity to a registered asset.

Aspect 13. The method of any preceding aspect, further comprising suppressing third party media content when the consumer is within a physical proximity to a registered asset.

Aspect 14. The method of any preceding aspect, wherein delivering the media content comprises engaging a transmission module configured to transmit the media content when the consumer is within a physical proximity to a third party asset.

Aspect 15. The method of any preceding aspect, further comprising compiling analytics based on an indication of engagement with the media content, the analytics comprising at least one of the following:

a number of consumer visits within a physical proximity to a registered asset;

a frequency of visits of consumers having the media content and within a physical proximity to a registered asset;

an amount of time one or more consumers dwell within a physical proximity to a registered asset; and a consumer-specific frequency of visits within a physical proximity to a registered asset.

Aspect 16. The method of any preceding aspect, wherein delivering the media content comprises engaging a transmission module configured to transmit at least one of the following:

multiple different media contents when the consumer is within a physical proximity to a registered asset; and a single media content when the consumer is within a physical proximity to one or more different registered assets.

Aspect 17. The method of any preceding aspect, wherein the first delivery rule and the second delivery rule being satisfied comprises at least one of the following:

receiving a designation of a space and a time; and determining that the consumer is in a proximity to the designated space at the designated time.

Aspect 18. The method of any preceding aspect, further comprising specifying, for the delivered media content, interactivity criteria.

Aspect 19. The method of any preceding aspect, further comprising:

receiving an indication that the consumer is engaged in a potential fulfillment of the interactivity criteria, wherein receiving the indication comprises receiving the indication that the consumer is moving at a particular path, towards a physical location, and within a designated period of time.

Aspect 20. The method of any preceding aspect, wherein the interactivity criteria is configured to be associated with:

a change in a physical location associated with the consumer;

a particular destination to which the consumer navigates; and a particular time period in which the consumer must fulfill the interactivity criteria.

Aspect 21. The method of any preceding aspect, further comprising providing, upon a fulfillment of the interactivity criteria:

a modification of the delivered media content and a tracking of the consumer's activity as it relates to the interactivity criteria with additional media content when interactivity criteria is met.

Aspect 22. The method of any preceding aspect, further comprising providing, upon a fulfillment of the interactivity criteria:

replacing the delivered media content and a tracking of the consumer's activity as it relates to the interactivity criteria with new media content when interactivity criteria is met.

Aspect 23. The method of any preceding aspect, wherein the interactivity criteria comprises at least one of the following:
an amount of consumer interactions with a user interface related to the delivered media content;
a threshold amount of time a consumer views the delivered media content;
a request to purchase a good or service associated with the delivered media content; and
a purchase of a good or service associated with the delivered media content.

Aspect 24. The method of any preceding aspect, wherein specifying the second delivery rule comprises specifying that the at least one element of profile data is related to the interactivity criteria.

Aspect 25. The method of any preceding aspect, wherein specifying the second delivery rule comprises specifying that the at least one element of profile data is an unpurchased good or service from previous interactivity, and the additional media content is an offer to purchase the unpurchased good or service.

Aspect 26. The method of any preceding aspect, wherein the unpurchased good or service is related to a first entity and the offer to purchase is related to a second entity.

Aspect 27. The method of any preceding aspect, wherein specifying the second delivery rule comprises specifying that the at least one element of profile data is one or more of the following:
previous interactivity;
consumer demographics;
consumer location history; and
consumer preferences.

VII. Claims

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The following is claimed:

1. A method comprising:
receiving an initial real-time device location from each of a plurality of devices, at least one of the plurality of devices is identifiable by a cookie;
receiving a subsequent real-time device location from each of the plurality of devices where at least one of the plurality of devices is identified by the cookie to receive the subsequent real-time device location;
determining a course of travel corresponding to each of the plurality of devices;
associating each device with each determined course of travel;
aggregating data associated with courses of travel for the plurality of devices includes calculating a consumer's propensity to visit the subsequent real-time device location from the initial real-time device location, data associated with a plurality of registered assets and also includes
data associated with device interactivity with content corresponding to the at least one registered asset;
providing a density map indicating a density of the plurality of commonly traveled paths that include statistics associated with device interactivity while within a threshold distance to the geolocation associated with the at least one registered asset;
determining a plurality of commonly traveled paths based on the aggregated data;
receiving an identification of a path of the plurality of commonly traveled paths;
anticipating that at least one device will travel down the identified path based on a comparison of a profile of the at least one device and the plurality of commonly traveled paths;
defining content to be transmitted to the at least one device traveling down the identified path, employing a demand side bidding system, and based on at least one of the following:
commercial activity associated with the plurality of devices traveling along the identified path, and parameters of media content viewed by the plurality of devices traveling down the identified path;
receiving an indication that the at least one device is traveling down the identified path the indication being triggered by at least one of the following:
a spatial trigger occurring, and a time-based trigger occurring;
transmitting the defined content to the anticipated at least one device:
and receiving subsequent data associated with one or more subsequent actions of the at least one device, the subsequent data relating to the transmitted defined content.

2. The method of claim 1, further comprising determining whether the course of travel corresponds to at least a portion of the identified path.

3. The method of claim 2, further comprising tagging the device for association with the defined content upon a determination that the course of travel corresponds to at least the portion of the identified path.

4. The method of claim 1, further comprising for each of the plurality of commonly traveled paths, registering at least one asset associated with the plurality of commonly traveled paths, the at least one asset comprising at least one of the following:
a physical asset, and
a virtual asset.

5. The method of claim 1, wherein aggregating the data comprises aggregating at least one of the following:
location data,
sensor data,
telemetry data,
device usage data, and
a unique identifier.

6. The method of claim 1, wherein aggregating the data comprises aggregating at least one of the following:
data associated with device proximity to at least one registered asset surrounding the subsequent real-time device location; and
data associated with device interactivity with content corresponding to the at least one registered asset.

7. The method of claim 1, wherein determining the course of travel of the consumer comprises determining the course of travel by accessing a database and retrieving location data.

8. The method of claim 1, wherein providing the density map comprises providing statistics associated with a number of device visits within a physical proximity of at least one commonly traveled path of the plurality of commonly traveled paths of the device.

9. The method of claim 1, wherein comparing the initial real-time device location and the subsequent real-time device location comprises tracking the real-time device location within a venue.

10. The method of claim 1, wherein determining the course of travel comprises determining the course of travel for a particular event.

11. The method of claim 1, further comprising generating an anticipated course of travel of the plurality of devices based on a comparison of at least one profile of the plurality of devices and at least one event occurring at a commonly attended venue.

12. The method of claim 11, wherein defining the content comprises defining the content associated with the event of the commonly attended venue.

13. The method of claim 4 further comprising transmitting the defined content to the registered at least one asset.

14. The method of claim 4 further comprising determining proximity information between registered assets.

15. The method of claim 6, wherein aggregating data comprises determining an amount of time one or more consumers dwell within the proximity to the at least one registered asset.

16. The method of claim 7, further comprising identifying, for the plurality of commonly traveled paths, the plurality of registered assets associated with each commonly traveled path.

17. A system for geolocation and time-based advertising, the system comprising:
 a memory storage; and
 at least one processing unit, wherein the at least one processing unit is configured to:
 receive an initial real-time device location from each of a plurality of devices, receive a subsequent real-time device location from each of a plurality of devices, where a cookie identifies a device in the plurality of devices to receive the subsequent real-time device location, compare the initial real-time device location and the subsequent real-time device location, determine a course of travel corresponding to each of the plurality of devices, associate each device with each determined course of travel, aggregate data associated with courses of travel for the plurality of other devices, wherein aggregate data includes calculating a consumer's propensity to visit the subsequent real-time device location from the initial real-time device location, data associated with a plurality of registered assets and also includes
 data associated with device interactivity with content corresponding to the at least one registered asset,
 determine a plurality of common paths based on the aggregated data,
 anticipate that at least one device will travel down the identified path based on a comparison of a profile of the at least one device and the plurality of commonly traveled paths,
 provide a density map comprising a density of the plurality of common paths that include statistics associated with device interactivity while within a threshold distance to the geolocation associated with the at least one registered asset,
 receive an identification of a path of the plurality of common paths, and
 define content to be transmitted to at least one device traveling down the identified path, employing a demand side bidding system, and based on at least one of the following:
 commercial activity associated with the plurality of devices associated with the identified path, and
 parameters of media content viewed by the plurality of devices associated with the identified path,
 receive an indication that the at least one device is traveling down the identified path, the indication being triggered by at least one of the following:
 a spatial trigger occurring, and
 a time-based trigger occurring, and
 transmit the defined content to the anticipated at least one device; and
 receive subsequent data associated with one or more subsequent actions of the at least one device, the subsequent data relating to the transmitted defined content.

* * * * *